United States Patent [19]

Fukushima et al.

[11] Patent Number: 5,327,290

[45] Date of Patent: Jul. 5, 1994

[54] COMPACT SIZE ZOOM LENS SYSTEM

[75] Inventors: Akira Fukushima; Takashi Okada, both of Osaka; Junji Hashimura, Sakai; Hiromu Umeda, Sakai; Hisayuki Masumoto, Sakai; Hisashi Tokumaru, Osakasayama, all of Japan

[73] Assignee: Minolta Camera Kabushiki Kaisha, Osaka, Japan

[21] Appl. No.: 595,389

[22] Filed: Oct. 10, 1990

[30] Foreign Application Priority Data

| Oct. 13, 1989 | [JP] | Japan | 1-266602 |
| Oct. 13, 1989 | [JP] | Japan | 1-266603 |
| Oct. 13, 1989 | [JP] | Japan | 1-266604 |
| Oct. 13, 1989 | [JP] | Japan | 1-266605 |
| Oct. 13, 1989 | [JP] | Japan | 1-266606 |
| Oct. 13, 1989 | [JP] | Japan | 1-266607 |
| Oct. 13, 1989 | [JP] | Japan | 1-266608 |
| Nov. 28, 1989 | [JP] | Japan | 1-308066 |
| Nov. 28, 1989 | [JP] | Japan | 1-308067 |
| Mar. 26, 1990 | [JP] | Japan | 2-077221 |
| Mar. 26, 1990 | [JP] | Japan | 2-077222 |
| Mar. 26, 1990 | [JP] | Japan | 2-077223 |
| Mar. 26, 1990 | [JP] | Japan | 2-077224 |
| Mar. 26, 1990 | [JP] | Japan | 2-077225 |
| Mar. 26, 1990 | [JP] | Japan | 2-077226 |

[51] Int. Cl.$^5$ ............ G02B 15/14; G02B 13/18
[52] U.S. Cl. ............ 359/692; 359/684; 359/689; 359/715; 359/716; 359/717
[58] Field of Search ............ 350/432–435, 350/423, 427; 359/684, 689, 690, 691, 692, 715, 716, 717

[56] References Cited

U.S. PATENT DOCUMENTS

| 4,652,091 | 3/1987 | Oizumi et al. | 359/692 |
| 4,659,186 | 4/1987 | Sato et al. | 359/692 |
| 4,682,860 | 7/1987 | Tanaka et al. | 359/692 |
| 4,726,668 | 2/1988 | Nakayama et al. | 359/692 |
| 4,772,106 | 9/1988 | Ogata et al. | 350/423 X |
| 4,787,718 | 11/1988 | Cho | 359/692 |
| 4,815,830 | 3/1989 | Sato et al. | 359/692 |
| 4,830,476 | 5/1989 | Aoki | 359/692 |
| 4,838,669 | 6/1989 | Ogata et al. | 359/692 |
| 4,848,883 | 7/1989 | Maruyama | 359/684 |
| 4,906,077 | 3/1990 | Ito | 359/692 |
| 4,911,539 | 3/1990 | Tsunashima et al. | 359/692 |
| 4,936,661 | 6/1990 | Betensky et al. | 359/692 |

FOREIGN PATENT DOCUMENTS

| 56-128911 | 10/1981 | Japan . |
| 58-137813 | 8/1983 | Japan . |
| 58-184916 | 10/1983 | Japan . |
| 58-215620 | 12/1983 | Japan . |

(List continued on next page.)

OTHER PUBLICATIONS

"Study on the Optical Design of a Zoom Lens," by Keizo Yamaji, Cannon Research Report No. 3, 1965.

Primary Examiner—Scott J. Sugarman
Attorney, Agent, or Firm—Price, Gess & Ubell

[57] ABSTRACT

A new compact-size, light-weight and low-cost zoom lens system having a high optical quality with a very simple structure including, from the object side to the image side, a front lens group having a positive refractive power and a rear lens group having a negative refractive power. The zoom lens system is operated by changing the axial air distance between the front and rear lens groups during a zooming operation. The zoom lens system uses aspherical surfaces whose low-cost manufacturing has been enabled by the recent progresses in plastic molding technology and glass molding technology. Many embodiments of the lens compositions according to the present invention, and furthermore specific examples of the embodiments are described with figures and data that show compactness and high optical performance.

42 Claims, 79 Drawing Sheets

FOREIGN PATENT DOCUMENTS

| | | |
|---|---|---|
| 60-48009 | 3/1985 | Japan . |
| 60-191216 | 9/1985 | Japan . |
| 60-263113 | 12/1985 | Japan . |
| 61-67016 | 4/1986 | Japan . |
| 61-69017 | 4/1986 | Japan . |
| 61-87119 | 5/1986 | Japan . |
| 61-87120 | 5/1986 | Japan . |
| 62-56917 | 3/1987 | Japan . |
| 62-78522 | 4/1987 | Japan . |
| 62-235916 | 10/1987 | Japan . |
| 62-251710 | 11/1987 | Japan . |
| 63-25613 | 2/1988 | Japan . |
| 63-32513 | 2/1988 | Japan . |
| 63-139314 | 6/1988 | Japan . |
| 63-148223 | 6/1988 | Japan . |
| 63-266413 | 11/1988 | Japan . |
| 63-276013 | 11/1988 | Japan . |
| 63-311224 | 12/1988 | Japan . |
| 64-42618 | 2/1989 | Japan . |
| 64-52111 | 2/1989 | Japan . |
| 1-191114 | 8/1989 | Japan . |
| 1-193807 | 8/1989 | Japan . |
| 1-193808 | 8/1989 | Japan . |
| 1-243011 | 9/1989 | Japan . |
| 1-307714 | 12/1989 | Japan . |
| 2-6917 | 1/1990 | Japan . |
| 2-10307 | 1/1990 | Japan . |
| 2-18511 | 1/1990 | Japan . |
| 2-51116 | 2/1990 | Japan . |
| 2-52308 | 2/1990 | Japan . |

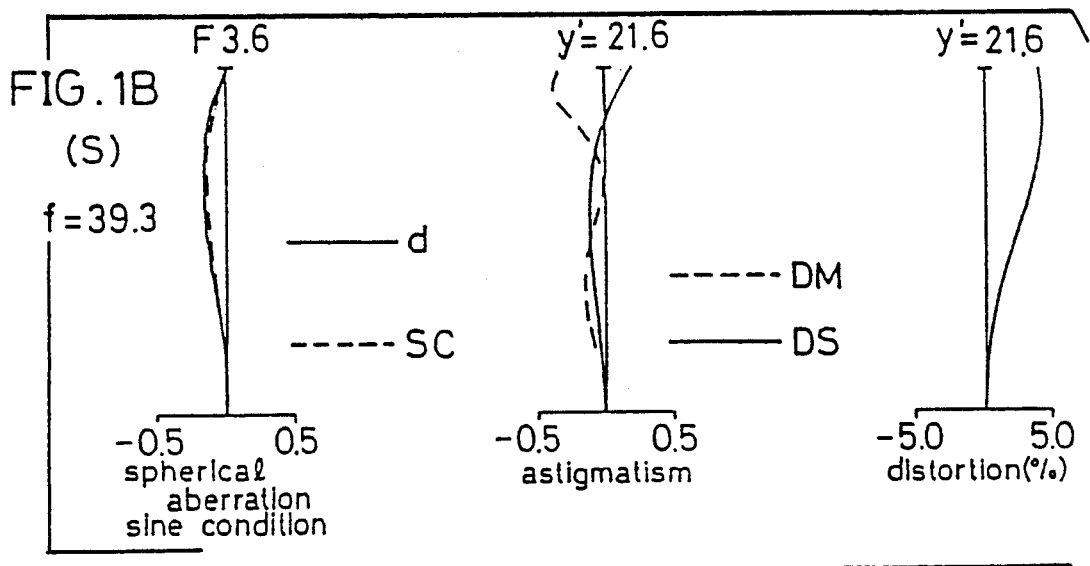
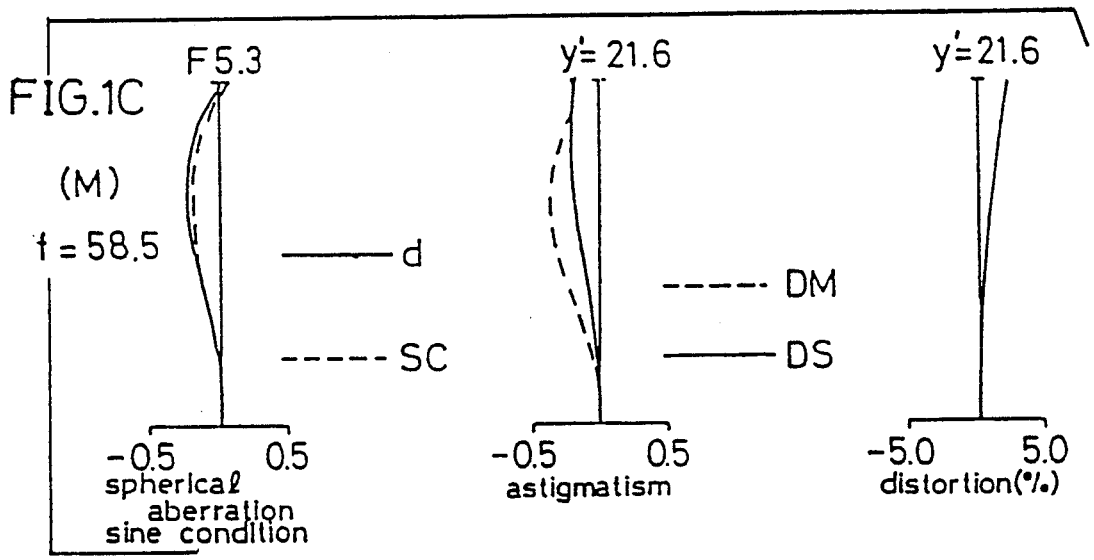
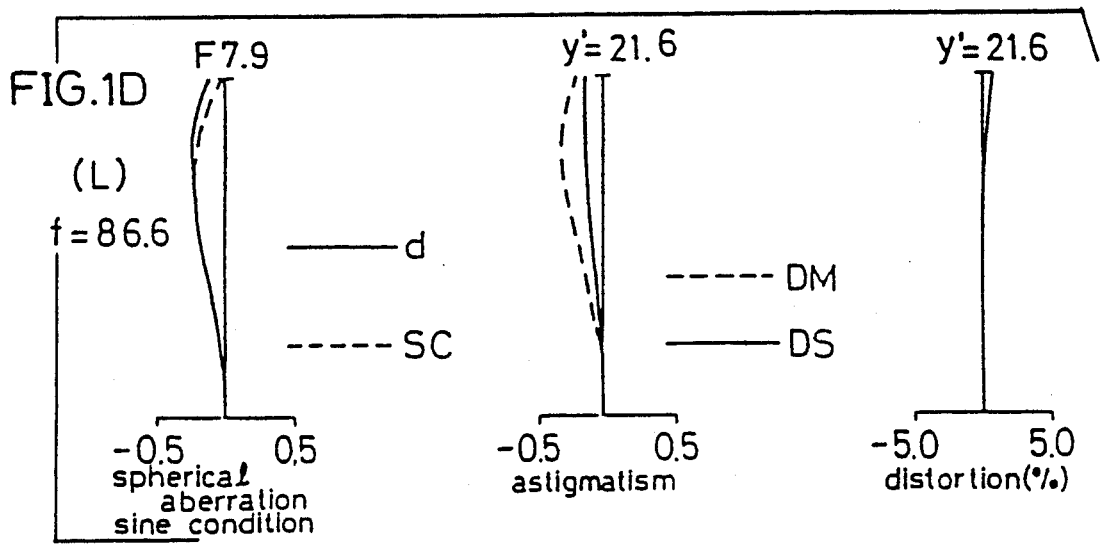

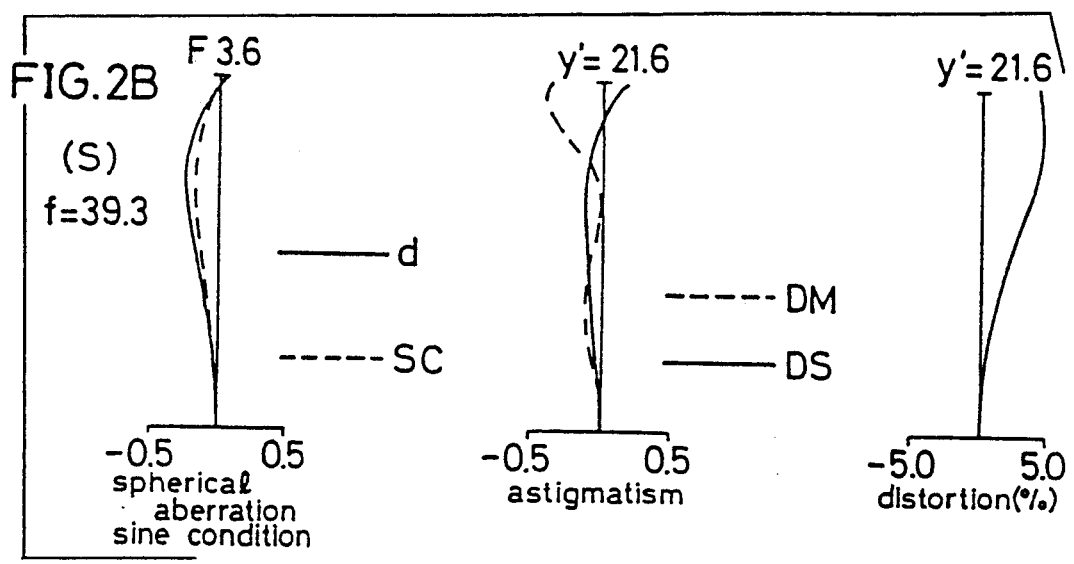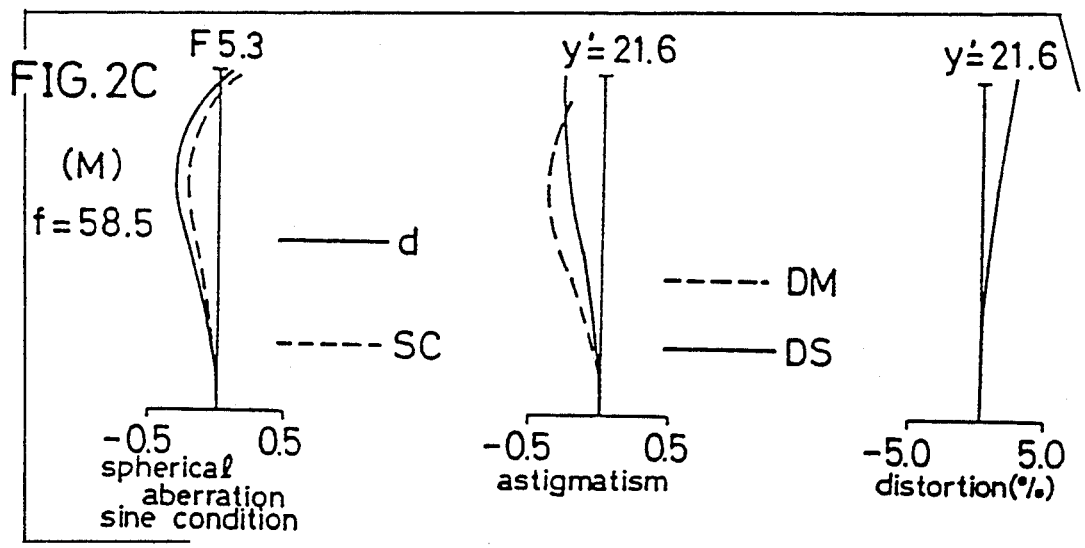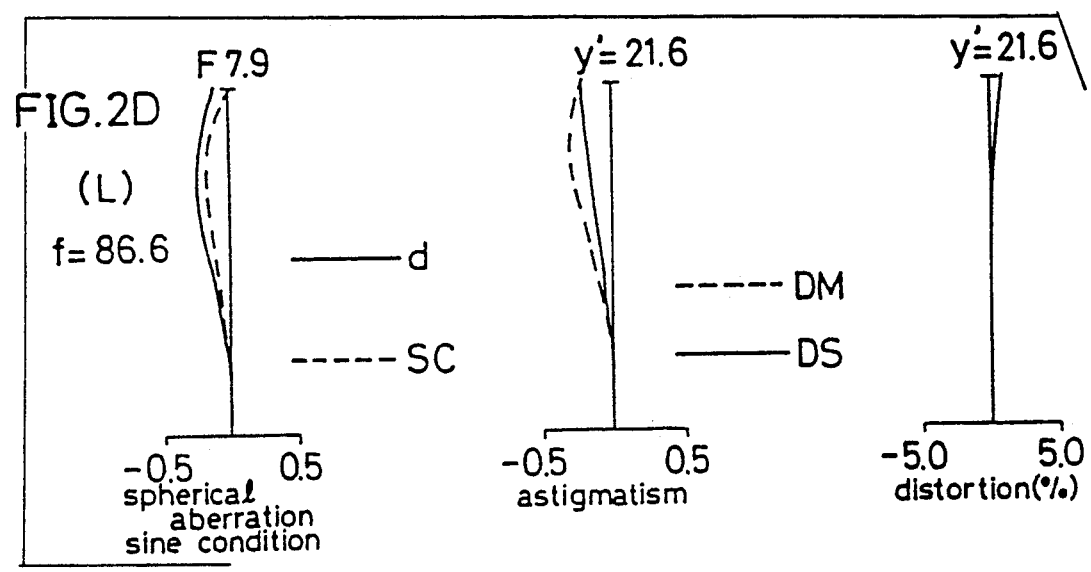

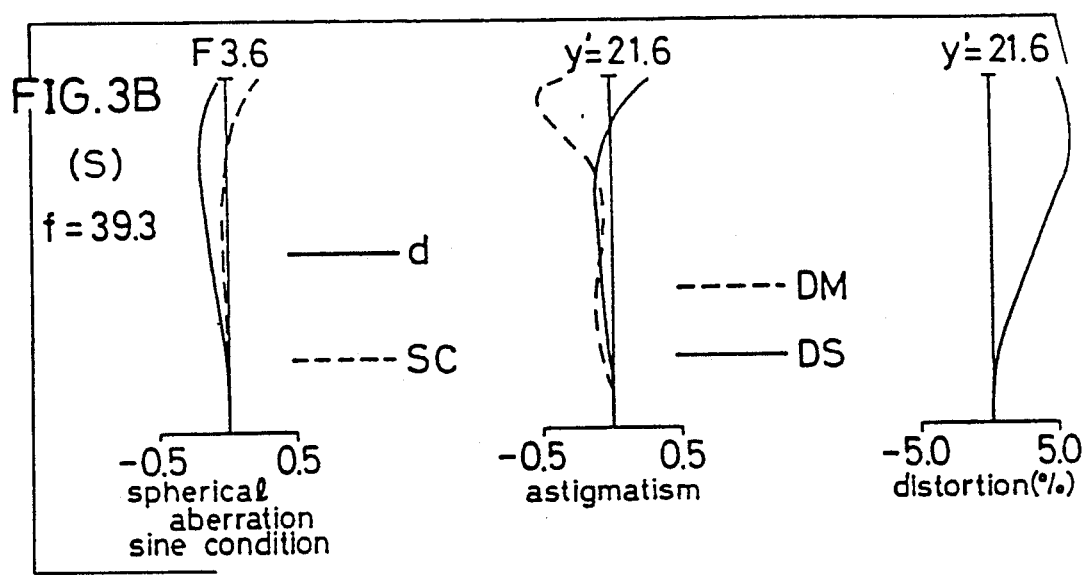
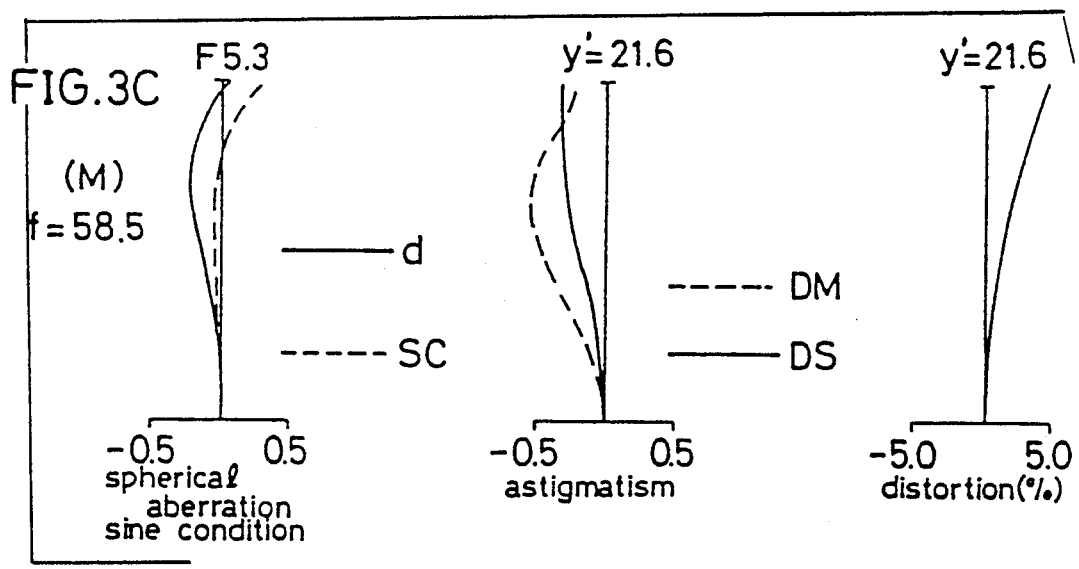
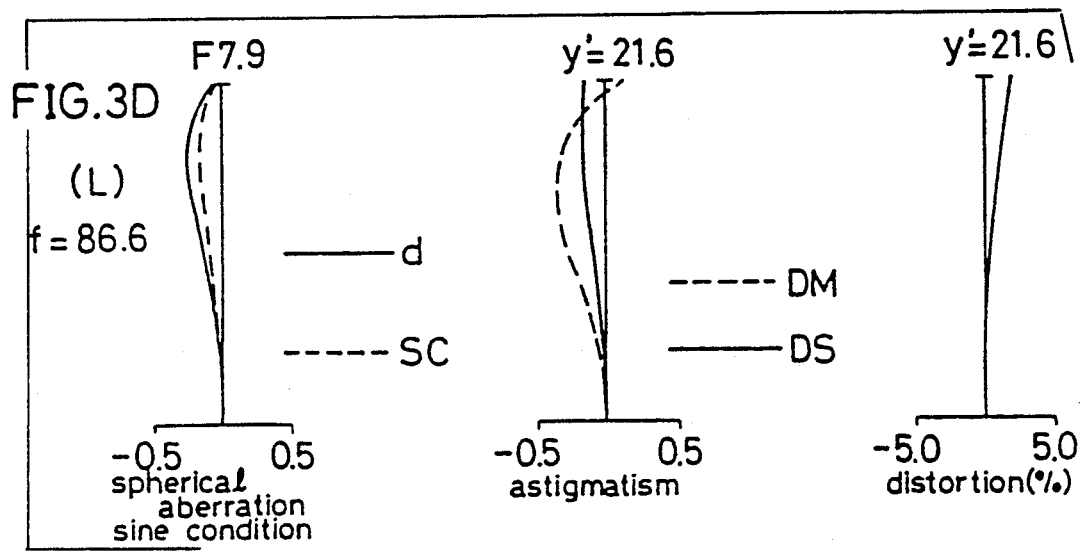

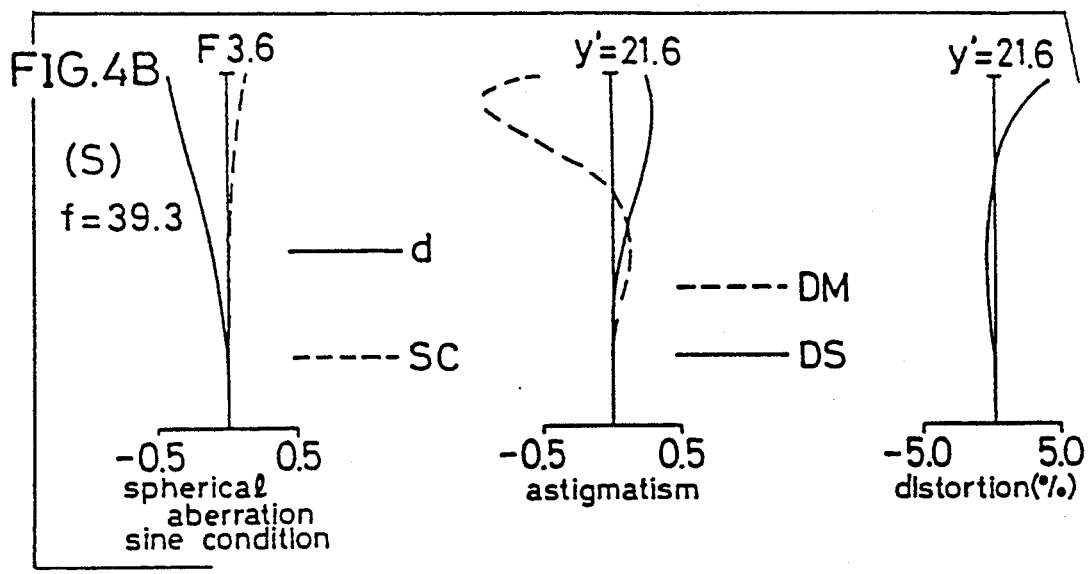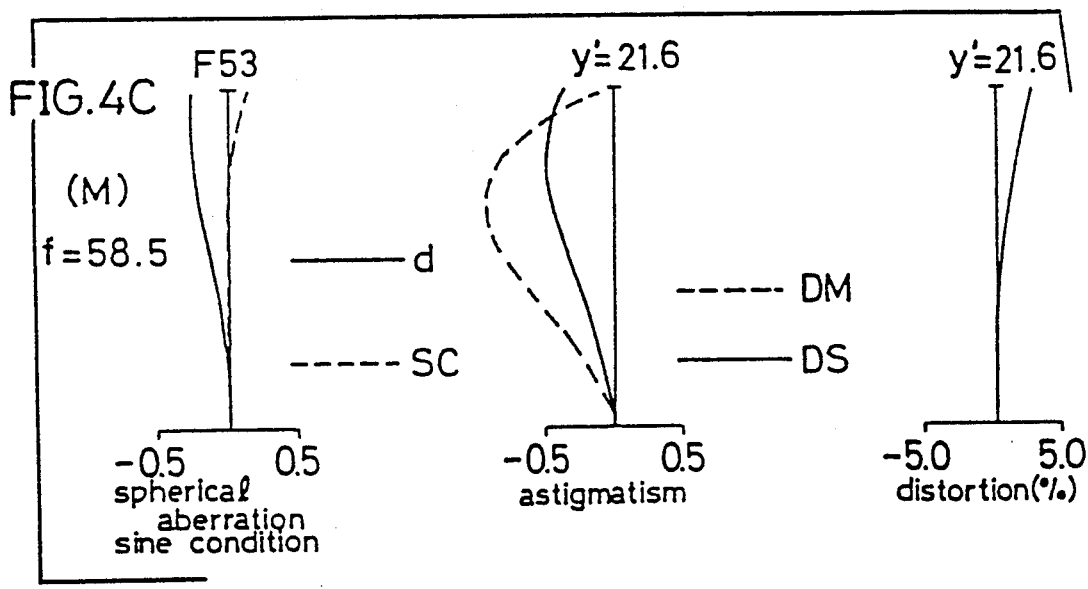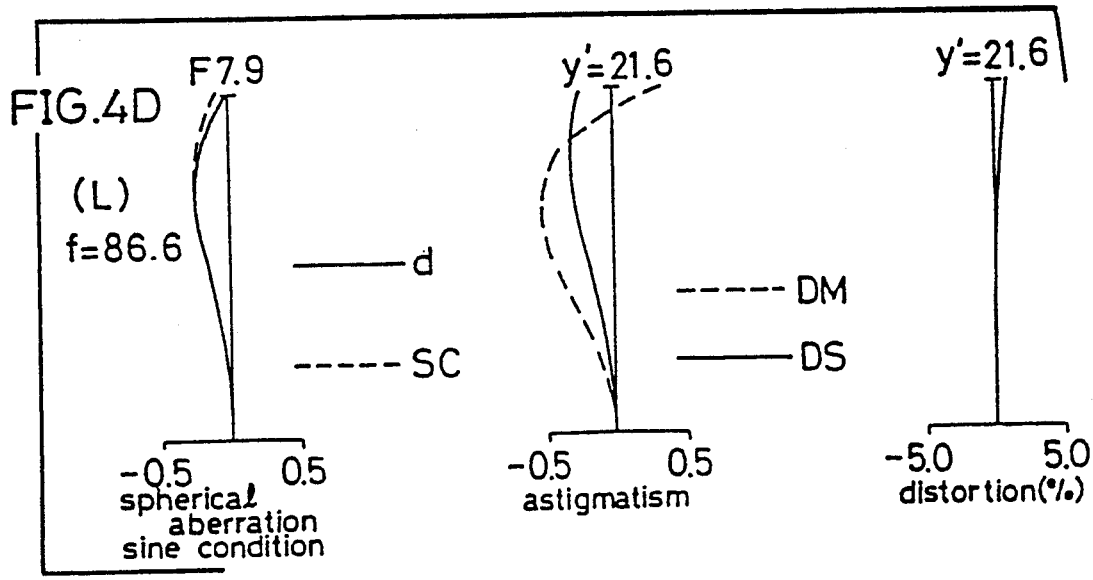

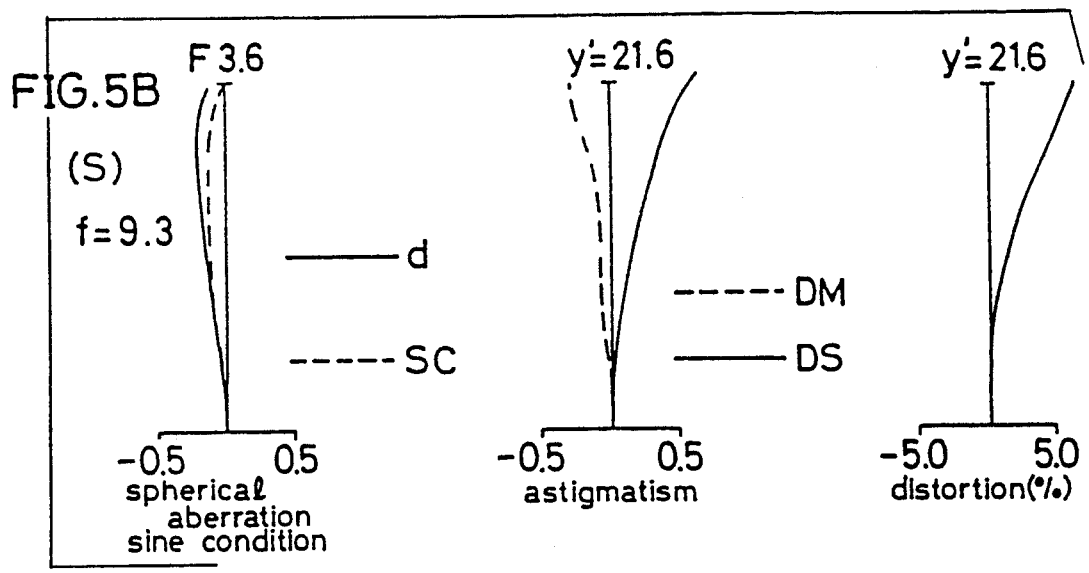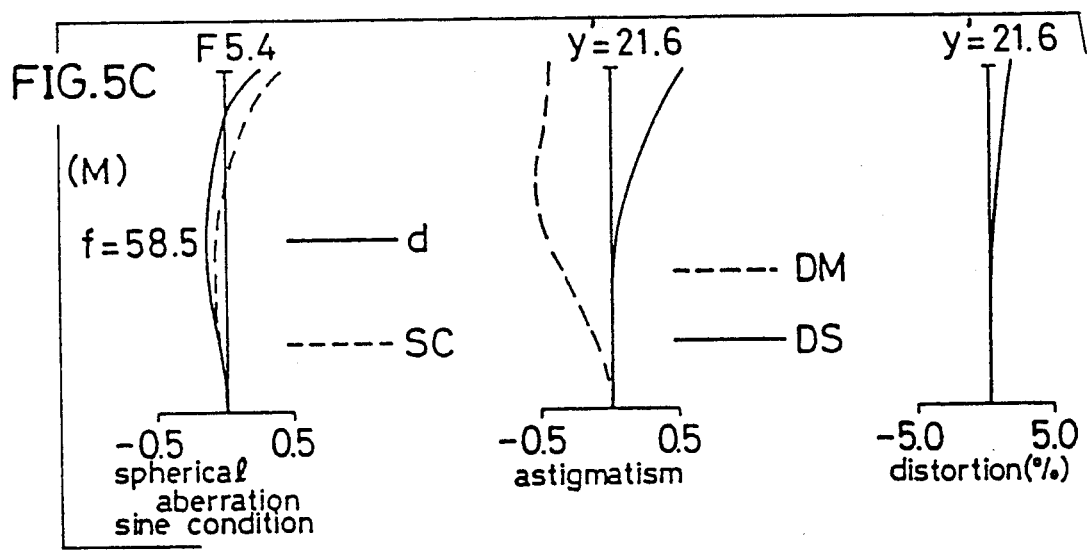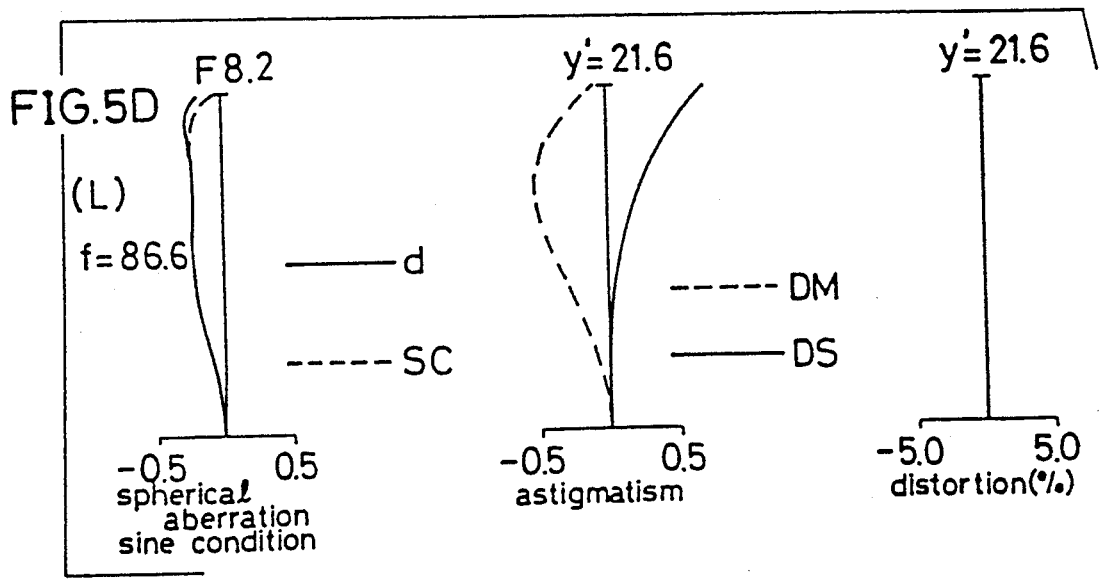

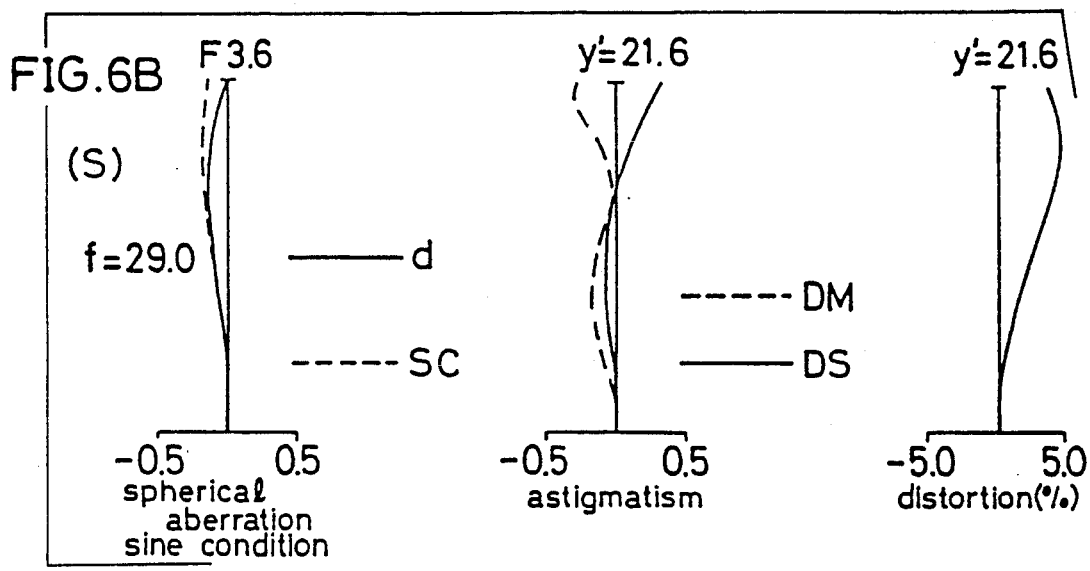
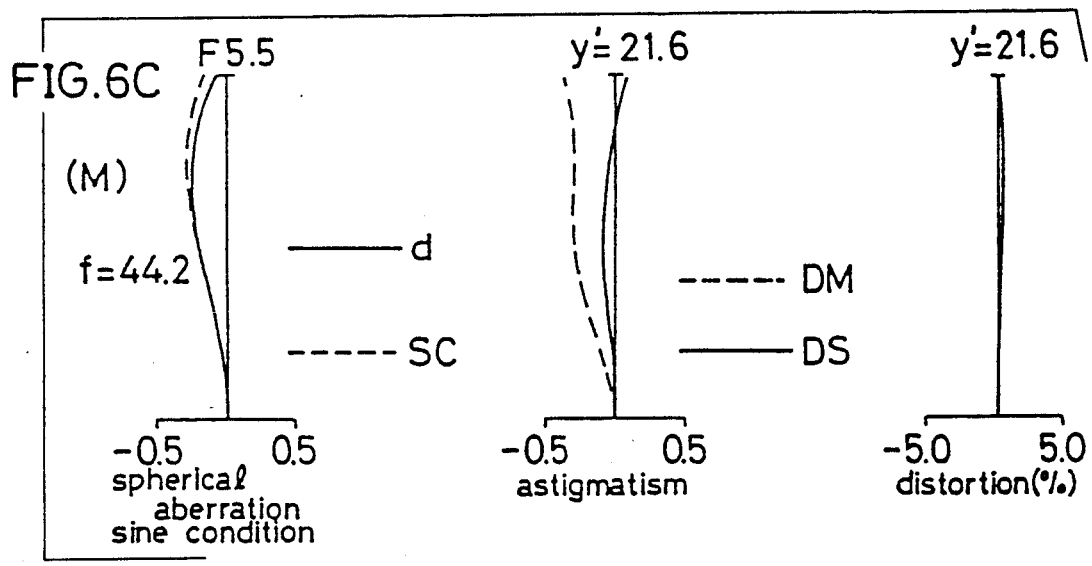
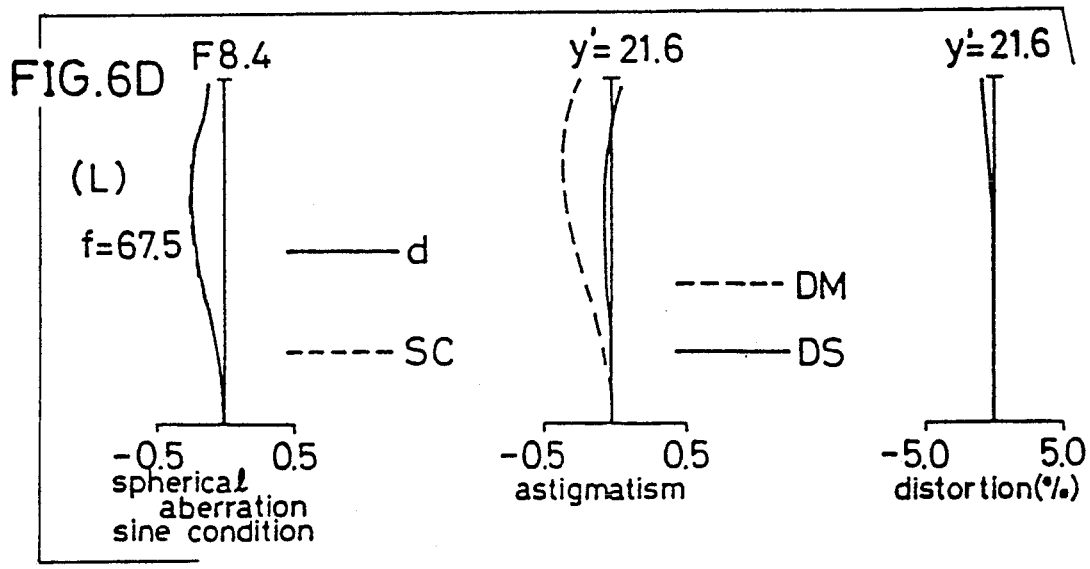

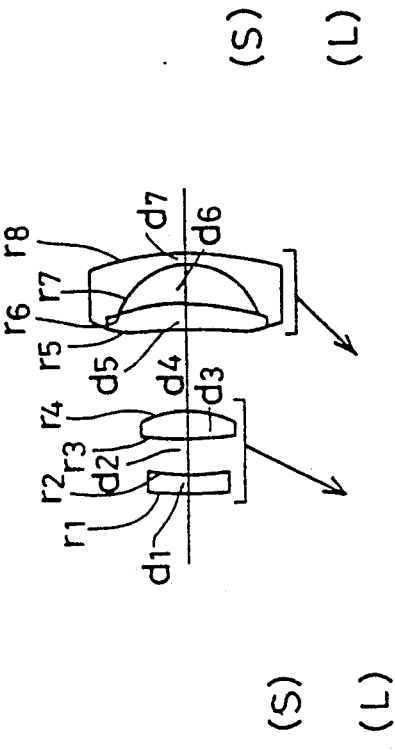
FIG.6A
FIG.7A
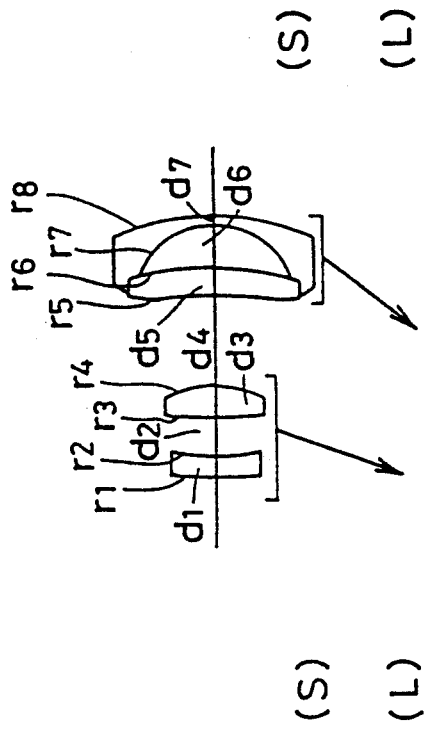
FIG.8A
FIG.9A

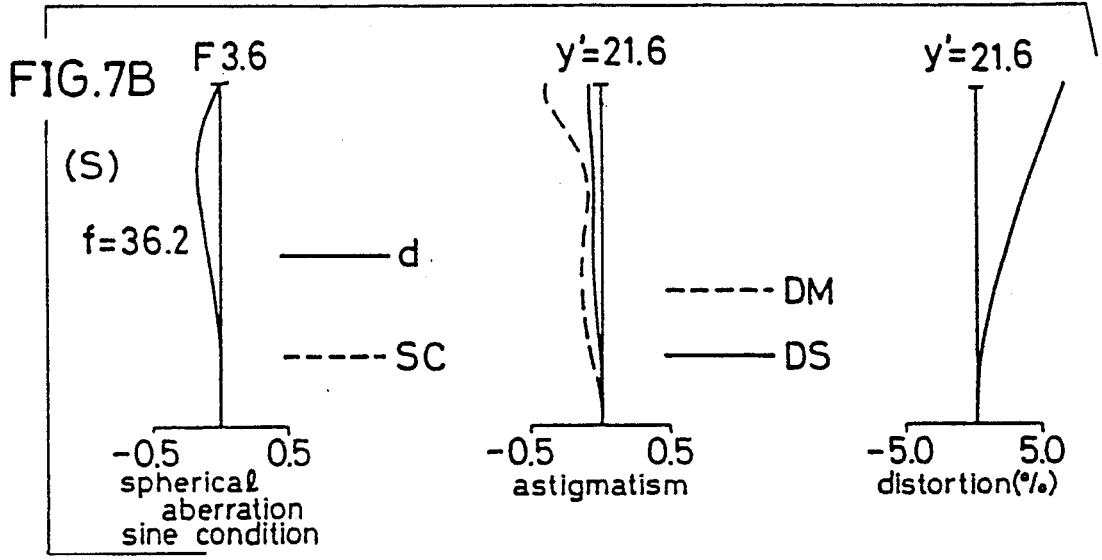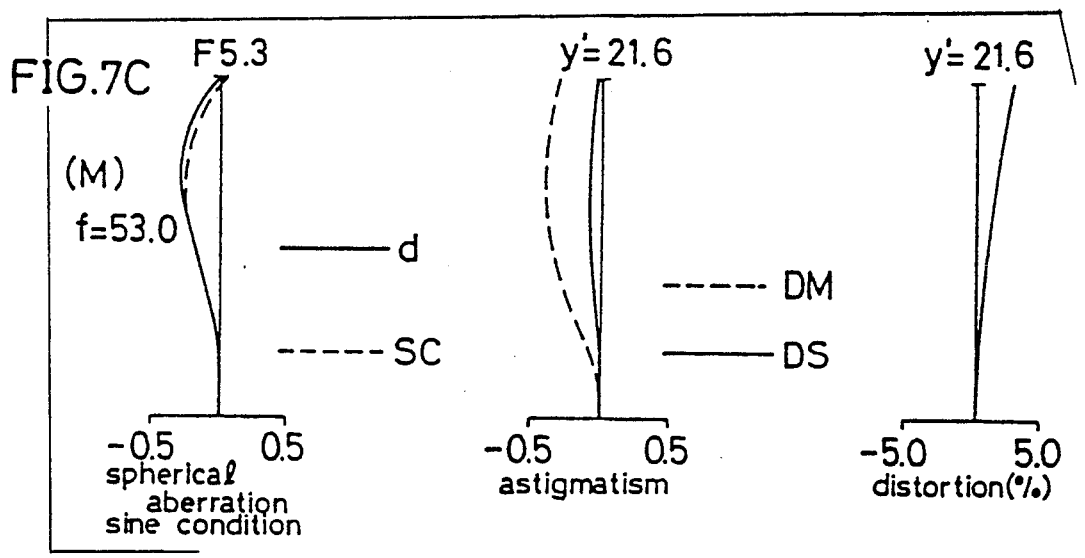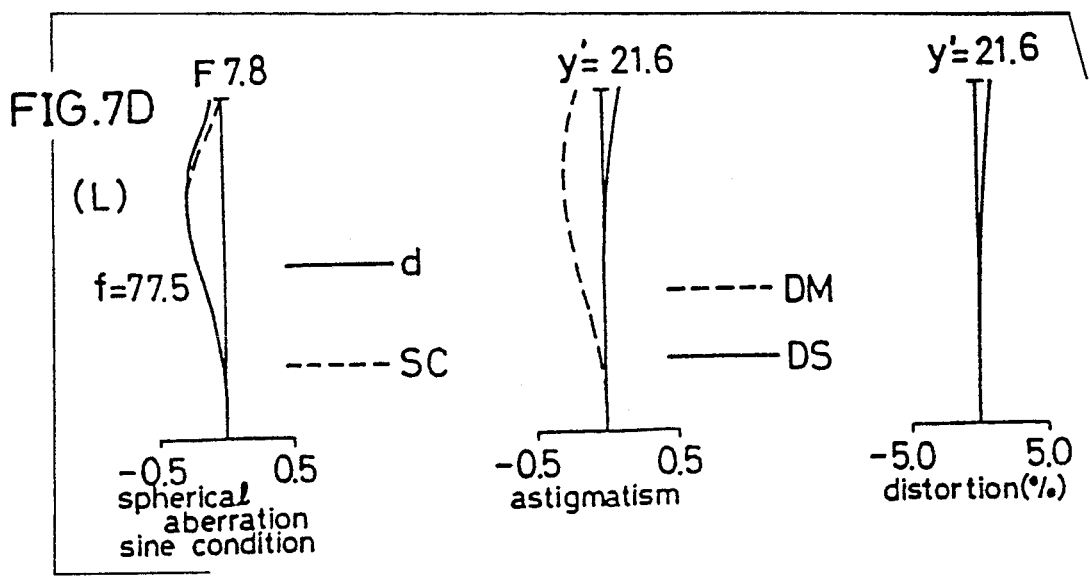

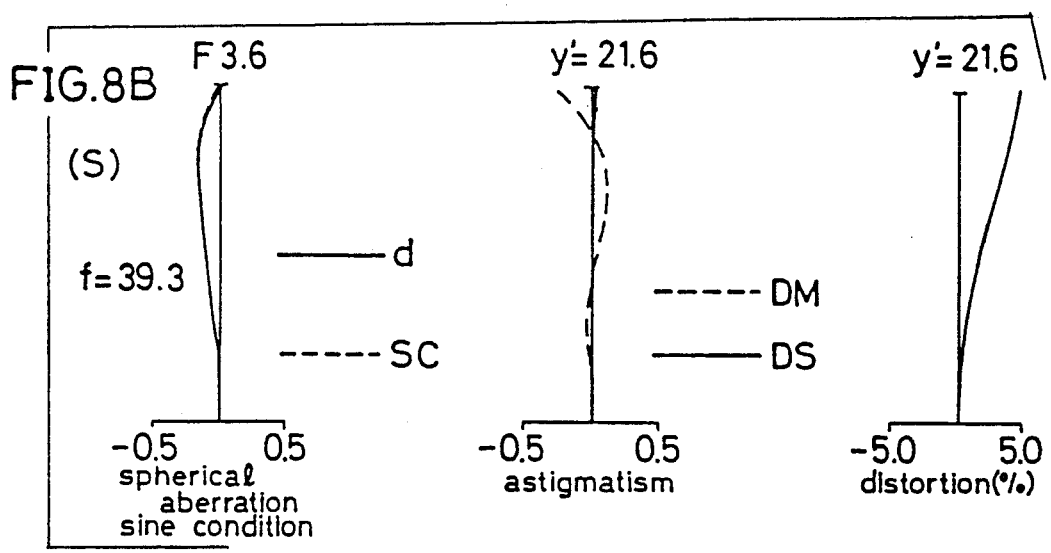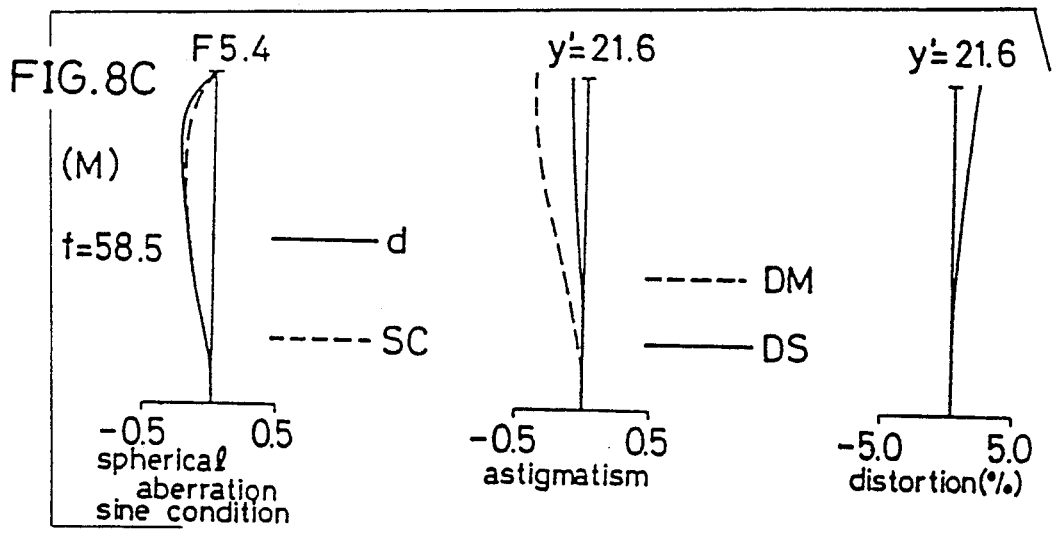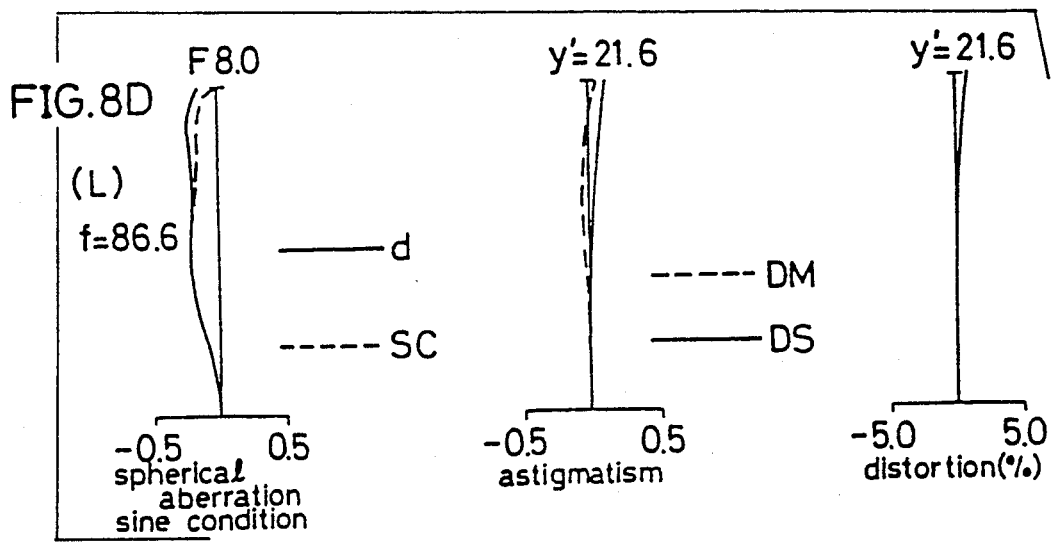

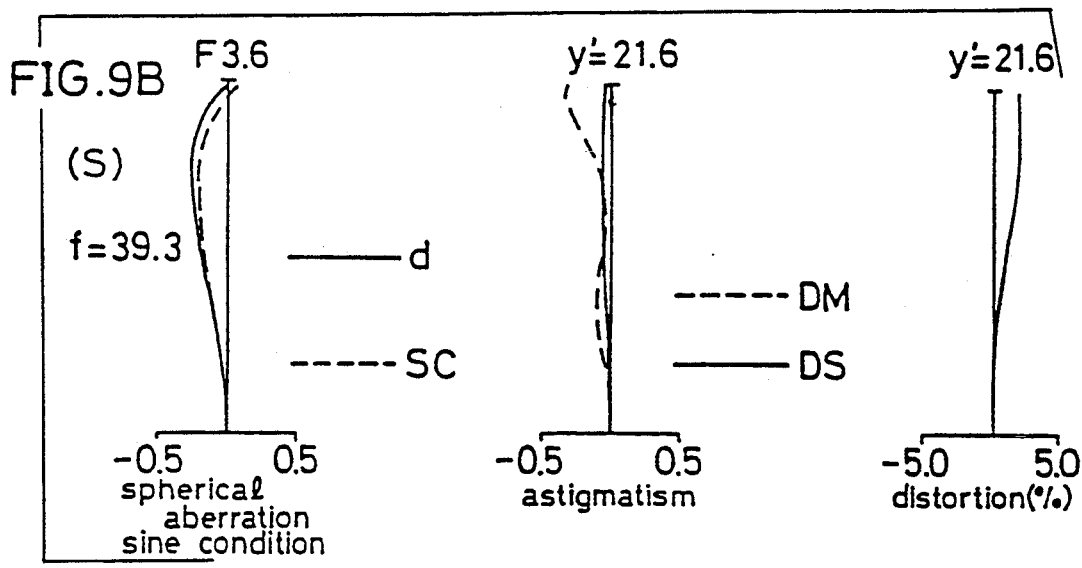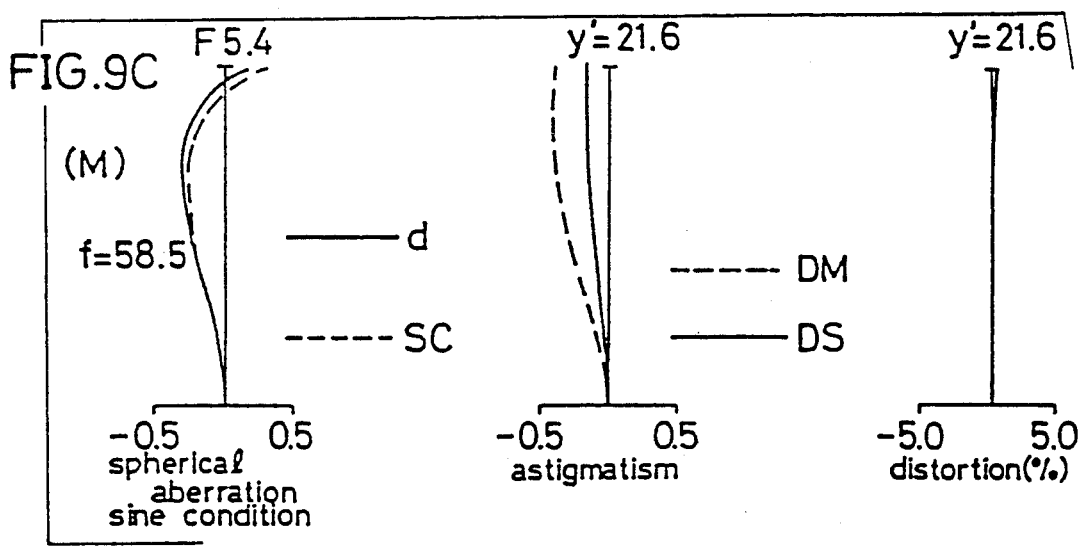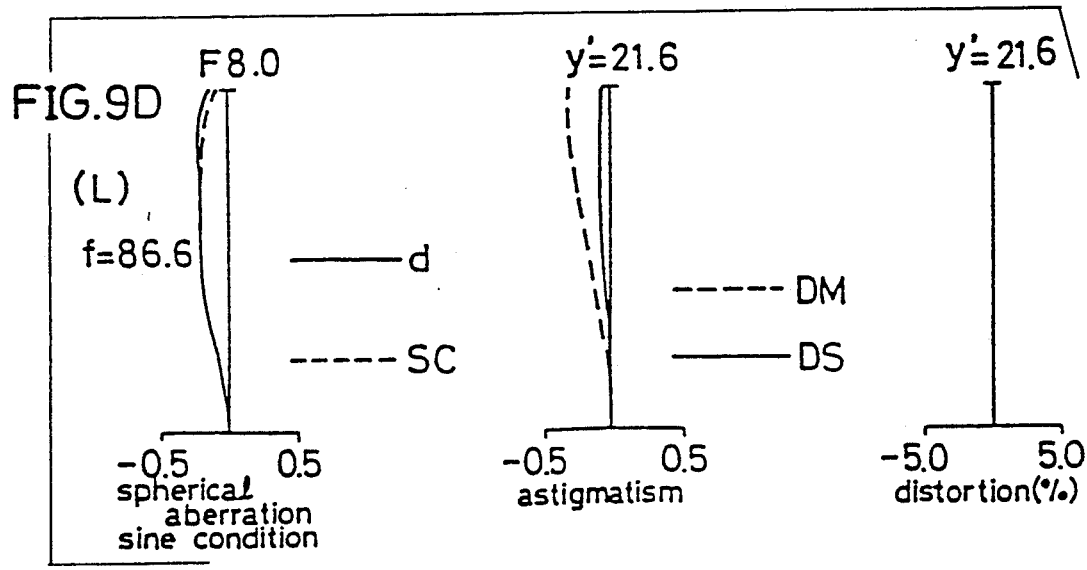

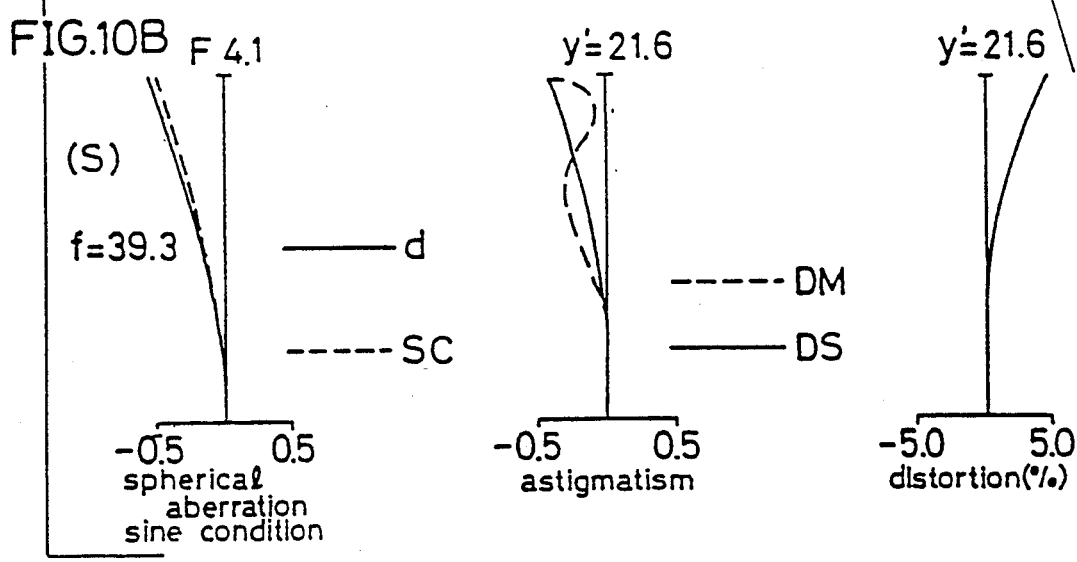
FIG.10B (S) f=39.3
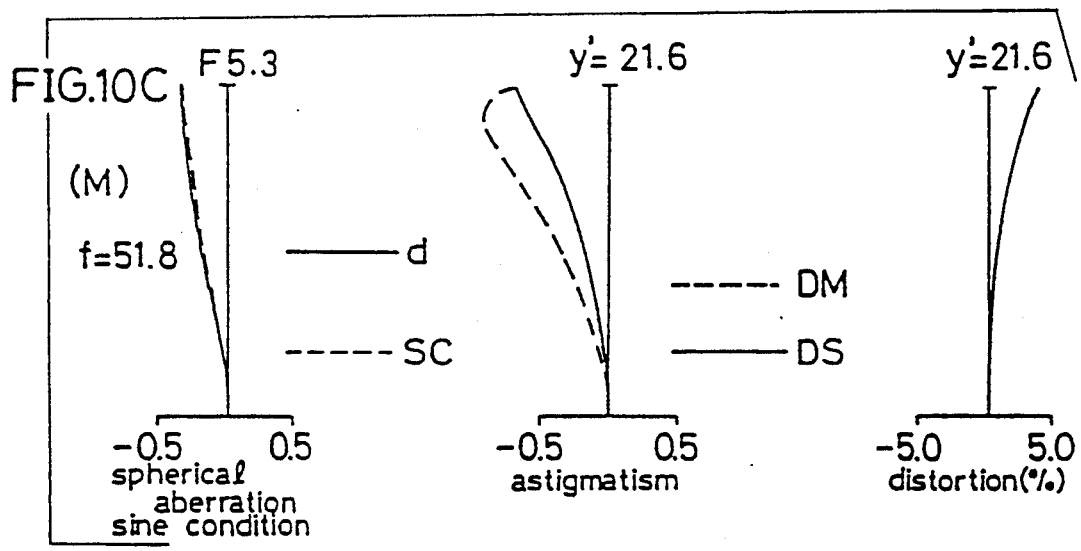
FIG.10C (M) f=51.8
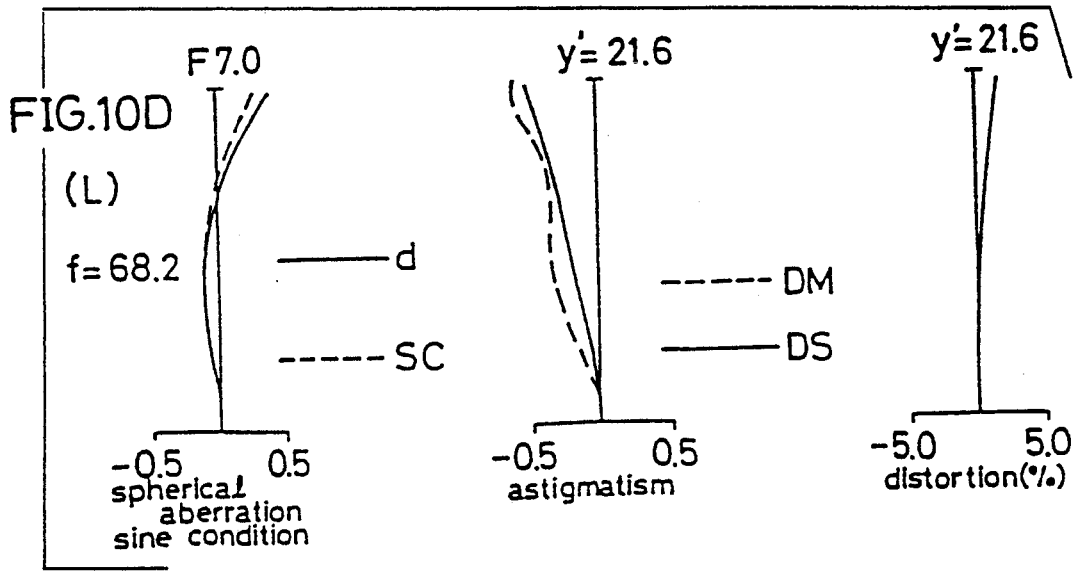
FIG.10D (L) f=68.2

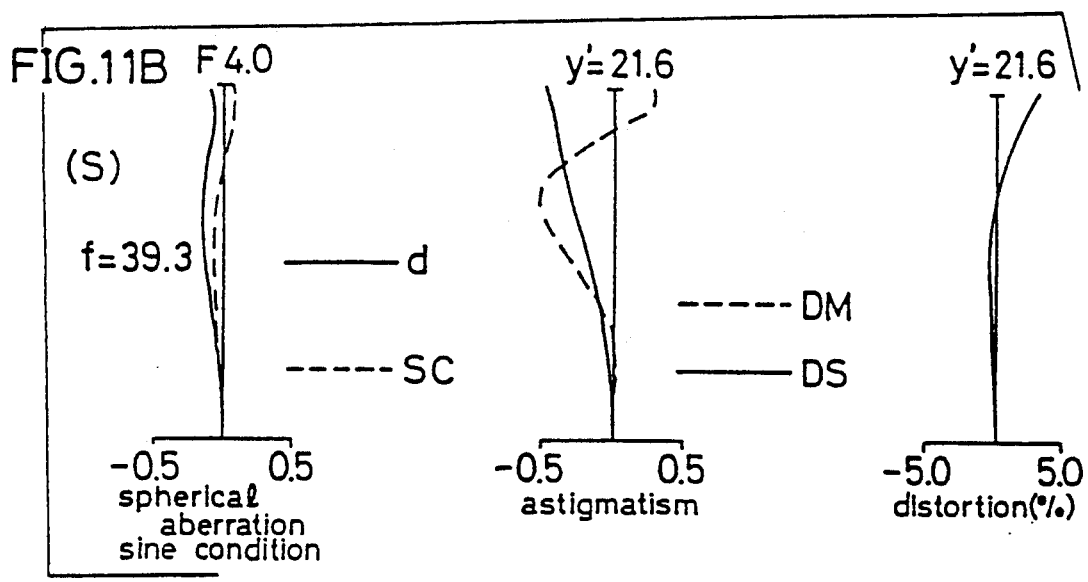
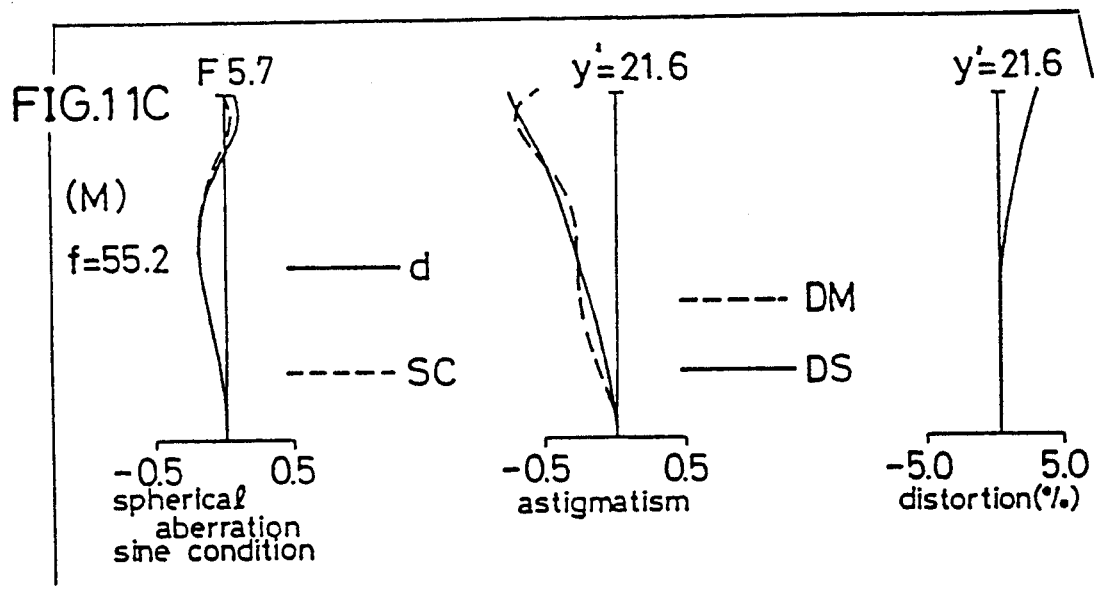
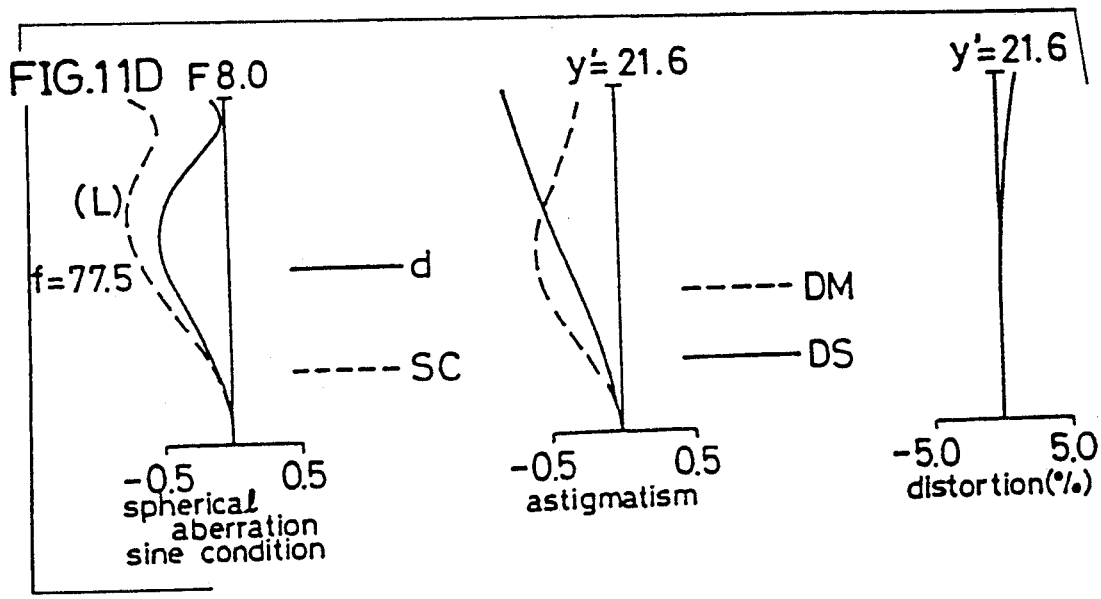

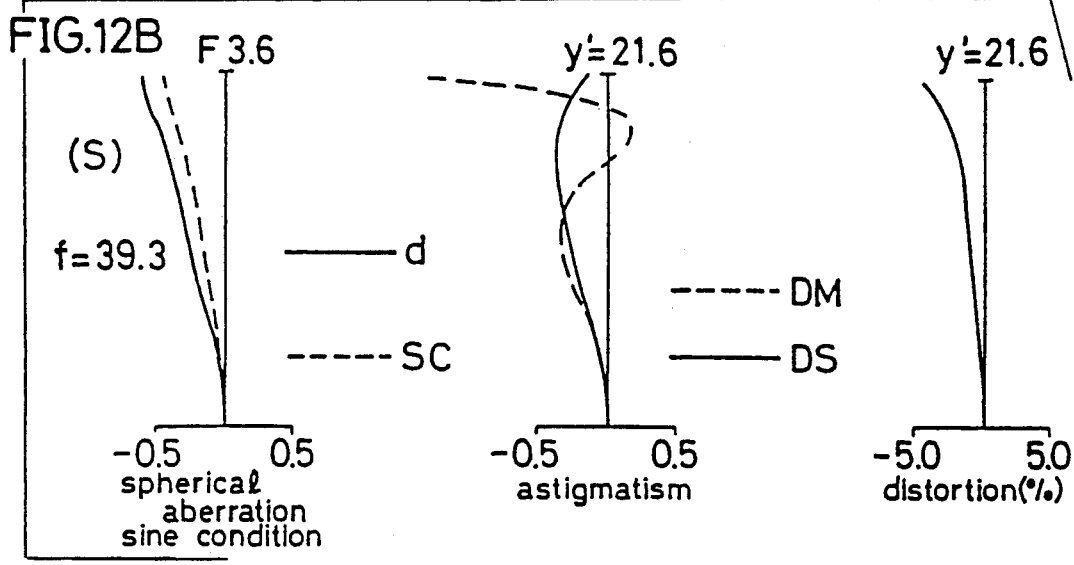
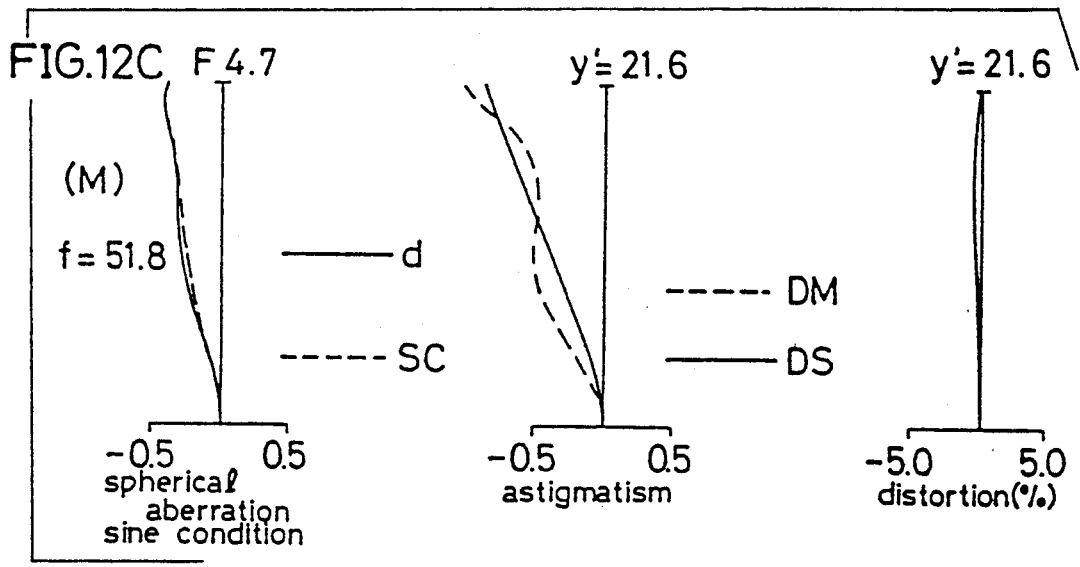
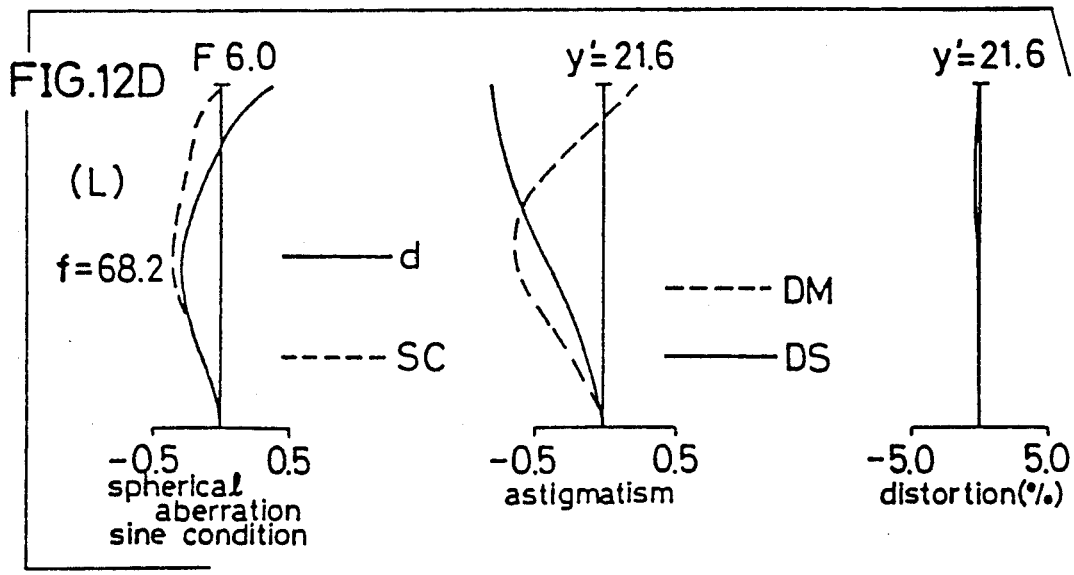

Y'=15

Y'=12

Y'=0

Y'=15

Y'=12

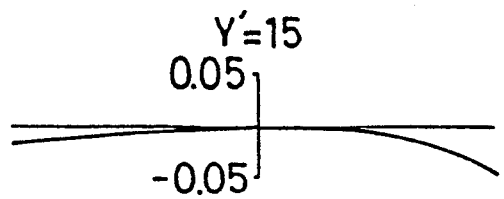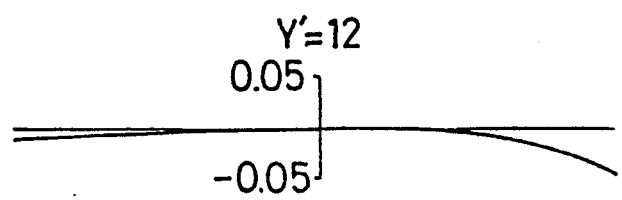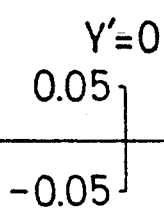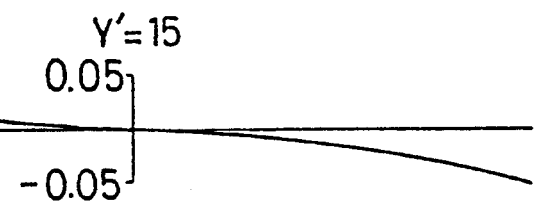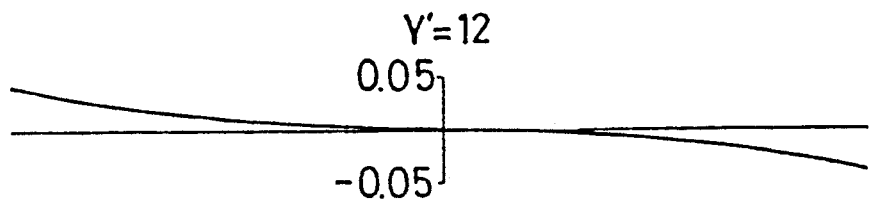

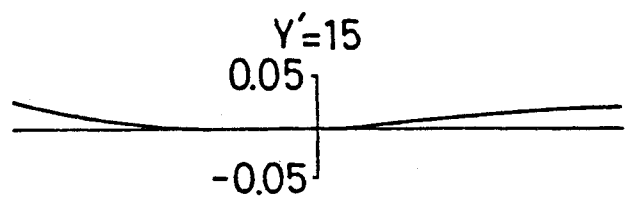
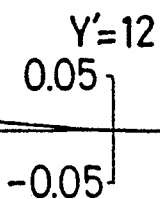
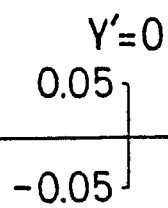
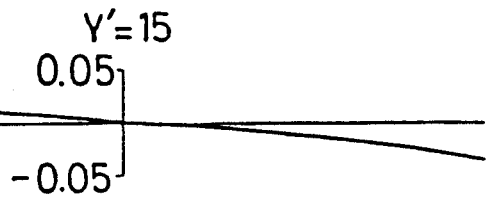
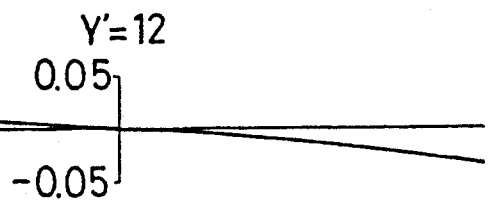

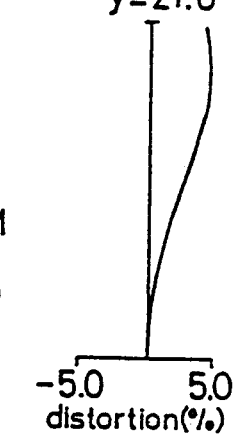
FIG.16B F 3.6 (S) f = 39.3
— d
----- SC
-0.5   0.5
spherical aberration sine condition
y' = 21.6
----- DM
— DS
-0.5   0.5
astigmatism
y' = 21.6
-5.0   5.0
distortion(%)
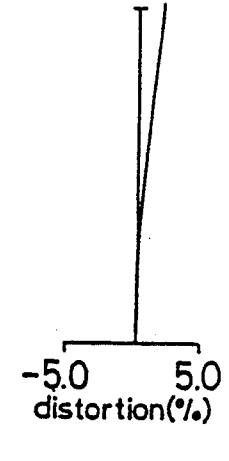
FIG.16C F 5.3 (M) f = 58.5
— d
----- SC
-0.5   0.5
spherical aberration sine condition
y' = 21.6
----- DM
— DS
-0.5   0.5
astigmatism
y' = 21.6
-5.0   5.0
distortion(%)
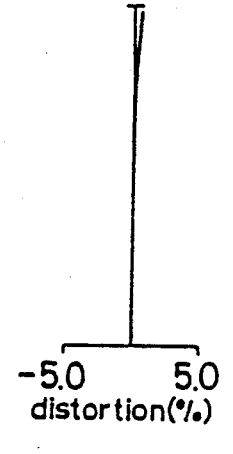
FIG.16D F 7.9 (L) f = 86.6
— d
----- SC
-0.5   0.5
spherical aberration sine condition
y' = 21.6
----- DM
— DS
-0.5   0.5
astigmatism
y' = 21.6
-5.0   5.0
distortion(%)

FIG.17B (S) f=39.3

F3.6 — d, ---- SC
spherical aberration sine condition, −0.5 to 0.5 y'=21.6 ---- DM, — DS
astigmatism, −0.5 to 0.5 y'=21.6
distortion(%), −5.0 to 5.0

FIG.17C (M) f=58.5

F5.3 — d, ---- SC
spherical aberration sine condition, −0.5 to 0.5 y'=21.6 ---- DM, — DS
astigmatism, −0.5 to 0.5 y'=21.6
distortion(%), −5.0 to 5.0

FIG.17D (L) f=86.6

F7.9 — d, ---- SC
spherical aberration sine condition, −0.5 to 0.5 y'=21.6 ---- DM, — DS
astigmatism, −0.5 to 0.5 y'=21.6
distortion(%), −5.0 to 5.0

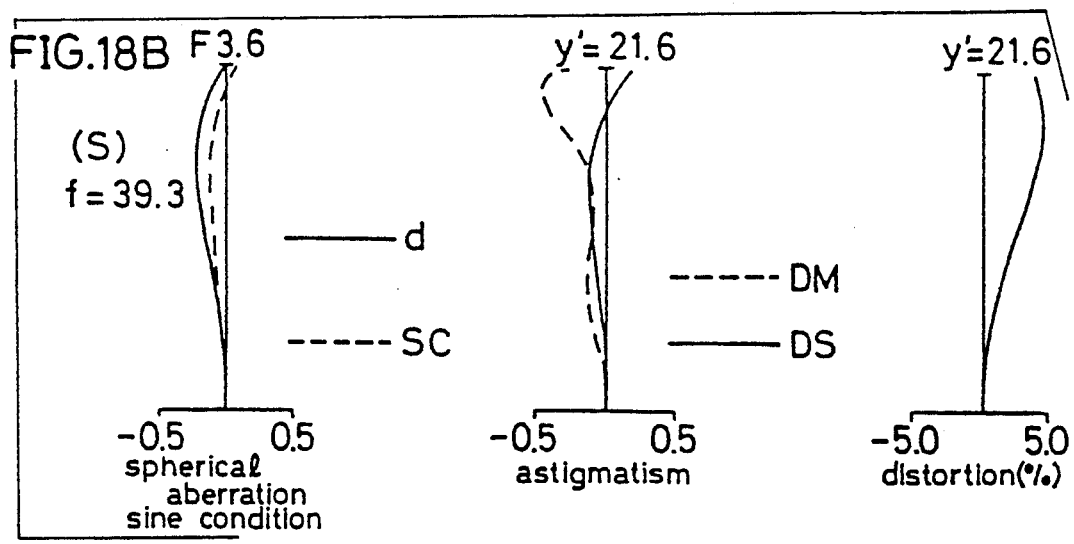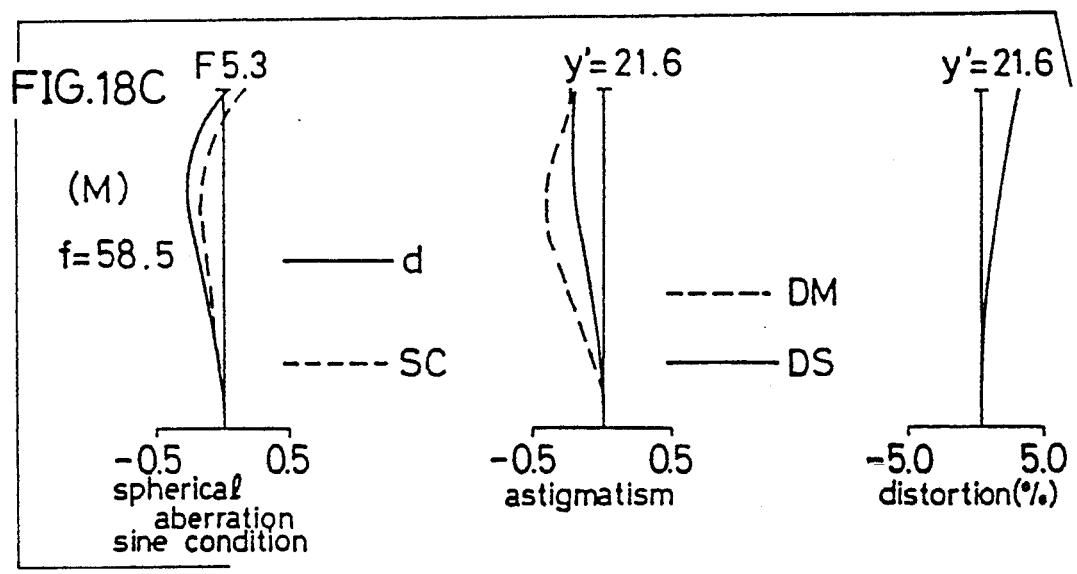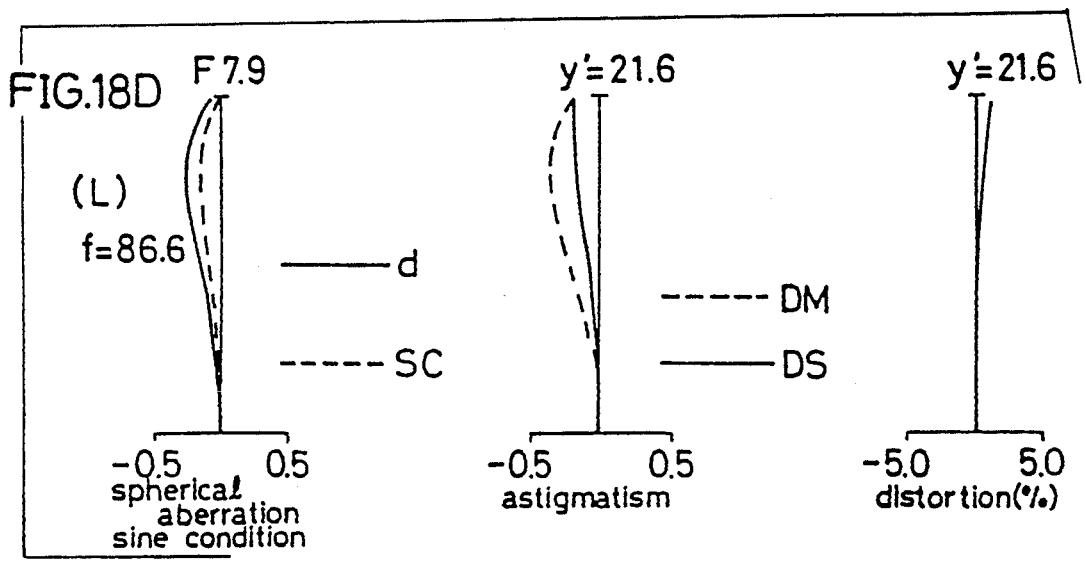

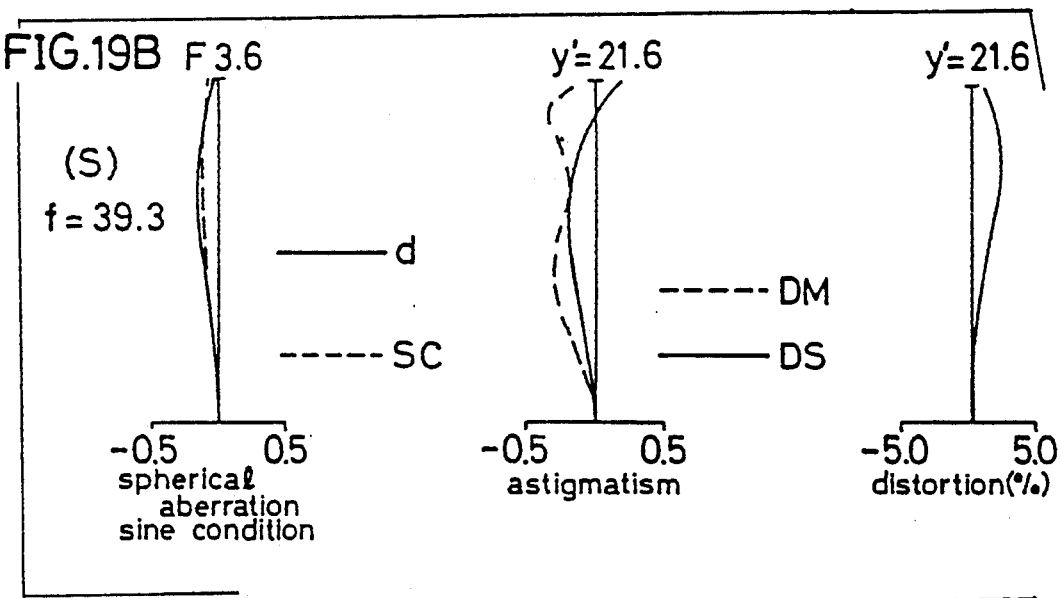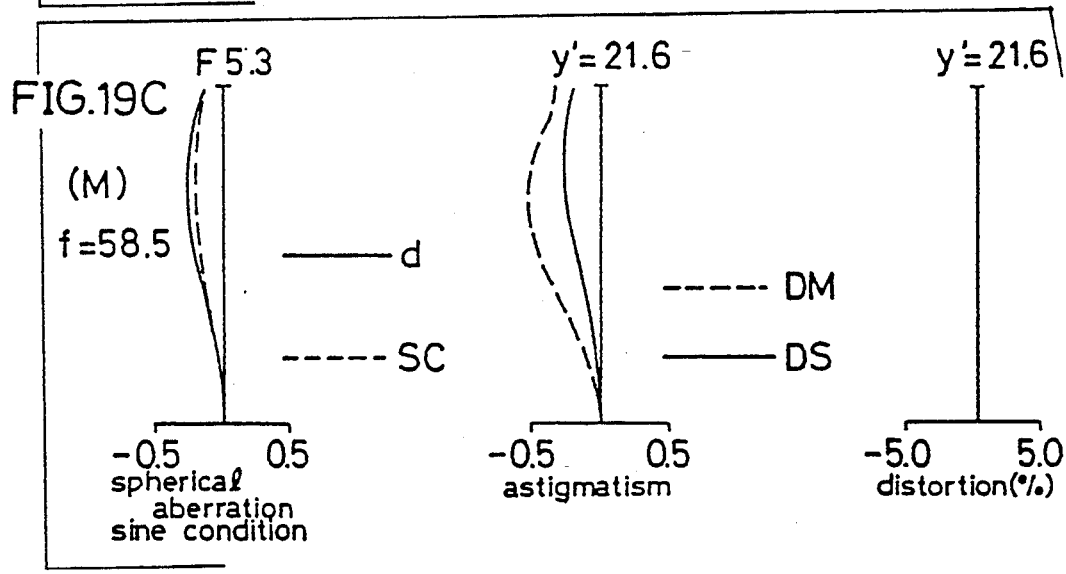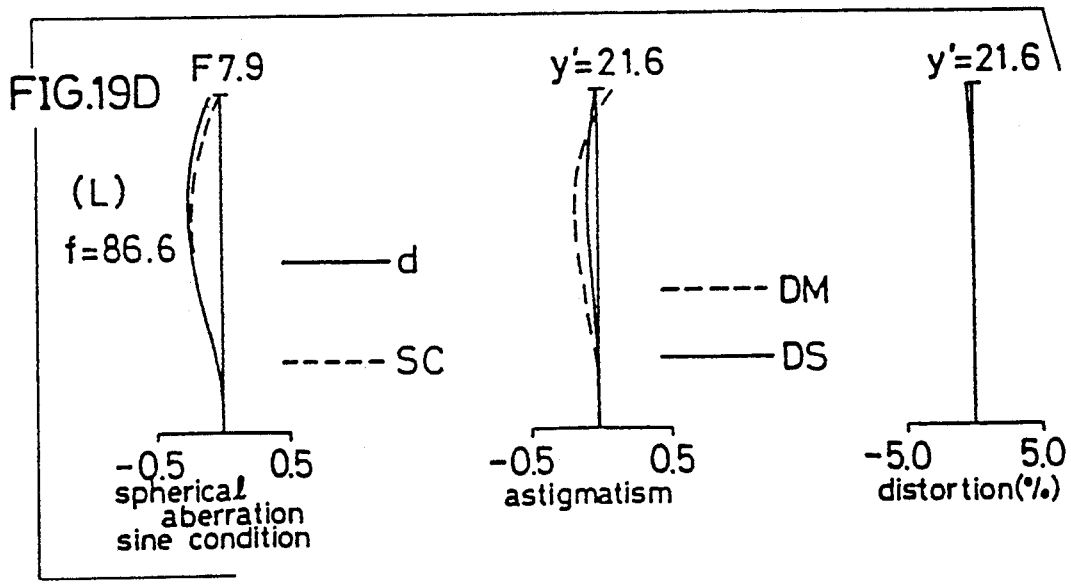

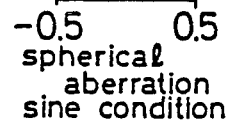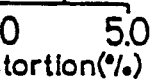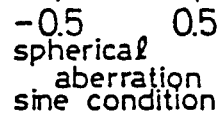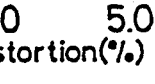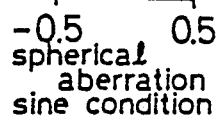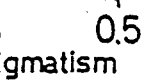

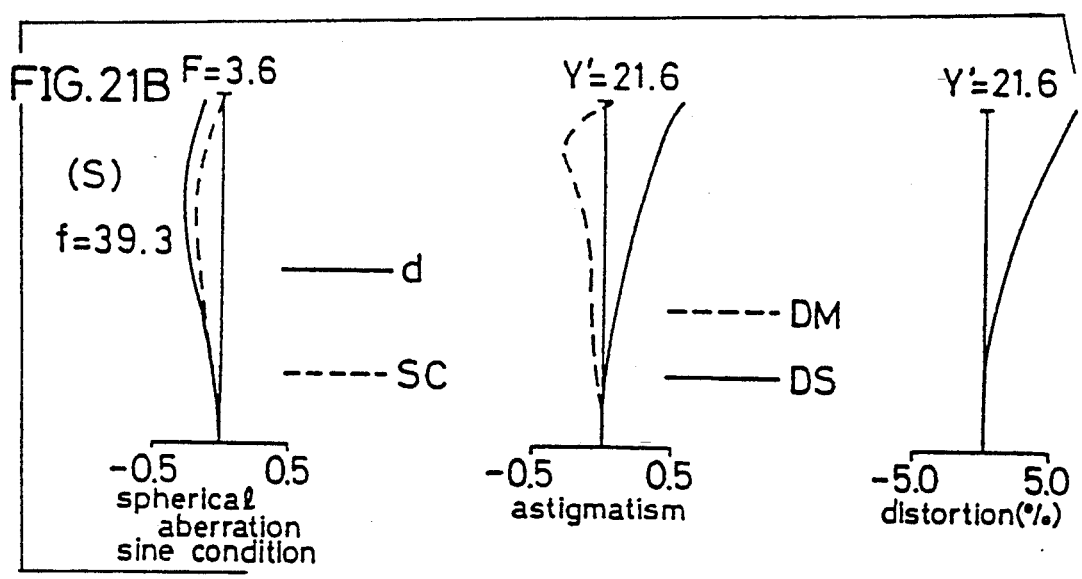
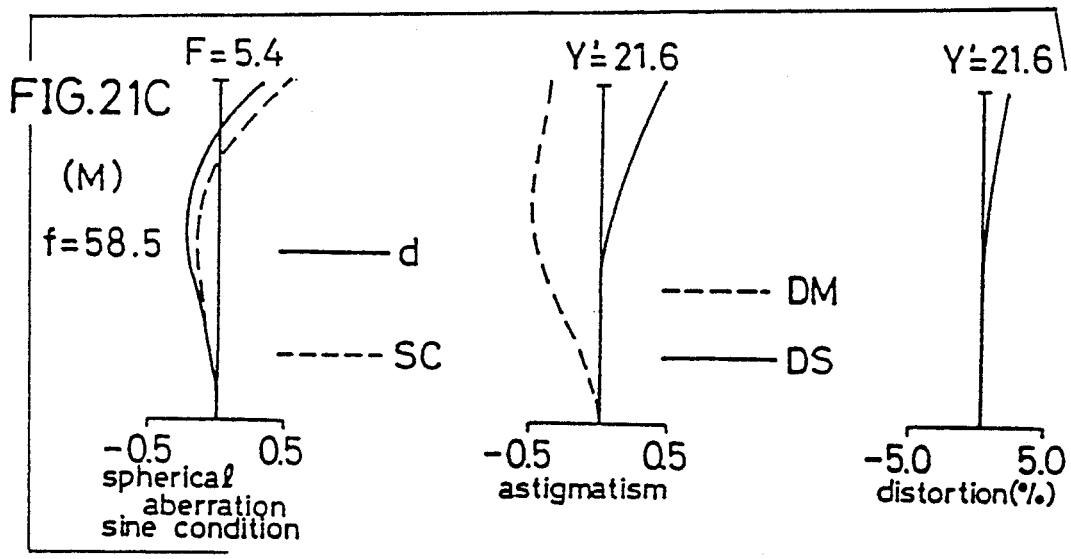
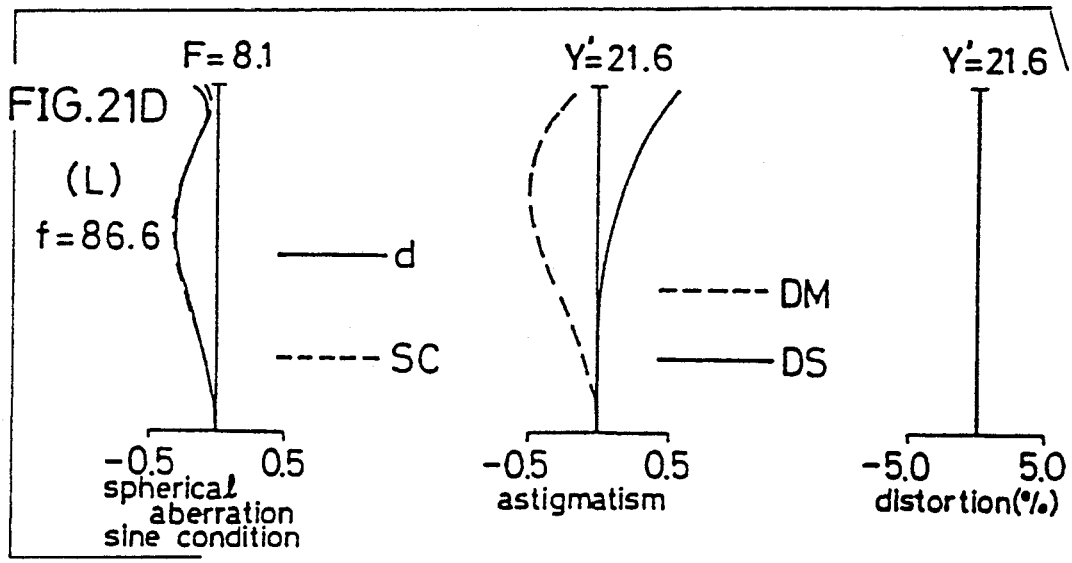

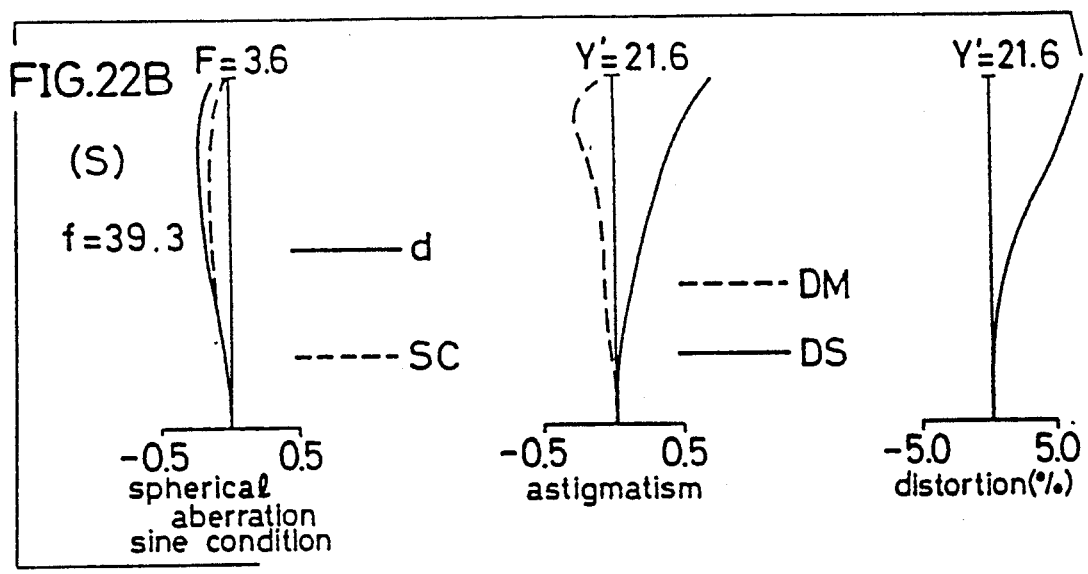
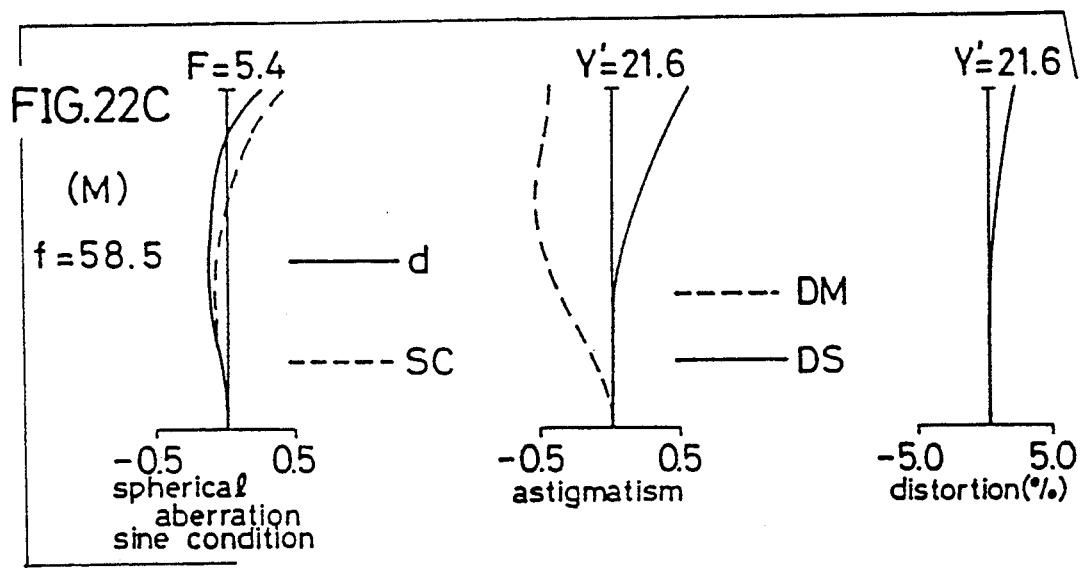
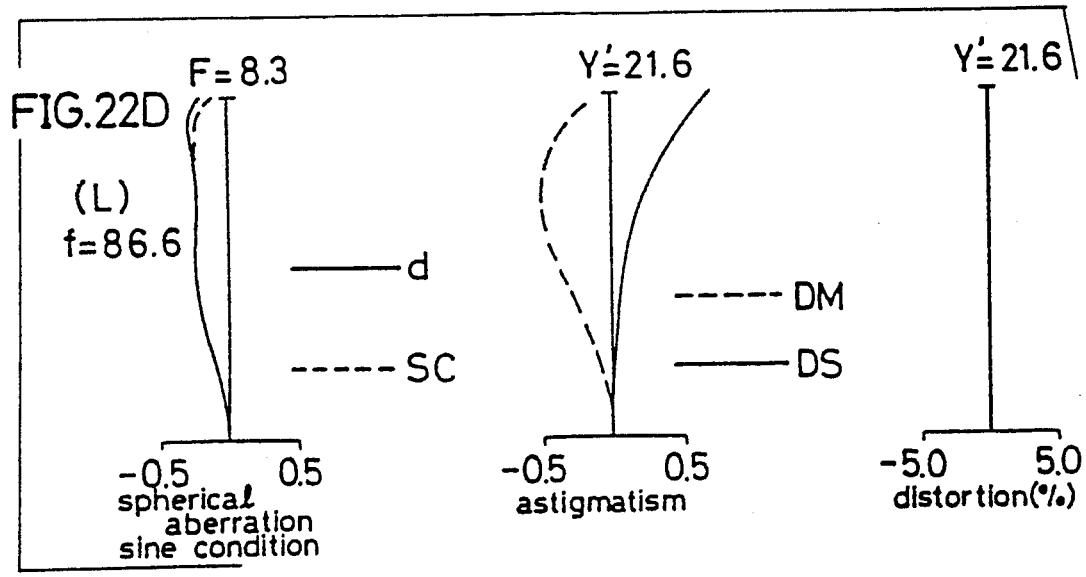

(S)

(L)

(S)

(L)

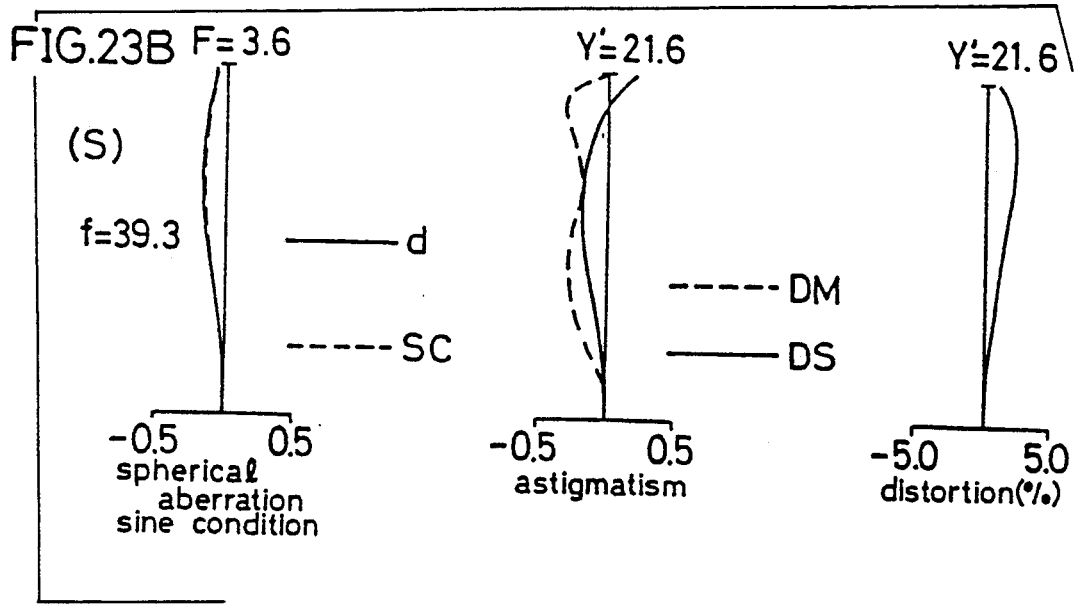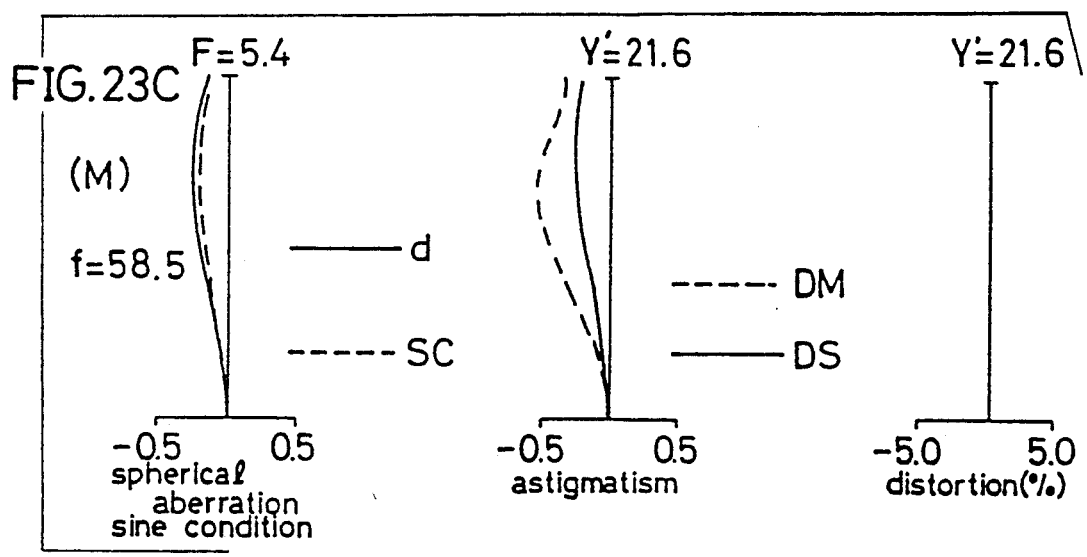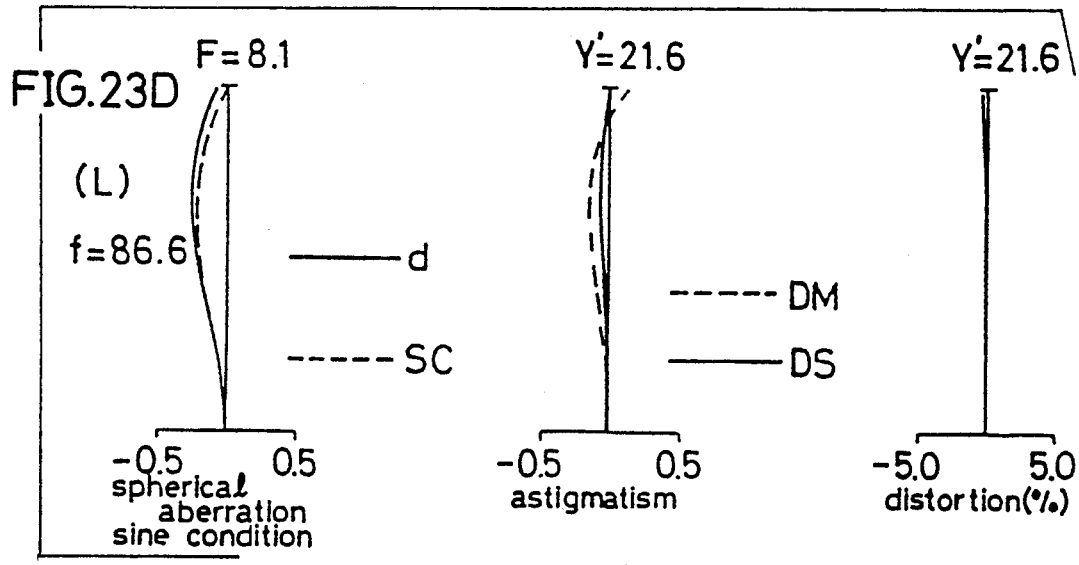

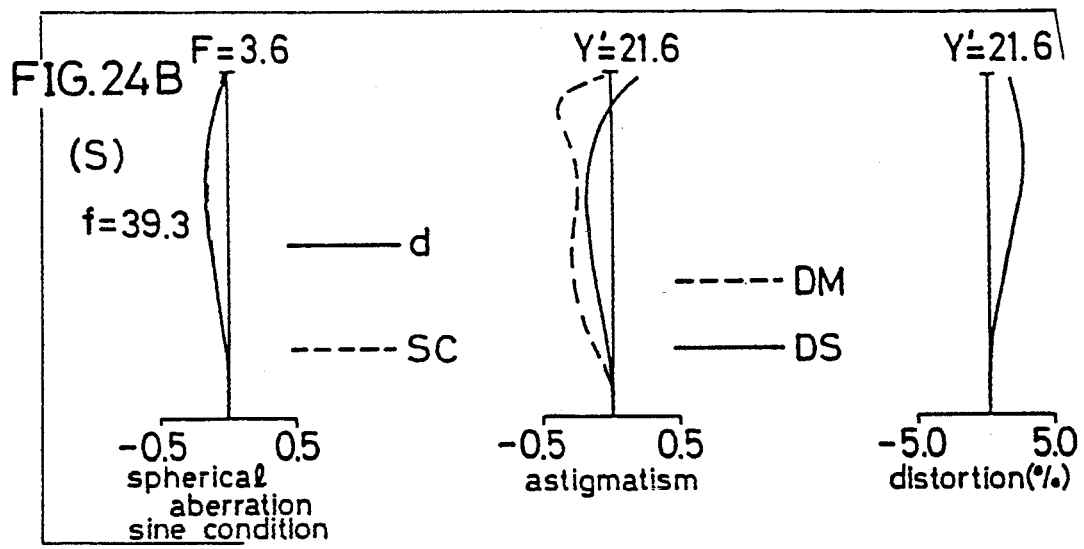
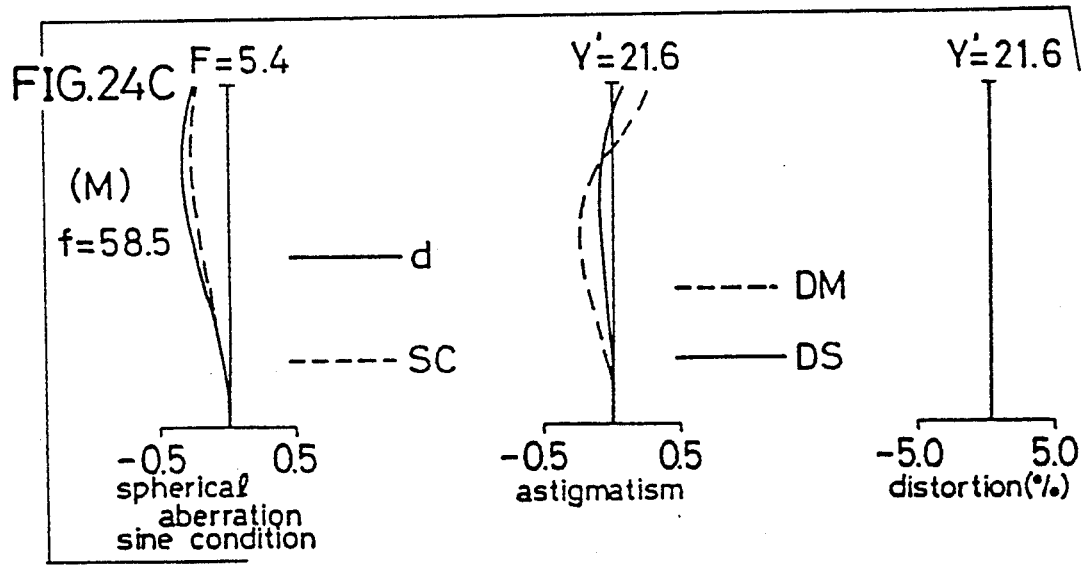
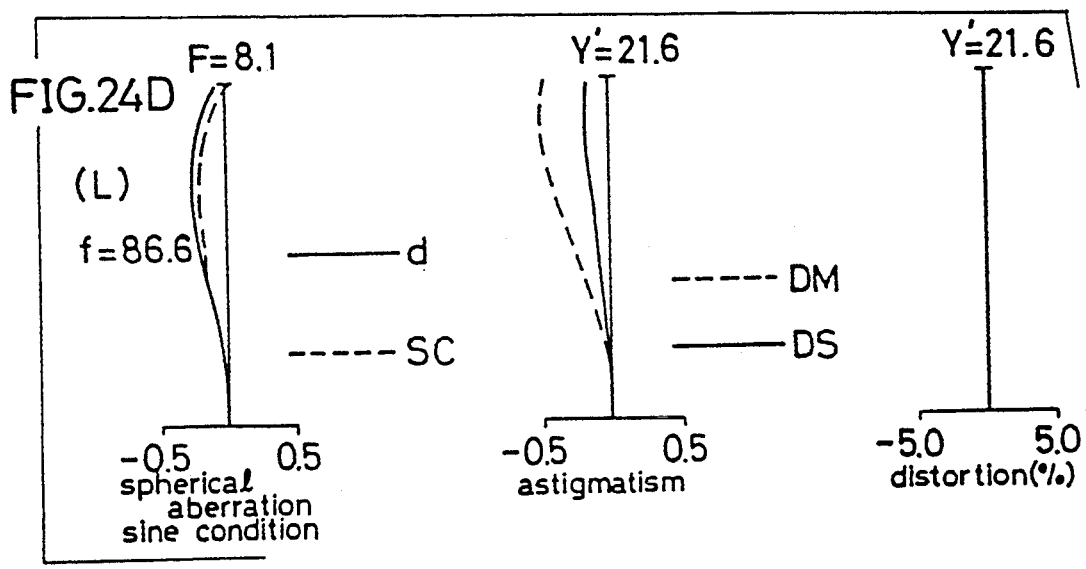

(S)

(L)

(S)

(L)

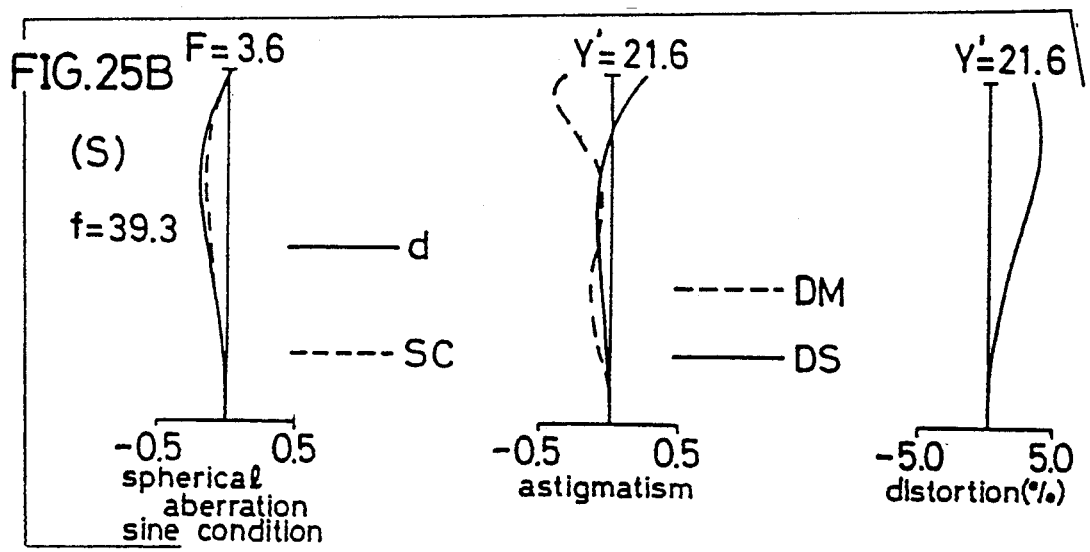
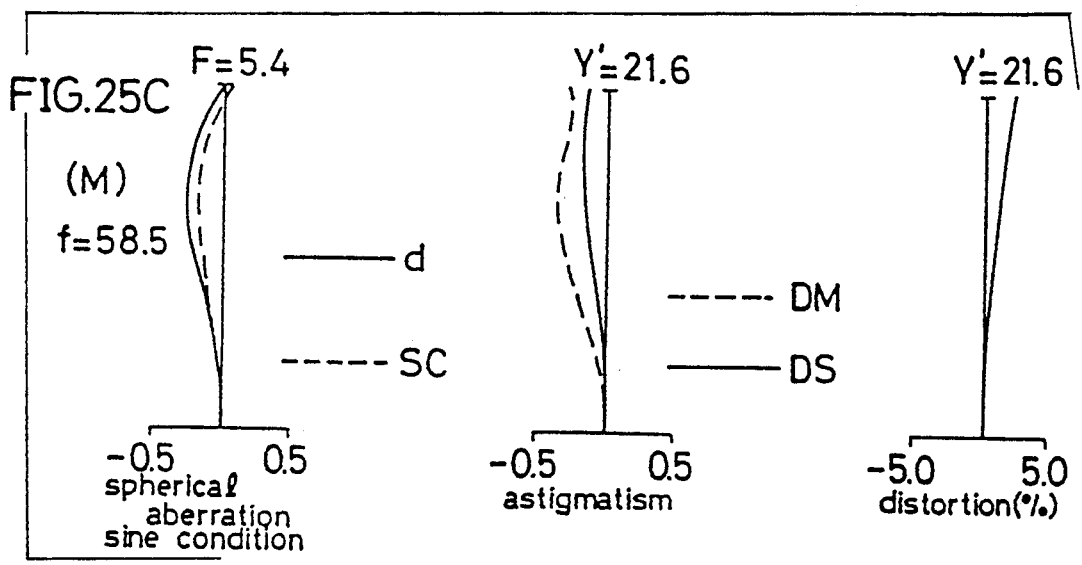
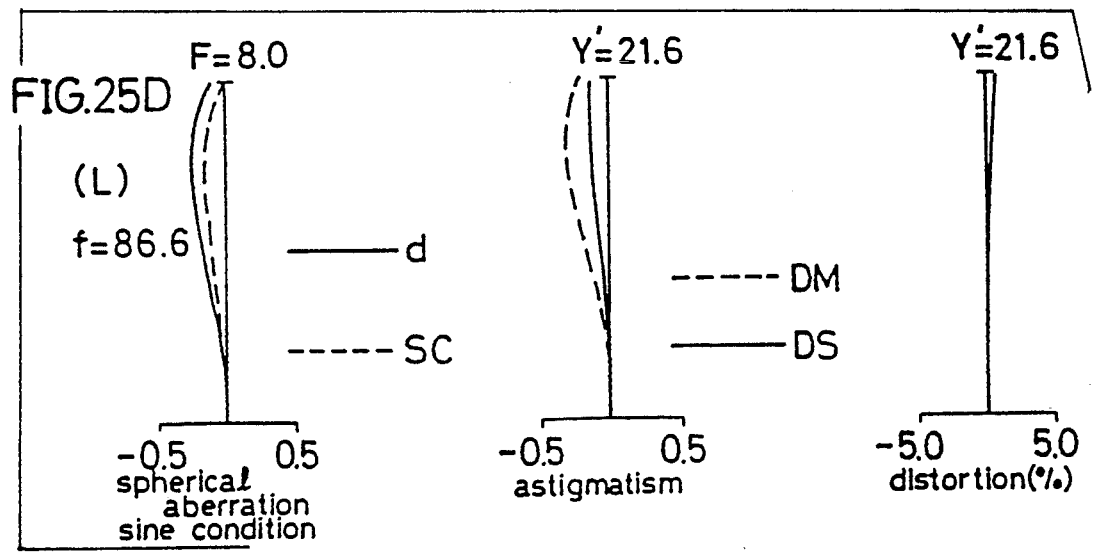

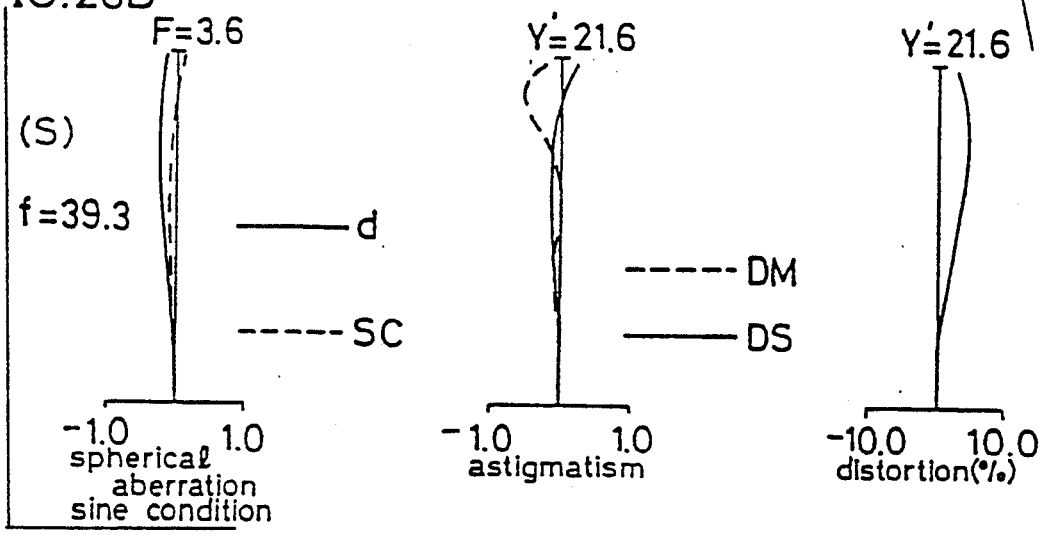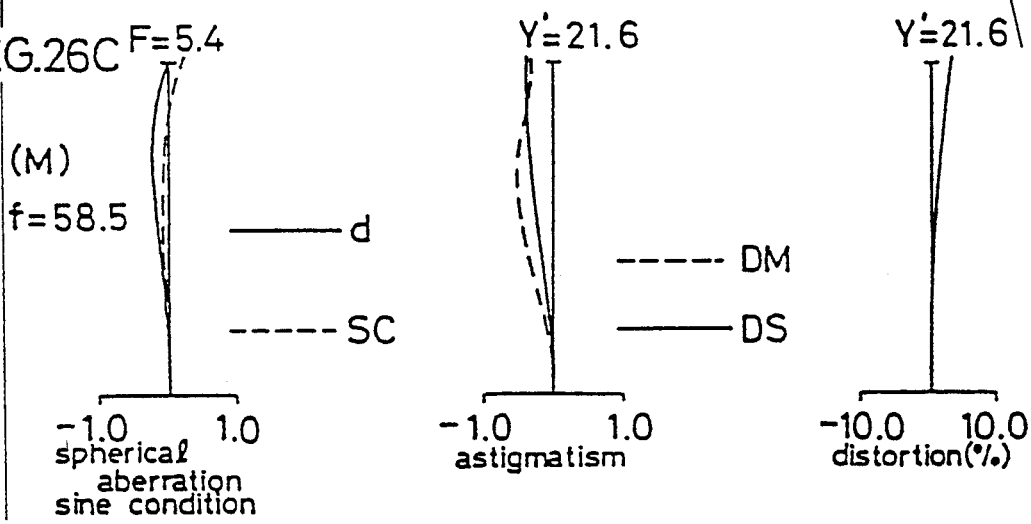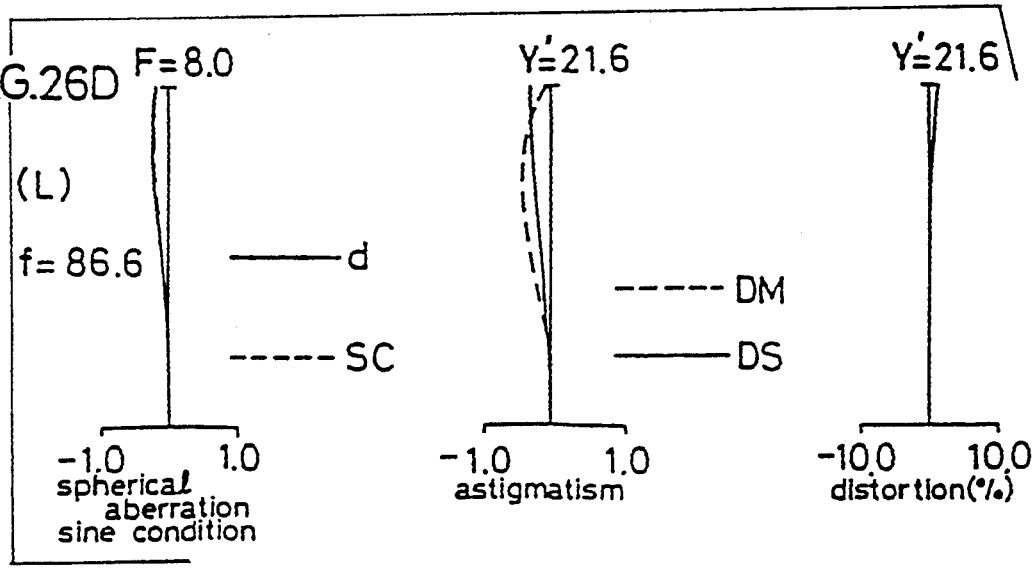

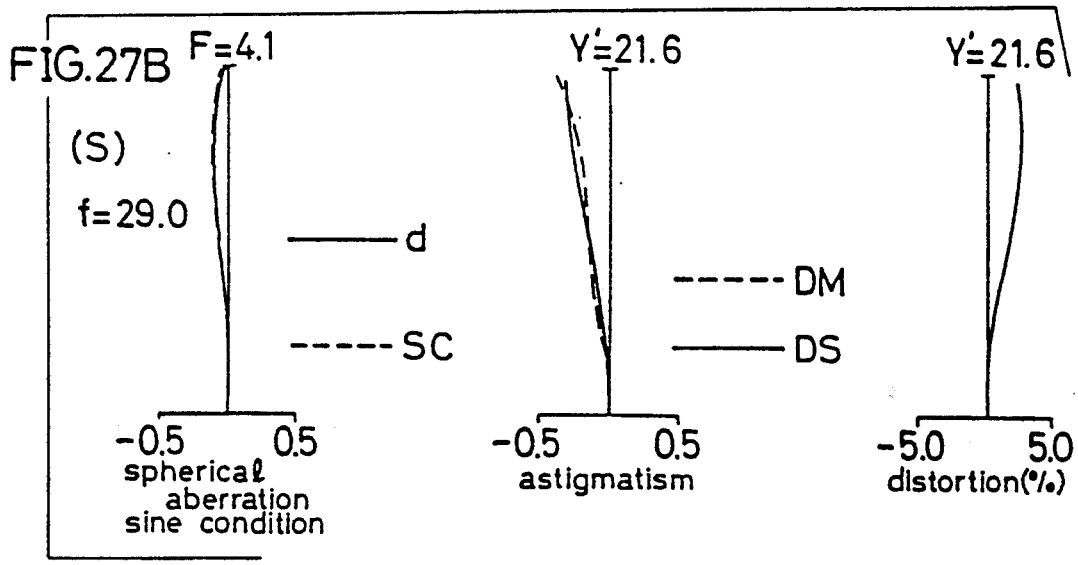
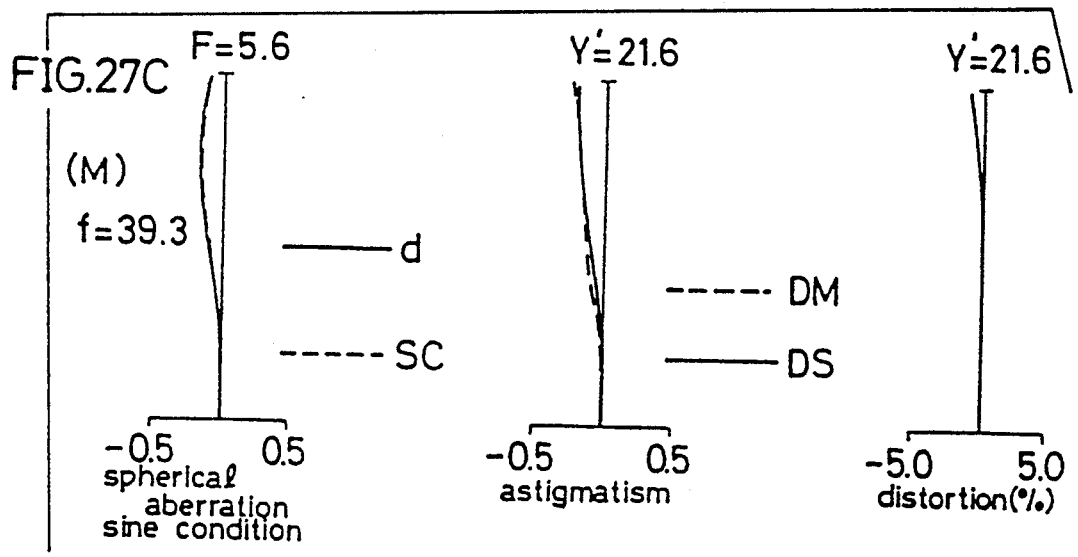
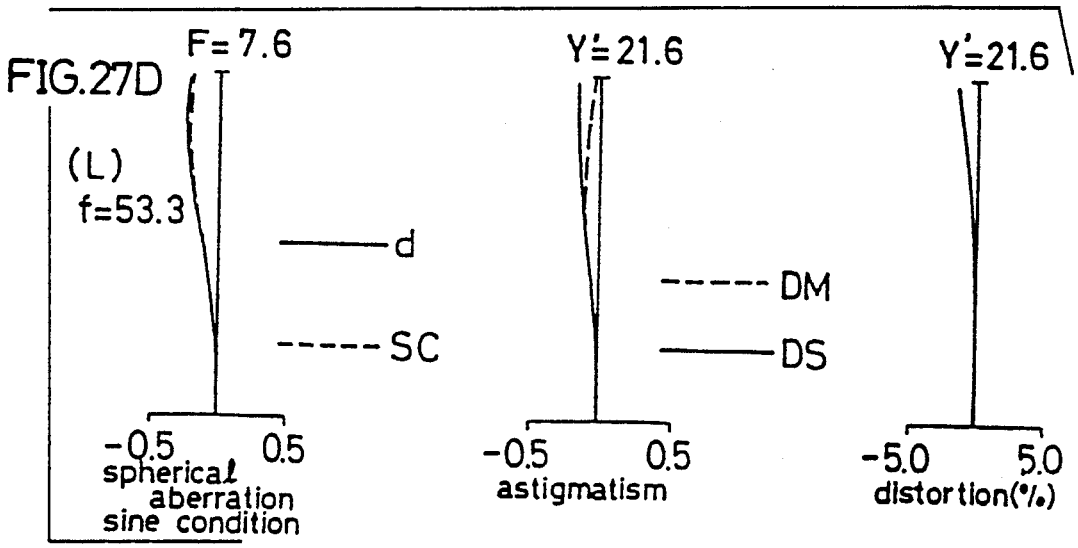

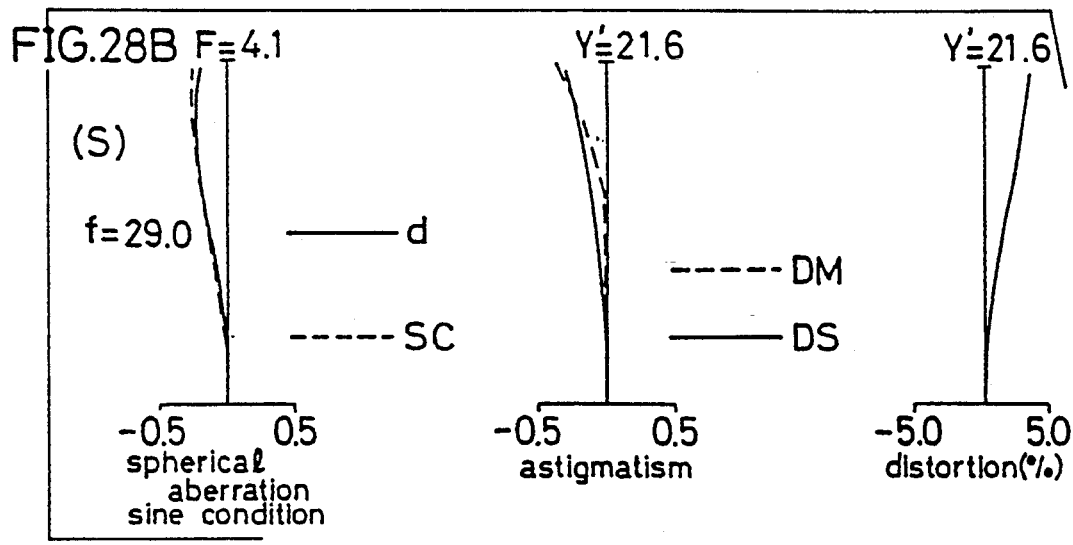
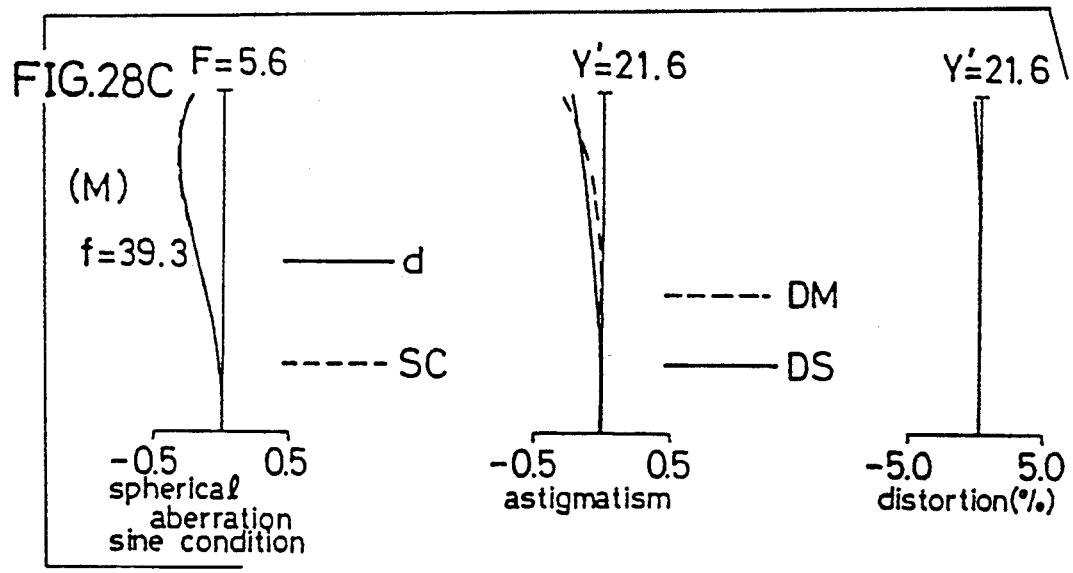
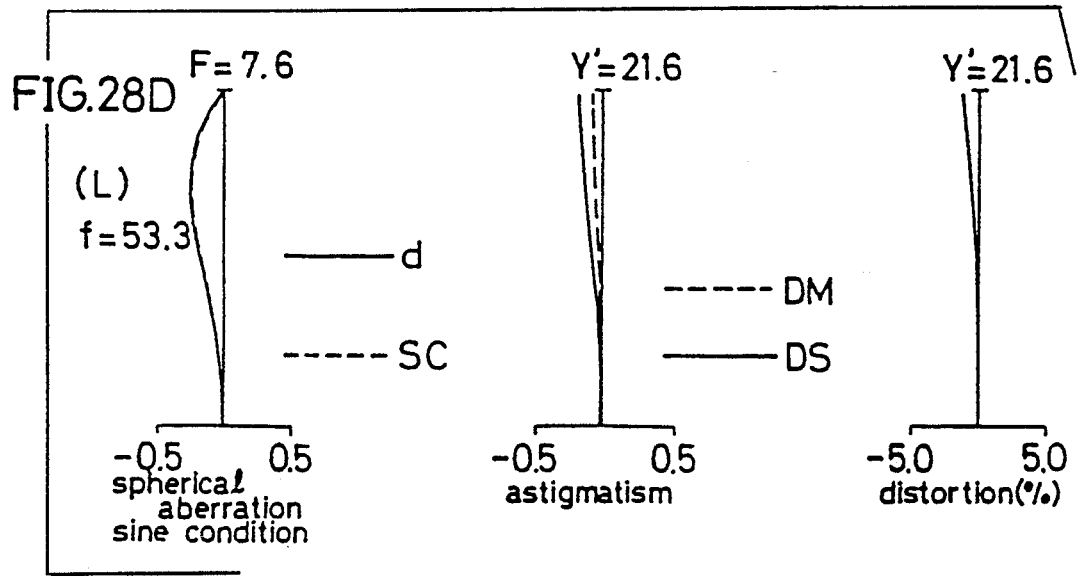

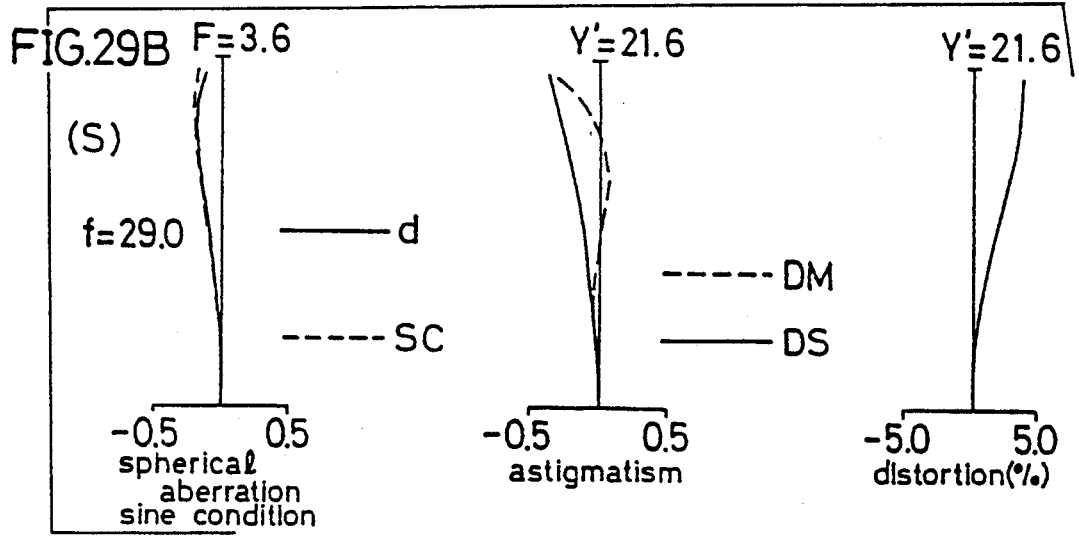
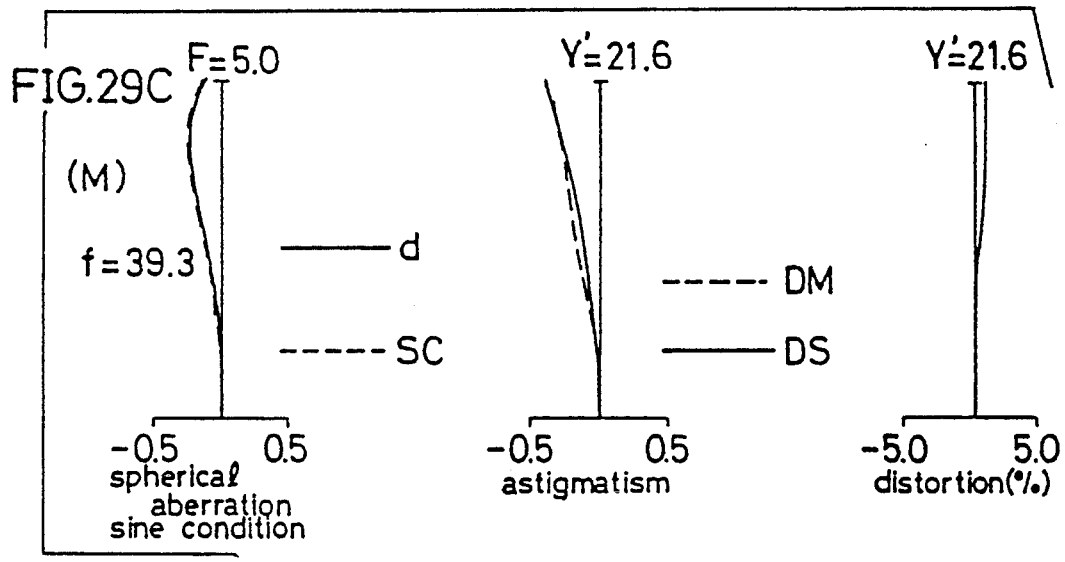
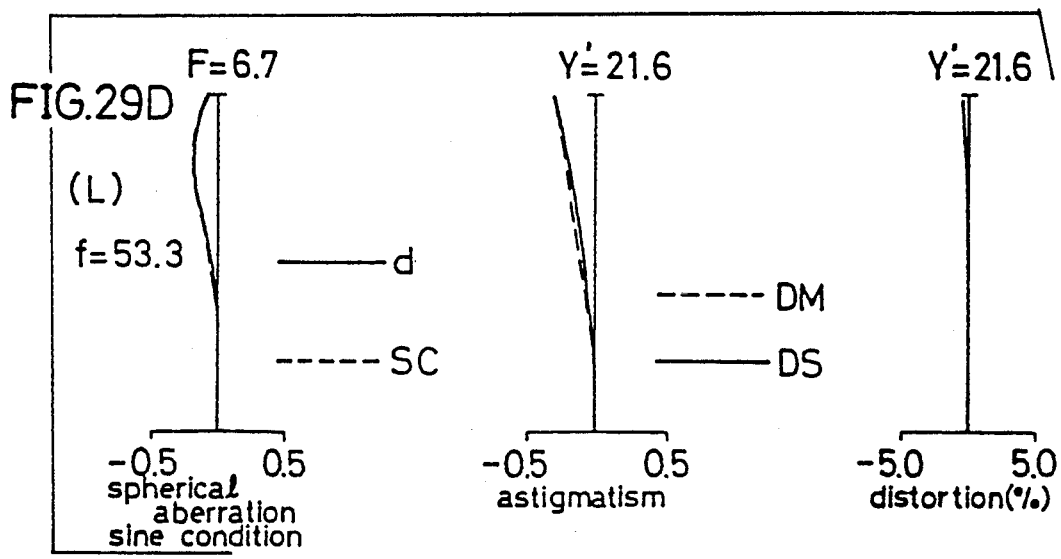

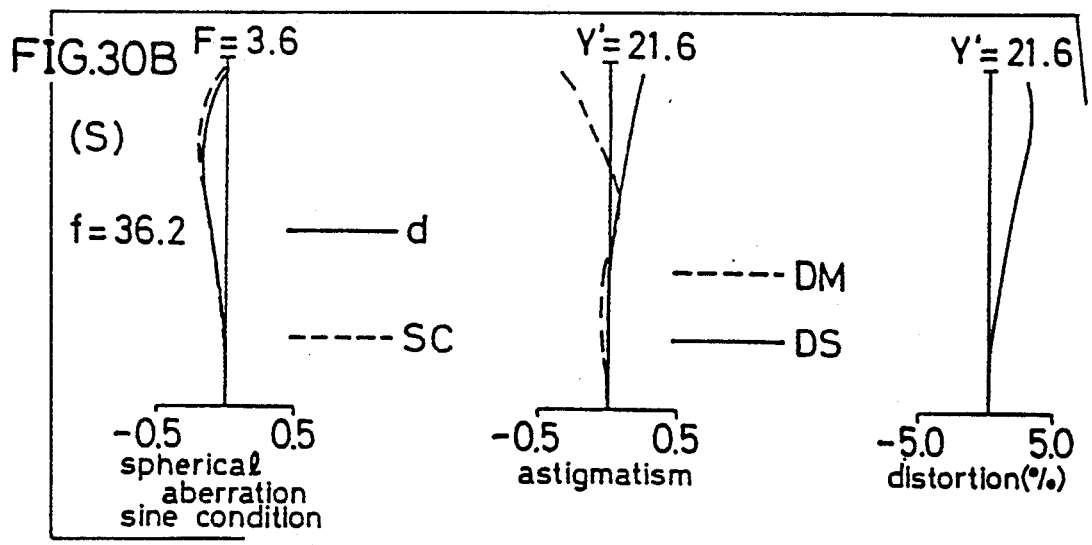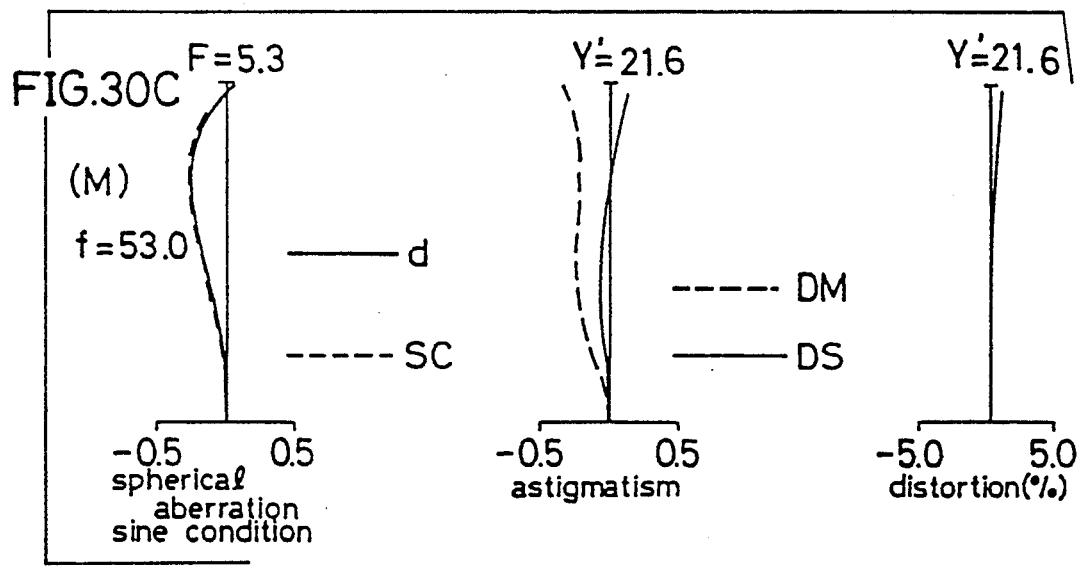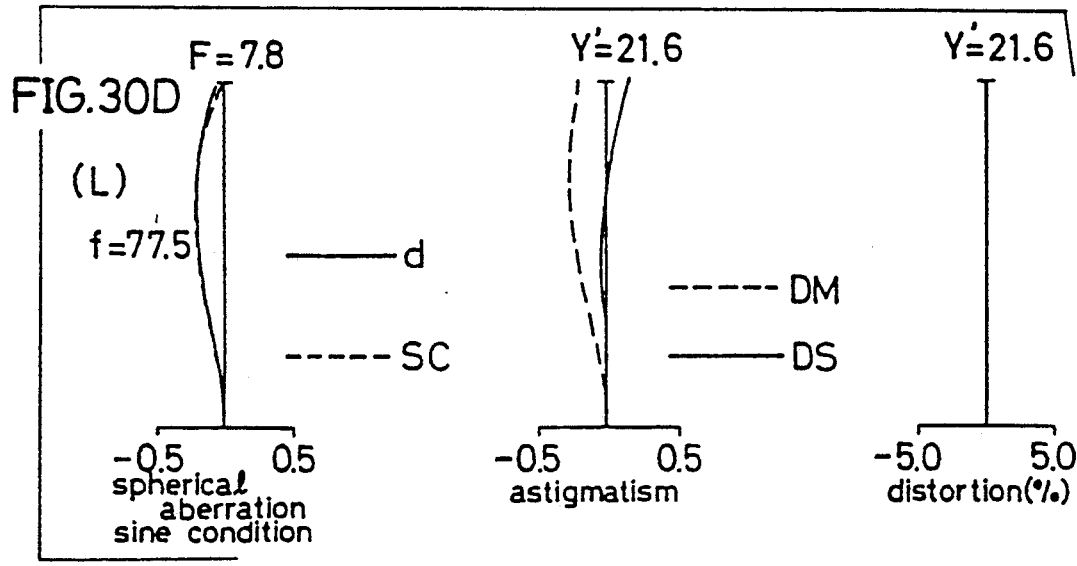

(S)

(L)

(S)

(L)

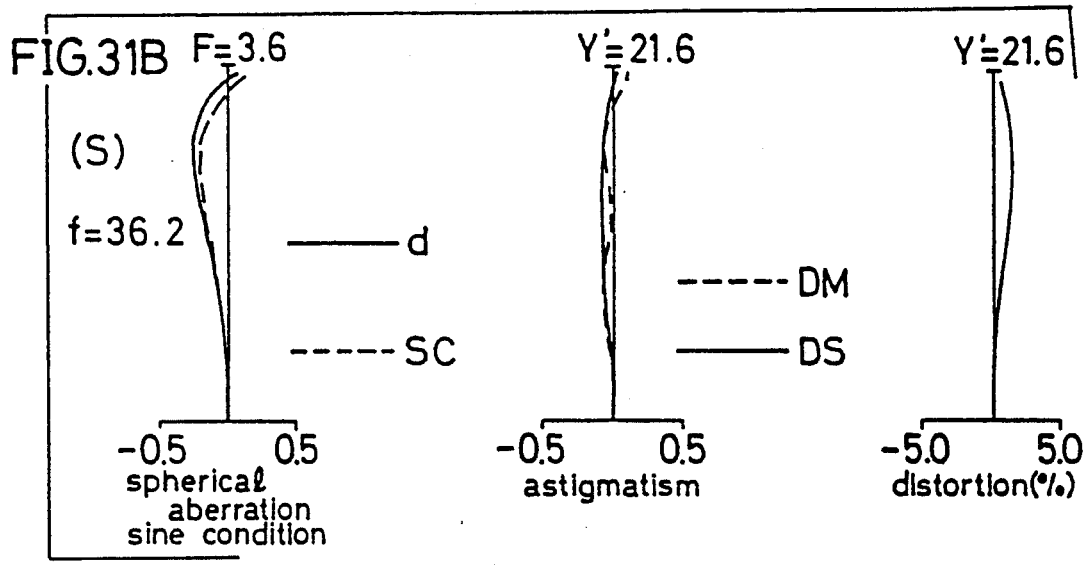
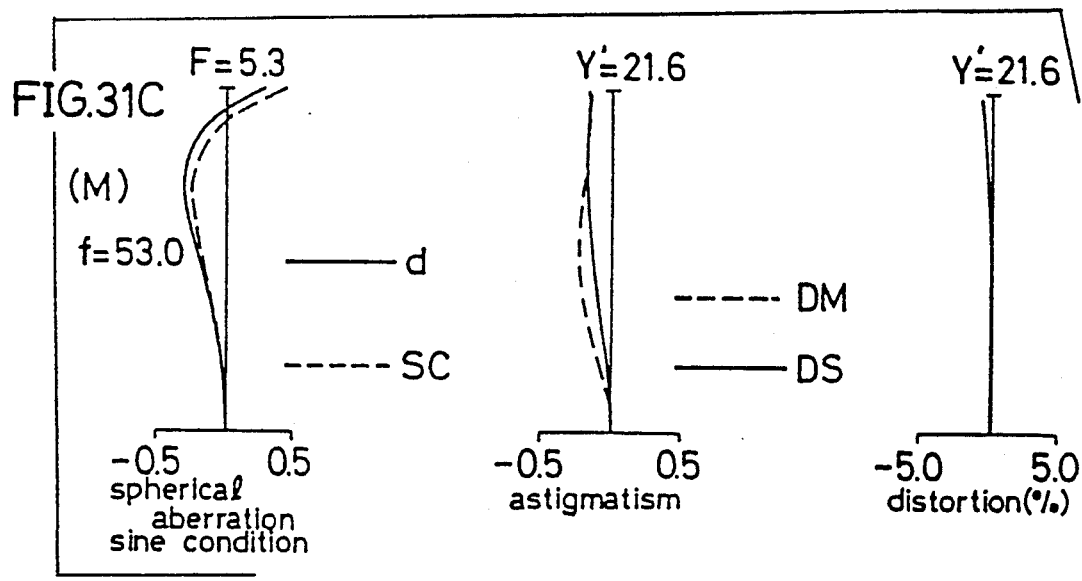
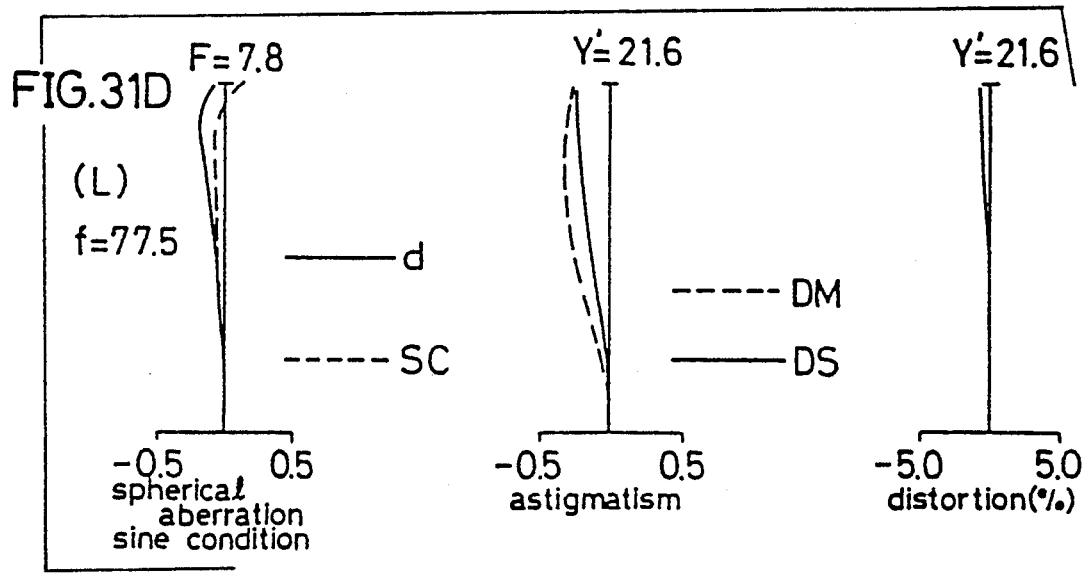

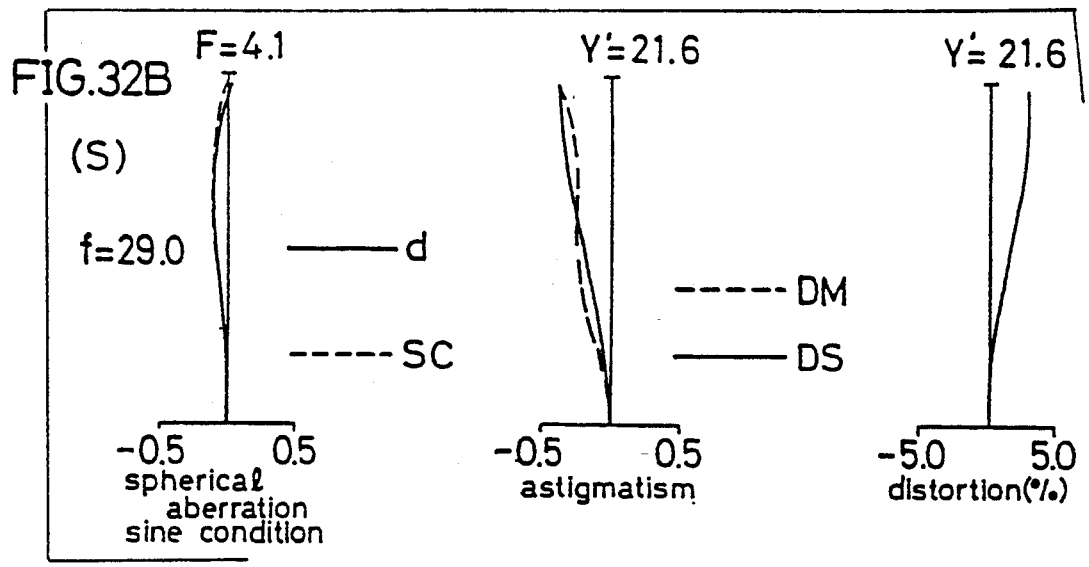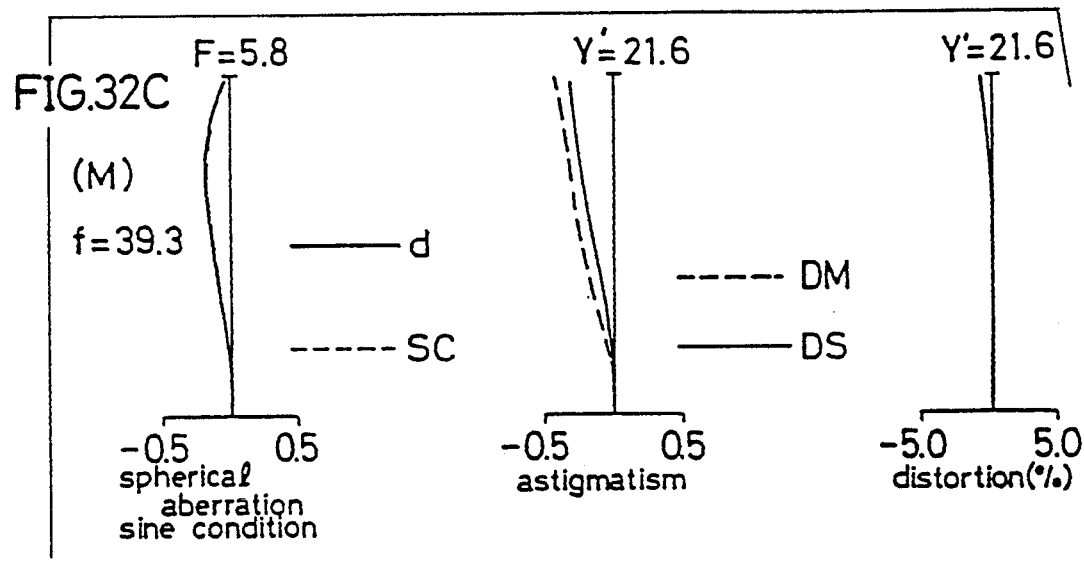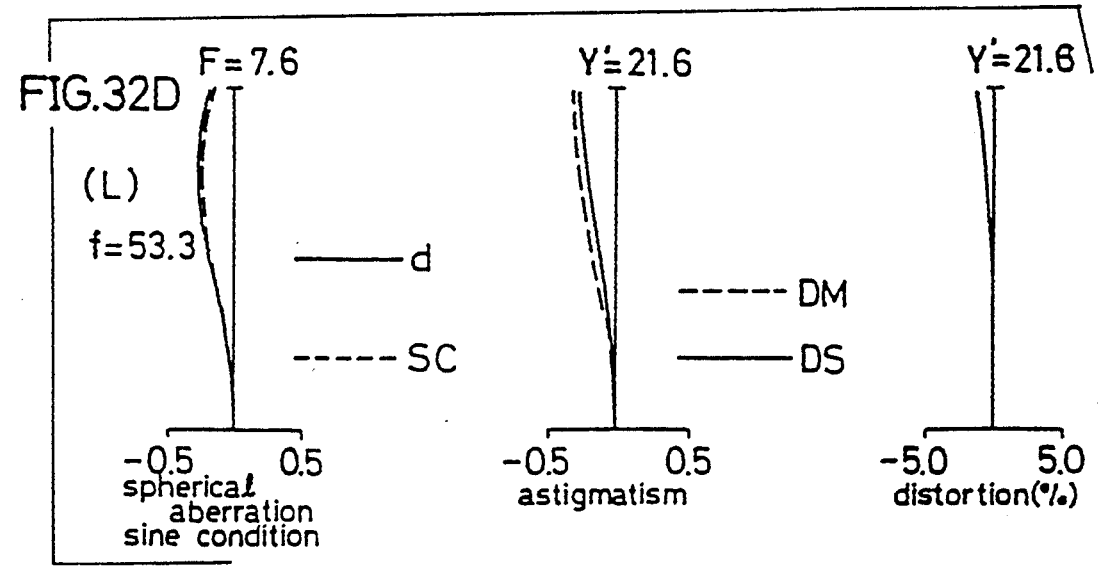

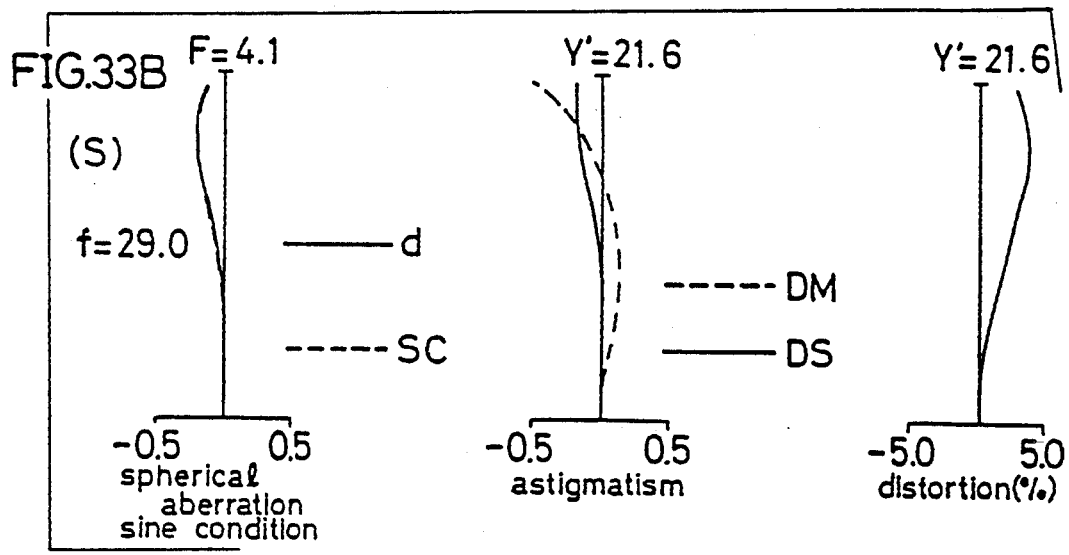
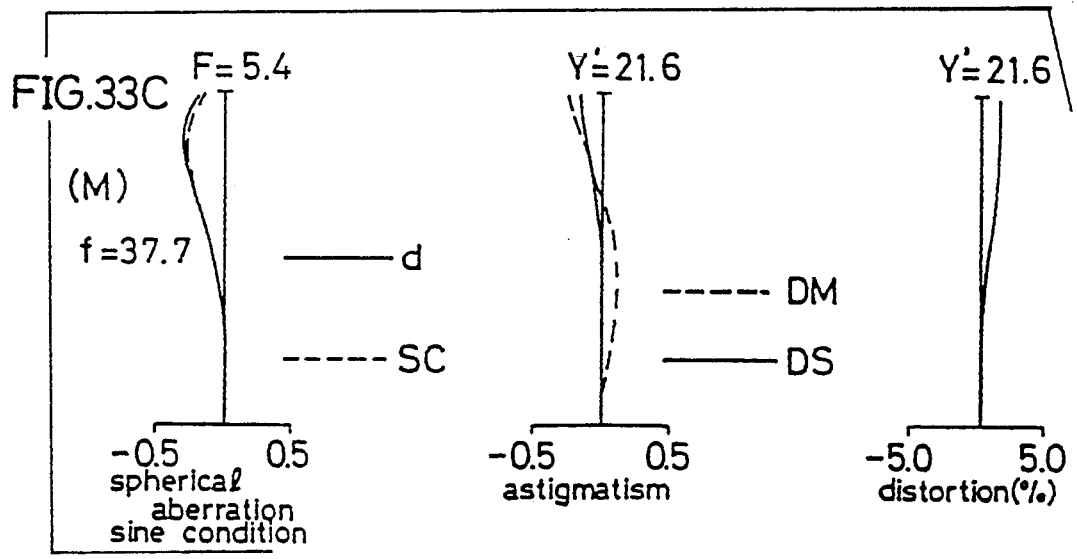
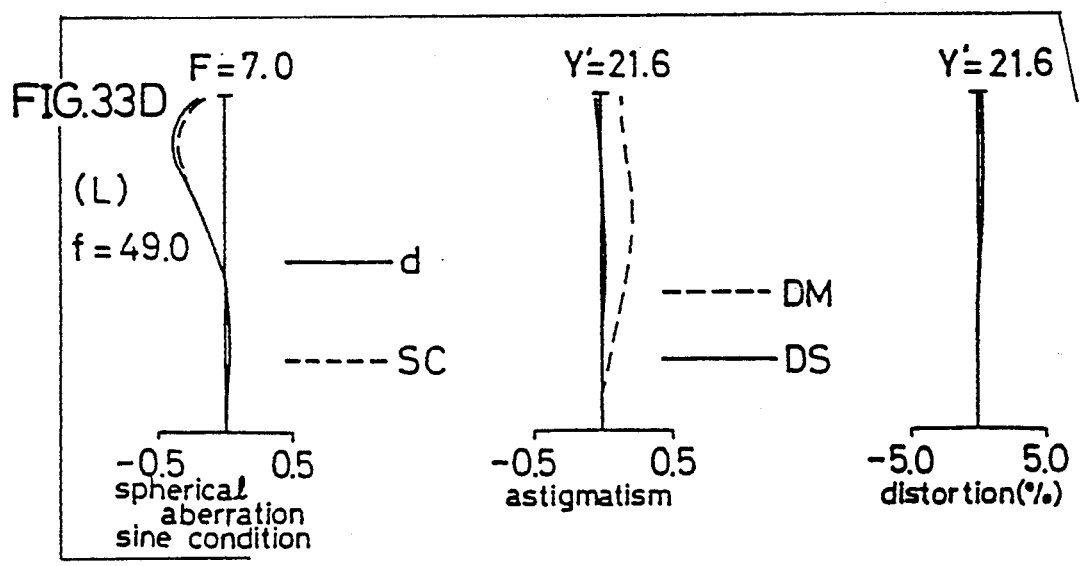

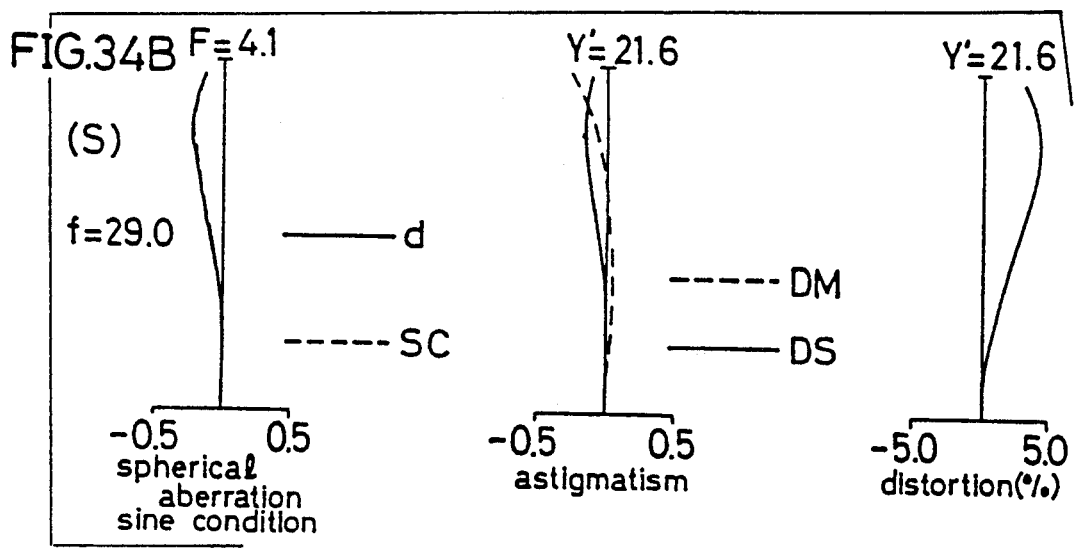
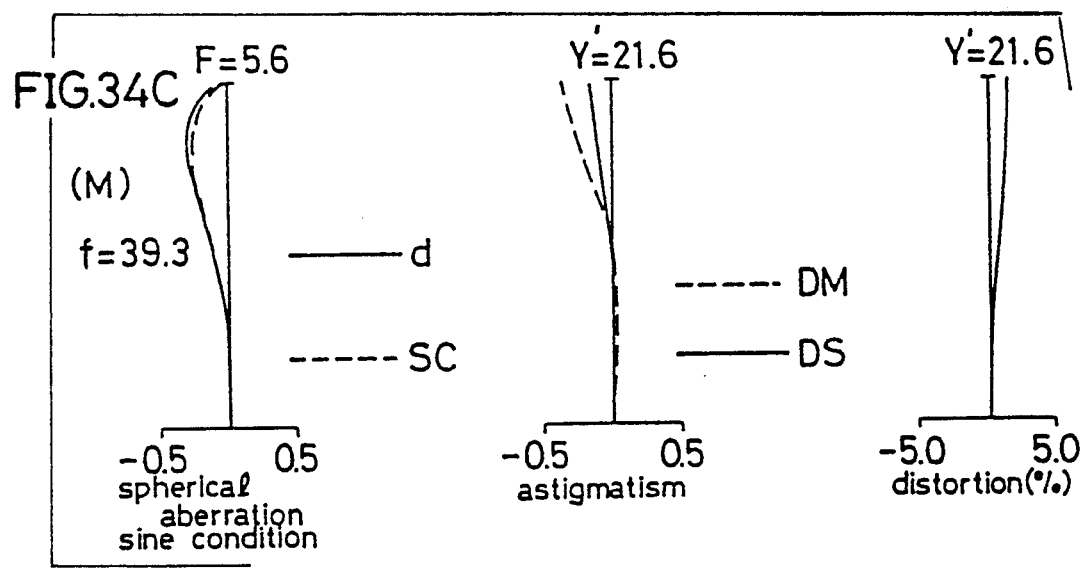
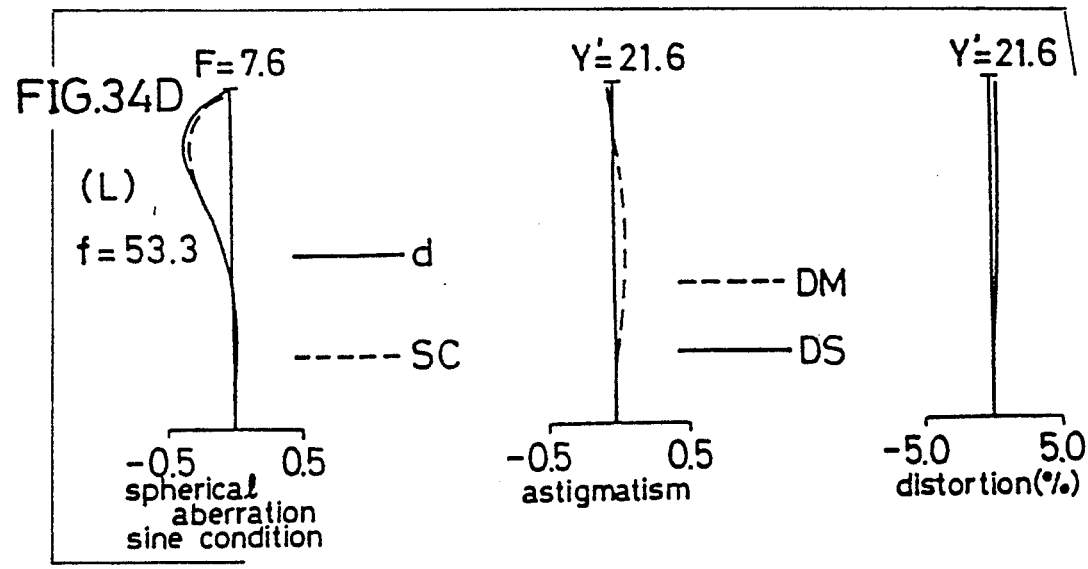

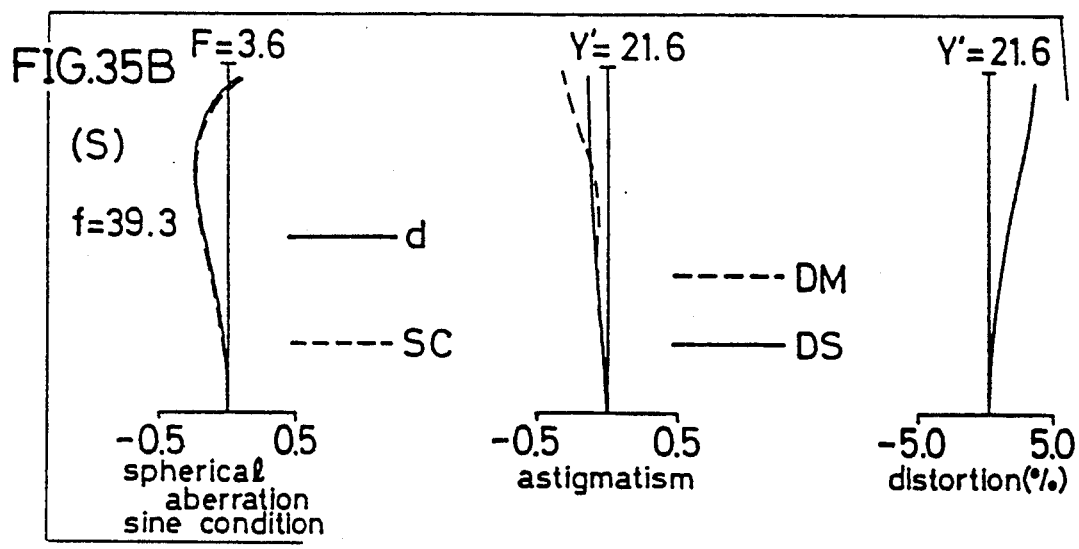
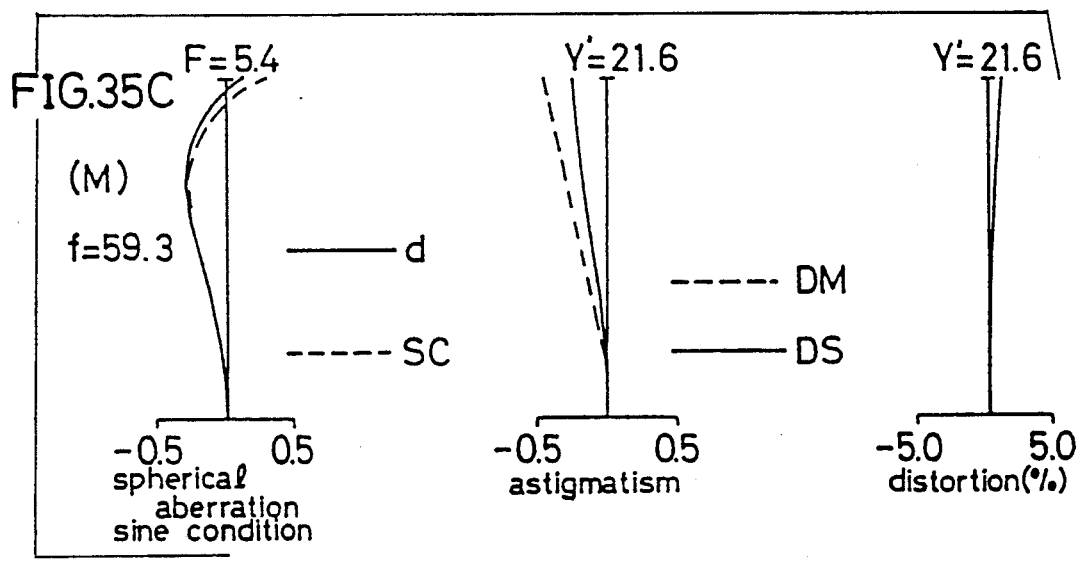
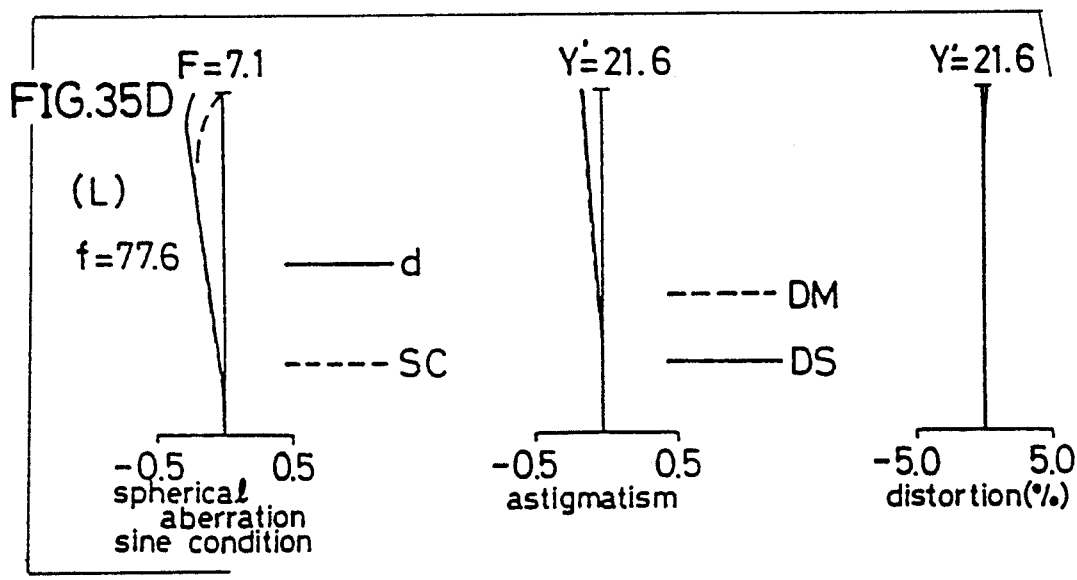

(S)

(L)

(S)

(L)

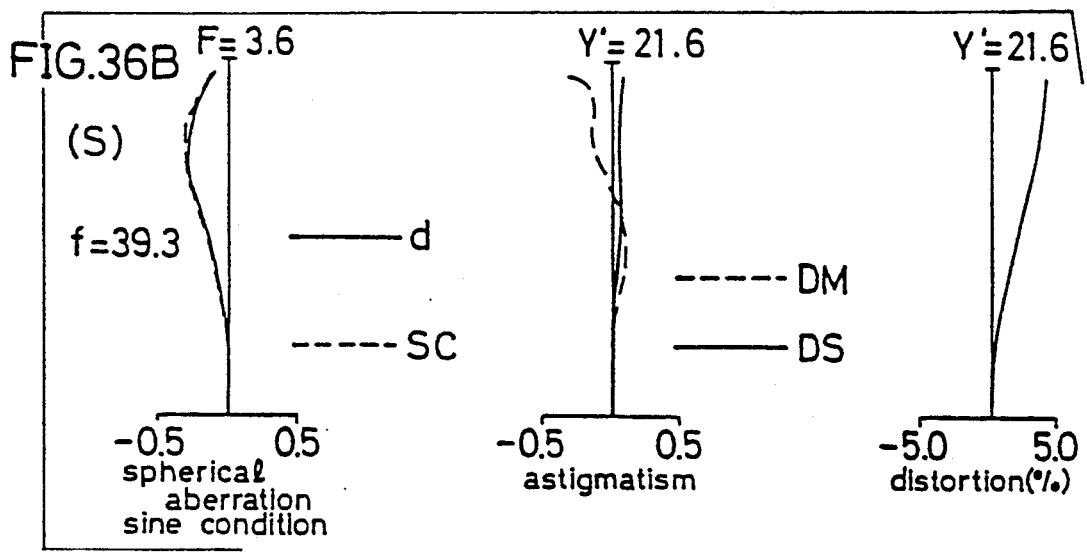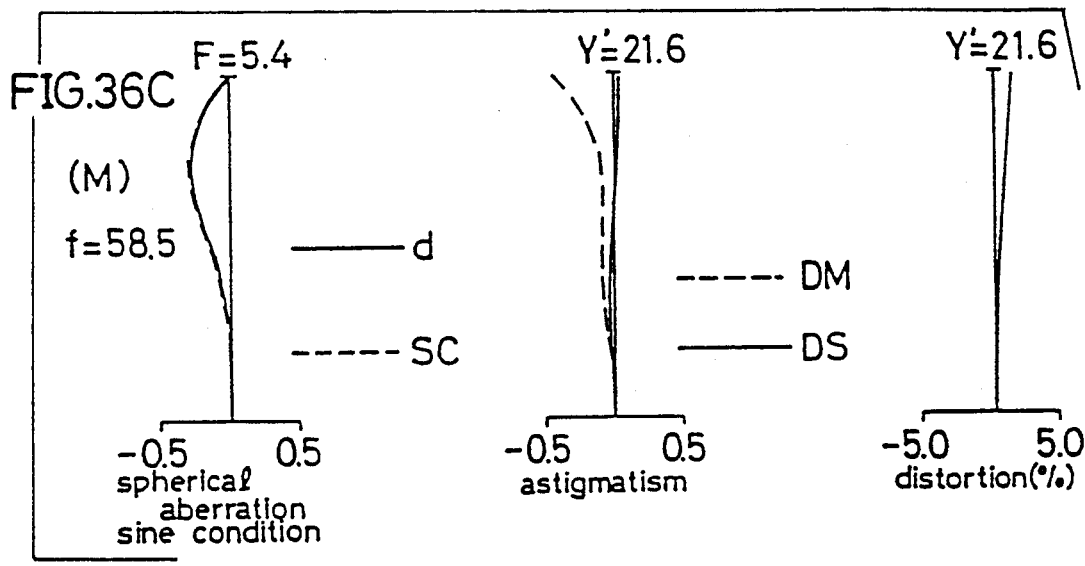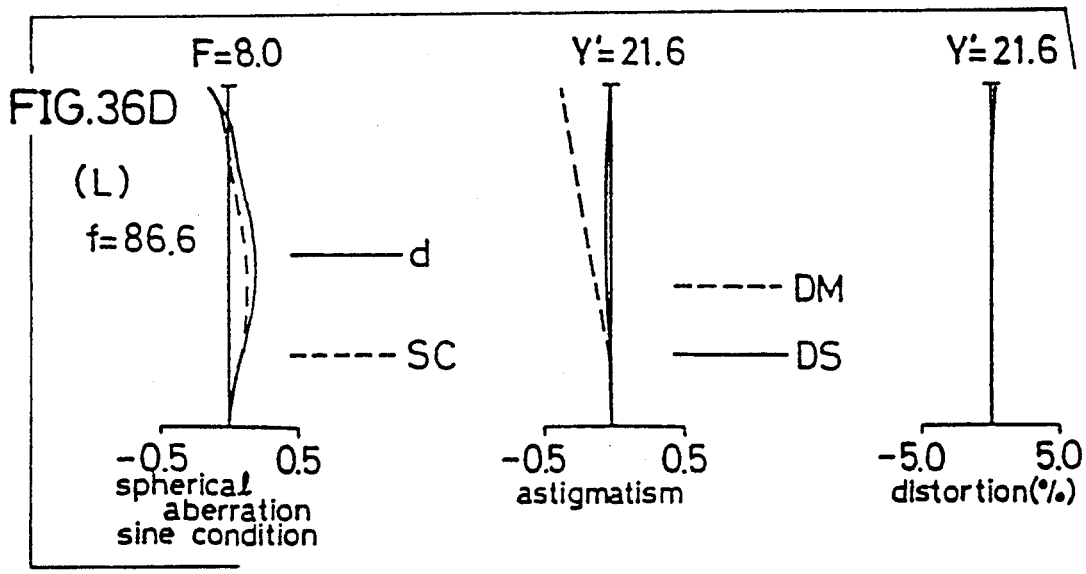

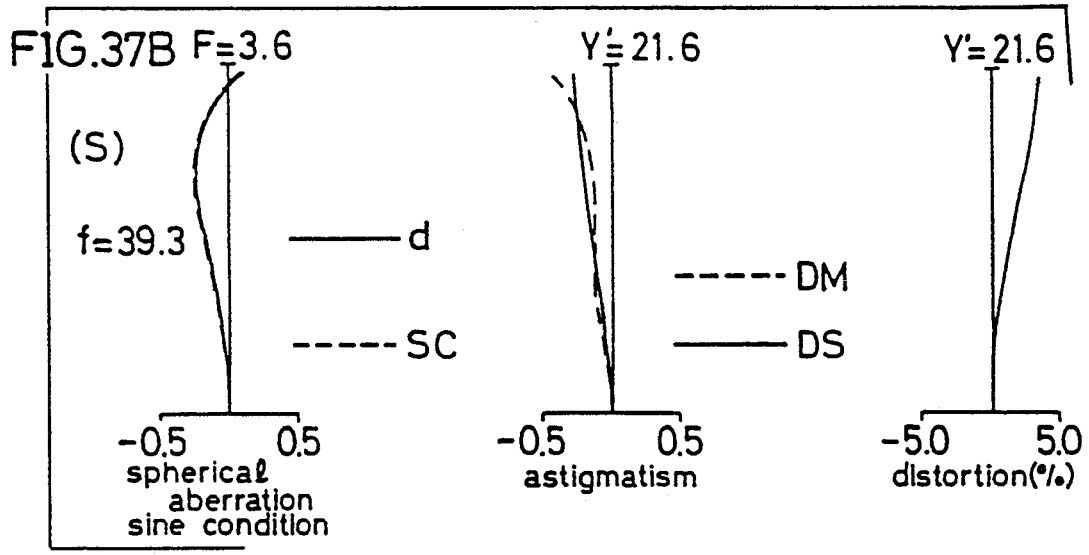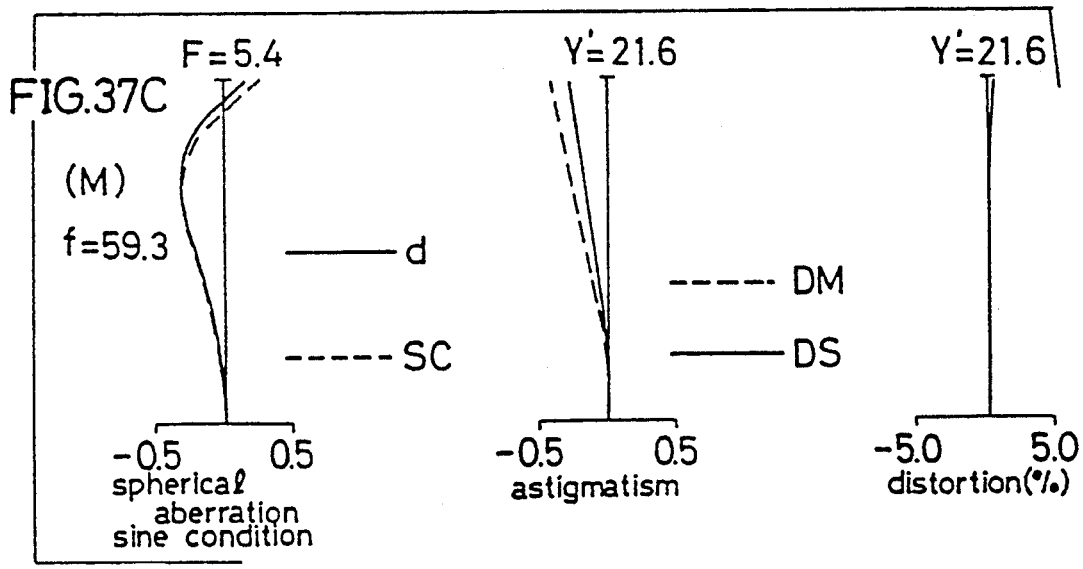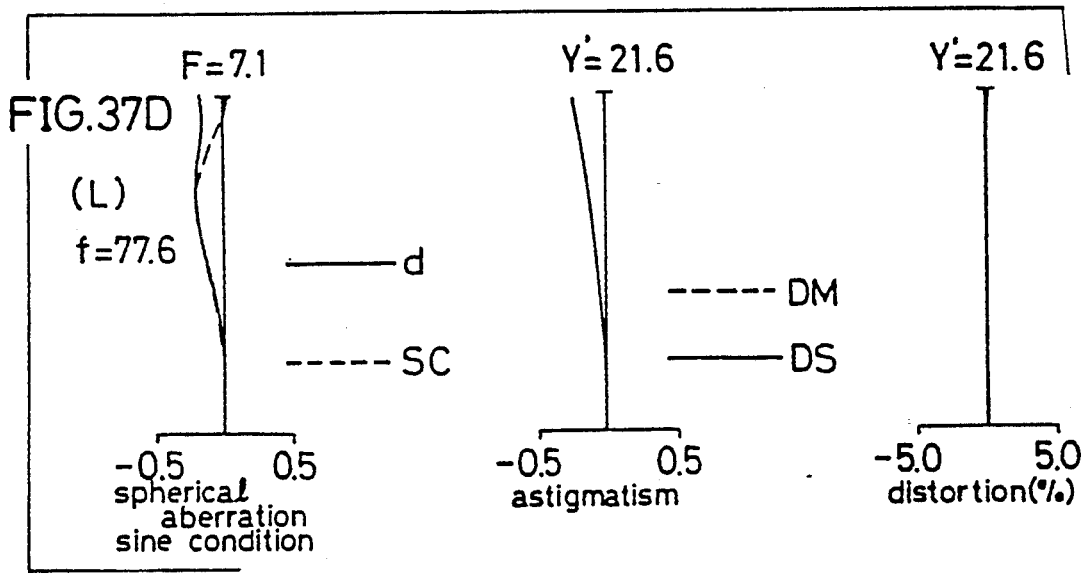

(S)

(L)

(S)

(L)

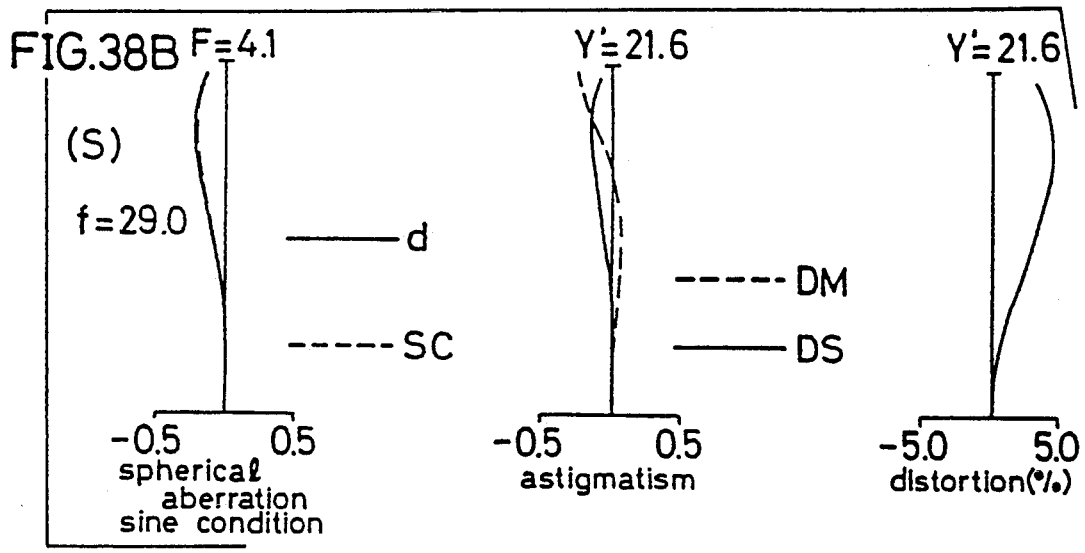
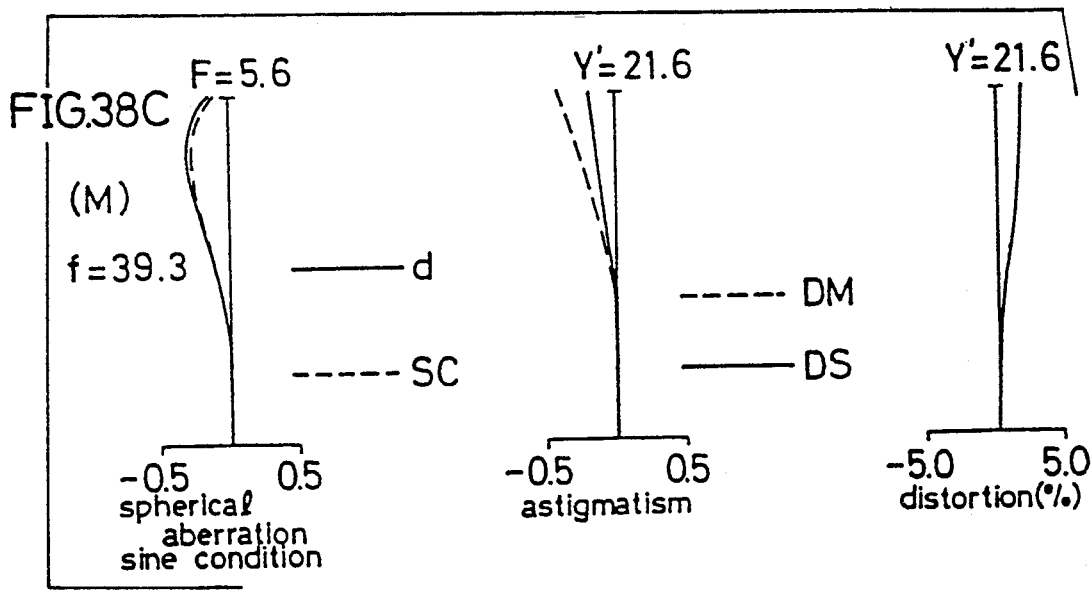
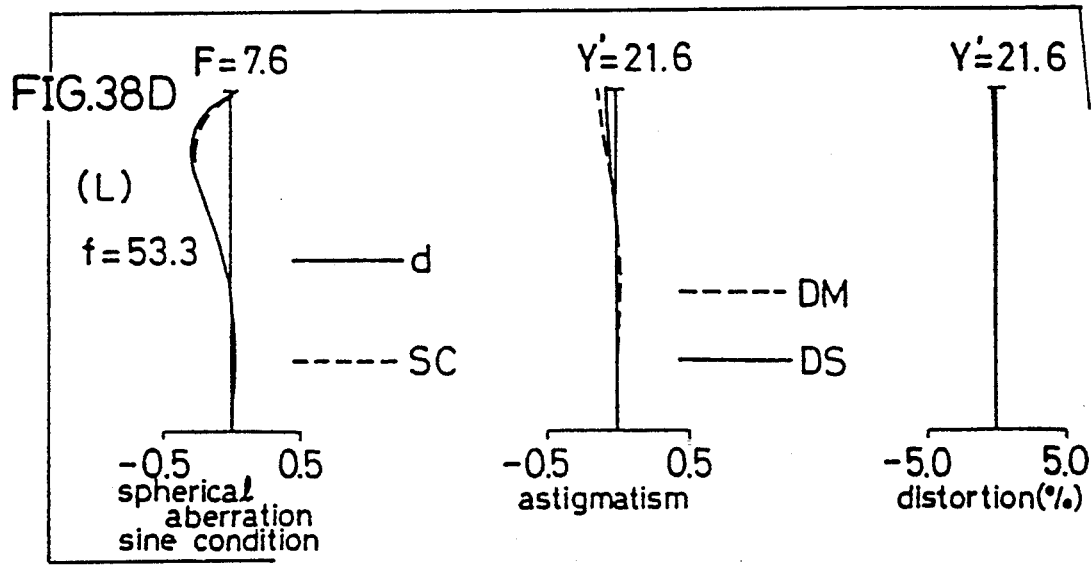

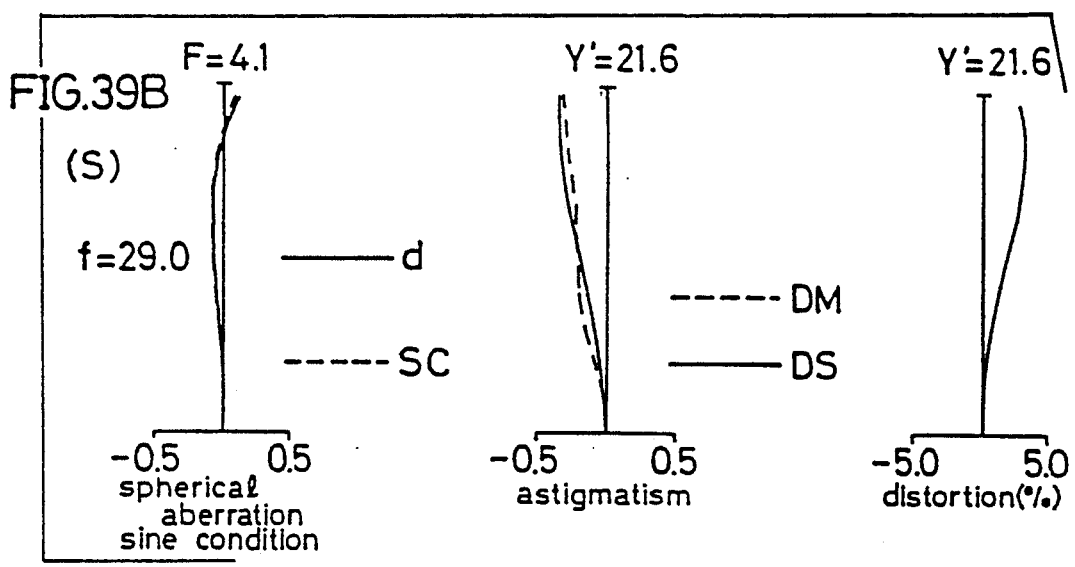
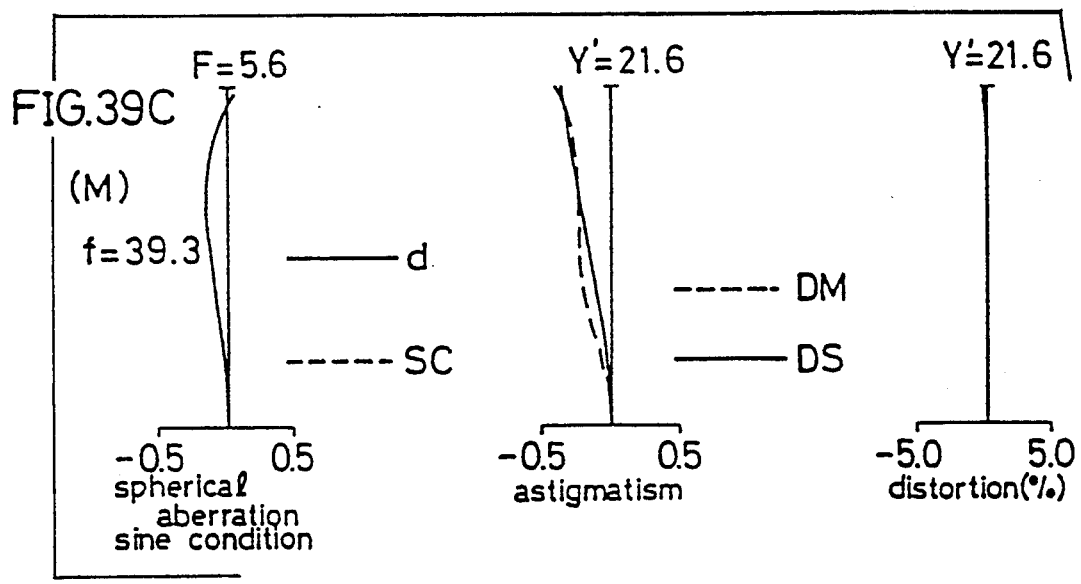
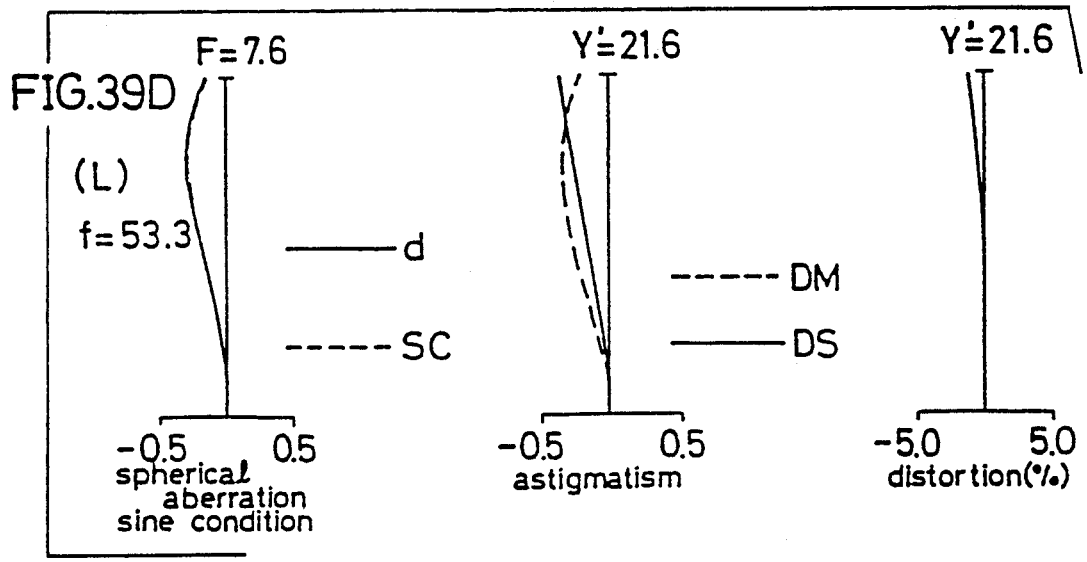

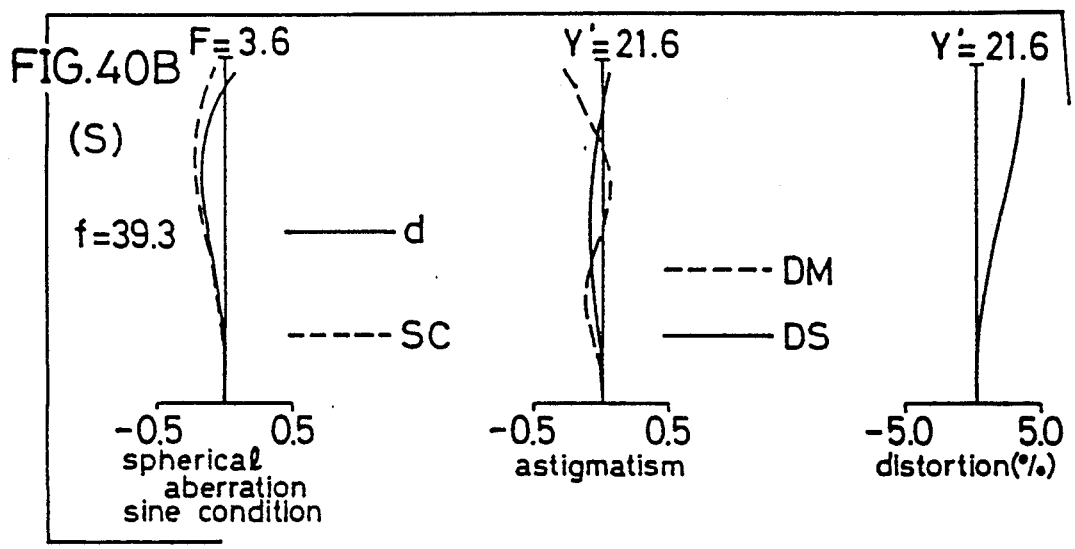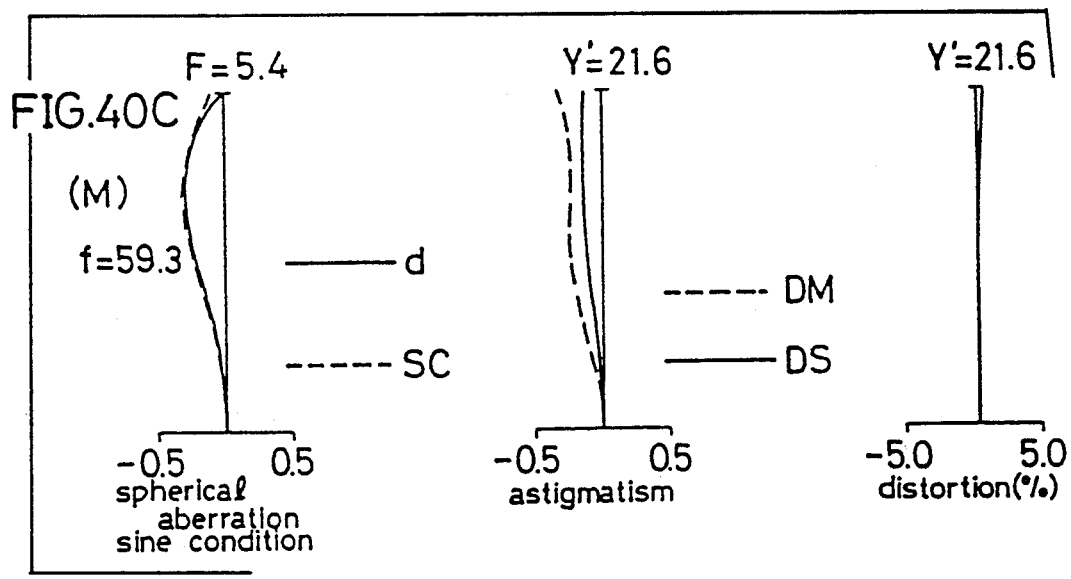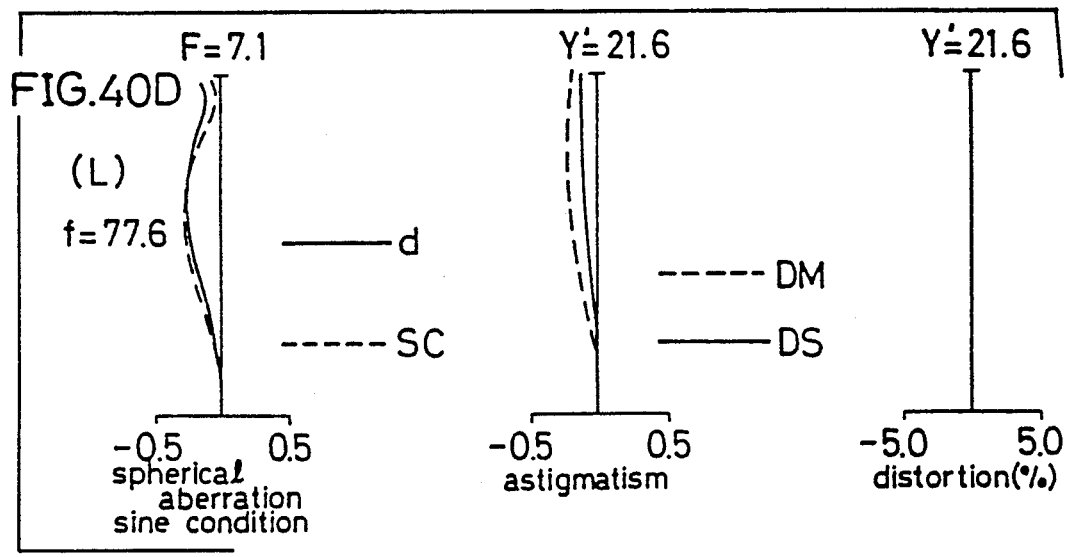

(S)
(L)

(S)
(L)

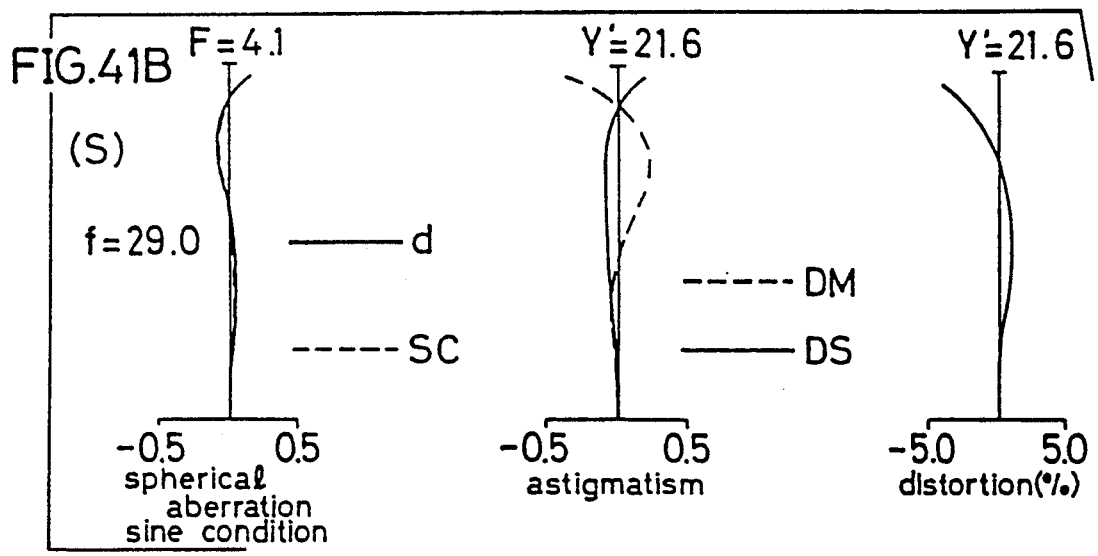
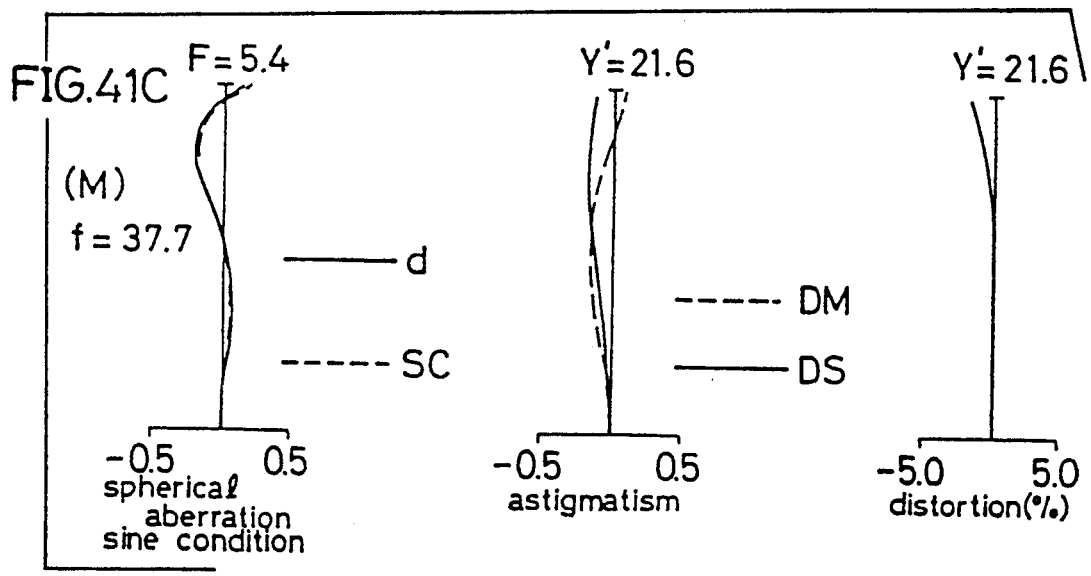
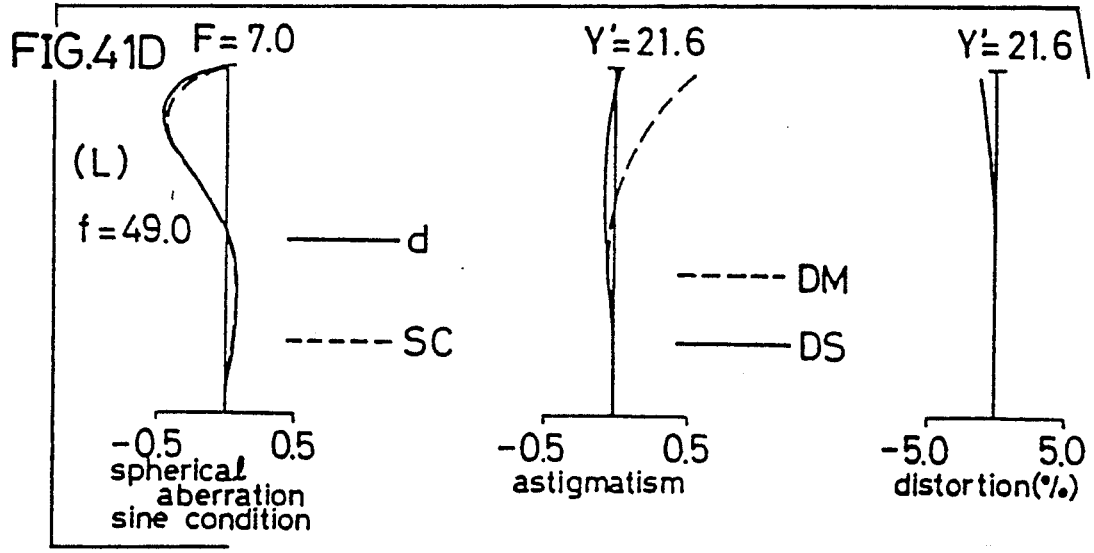

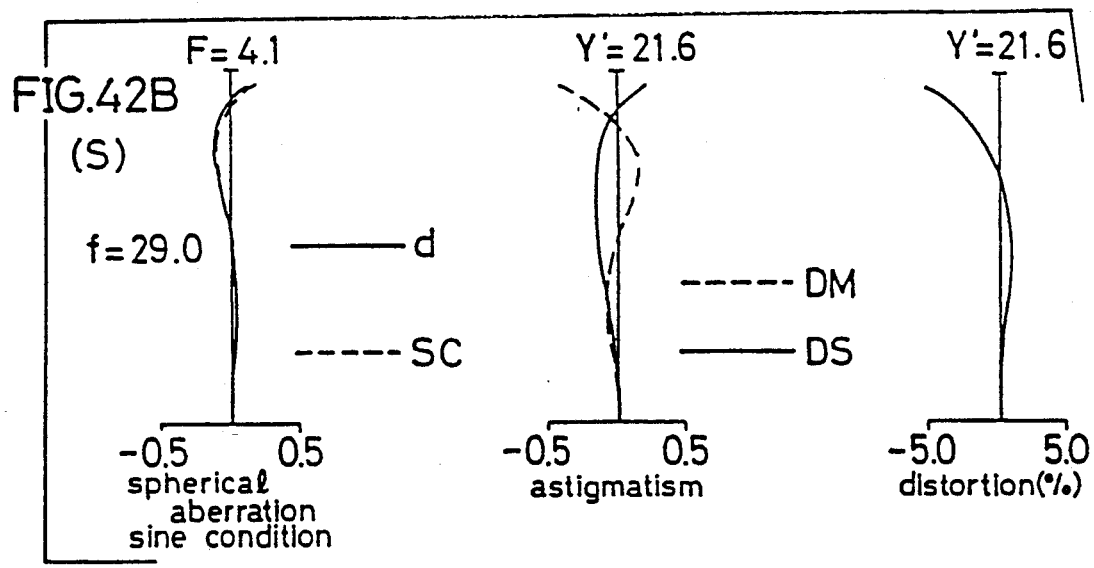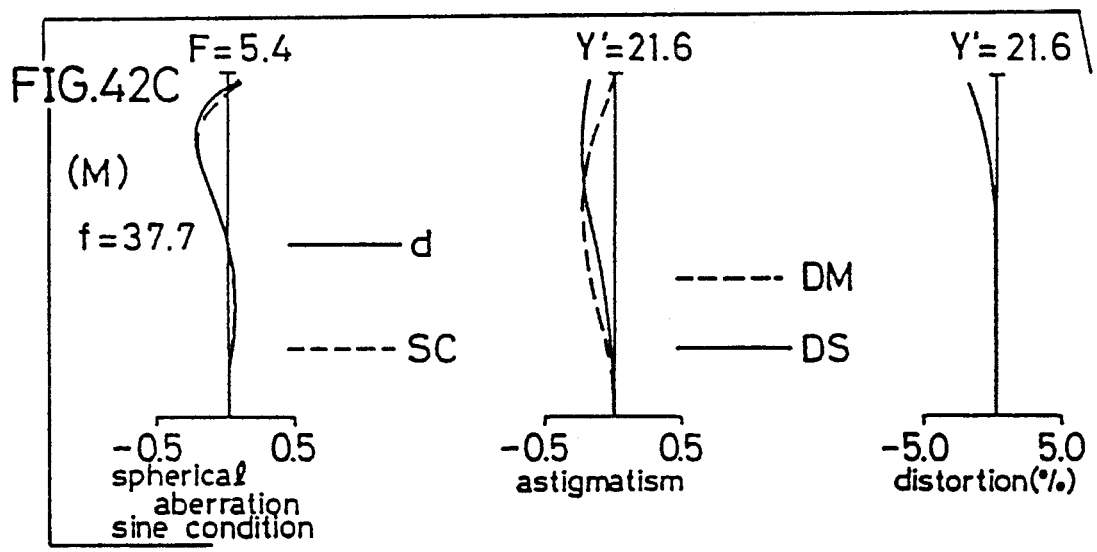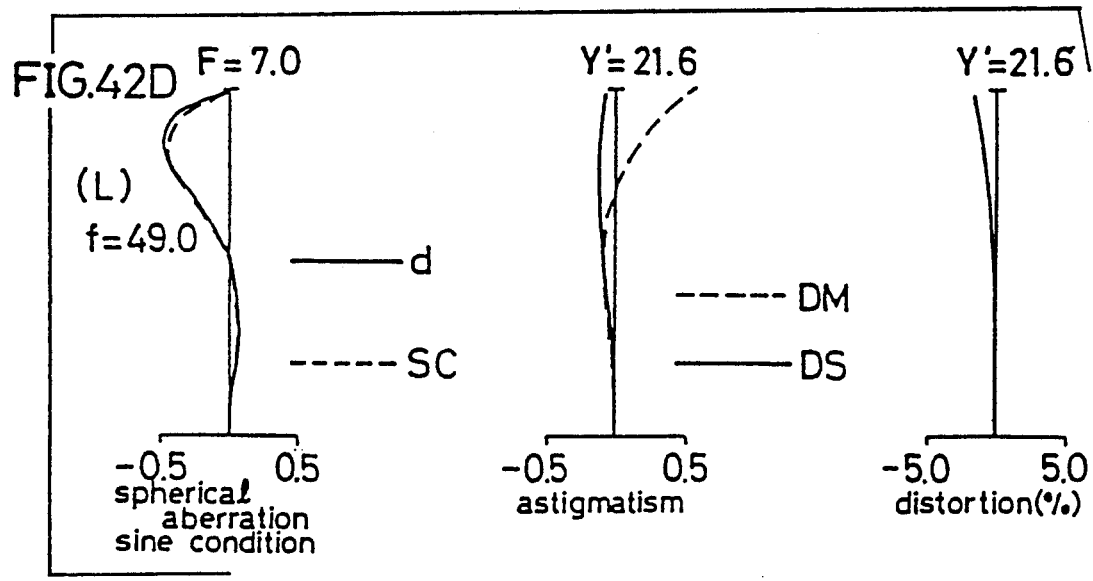

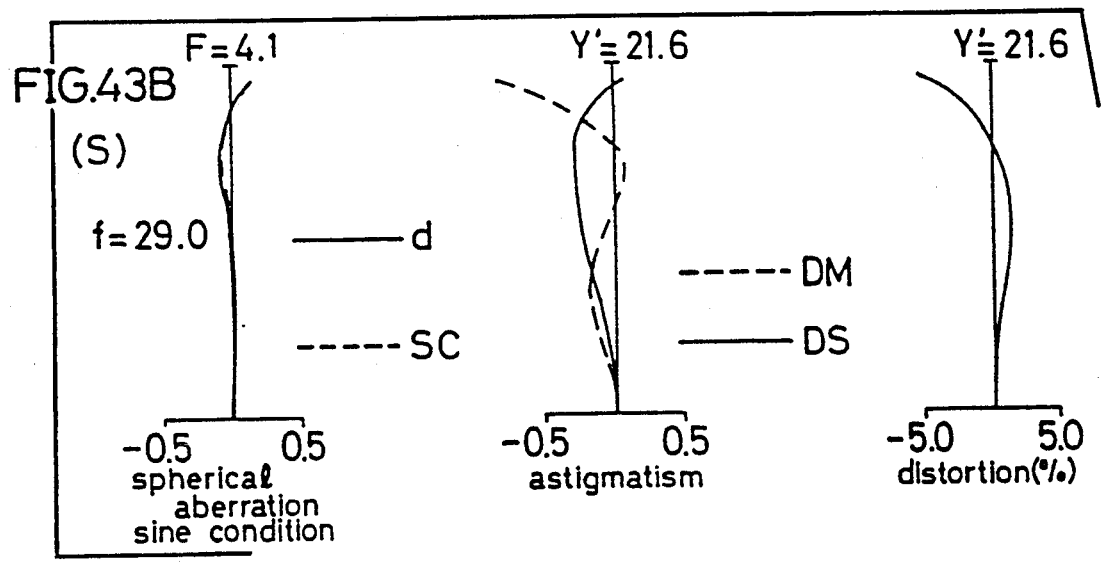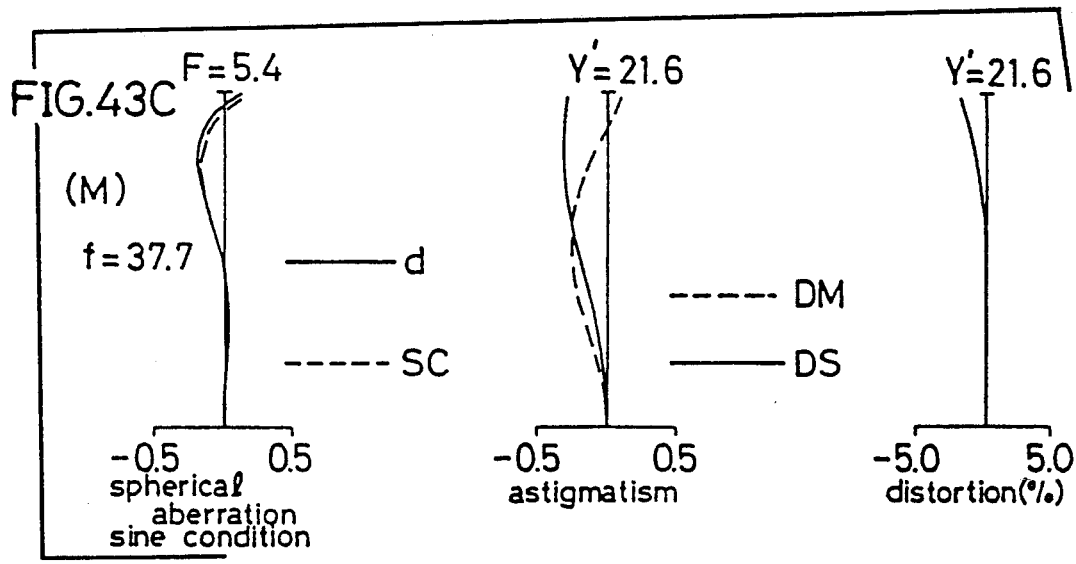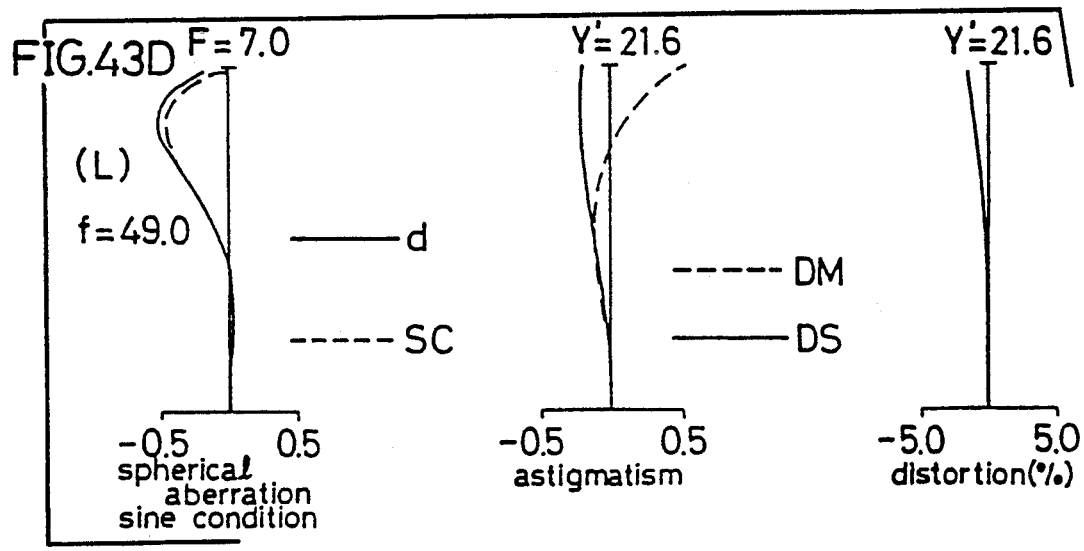

COMPACT SIZE ZOOM LENS SYSTEM

BACKGROUND OF THE INVENTION

1. Field of the Invention

The present invention relates to a compact size zoom lens system, especially suitable to be installed in a compact lens shutter camera.

2. Description of the Related Art

A lens system installed in a lens shutter camera is required to be compact, lightweight and low cost. When a zoom lens system is used in a lens shutter camera, the requirements are just the same. For making a zoom lens system compact, including the lens shifting space for zooming, refractive power of every lens group must be strong. In order to obtain a strong refractive power of a lens group while maintaining a high quality, the number of lenses in the lens group should increase. The increase in the number of lenses naturally increases the weight and the cost.

SUMMARY OF THE INVENTION

Recent progresses in plastic molding technology and glass molding technology have enabled low-cost manufacturing of aspherical lenses (i.e., lenses having at least one aspherical surface).

Therefore an object of the present invent ion is to provide a compact-size, light-weight and low-cost zoom lens system by dexterously using aspherical surfaces.

Another object of the present invention is to provide a zoom lens system that uses less number of lens elements while achieving a high optical quality where various aberrations are adequately corrected.

A common feature of the zoom lens system according to the present invention is that the zoom lens system has a very simple structure including, from the object side to the image side, a front lens group having a positive refractive power and a rear lens group having a negative refractive power, and the zoom lens system is operated by changing the air distance between the front and rear lens groups during a zooming operation. Other features of the present invention are detailed with reference to the specific embodiments that follow.

BRIEF DESCRIPTION OF THE DRAWINGS

FIGS. 1A through 43A (i.e., figures with a suffix A) respectively show a sectional view illustrating the lens configuration and the movement of the lens groups during a zooming operation from the shortest focal length $<S>$ to the longest focal length $<L>$ of the first through 43rd examples of the present invention.

FIGS. 1B through 43J (i.e. figures with suffixes B, C and J), except those otherwise described in the following paragraph, show aberration curves for an object at infinity of the first through 43rd examples of the present invention, in which FIGS. 1B, 1C, 1D through 43B, 43C, 43D are for the shortest focal length (S), FIGS. 1E, 1F, 1G through 43E, 43F, 43C are for the midpoint focal length (M) and FIGS. 1H through 1J to 43H through 43J are for the longest focal length (L).

FIGS. 13B through 15G show aberration curves of the 13th through 15th examples of the present invention, in which FIGS. 13B-15B are for sagittal direction at the shortest focal length (S), FIGS. 13C-15C are for meridional direction at the shortest focal length (S), FIGS. 13D-15D are for sagittal direction at the midpoint focal length (M), FIGS. 13E-15E are for meridional direction at the midpoint focal length (M), FIGS. 13F-15F are for sagittal direction at the longest focal length (L), and FIGS. 13G-15G are for meridional direction at the longest focal length (L).

FIGS. 25K through 26V show aberration curves for an object at infinity of the 25th and 26th examples of the present invention, in which FIGS. 25K through 25P and 26K through 26V are for the case without using a floating operation at the longest focal length (L), and FIGS. 25Q through 25V and 26Q through 26V are for the case using a floating operation at the longest focal length (L).

DETAILED DESCRIPTION OF THE PREFERRED EMBODIMENTS

Figure 1A:
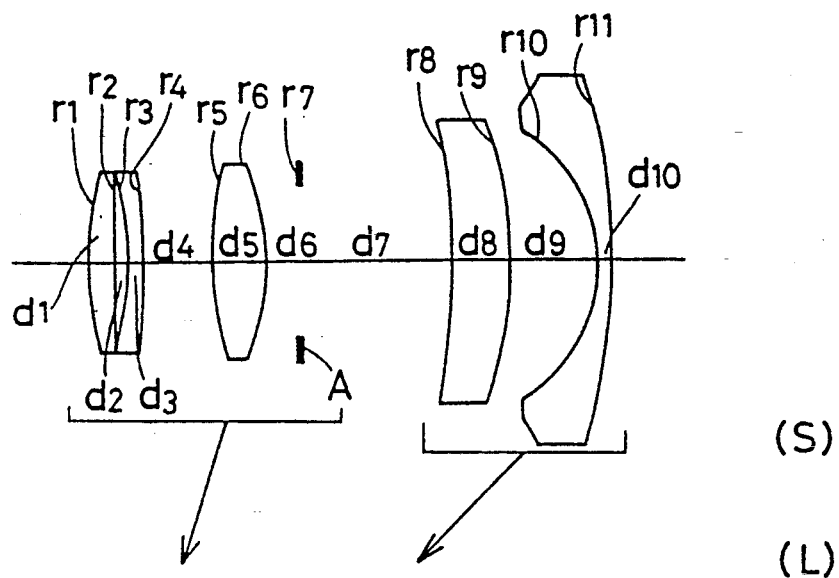

First embodiment of the present invention is a zoom lens system comprising, from the object side to the image side, a front lens group having a positive refractive power and a rear lens group having a negative refractive power where the zoom lens system is operated by changing the air distance between the front and rear lens groups during a zooming operation. The zoom lens system of the present embodiment is characterized in that the zoom lens system comprises at least three aspherical surfaces for correcting aberrations. Conventional zoom lens systems that are composed of two lens groups with a positive lens group and negative lens group use two aspherical surfaces at most. Therefore the number of lenses of the conventional zoom lens system is large and the length of the zoom lens system (i.e., the distance from the apex point of the most object-side lens element at the shortest focal length condition to the film surface) is large. The zoom lens system of the present invention, however, uses at least three aspherical surfaces, which enables the zoom lens system being composed of less number of lens elements with a shorter length.

The front lens group of the above zoom lens system may include two or more aspherical surfaces to correct aberrations, or the rear lens group may include two or more aspherical surfaces.

It is preferable that the front and rear lens groups respectively satisfy the following conditions:

$$0.10 < (\phi_w \cdot \phi_T)^{1/2}/(\beta \cdot \phi_1) < 0.27 \quad (1)$$

$$0.08 < |(\phi_w \cdot \phi_T)^{1/2}/(\beta \cdot \phi_2)| < 0.26 \quad (2)$$

where $\phi_w$: refractive power of the zoom lens system at the shortest focal length condition, $\phi_T$: refractive power of the zoom lens system at the longest focal length condition, $\phi_1$: refractive power of the front lens group ($\phi_1 > 0$), $\phi_2$: refractive power of the rear lens group ($\phi_2 < 0$), and $\beta$ zoom ratio, which is give by $\beta = \phi_w/\phi_T$.

These conditions are given for attaining a shorter length of the zoom lens system, a shorter shift amount of the lens groups during a zooming operation and an adequate correction of aberrations. When the lower limit of the condition (1) is violated (i.e., $(\phi_w \cdot \text{SM } T)^{1/2}/(\beta \cdot \phi_1) \leq 0.10$), it is difficult to obtain an adequate value (i.e., more than 15 percent of the focal length at the shortest focal length condition) of the back focal distance at the shortest focal length condition, and the diameter of the rear lens group should increase. When the upper limit of the condition (1) is violated, the shift amounts of the front and rear lens groups during a zooming operation become too large so that the design of the lens barrel would be awkward.

When the lower limit of the condition (2) is violated, the Petzval's sum becomes negatively too large (i.e., the absolute value increases), which leads to the phenomena that the image plane significantly bends toward the positive side and the positive distortion becomes too large at the shortest focal length condition. When the upper limit of the condition (2) is violated, the change in the air distance between the front and rear lens groups during a zooming operation becomes too large. The air distance becomes especially large at the shortest focal length condition and the overall length of the zoom lens system becomes too large.

The next conditions (3) and (4) are also effective for decreasing the overall length of the zoom lens system, decreasing the shift amount for a zooming operation and adequately correcting aberrations:

$$1.2 < \phi_1/\phi_w < 2.4 \quad (3)$$

$$1.1 < |\phi_2/\phi_w| < 2.4 \quad (4)$$

The condition (3) defines the ratio of the refractive power of the front lens group to that of the whole zoom lens system at the shortest focal length condition. When the upper limit of the condition (3) is violated, i.e., the refractive power of the front lens group is too large, the aberrations arising in the front lens group, especially spherical aberration, becomes too large to correct adequately even with the aspherical surfaces. When the lower limit of the condition (3) is violated, inward coma (coma with the tail extending toward the center of the image plane) becomes intolerable in the peripheral area of the image plane. The condition (4) defines the ratio of the refractive power of the rear lens group to that of the whole zoom lens system at the shortest focal length condition. When the upper limit of the condition (4) is violated, i.e., the refractive power of the rear lens group is too large, the aberrations arising in the rear lens group, especially curvature of field and distortion, becomes too large to correct adequately even with the aspherical surfaces. When the lower limit of the condition (4) is violated, inward coma becomes intolerable and it becomes difficult to obtain an enough space for the back focus.

When a zoom lens system is composed of very few lens elements (i.e., two or three lenses), it is necessary to relatively weaken the refractive powers of the front and rear lens groups in order to adequately correct aberrations, even if the zoom ratio is less than two and the open F number is relatively large. In such a case, it is preferable for the zoom lens system to satisfy the following conditions:

$$0.2 < (\phi_w \cdot \phi_T)^{1/2}/(\beta \cdot \phi_1) < 0.6 \quad 5)$$

$$0.2 < |(\phi_w \cdot \phi_T)^{1/2}/(\beta \; \phi_2)| < 0.8 \quad (6)$$

When the lower limit of the condition (5) is violated, it is difficult to obtain a sufficient back focal distance even for a zoom lens system with the zoom ratio less than two, and the diameter of the rear lens group should grow large. When the upper limit of the condition (5) is violated, the shift amounts of both the front and rear lens groups during a zooming operation increase too much and the design of the lens barrel would be awkward. When the lower limit of the condition (6) is violated, the Petzval's sum becomes negatively too large, resulting in that the image plane significantly bends toward the positive side and the positive distortion becomes too large at the shortest focal length condition. When the upper limit of the condition (6) is violated, the change in the axial air distance between the front and rear lens groups becomes too large. The air distance becomes especially large at the shortest focal length condition and the overall length of the zoom lens system becomes too large.

The following conditions are further preferred in the zoom lens system according to the first embodiment of the present invention.

$$1.0 < \phi_1/\phi_w < 1.8 \quad (7)$$

$$0.5 < |\phi_2/\phi_w| < 1.6 \quad (8)$$

When the upper limit of the condition (7) is violated, i.e., the refractive power of the front lens group is too strong, it is difficult to adequately correct various aberrations arising in the front lens group, especially spherical aberration, with the aspherical surfaces even for a zoom lens system with a large open F number and small zoom ratio if the number of lenses is very few. When the lower limit of the condition (7) is violated, inward coma in the peripheral area of the image plane becomes intolerable even for a zoom lens system with a large open F number and small zoom ratio if the number of lenses is very few.

When the upper limit of the condition (8) is violated, i.e., the refractive power of the rear lens group is too strong, it is difficult to adequately correct various aberrations arising in the rear lens group, especially field curvature and distortion, with the aspherical surfaces even for a zoom lens system with a large open F number and small zoom ratio if the number of lenses is very few. When the lower limit of the condition (8) is violated, inward coma becomes intolerable and a sufficient back focal distance cannot be obtained even for a zoom lens system with a large open F number and small zoom ratio if the number of lenses is very few.

Second embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the zoom lens system comprises at least one aspherical surface in each of the front and rear lens groups. It is preferable to construct the front lens group with three lens elements as, from the object side to the image side, positive, negative and positive, satisfying the condition (1) described above. The rear lens group is preferably constructed with two lens elements as, from the object side to the image side, positive and negative, or with one negative lens element satisfying the condition (2) described above. The conditions (1) and (2) define the most suitable relations between breadth (i.e., the upper and lower limits) of the zoom range and the refractive powers of the front and rear lens groups.

Third embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the front lens group is composed of three independent lens elements as, from the object side to the image side, positive, negative and positive, and the rear lens group is composed of two independent lens elements. Specifically, the rear lens group is composed of, from the object side to the image side, positive and negative lens elements. In this embodiment of the invention, the zoom lens system satisfies the following conditions:

$$0.07 < (\phi_w \cdot \phi_T)^{1/2}/(\beta \cdot \phi_1) < 0.25 \quad (1a)$$

$$0.07 < |(\phi_w \cdot \text{SM } T)^{1/2}/(\beta \cdot \phi_2)| < 0.35 \quad (2a)$$

where SM$_w$: refractive power of the zoom lens system at the shortest focal length condition, $\phi_T$: refractive power of the zoom lens system at the longest focal length condition, $\phi_1$: refractive power of the front lens group ($\phi_1 > 0$), $\phi_2$: refractive power of the rear lens group ($\phi_2 < 0$), and $\beta$: zoom ratio, which is given by $\beta = \phi_w/\phi_T$.

Fourth embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the front lens group is composed of independent three lens elements as, from the object side to the image side, positive, negative and positive, and the rear lens group is composed of an independent lens element having a negative refractive power. In this embodiment of the present invention, the zoom lens system satisfies the following conditions:

$$0.07 < (\phi_w \cdot \phi_T)^{1/2}/(\beta \cdot \phi_1) < 0.40 \quad (1b)$$

$$0.07 < |(\phi_w \cdot \phi_T)^{1/2}/(\beta \cdot \phi_2)| < 0.50 \quad (2b)$$

where $\phi_w$: refractive power of the zoom lens system at the shortest focal length condition, $\phi_T$: refractive power of the zoom lens system at the longest focal length condition, $\phi_1$: refractive power of the front lens group ($\phi_1 \times 0$), $\phi_2$: refractive power of the rear lens group ($\phi_2 0$), and $\beta$: zoom ratio, which is give by $$\beta = \phi_w/\phi_T.$$

Fifth embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that each of the front and rear lens groups is composed of two lens elements, and at least one of the front and rear lens groups comprises at least one aspherical surface. For example, the zoom lens system may be composed of negative—positive (front) and negative-positive (rear) lens elements, or negative—positive (front) and non-power—negative (rear) lens elements. These lens composition, especially the composition of the rear lens group (i.e., the third and fourth lens elements counted from the object side), is advantageous in correcting aberrations because the refractive power of the negative lens elements in the rear lens group can be weak. While by composing the rear lens group with two negative lens elements, Petzval's sum can be prevented from positively increasing and the image plane is prevented from bending toward the object side. The third lens element with non-refractive power in the rear lens group described above functions similar to a negative third lens element, preventing increase in the Petzval's sum to the positive direction and bending of the image plane toward the object side. It is preferable to use an aspherical surface in the third lens element because it can effectively prevent distortion from increasing to the positive side at a wide angle side. For minimizing the Petzval's sum and adequately correcting various aberrations, it is preferable to compose the zoom lens system as negative—positive (front) and positive—negative (rear). By this configuration, each of the front and rear lens groups can correct chromatic aberration. For making the whole length of the zoom lens system compact, refractive powers of both front and rear lens groups should be strong. In this case, also, negative—positive (front) and positive—negative (rear) composition is effective.

In the fifth embodiment of the invention, in which each of the front and rear lens groups is composed of two lens elements, the front lens group includes at least one aspherical surface. If, for example, an aspherical surface (aspherical surface A) is used in the most object side lens element, the aspherical surface A eliminates coma in the peripheral area of the image plane. This is because the aspherical surface A is the remotest from the aperture stop and is effective in correcting aberrations caused by off-axial rays. If an aspherical surface (aspherical surface B) is used in the lens element that is nearest to the aperture stop, the aspherical surface B is effective in eliminating spherical aberration. This is because the aspherical surface B is nearest to the aperture stop and is effective for correcting aberrations caused by axial rays.

In the fifth embodiment of the invention, the rear lens group may include at least one aspherical surface. If, for example, an aspherical surface (aspherical surface C) is used in the most object side lens element of the rear lens group, the aspherical surface C effectively corrects distortion at a wide angle side. If, for example, an aspherical surface (aspherical surface D) is used in the most image side lens element, the aspherical surface D is effective in correcting field curvature. It is preferable that the most object side lens element of the rear lens group is a positive meniscus lens convex on the object side. If an aspherical surface is used in the positive meniscus lens, the shape of the aspherical surface is preferred to weaken the negative refractive power of the rear lens group in order to adequately correct distortion. If an aspherical surface is used in the most image side lens element, the shape of the aspherical surface is also preferred to weaken the negative refract ire power of the rear lens group in order to adequately correct field curvature.

The most object side lens element of the front lens group may have two aspherical surfaces. In this case, coma and spherical aberration in the peripheral area of the image plane are corrected. An aspherical surface in the most object side lens element of the front lens group eliminates coma, because, as described above, the aspherical surface is farthest from the aperture stop and is effective for correcting aberrations due to off-axial rays. The two aspherical surfaces of the lens elements effectively corrects spherical aberration, because axial rays passing through one of the aspherical surfaces far from the aperture stop and excessively refracted thereby can be correctly returned to the right course by the other aspherical surface. Thus the two aspherical surface lens element can correct both axial and off-axial spherical aberration. When a two aspherical surface lens element is used in the rear lens group, one of the aspherical surfaces corrects distortion and the other correct field curvature.

By effectively using two or more aspherical surfaces (i.e., using two aspherical surface lens elements) in the zoom lens system, the number of component lens elements of a zoom lens system can be greatly reduced. For example, conventional zoom lens systems having zoom range of 38-90 mm are composed of 7 to 8 lens elements. A zoom lens system according to the present invention can be composed of only 4 lens elements, as described before, for the same zoom range. The reduction in the number of lenses can make the whole length of the zoom lens system shorter, e.g., 5-10 mm in this case.

Sixth embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the front lens group is composed of a positive lens element and a negative lens element, and the rear lens group is composed of a negative lens element. It is preferable in this case that the two lens elements in the front lens group is arranged as, from the object to image side, negative lens element and positive lens element in order to obtain an enough back focal distance. If the back focal distance is too short, the effective aperture of the most image side lens element must be large, resulting in a big size zoom lens system and camera.

Seventh embodiment of the present invention is a zoom lens system comprising, from the object to image side, a front lens group having a positive refractive power and a rear lens group having a negative refractive power, where the zoom lens system is operated by changing the air distance between the front and rear lens groups during a zooming operation. The zoom lens system of the present embodiment is characterized in that each of the front and rear lens groups is composed of one lens element, and at least one surface of each of the lens elements is aspherical. The lens element of the front lens group is preferably concave on the object side and convex on the image side in order to obtain enough back focal distance. If the back focal distance is too short, the effective aperture of the most image side lens element must be large, resulting in a big size zoom lens system and camera. If the effective aperture is kept small in this case, it is necessary to strongly bend off-axial rays (especially the outermost off-axial rays), resulting in deteriorated aberrations.

It is preferable to place a ray restrictor that shifts during a zooming operation at the object side of the front lens group. The ray restrictor is placed to prevent unnecessary off-axial rays from coming, and the aperture diameter is preferably less than 1.2 times that of the axial light flux at either the shortest focal length condition or the longest focal length condition, because otherwise it is difficult to eliminate coma flare due to intermediate rays especially at the longest focal length condition. It is more preferable to make the diameter of the ray restrictor less than 1.05 times the diameter of the axial light flux to eliminate coma flare of the off-axial light flux at the longest focal length condition.

It is preferable to shift the ray restrictor so that the air distance between the front lens group and the ray restrictor increases as the zoom lens system is zoomed from the shortest focal length condition to the longest focal length condition. This effectively eliminate coma flare arising around the intermediate area (i.e., the area having the image height y' around 10-15) at the longest focal length condition without reducing peripheral light amount at the shortest focal length condition. It is further preferable to make the ray restrictor shift with the rear lens group while the zoom lens system is zoomed from the shortest focal length to the longest focal length because the structure of the lens barrel can be simple.

The following is a description of a desired shape of an aspherical surface included in the above-mentioned first to seventh embodiments.

It is preferable to make at least one of the aspherical surfaces of the front lens group satisfy the following condition (9):

for a height y from the optical axis of the zoom lens system satisfying $0.7y_{MAX} < y < 1.0y_{MAX}$ where $y_{MAX}$ is the maximum effective radius of the aspherical surface, $$-0.03 < \phi_1 \cdot (N'-N) \cdot d\{x(y)\}/dy < 0 \qquad (9)$$

where $\phi_1$: refractive power of the front lens group,

N: refractive index of the medium at the object side of the aspherical surface,

N': refractive index of the medium at the image side of the aspherical surface, x(y): axial deviation of the aspherical surface from its vertex at the height y, which is given by $x(y) = (r/\epsilon)[1 - \{1 - \epsilon(y^2/r^2)\}^{1/2}] + \Sigma A_i y^i$ (summation $\Sigma$ made for $i \geq 2$)

$x_0(y)$: axial deviation of the reference spherical surface of the aspherical surface from its vertex at the height y, which is given by $x_0(y) = \bar{r}[1 - \{1 - (y^2/\bar{r}^2)\}^{1/2}]$ r: radius of curvature of the aspherical surface at the vertex, $\epsilon$: quadric surface parameter, $A_i$: aspherical coefficient of the i-th order, and $\bar{r}$: radius of curvature at the vertex, which is given by $(1/\bar{r}) = (1/r) + 2A_2$.

The condition (9) means that the aspherical surface is shaped so that the refractive power is weaker in positive (i.e., stronger in negative) as the height y increases (i.e., in the periphery of the aspherical surface). The condition (9) is imposed to effectively eliminate spherical aberration. When the upper limit of the condition (9) is violated, spherical aberration is under-corrected in the entire zoom range, and when the lower limit is violated, spherical aberration is over-corrected in the entire zoom range.

It is further preferable to make at least one of the aspherical surfaces of the rear lens group satisfy the following condition (10):

for a height y from the optical axis of the zoom lens system satisfying $0.8y_{MAX} < y < 1.0y_{MAX}$ where $y_{MAX}$ is the maximum effective radius of the aspherical surface, $$-0.10 < \phi_2 \cdot (N'-N) \cdot d\{x(y) - x_o(y)\}/dy = 0 \quad (10)$$

where $\phi_2$: refractive power of the rear lens group.

The condition (10) means that the aspherical surface is shaped so that the refractive power is weaker in negative (i.e., stronger in positive) as the height y increases. The condition (10) is imposed to effectively correct both distortion and field curvature at a high level. When the upper limit of the condition (10) is violated, positive distortion becomes too large in the shortest focal length condition, and when the lower limit is violated, negative field curvature becomes intolerable in the entire zoom range.

It is still preferable that all the aspherical surfaces of the front lens group satisfy the following condition (11):

for a height y from the optical axis of the zoom lens system satisfying $0.7y_{MAX} < y < 1.0y_{MAX}$ where $y_{MAX}$ is the maximum effective radius of the aspherical surface, $$-0.03 < \phi_1 \cdot (N'-N) \cdot d\{x(y) - x_o(y)\}/dy < 0.01 \quad (11)$$

When the upper limit of the condition (11) is violated, zonal aberration becomes too strong in negative and the focal point varies in accordance with stopping down. When the lower limit is violated, zonal aberration is over-corrected (the spherical aberration waves) and it is difficult to correct both spherical aberration and other aberrations at a permissible level.

It is also preferable that all the aspherical surfaces of the rear lens group satisfy the following condition (12):

for a height y from the optical axis of the zoom lens system satisfying $0.8y_{MAX} < y < 1.0y_{MAX}$ where $Y_{MAX}$ is the maximum effective radius of the aspherical surface, $$-0.05 < \phi_2 \cdot (N'-N) \cdot d\{x(y) - x_o(y)\}/dy < 0.02 \quad (12)$$

When the upper limit of the condition (12) is violated, positive distortion and positive field curvature becomes too strong from the shortest (i.e., wide angle end) to middle focal length conditions, and when the lower limit is violated, negative distortion becomes too strong in a middle to longest focal length condition and, besides that, negative field curvature becomes too strong in the entire zoom range.

When a lens unit having two aspherical surfaces is used in the front lens group, one surface is preferred to satisfy the following condition (13):

for a height y from the optical axis of the zoom lens system satisfying $0.7y_{MAX} < y < 1.0y_{MAX}$ where $y_{MAX}$ is the maximum effective radius of the aspherical surface, $$-0.04 < \phi_1 \cdot (N'-N) \cdot d\{x(y) - x_o(y)\}/dy < 0 \quad (13)$$

and the other surface is preferred to satisfy the following condition (14):

for a height y from the optical axis of the zoom lens system satisfying $0.7y_{MAX} < y < 1.0y_{MAX}$ where $y_{MAX}$ is the maximum effective radius of the aspherical surface, $$0 < \phi_1 \cdot (N'-N) \cdot d\{x(y) - x_o(y)\}/dy < 0.04 \quad (14)$$

The condition (13) means that the aspherical surface is shaped so that the refractive power is weaker in positive (i.e., stronger in negative) as the height y increases (i.e., in the periphery of the aspherical surface). The condition (13) is imposed to correct spherical aberration to lean toward over side in three dimensional aberration range. Since this correction is too strong for the off-axial rays, the other aspherical surface is designed to have stronger positive refractive power in the periphery to return the off-axial rays toward under side, as shown by the condition (14). The deviation of the aspherical surface defined by the condition (13) from the reference spherical surface is preferred to be larger than that of the other aspherical surface defined by the condition (14).

When a lens unit having two aspherical surfaces is used in the rear lens group, one surface is preferred to satisfy the following condition (15):

for a height y from the optical axis of the zoom lens system satisfying $0.8y_{MAX} < y < 1.0y_{MAX}$ where $y_{MAX}$ is the maximum effective radius of the aspherical surface, $$-0.10 < \phi_2 \cdot (N'-N) \cdot d\{x(y) - x_o(y)\}/dy - 0 \quad (15)$$

and the other surface is preferred to satisfy the following condition (16):

for a height y from the optical axis of the zoom lens system satisfying $0.8y_{MAX} < y < 1.0y_{MAX}$ where $y_{MAX}$ is the maximum effective radius of the aspherical surface, $$-0.02 < \phi_2 \cdot (N'-N) \cdot d\{x(y) - x_o(y)\}/dy < 0.10 \quad (16)$$

The condition (15) means that the aspherical surface is shaped so that the refractive power is weaker in negative (i.e., stronger in positive) as the height y increases. The condition (15) is imposed to correct distort ion around the wide angle end. The other aspherical surface defined by the condition (16) is imposed to further correct field curvature.

When a lens unit having two aspherical surfaces is used in each of the front and rear lens groups, the refractive powers of the front and rear lens groups is preferred to satisfy the following conditions (3a) and (3b):

$$0.10 < (\phi_w \cdot \phi_T)^{1/2}/(\beta \cdot \phi_1) < 0.35 \quad (1c)$$

$$b\ 0.08 < |(\phi_w\ \phi_T)^{1/2}/(\beta \cdot \phi_2)| < 0.36 \quad (2c)$$

where $\phi_1$: refractive power of the zoom lens system at the shortest focal length condition, $\phi_T$: refractive power of the zoom lens system at the longest focal length condition, $\phi_1$: refractive power of the front lens group ($\phi_1 > 0$);

$\phi_2$: refractive power of the rear lens group ($\phi_2 > 0$), and $\beta$: zoom ratio, which is give by $\beta = \phi_w/\phi_T$.

These conditions are imposed to obtain a short length of the zoom lens system, short shift amount, enough back focal distance and good correction of various aberrations at a high level.

The lens elements in the front lens group is preferred to satisfy the following conditions (17) and (18):

$$\nu_{d(G1)} < 40 \quad (17)$$

$$\nu_{d(G2)} > 50 \quad (18)$$

where $\nu_{d(G1)}$: Abbe number of the object side lens of the front lens group, and $\nu_{d(G2)}$: Abbe number of the image side lens of the front lens group.

These conditions are introduced to correct axial chromatic aberration and chromatic aberration of magnification: by making the value $\nu_{d(G1)}$ small and making the value $\nu_{D(G2)}$ large, chromatic aberration is effectively corrected.

Eighth embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the front lens group comprises, from the object side to the image side, a first sub lens group and a second sub lens group, and the air distance between the first sub lens group and the second sub lens group of the front lens group slightly varies for correcting aberrations according to a shift of the front lens group or the rear lens group along the optical axis of the zoom lens system for a focusing operation.

As described above, the composition of the zoom lens system is very simple as it is composed of positive front lens group and negative rear lens group, and the zooming operation is performed by varying the air distance between the front and rear lens groups. The zoom lens system of the present embodiment is characterized in that the front lens group is divided into two sub lens groups, and the air distance between the sub lens groups also varies in the front lens group during a focusing operation. The movements of the two sub lens groups is referred to as focus floating here. A focus floating is to vary a certain air distance slightly during a focusing operation in order to compensate for the deterioration of aberrations for an object close to the lens system. For example, when a close object is to be photographed with a two group zoom lens system in a lens shutter camera, aberrations cannot be adequately corrected by a simple focusing with the front lens group or the rear lens group. In this embodiment of the present invention, the focus floating is introduced in the front lens group of a two group zoom lens system in order to compensate for the deterioration of aberrations in a close up photographing. One preferable variation of the above zoom lens system is that the first sub lens group has a negative refractive power comprising at least one lens element having a negative refractive power, and the second sub lens group has a positive refractive power comprising at least one lens element having a positive refractive power.

Another preferable variation is that the first sub lens group has a positive refractive power comprising at least one lens element having a positive refractive power, and the second sub lens group has a positive refractive power comprising at least one lens element having a positive refractive power.

The focusing can be performed either by the front lens group or by the rear lens group. The front lens group may include an aspherical surface and the rear lens group may also include an aspherical surface. Any shape of aspherical surface can be used in the front lens group, but such that has stronger negative refractive power in the periphery is preferred. Also, any shape of aspherical surface can be used in the rear lens group, but such that has stronger positive refractive power in the periphery is preferred.

The air distance between the first and second sub lens groups becomes large either when the object distance is infinity or when the object is close, but the latter case is preferred for correcting aberrations. A focus floating ratio $\Delta Tf$ is defined by $\Delta Tf = \Delta t/\Delta d$ where $\Delta d$ is the change in the axial air distance between the first and second sub lens groups, and $\Delta t$ is the shift amount of the focusing lens group during the focusing operation. The zoom lens system according to the invention is preferred to satisfy the following condition (19):

$$0 < |\Delta Tf| < 0.75 \qquad (19)$$

If the upper limit of the condition (19) is violated, the image plane bend toward over side and the aberrations are over-corrected. The maximum value of the axial air distance between the first and second sub lens groups can be taken at any focal length condition, i.e., at the longest, the middle point or the shortest focal length condition. The focus floating can also be performed in the rear lens group, as well as in the front lens group.

The floating can be made in the zooming operation, as well as in the focusing operation. For realizing a floating in relation to a zooming operation, a zoom lens system of the ninth embodiment of the present invention comprises, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that the front lens group comprises, from the object side to the image side, a first sub lens group having a negative refractive power and a second sub lens group having a positive refractive power, and the front and rear lens groups shift toward the object side with the air distance between the front lens group and the rear lens group decreasing and with the air distance between the first sub lens group and the second sub lens group of the front lens group slightly varying during a zooming operation from a shorter focal length to a longer focal length.

As described above, the composition of the zoom lens system is very simple as it is composed of positive front lens group and negative rear lens group, and the zooming operation is performed by varying the air distance between the front and rear lens groups. The zoom lens system of the present embodiment is characterized in that the front lens group is divided into two sub lens groups, and the air distance between the sub lens groups also varies in the front lens group during a zooming operation. The movements of the two sub lens groups is referred to as zoom floating here for discriminating from the focusing floating. The zoom floating used here is not to vary magnification but to minimize fluctuation of aberrations and adequately correct aberrations by varying the air distance slightly during a zooming operation. No prior art adopts such a zoom floating in a two-lens-group (negative-positive) zoom lens system.

By adopting the zoom floating operation, the number of restricting conditions in designing a zoom lens system is reduced. Now the restricting conditions are explained. In a design of a zoom lens system, the change in aberration coefficients of three dimension satisfies the following conditions during zooming:

(a) Petzval's sum is constant.

(b) spherical aberration (I) and astigmatism (III) coincide at both ends when best corrected and show a U-shaped curve between the ends.

(c) coma (II) and distortion (V) can change in one way.

From the conditions (a)-(c), it is sufficient to correct field curvature (IV) represented by Petzval's sum (P) at either of the shortest focal length condition (S; the wide angle end) or the longest focal length condition (L; the telephoto end). Also, it is sufficient to correct Coma (II) and distortion (V) at both ends S and L. But spherical aberration (I) and astigmatism (III) must be corrected in the entire range, i.e., at S, M (middle-point focal length condition) and L. In summary, one zoom lens system is imposed by at least eleven restriction conditions (cf. "Study on an Optical Design of a Zoom Lens System" by Yamaji, Research Report of Canon, pp. 82-84). The restriction conditions are illustrated in the following table.

|     | S | M | L | S or L |
|-----|---|---|---|--------|
| I   | O | O | O |        |
| II  | O |   | O |        |
| III | O | O | O |        |
| IV  |   |   |   | O      |
| V   | O |   | O |        |

Since a zoom floating is used in the zoom lens system of the present invention, fluctuation of astigmatism (III) during the zooming operation is minimized. Thus it is sufficient to correct astigmatism, as well as field curvature, either at the shortest focal length condition (S) or at the longest focal length condition (L), which reduces the number of restriction conditions by two.

The reason why the first sub lens group is negative and second sub lens group is positive for the zoom floating of the present invention is now explained. For obtaining a compact zoom lens system with less number of lens elements (e.g., four or five lens elements), the most object side lens group (not necessarily a lens element) has preferably a negative refractive power. Since, in the present invention, the front lens group has a positive refractive power, if the first sub lens group (of the front lens group) has a negative power, the remaining second sub lens group should have a positive refractive power.

The zoom lens system as described here is preferred to satisfy the following condition:

$$0.01 < |(A_w - A_t)/(B_w - B_T)| < 0.8 \quad (20)$$

where $A_w$: the axial air distance between the first sub lens group and the second sub lens group of the front lens group at the shortest focal length condition, $A_T$: the axial air distance between the first sub lens group and the second sub lens group of the front lens group at the longest focal length condition, $B_w$: the axial air distance between the front lens group and the rear lens group at the shortest focal length condition, and $B_T$: the axial air distance between the front lens group and the rear lens group at the longest focal length condition.

The condition (20) means that the change in the axial air distance (for the zoom floating) between the first and second sub lens groups (in the front lens group) is smaller than the change in the axial air distance between the front and rear lens groups during zooming. When the lower limit of the condition (20) is violated, the effect of the zoom floating could be too small, resulting in the image plane bending toward the under side. When the upper limit of the condition (20) is violated, the aberration correction by the zoom floating is too strong, resulting in the bending of the image plane toward the over side.

It is further preferable to compose the zoom lens system to satisfy the following conditions:

$$A_w < A_t \quad (21)$$

$$1.0 < \phi_{1T}/\phi_{1w} < 2.0 \quad (22)$$

where $\phi_{1w}$: refractive power of the front lens group at the shortest focal length condition, and $\phi_{1T}$: refractive power of the front lens group at the longest focal length condition.

The condition (21) means that the axial air distance between the first and second sub lens group is larger at the shortest focal length condition (wide angel end) than at the longest focal length condition (telephoto end). It is not always necessary that the axial air distance is largest at the telephoto end, but it can be largest at a midway between the shortest focal length condition and the longest focal length condition. When the first sub lens group has a negative power and the second sub lens group has a positive power, a desired zoom floating effect cannot be obtained without the condition (21).

Since the axial air distance between the first and second sub lens groups changes by a zoom floating, the refractive power of the front lens group including the first and second sub lens groups also changes. The condition (22) defines the change (the upper and lower limits) in the refractive power of the front lens group. When the upper limit is violated, the aberration is overcorrected and the image plane is bent toward the over side. When the lower limit is violated, which means that the refractive power of the front lens group is smaller at the longest focal length condition than at the shortest focal length condition, the shifting amount of the front lens group becomes too large.

The front lens group may include at least one aspherical surface. Any shape of aspherical surface can be used in the front lens group, but such that has stronger negative refractive power in the periphery is preferred. The rear lens group may also include at least one aspherical surface. Similarly, any shape of aspherical surface can be used in the rear lens group, but such that has stronger positive refractive power in the periphery is preferred.

Tenth embodiment of the present invention is a zoom lens system comprising, from the object side to the image side, a front lens group having a positive refractive power and a rear lens group having a negative refractive power, where the zoom lens system is operated by changing the air distance between the front and rear lens groups during a zooming operation. The zoom lens system of the present embodiment is characterized in that each of the front lens group and the rear lens group is composed of two lens elements, and each of the front lens group and the rear lens group comprises at least one lens element that is made of lens material satisfying either one of the following conditions (23) and (24):

$$N_d \leq 1.60 \text{ and } \nu_d \leq 35.0 \quad (23)$$

$$N_d \leq 1.50 \quad (24)$$

where $N_d$: refractive index of the lens material for the d-line, and $v_d$: Abbe number of the lens material for the d-line.

When a convex lens uses the lens material satisfying one of these conditions, bending of the image plane toward the positive side (due to increase in the absolute value of Petzval's sum in negative) is effectively prevented. When in that case the refractive index of the lens material is greater than that defined by the condition (23) or (24), the absolute value of the negative Petzval's sum further increases and it becomes difficult to find a best matching position of the MTF value on axis and off axis.

When a lens element satisfying either of the conditions (23) or (24) is used in the rear lens group, the Petzval's sum can be optimal. Further by making the object side surface of the lens element aspherical, distortion near the wide angle end can be effectively corrected. The front lens group may also include such a lens element satisfying either of the conditions (23) and (24). When the material with the Abbe number $v_d \leq 35.0$ as defined by the condition (23) is used for a concave lens in the front lens group, chromatic aberration is effectively corrected. If a concave lens violating the condition $v_d \leq 35.0$ is used in the front lens group, $v_d$ values of a convex lens element and concave lens element of the front lens group become nearly equal. In this case, in order to correct chromatic aberration, the refractive powers of the convex and concave lens elements must be strong, which deteriorates monochromatic aberrations even when an aspherical surface is used.

The arguments as described above about the conditions (23) and (24) can be applied to any of the preceding zoom lens system of the present invention.

The low-refractive-index and high-dispersion materials satisfying the conditions (23) and (24) are, in many cases, plastics. Therefore, the zoom lens system of the present invention is generally lightweight and low-cost, which is advantageous in a mass production.

Forty-three (43) specific examples of the zoom lens system according to the present invention are now described. In the Lens data listed later:

$r_i$ is the radius of curvature of the i-th surface as counted from the object side to the image side $d_i$ is the axial distance between two adjacent surfaces i and i+1;

$N_j$ is the refractive index for the d line of the j-th lens element as counted from the object side to the image side;

$v_j$ is the Abbe number of the j-th lens element;

f is the focal length of the overall zoom lens system; and $F_{NO}$ is the open (minimum) f-number.

The surface with an asterisk (,) after the radius of curvature ($r_i$) in the list is an aspherical surface, whose surface shape is defined by the formulae as described above.

Tables 1-20 and 25-41 show values of $$A_{FR} = \phi_1 \cdot (N'-N) \cdot d\{x(y) - x_0(y)\}/dy$$

and $$A_{RE} = \phi_2 \cdot (N'-N) \cdot d\{x(y) - x_0(y)\}/dy$$

defined in the conditions (9), (10), etc. for each of the 1/10 heights of the aspherical surfaces of the examples 1-20 and examples 27-43. Tables 21 and 42 show values of $(\phi_w \cdot \phi_T)^{1/2}/(\beta \cdot \phi_1)$ $(\phi_w \cdot \phi_T)^{1/2}/(\beta \cdot \phi_2)$ $\phi_1/\phi_w$ and $|\phi_2/\phi_w|$ defined in the conditions (1), (2), etc. for the examples 1-20 and examples 27-43.

Table 22 shows the values of $(A_w = A_T)/(B_w - B_T)$ and $\phi_{1T}/\phi_{1w}$ defined in the conditions (20) and (22) for the examples 21-24. Tables 23 and 24 show the air space distance $d_4$ and $d_7$ and the values of $|\Delta Tf|$ defined in the condition (19) at various values of magnification fi of the examples of 25 and 26.

Figure 2A:
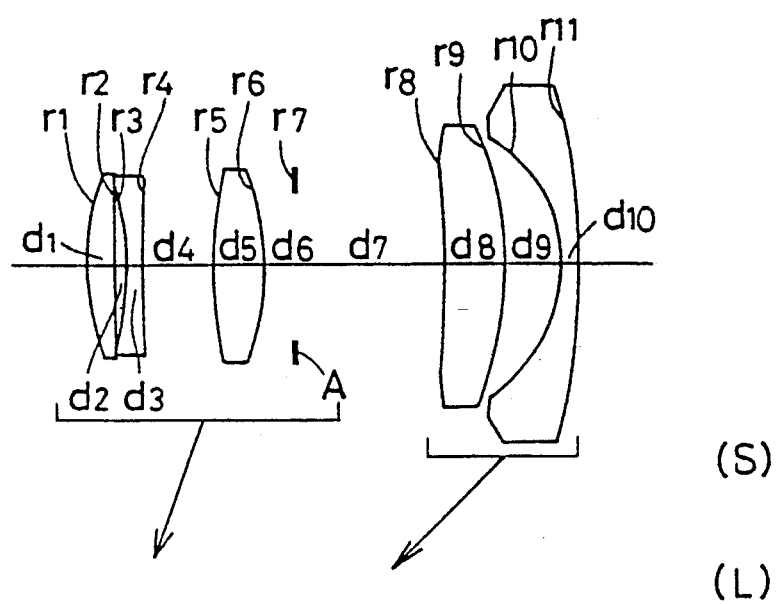
Figure 3A:
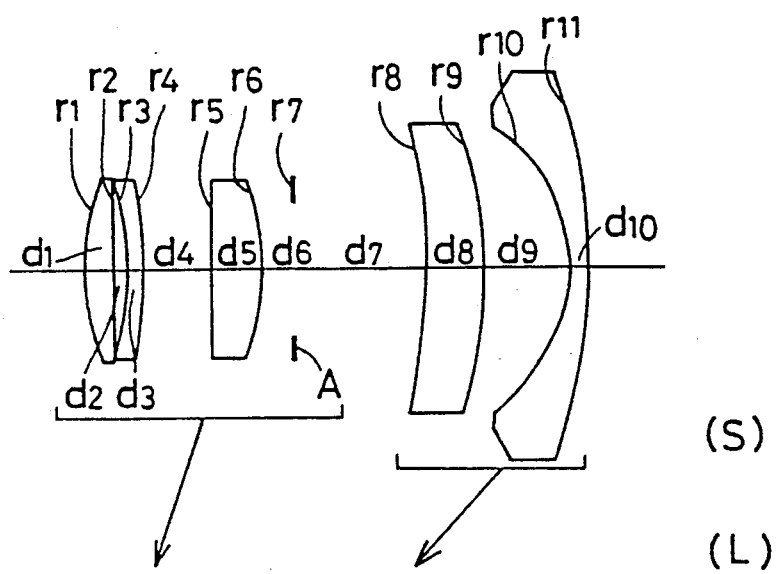
Figure 4A:
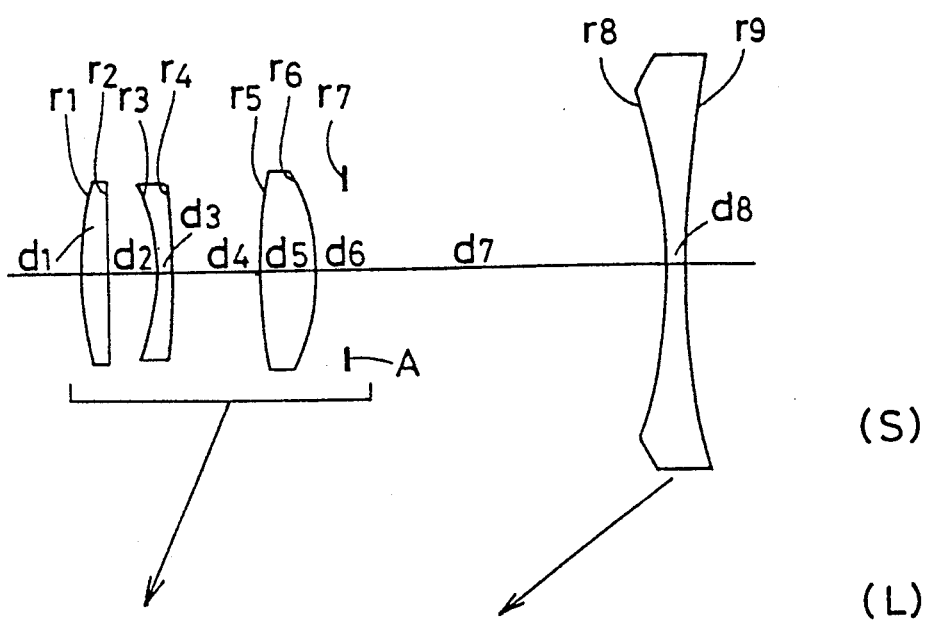
Figure 5A:
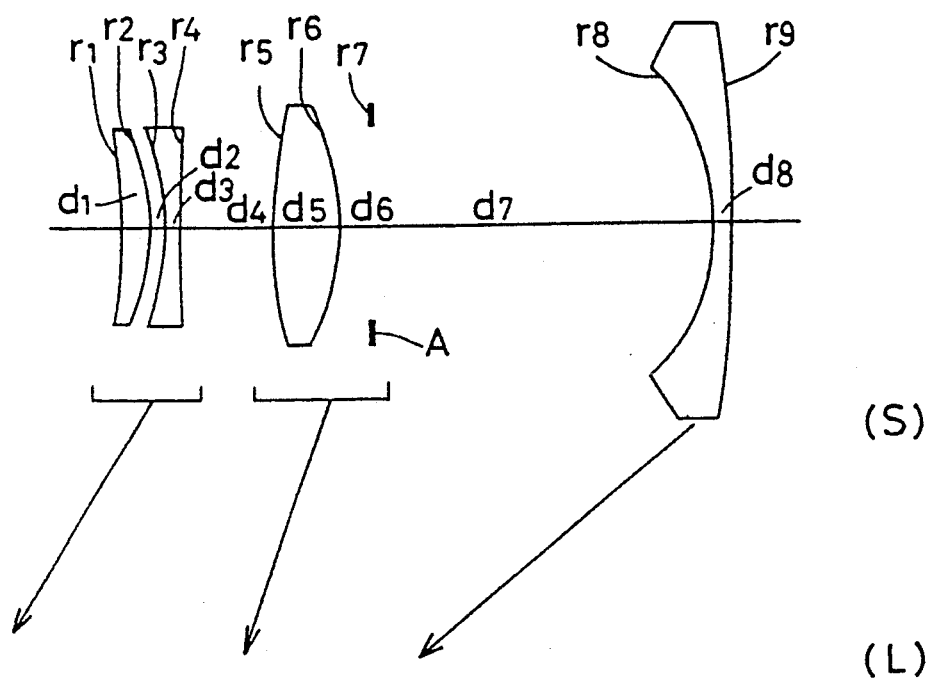
Figure 10A:
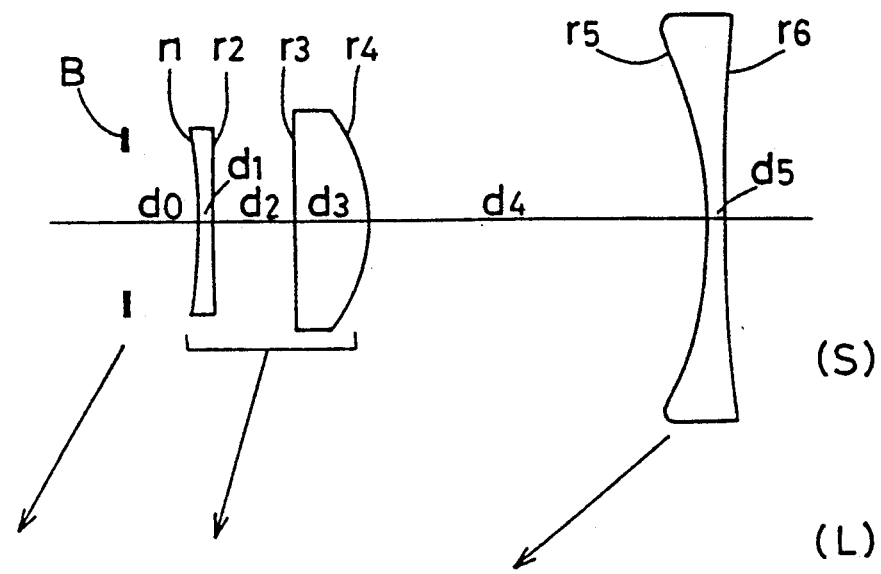
Figure 11A:
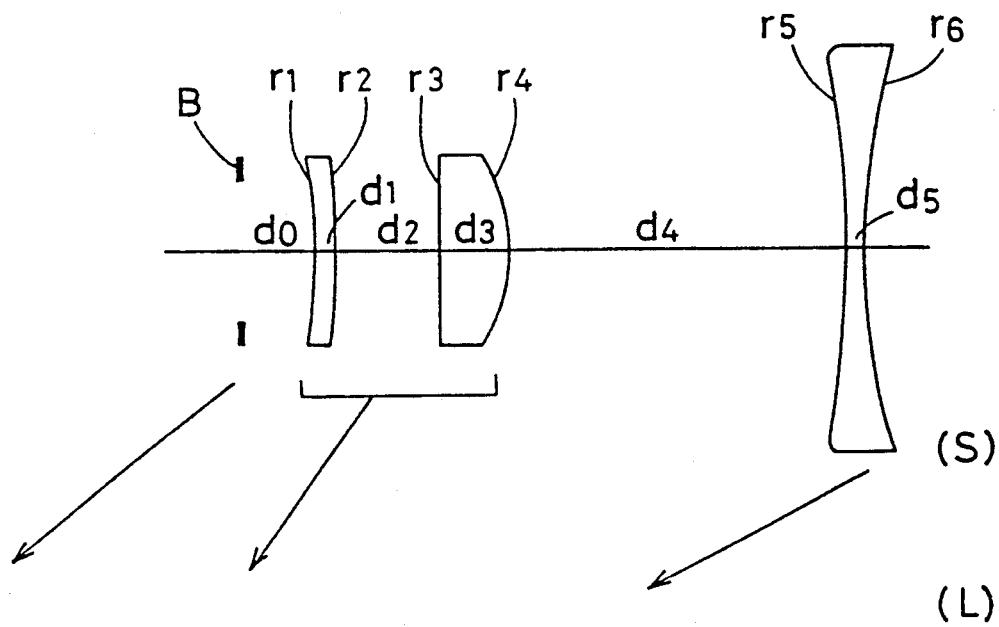
Figure 12A:
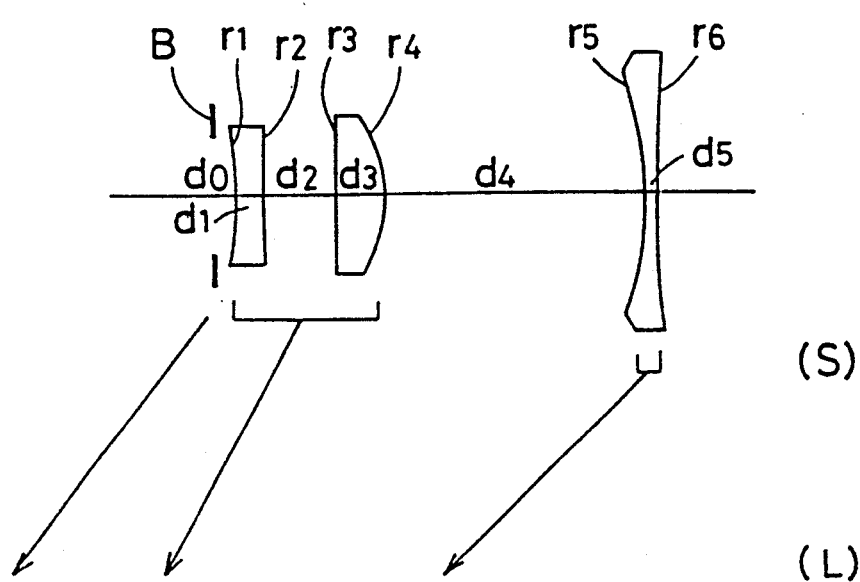
Figure 13A:
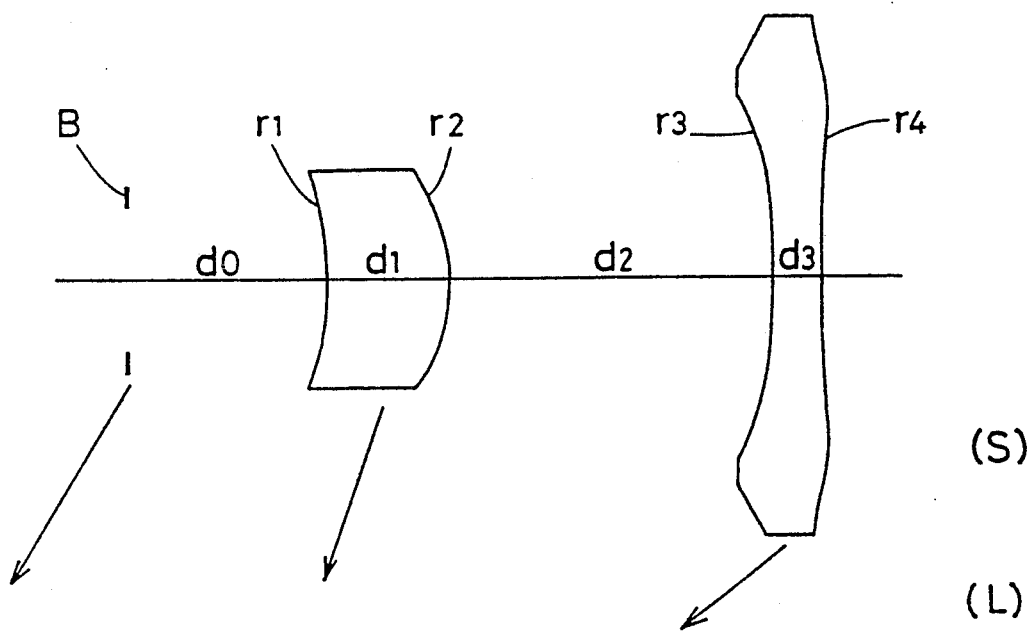
Figure 13B:
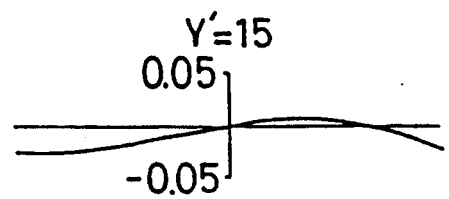
Figure 13B:
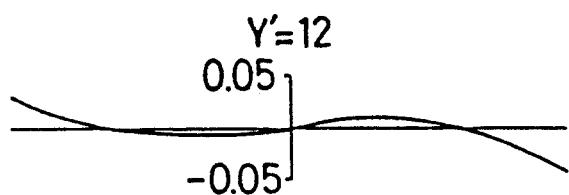
Figure 13B:
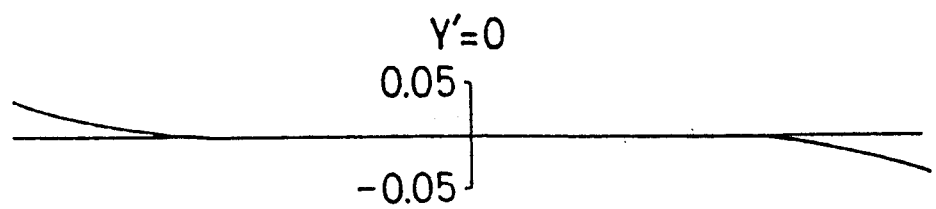
Figure 13C:
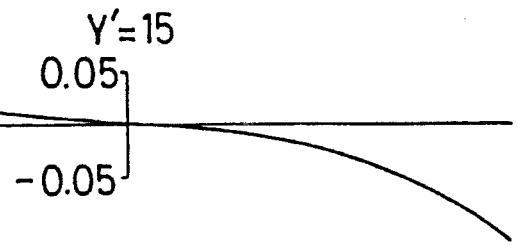
Figure 13C:
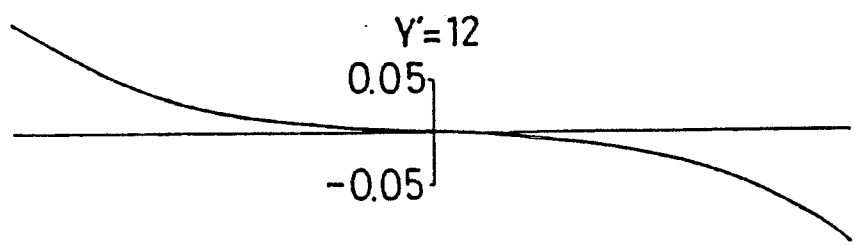
Figure 13D:
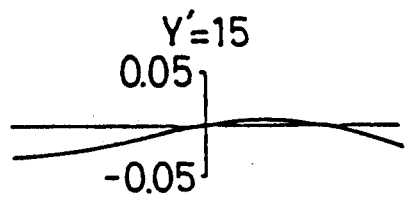
Figure 13D:
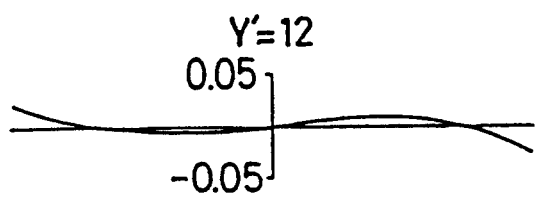
Figure 13D:
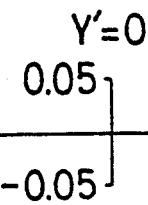
Figure 13E:
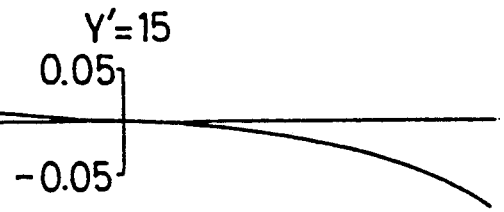
Figure 13E:
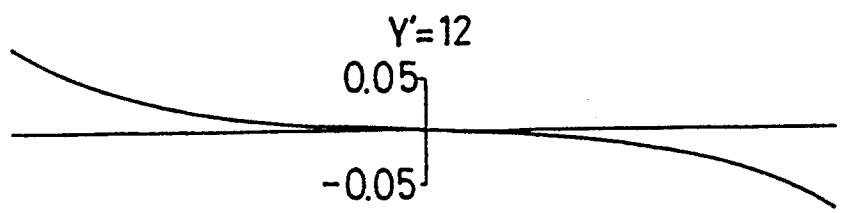
Figure 14A:
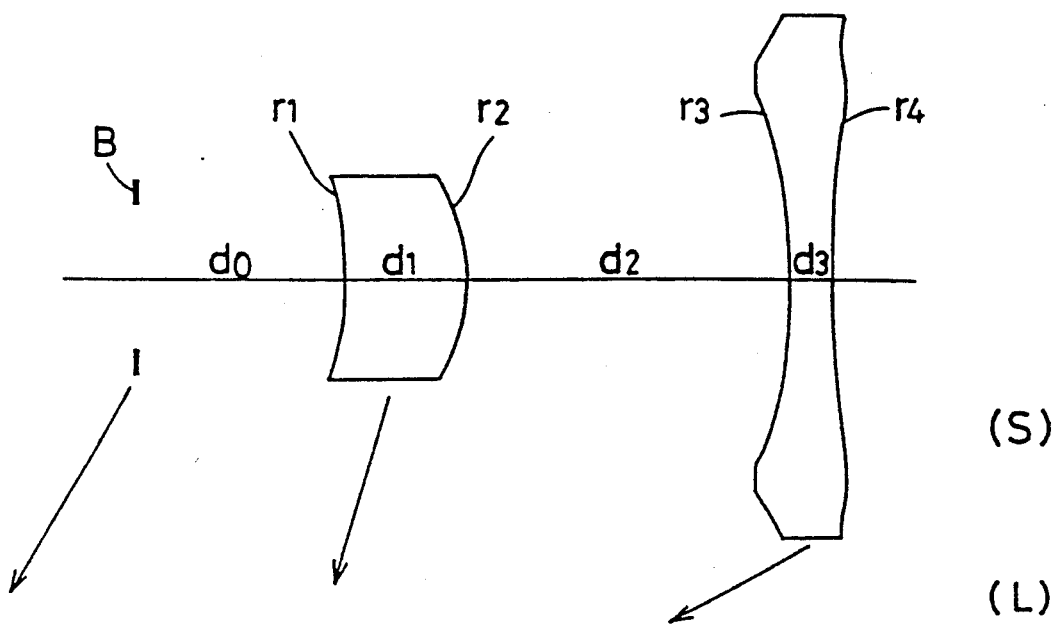
Figure 15A:
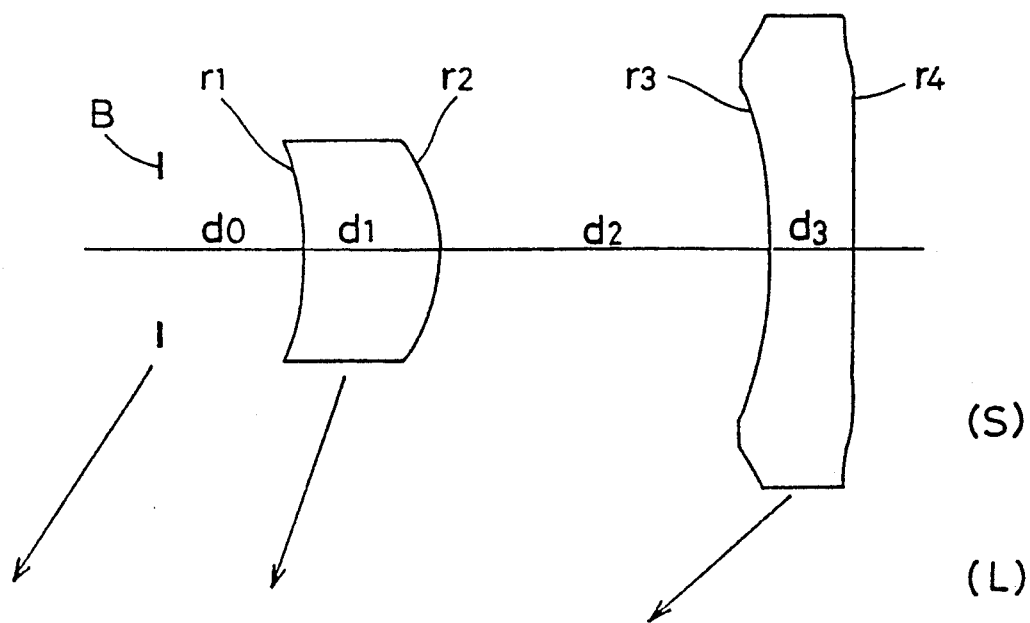
Figure 14B:
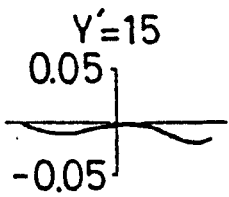
Figure 14B:
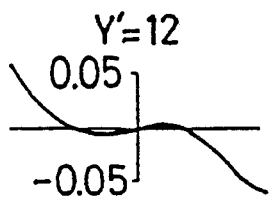
Figure 14B:
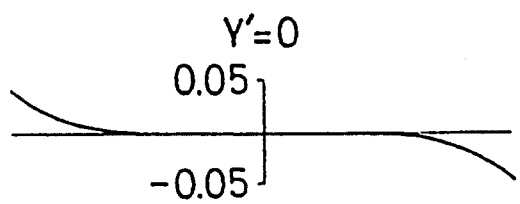
Figure 14C:
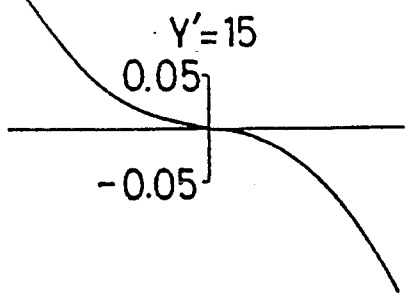
Figure 14C:
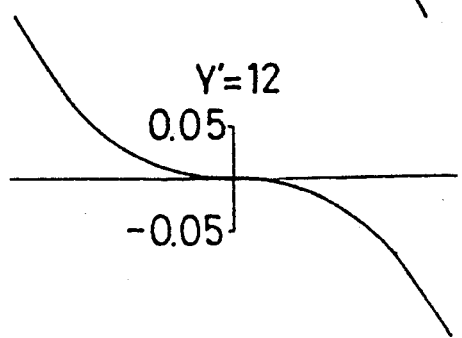
Figure 14D:
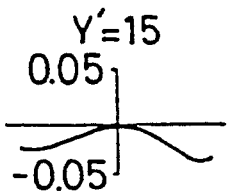
Figure 14D:
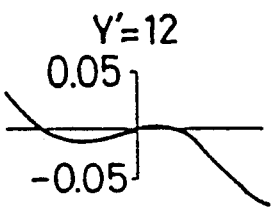
Figure 14D:
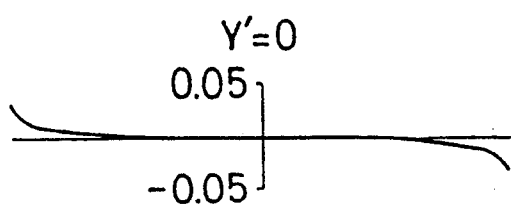
Figure 14E:
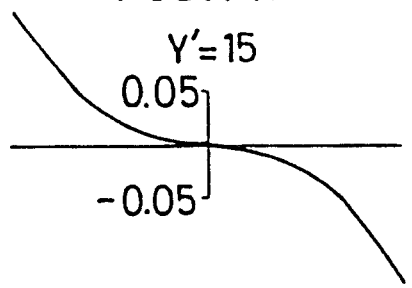
Figure 14E:
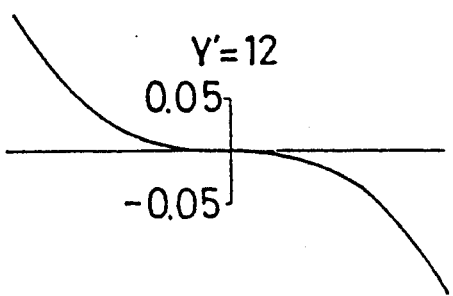
Figure 14F:
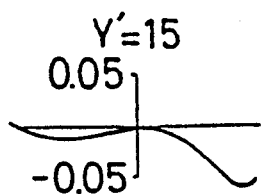
Figure 14F:
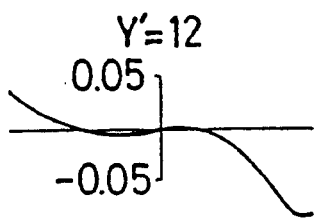
Figure 14F:
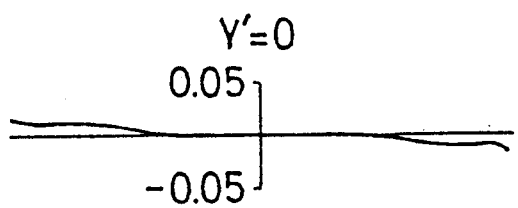
Figure 14G:
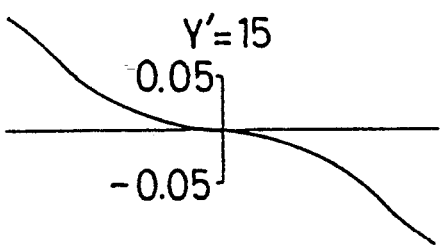
Figure 14G:
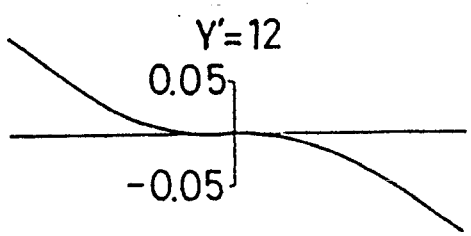
Figure 15D:
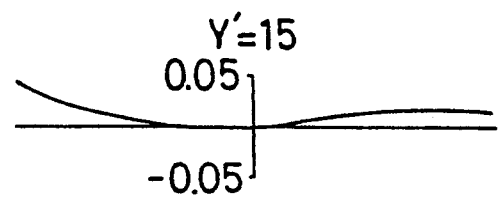
Figure 15D:
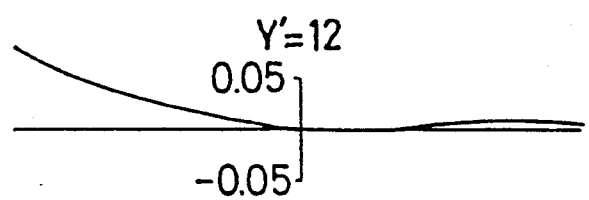
Figure 15D:
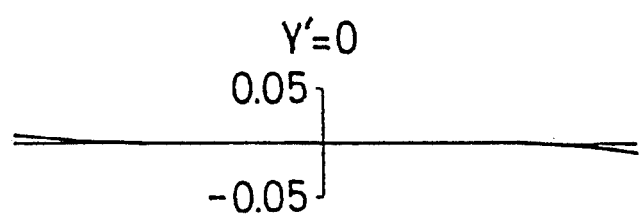
Figure 15E:
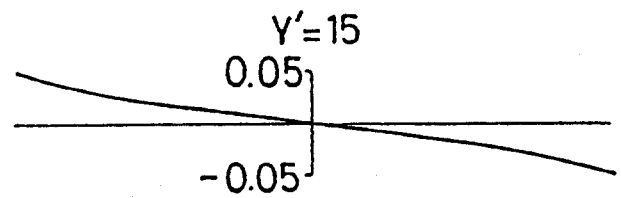
Figure 15E:
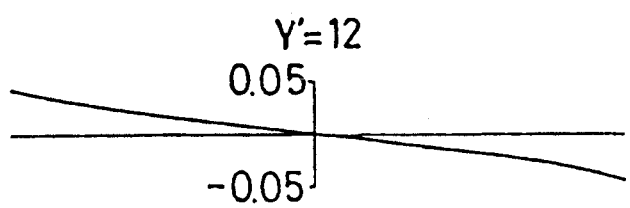
Figure 16A:
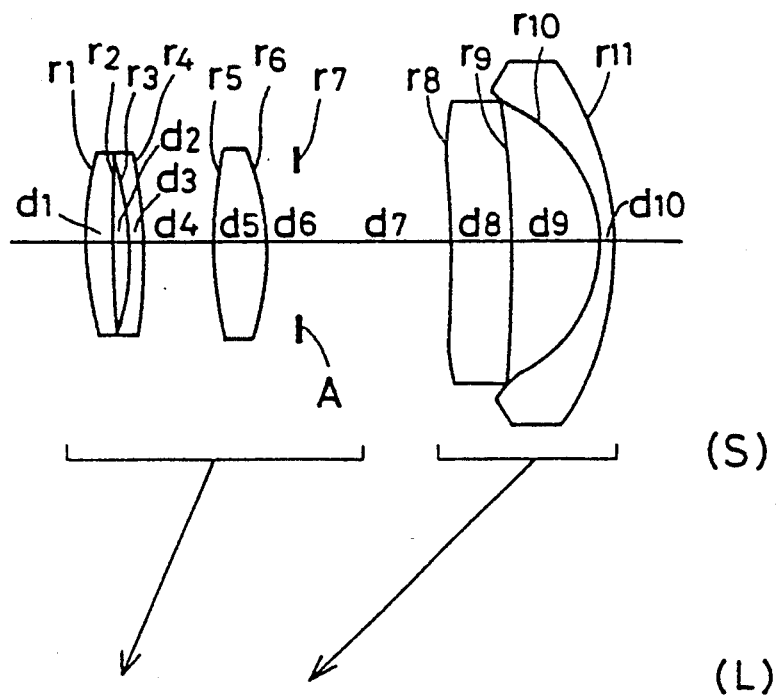
Figure 17A:
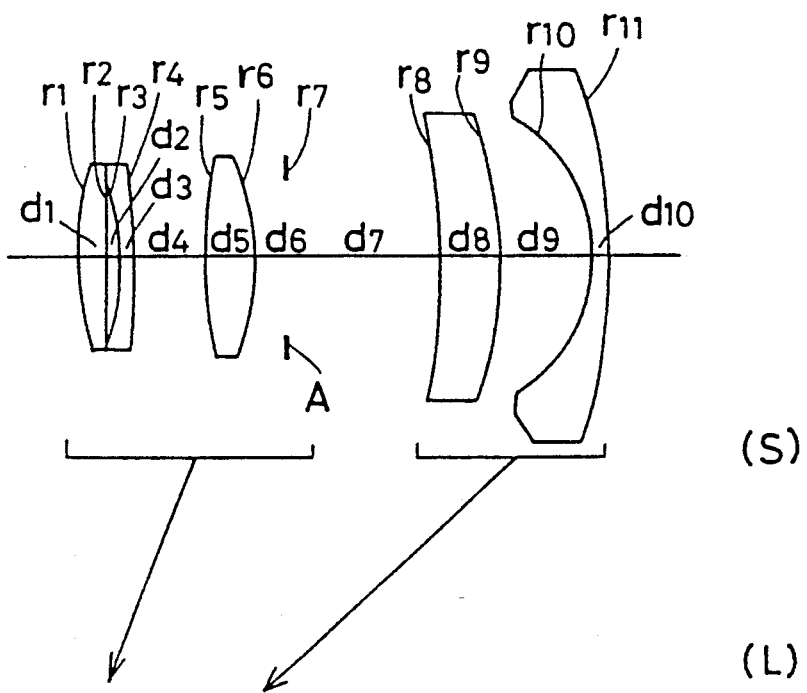
Figure 18A:
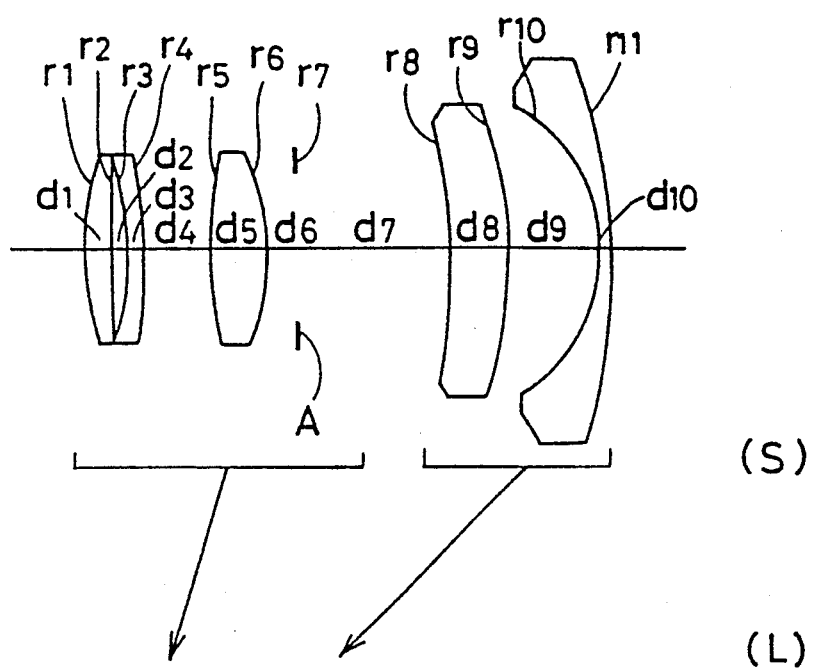
Figure 19A:
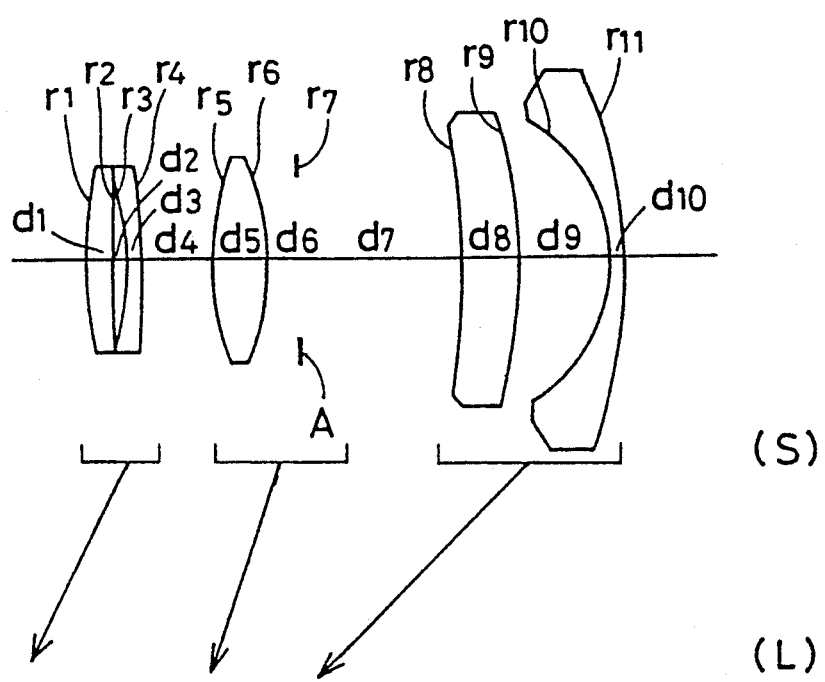
Figure 20A:
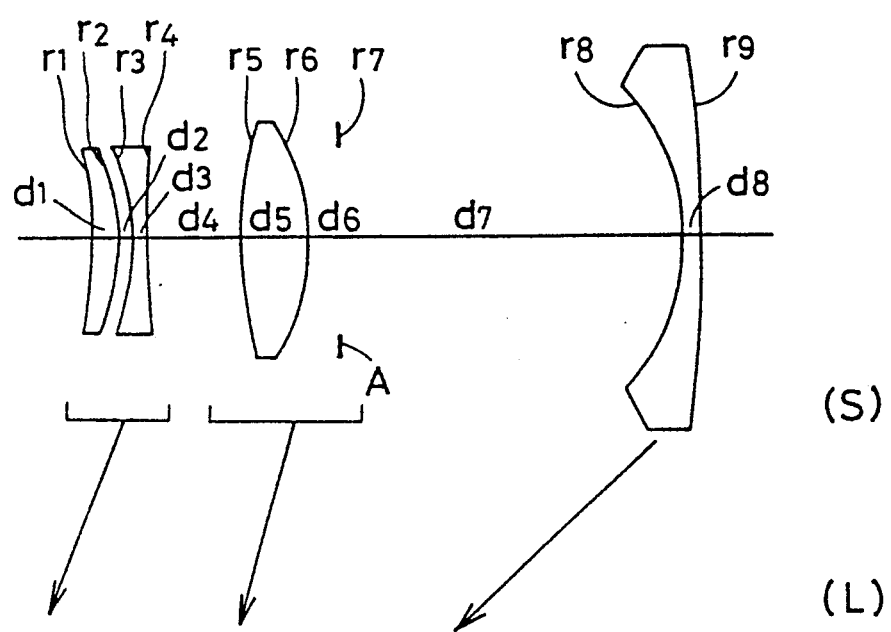
Figure 21A:
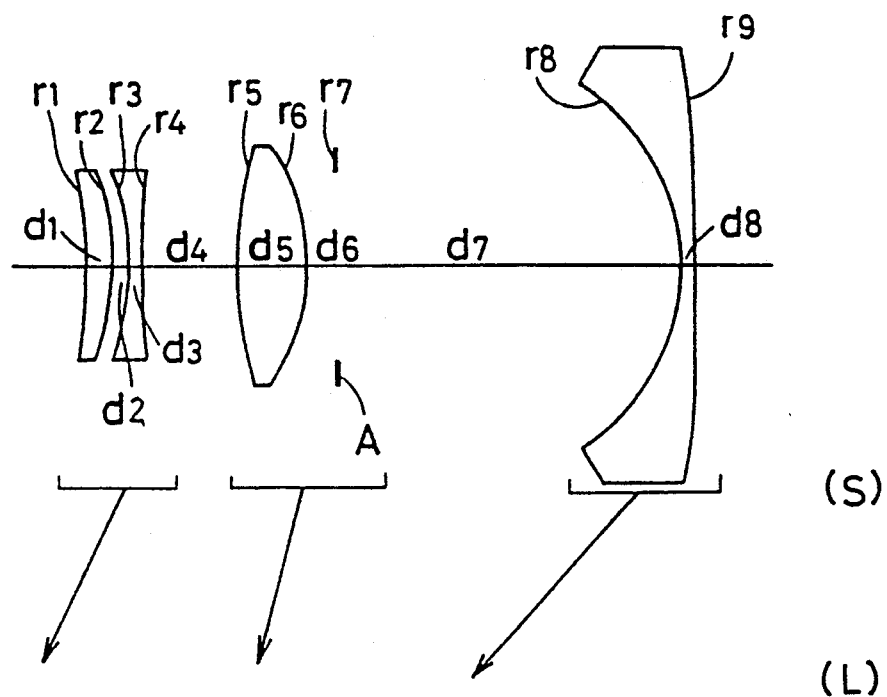
Figure 22A:
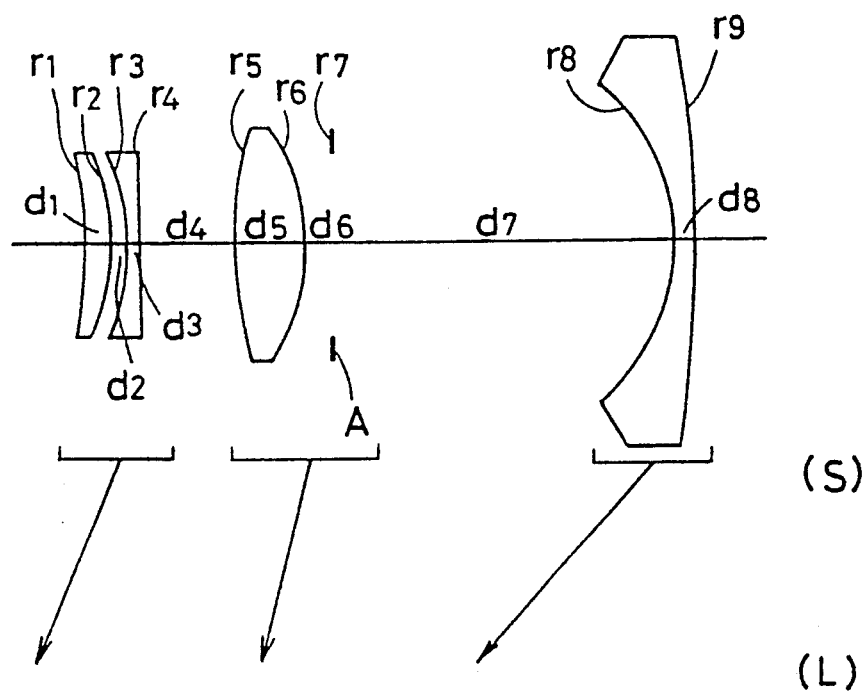
Figure 23A:
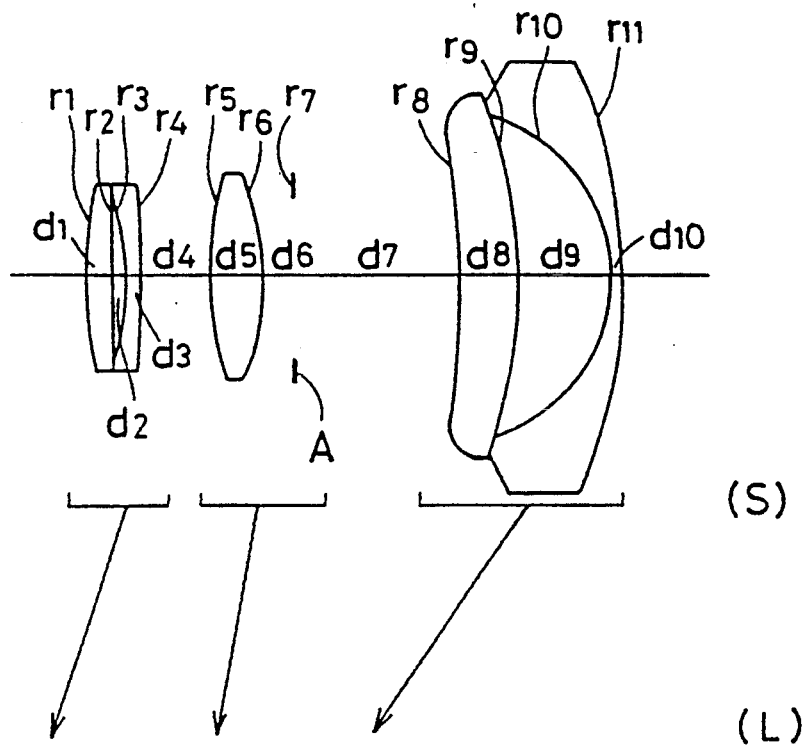
Figure 24A:
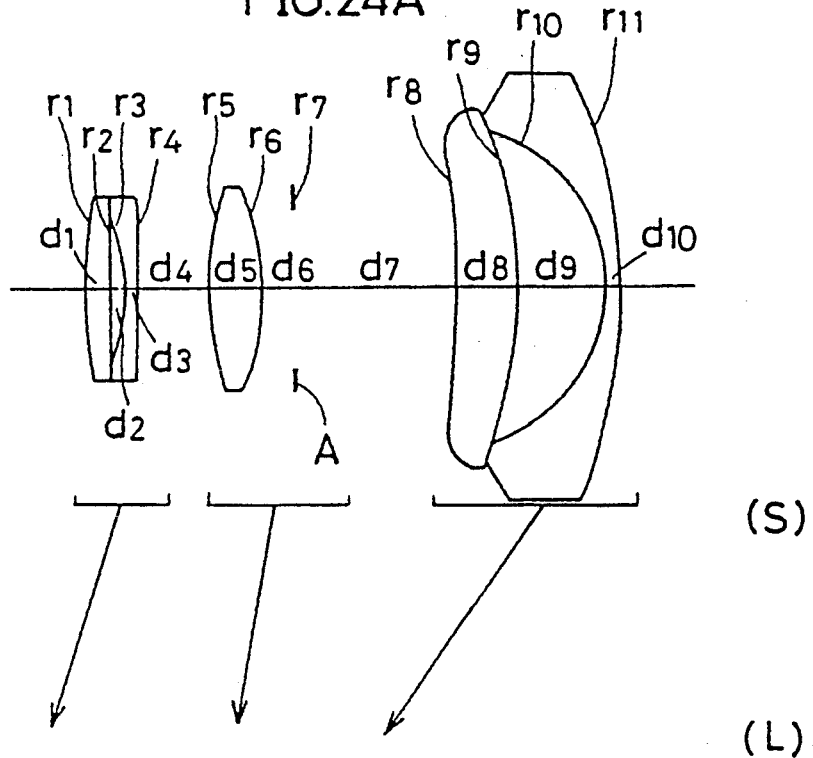
Figure 25A:
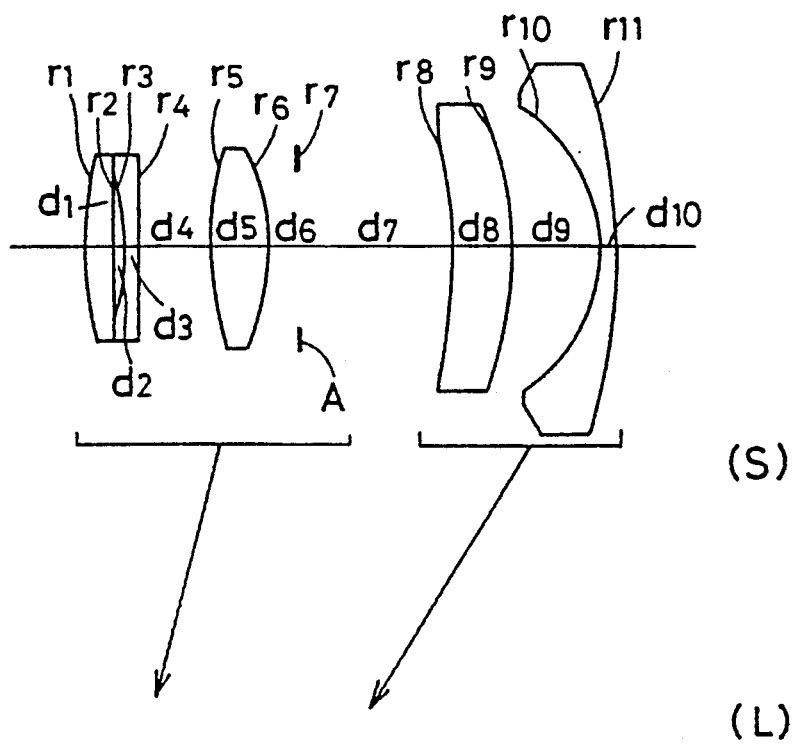
Figure 26A:
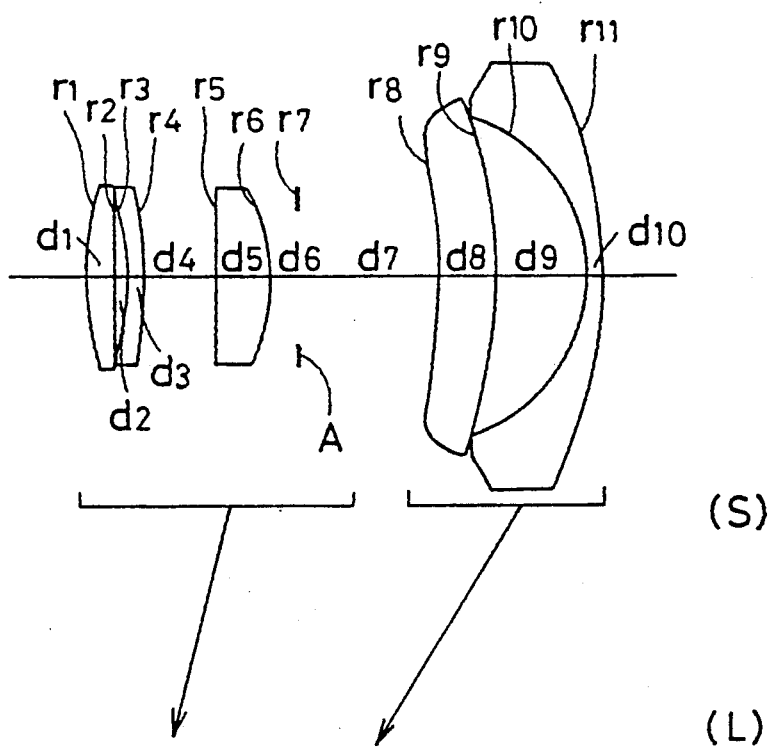
Figure 25E:
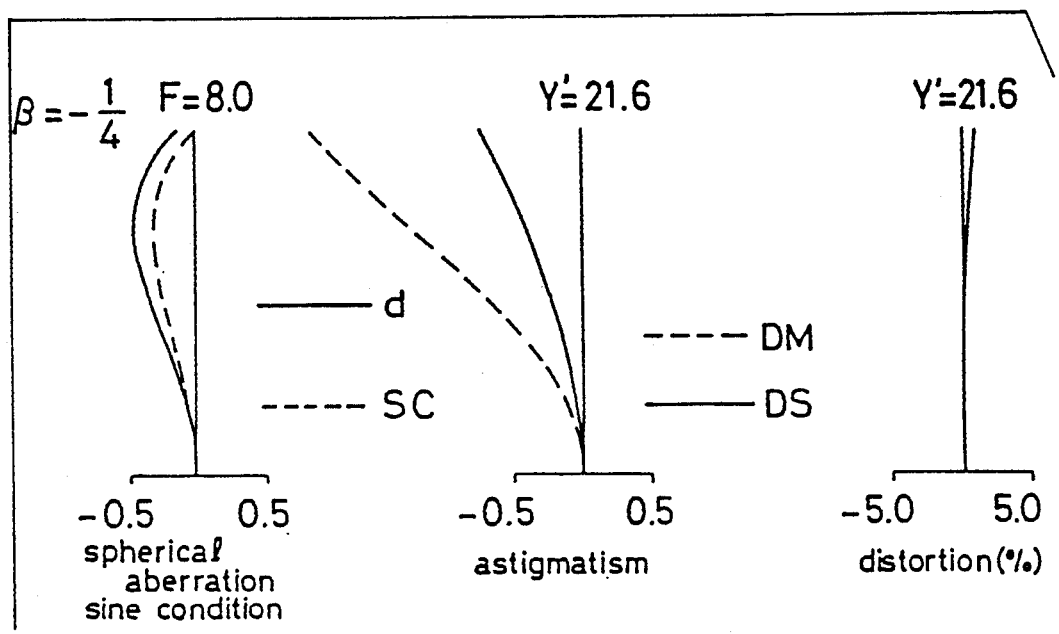
Figure 25F:
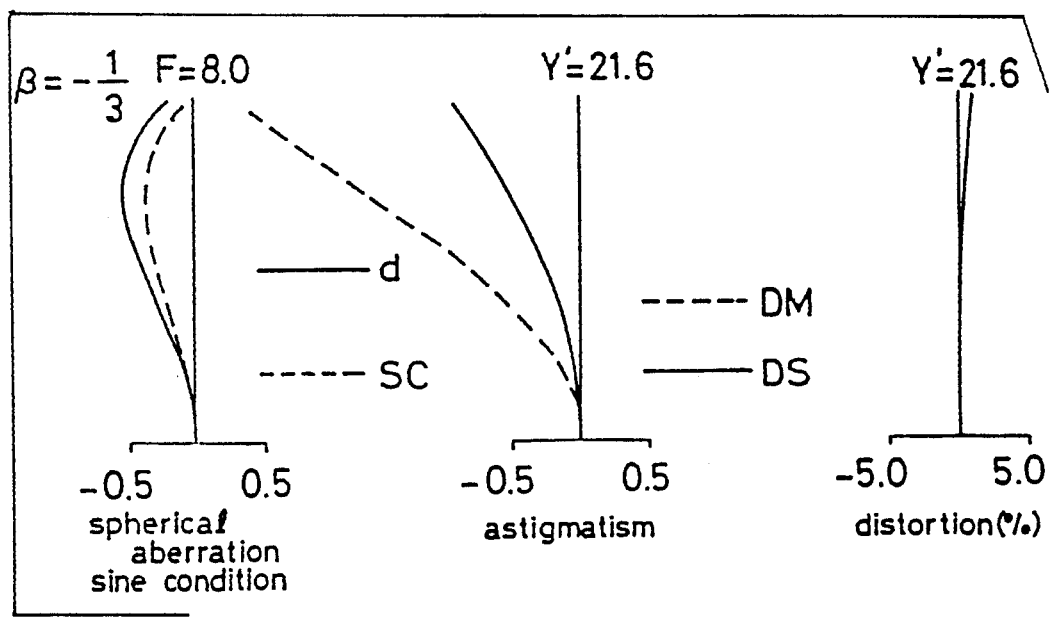
Figure 25G:
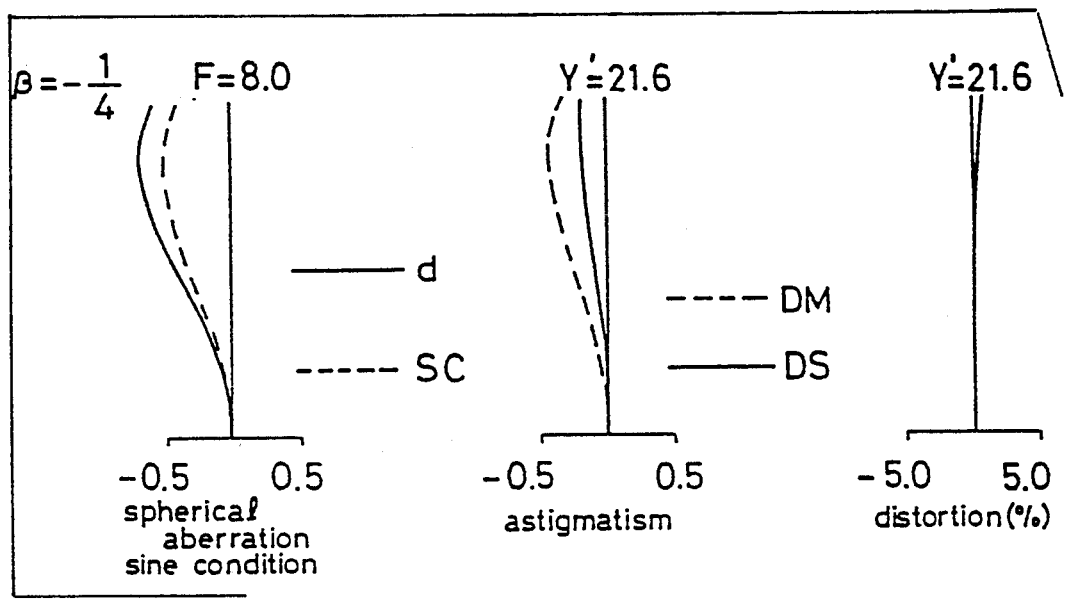
Figure 25H:
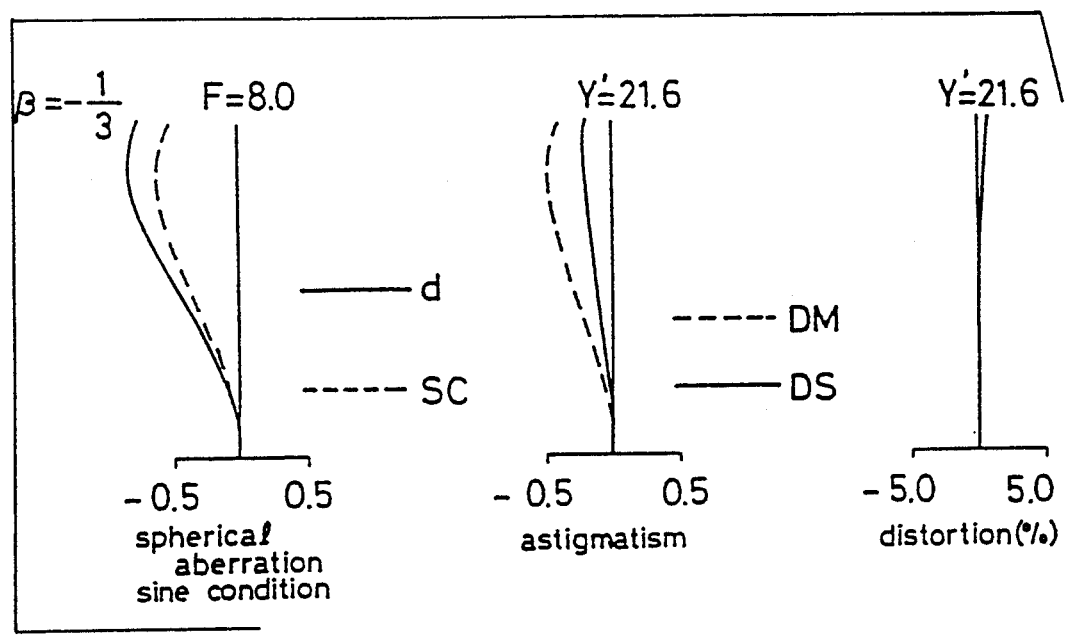
Figure 26E:
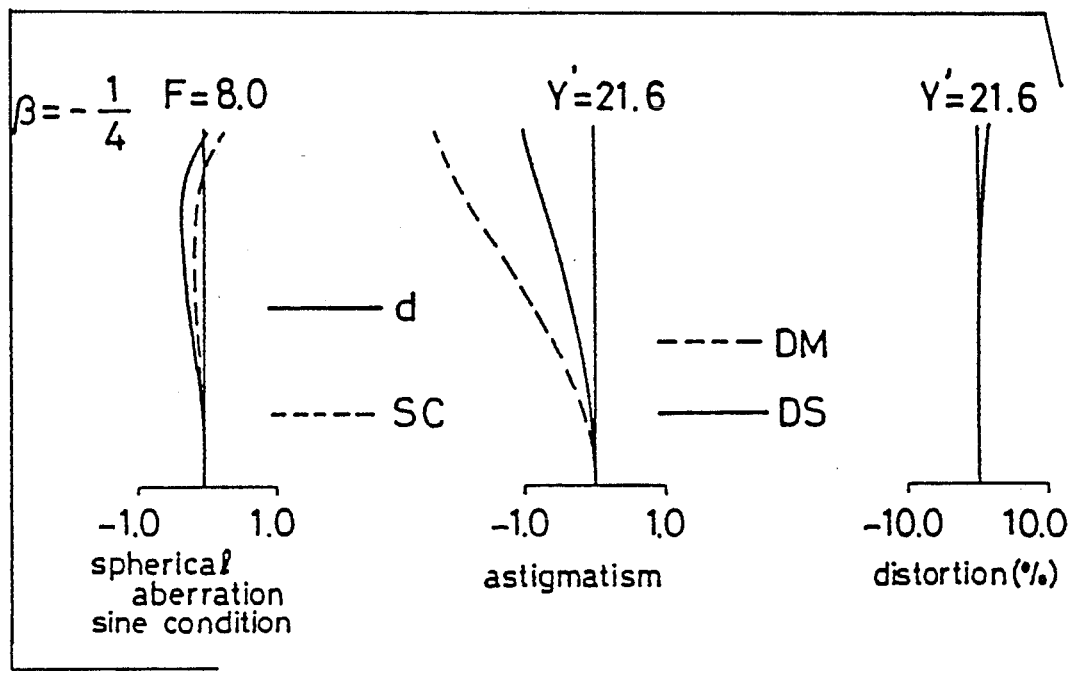
Figure 26F:
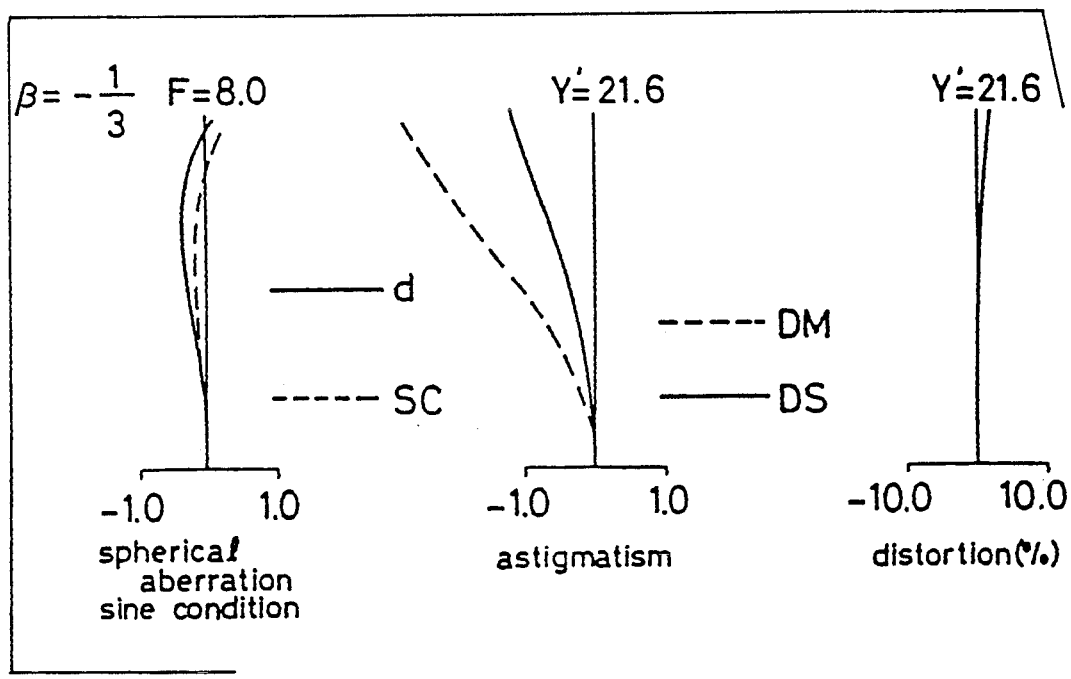
Figure 26G:
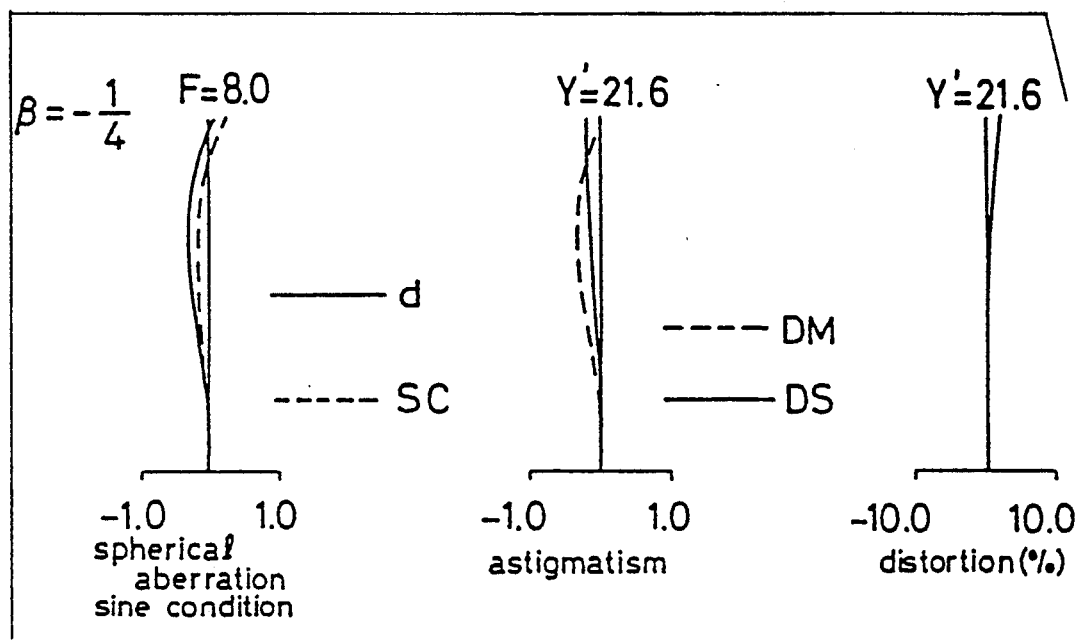
Figure 26H:
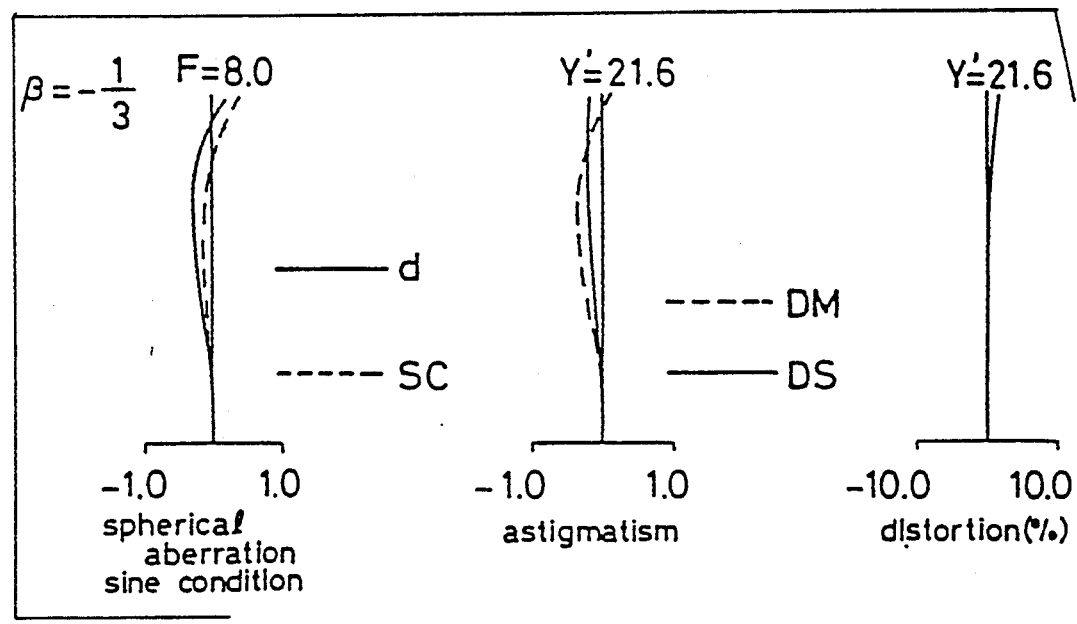
Figure 27A:
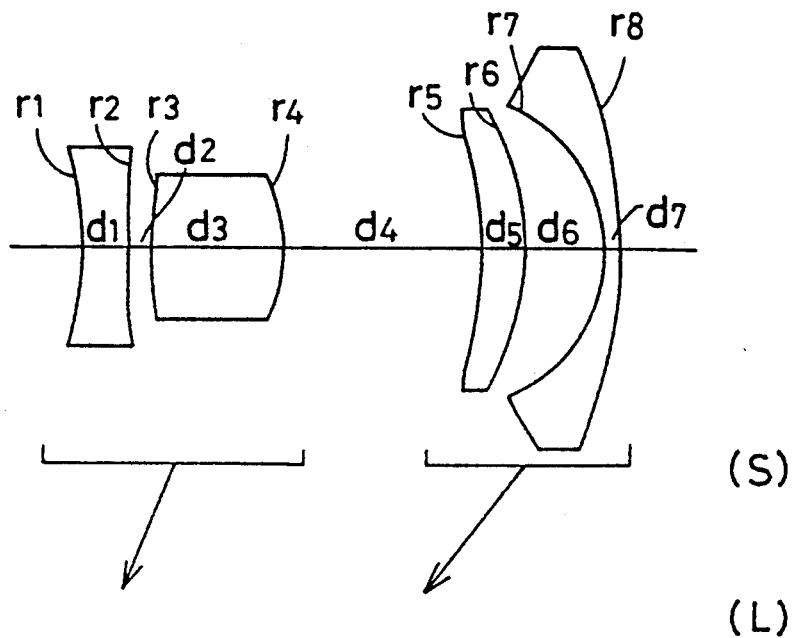
Figure 28A:
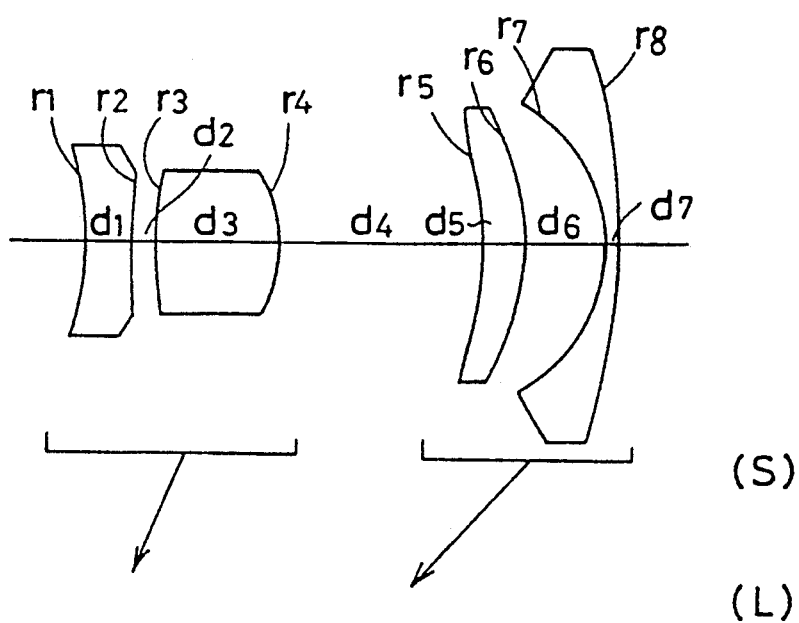
Figure 29A:
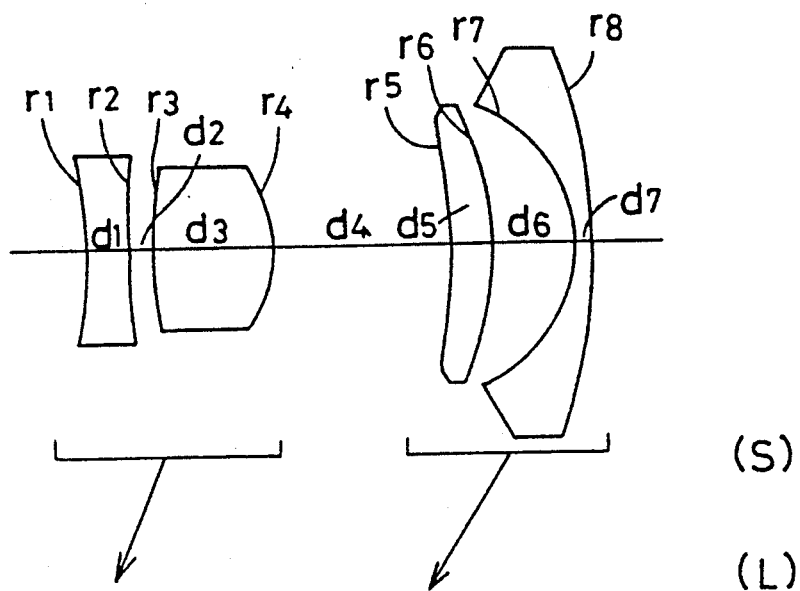
Figure 30A:
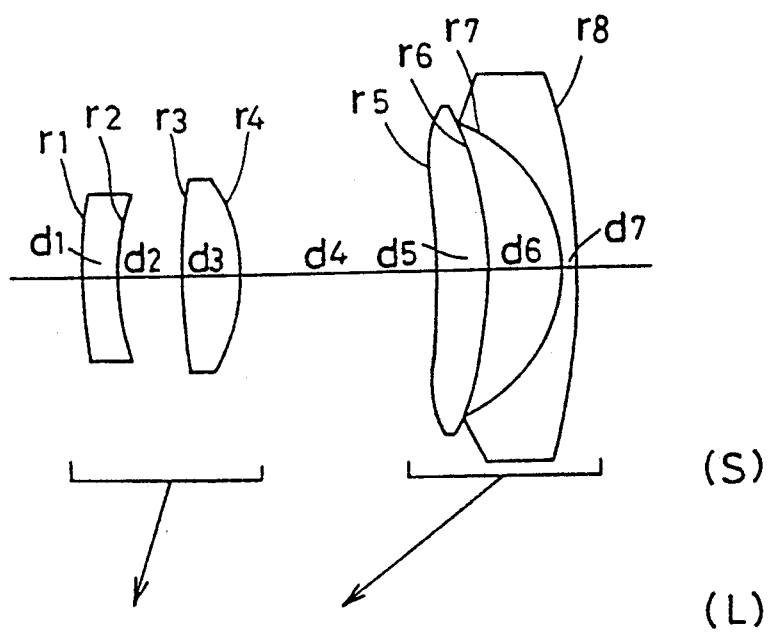
Figure 31A:
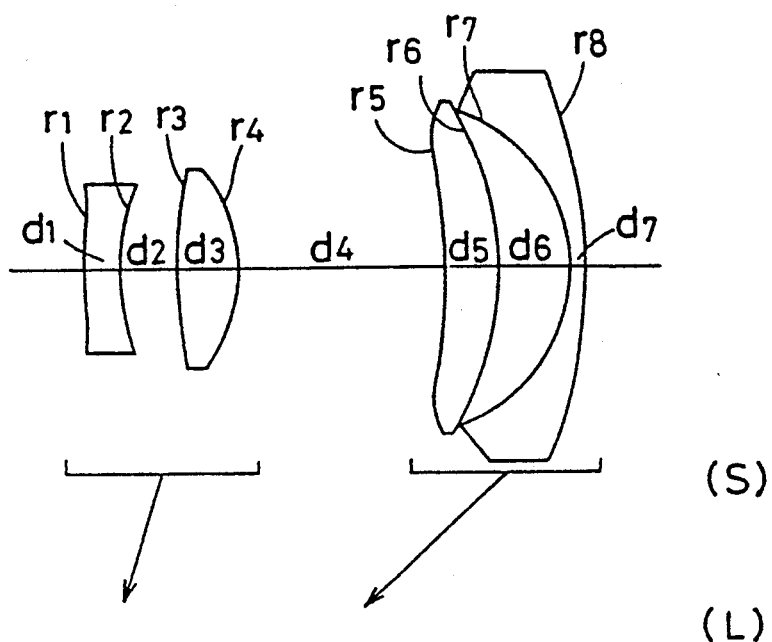
Figure 32A:
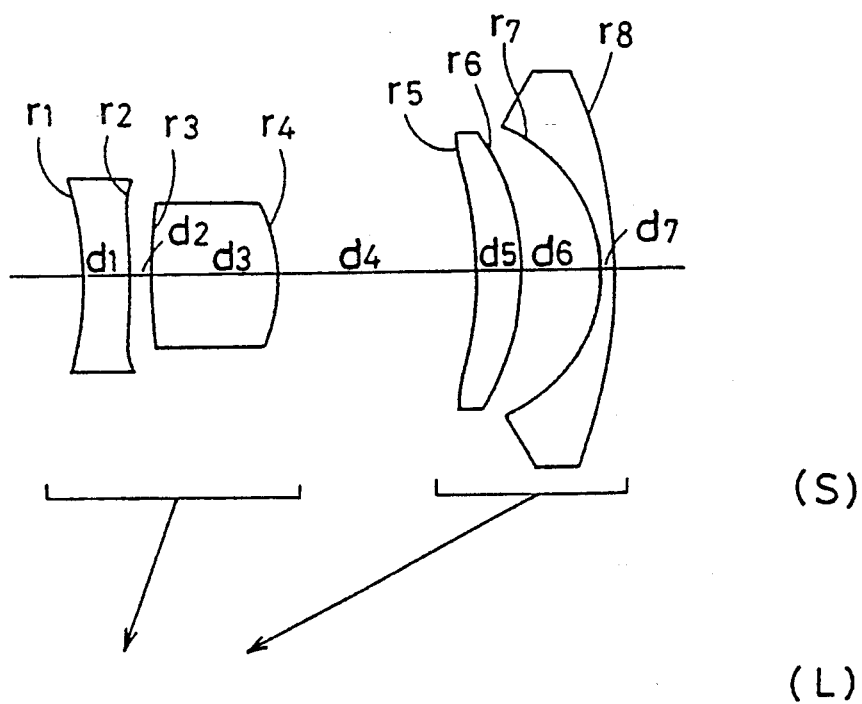
Figure 33A:
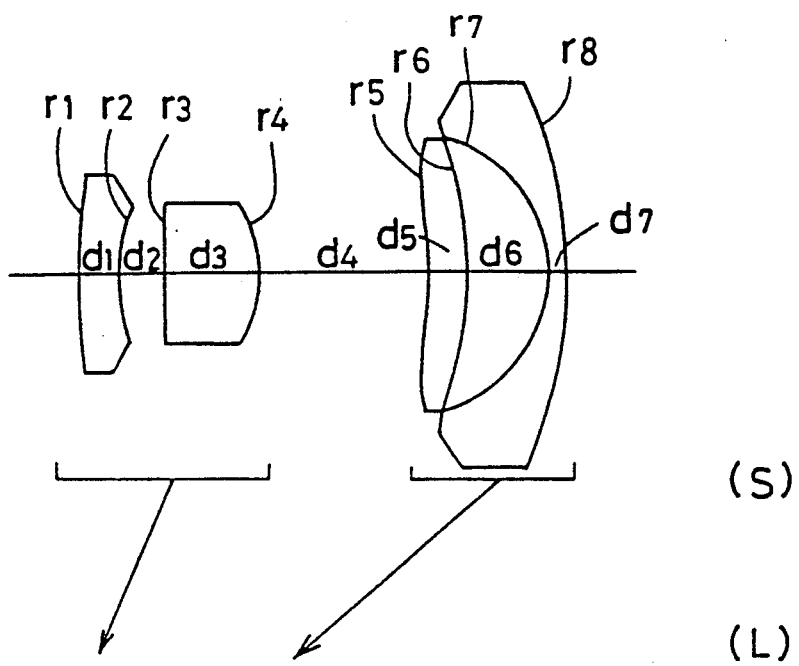
Figure 34A:
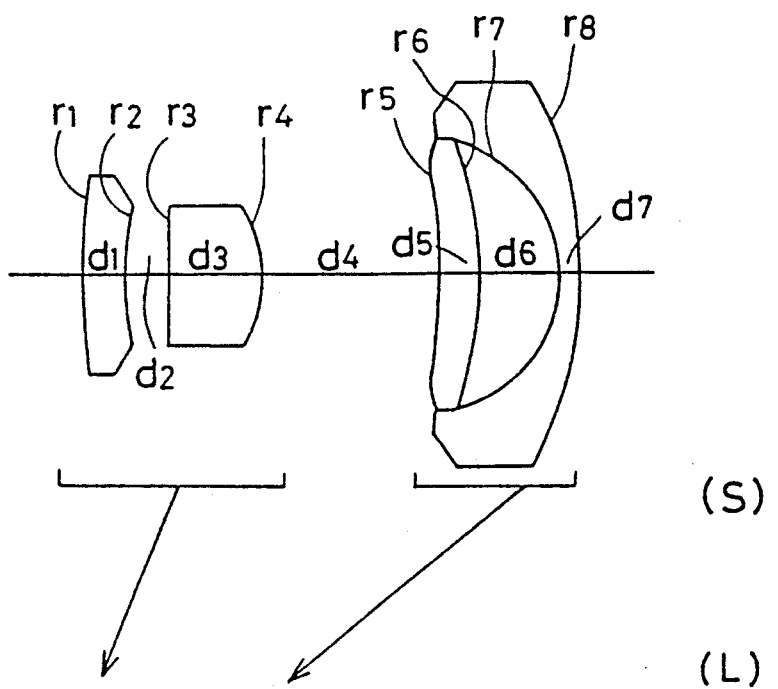
Figure 35A:
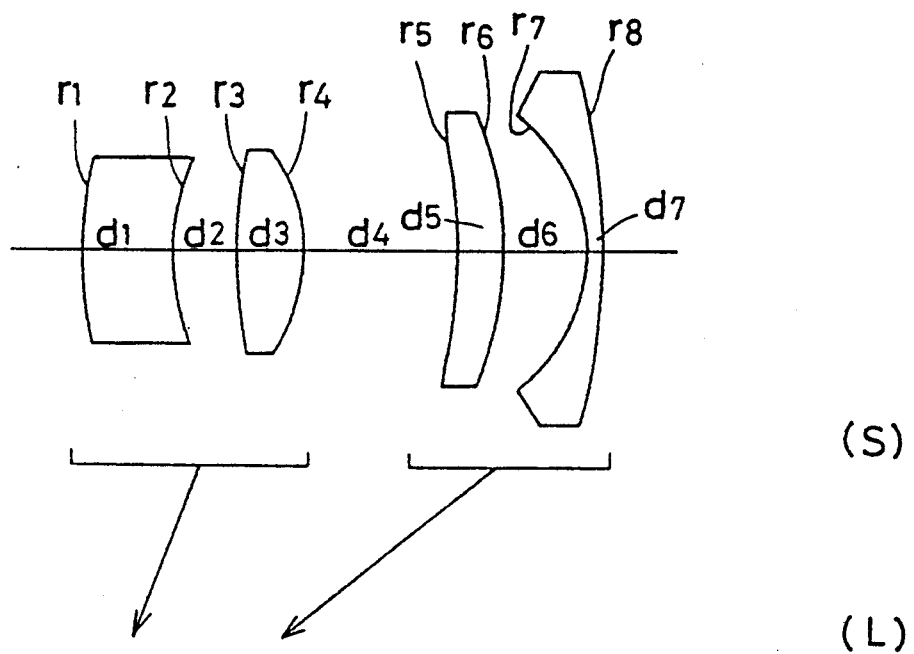
Figure 36A:
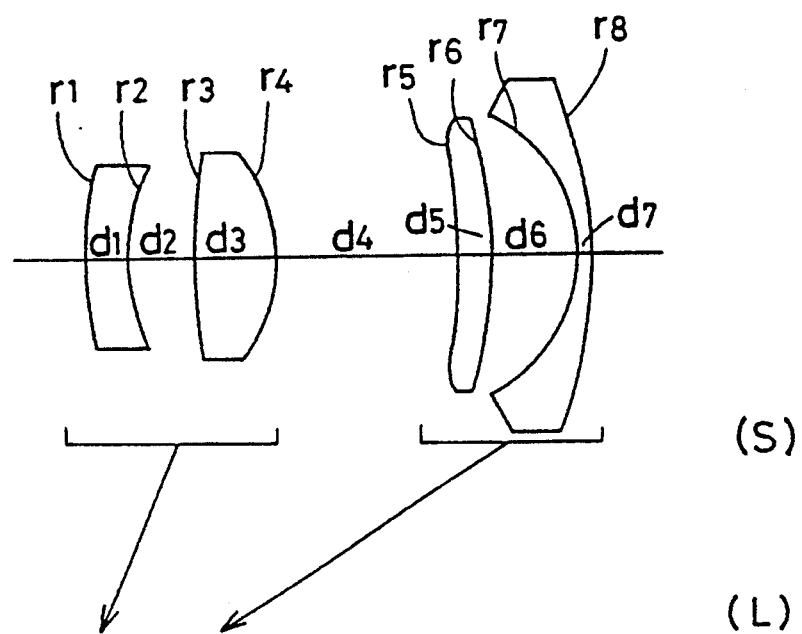
Figure 37A:
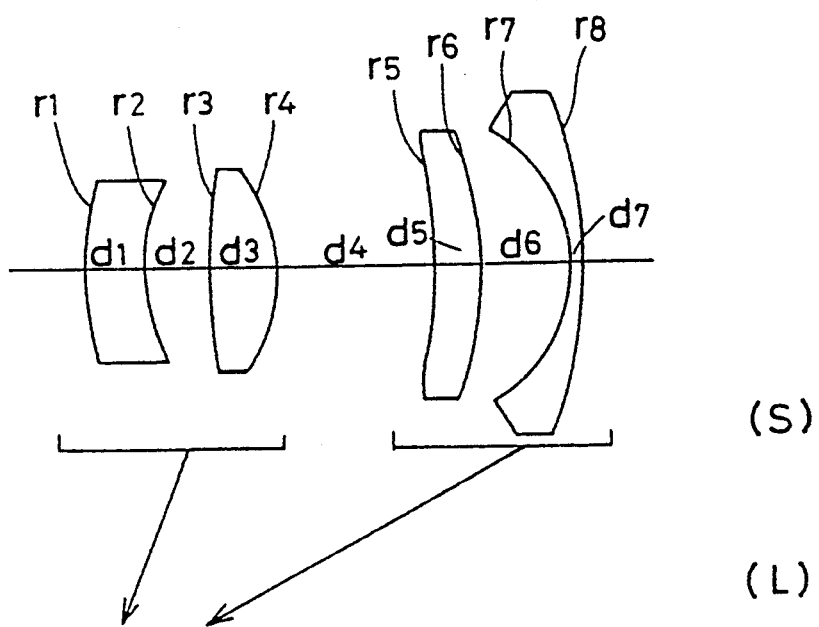
Figure 38A:
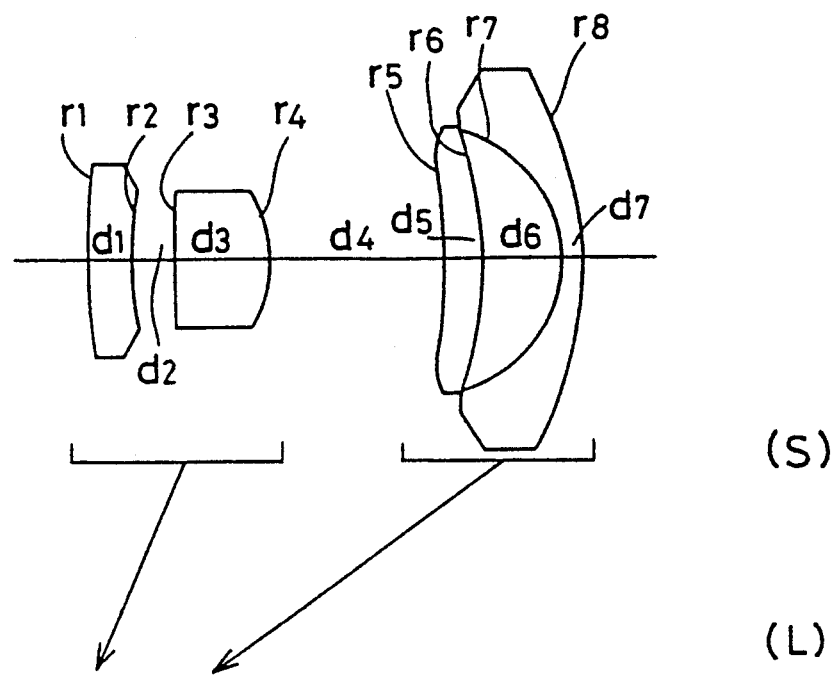
Figure 39A:
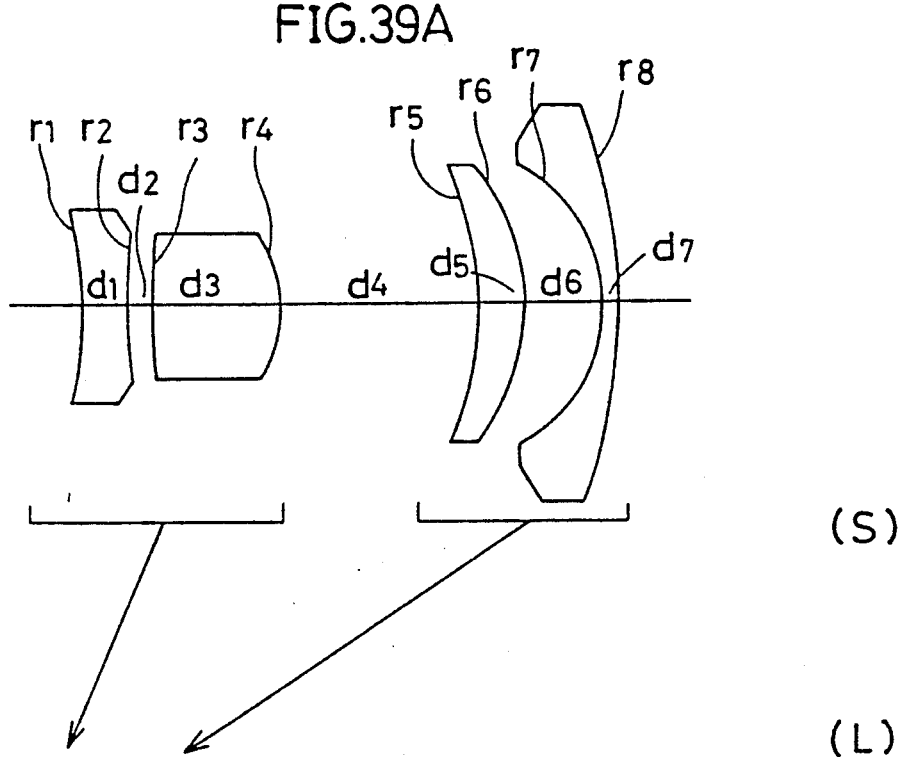
Figure 40:
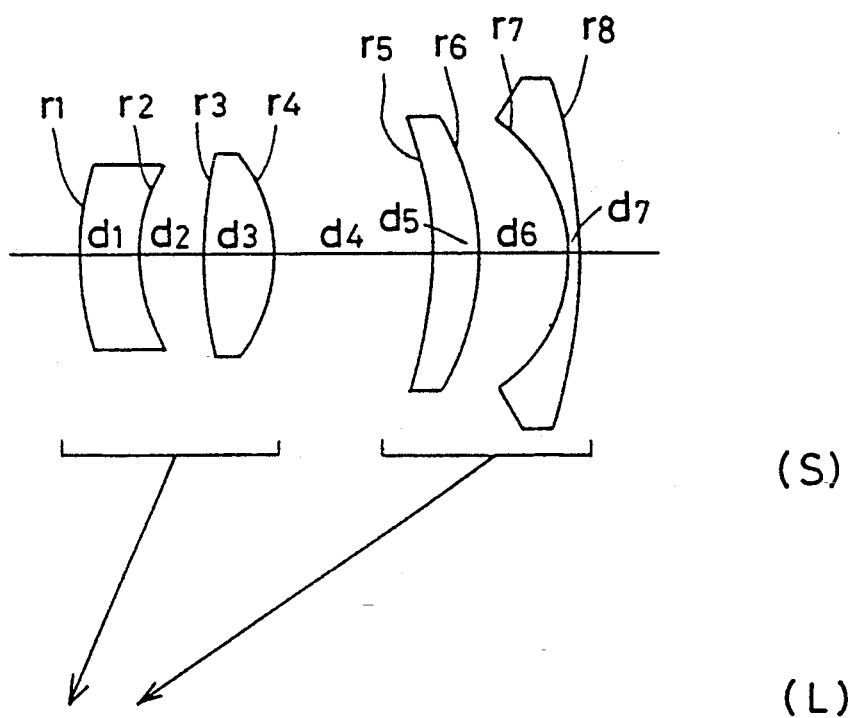
Figure 41A:
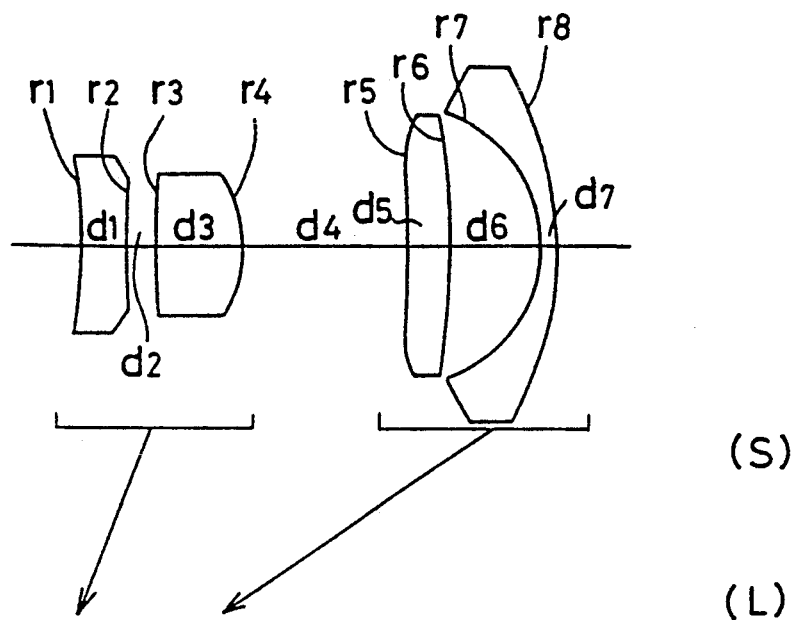
Figure 42A:
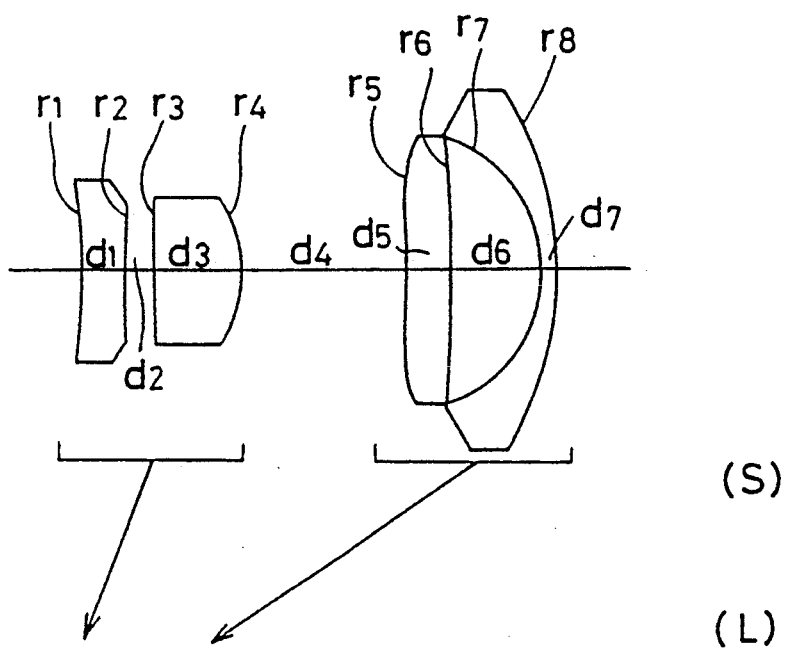
Figure 43A:
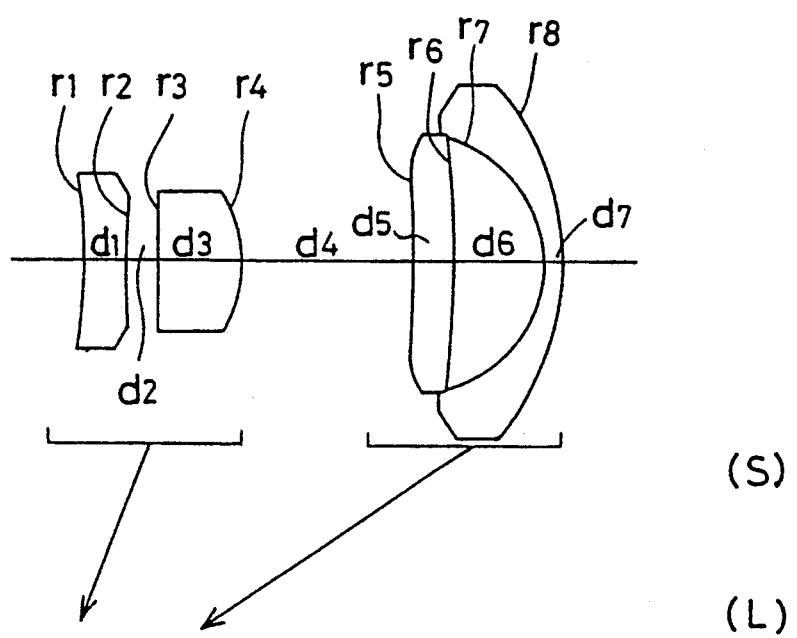

In FIGS. 1A-43A that show lens configurations and movements of the examples, "A" denotes an aperture stop and "B" denotes a ray restrictor. A ray restrictor B shifts along the optical axis with a zooming operation for effectively eliminating a coma flare at a longer focal length side. The diameter of the ray restrictors B are preferably less than 1.2 times the diameter of the axial light flux at either the shortest focal length condition or the longest focal length condition, because otherwise it is difficult to eliminate coma flare due to intermediate rays especially at the longest focal length condition. It is more preferable to make the diameter of the ray restrictor B less than 1.05 times the diameter of the axial light flux to eliminate coma flare of the off-axial light flux at the longest focal length condition.

It is preferable to shift the ray restrictor B so that the air distance between the front lens group and the ray restrictor B increases as the zoom lens system is zoomed from a shorter focal length condition to a longer focal length condition. This effectively eliminate coma flare at the longest focal length condition without reducing peripheral light amount at the shortest focal length condition. It is further preferable to make the ray restrictor B shift with the rear lens group because the structure of the lens barrel can be simple.

Example 1 is composed of, from the object side:

a front lens group with a positive first lens, a negative second lens, a positive third lens, and a stop, and a rear lens group with a positive fourth lens and a negative fifth lens.

The first lens is a positive meniscus lens convex on the object side, the second lens is a negative meniscus lens concave on the object side, and the third lens is a bi-convex lens. The refractive power of the fourth lens is positive but very weak (almost non-power), and the fifth lens is a negative meniscus lens concave on the object side. The image side surface of the third lens, the object side surface of the fourth lens, and the object side surface of the fifth lens are aspherical.

Example 2 is composed of, from the object side:

a front lens group with a positive first lens, a negative second lens, a positive third lens, and a stop, and a rear lens group with a positive fourth lens and a negative fifth lens.

The first lens is a positive meniscus lens convex on the object side, the second lens is a hi-concave lens, and the third lens is a bi-convex lens. The refractive power of the fourth lens is positive but very weak (almost non-power), and the fifth lens is a negative meniscus lens concave on the object side. The object side surface of the first lens, the image side surface of the second lens, the image side surface of the third lens, the object side surface of the fourth lens and the object side surface of the fifth lens are aspherical.

Example 3 is composed of, from the object side:

a front lens group with a positive first lens, a negative second lens, a positive third lens, and a stop, and a rear lens group with a positive fourth lens and a negative fifth lens.

The first lens has a strong positive power on the object side, the second lens is a negative meniscus lens concave on the object side, and the third lens has a strong positive power on the image side. The refractive power of the fourth lens is positive but very weak (almost non-power), and the fifth lens is a negative meniscus lens concave on the object side. The object side surface of the first lens, the image side surface of the second lens, the image side surface of the third lens, the object side surface of the fourth lens, and the object side surface of the fifth lens are aspherical.

Example 4 is composed of, from the object side:

a front lens group with a positive first lens, a negative second lens, a positive third lens, and a stop, and a rear lens group with a negative fourth lens.

The first lens is a positive meniscus lens convex on the object side, the second lens is a negative meniscus lens concave on the object side, and the third lens is a bi-convex lens. The fourth lens is a bi-concave lens. The object side surface of the first lens, the image side surface of the second lens, the image side surface of the third lens, and the object side surface of the fourth lens are aspherical.

Example 5 is composed of, from the object side:

a front lens group with a positive first lens, a negative second lens, a positive third lens, and a stop, and a rear lens group with a negative fourth lens.

The first lens is a positive meniscus lens convex on the image side, the second lens is a bi-concave lens, and the third lens is a hi-convex lens. The fourth lens is a negative meniscus lens concave on the object side. The object side surface of the first lens, the image side surface of the second lens, the image side surface of the third lens, and the object side and image side surfaces of the fourth lens are aspherical. The air distance $d_4$ in the front lens group slightly varies for the floating operation.

Example 6 is composed of, from the object side:

a front lens group with a negative first lens, and a positive second lens, and a rear lens group with a positive third lens and a negative fourth lens.

The first lens is a bi-concave lens, and the second lens is a hi-convex lens. The refractive power of the third lens is positive but very weak (almost non-power), and the fourth lens is a negative meniscus lens concave on the object side. The object side and image side surfaces of the first lens, the image side surface of the second lens, the object side surface of the third lens and the object side surface of the fourth lens are aspherical.

Example 7 is composed of, from the object side:

a front lens group with a negative first lens, and a positive second lens, and a rear lens group with a positive third lens and a negative fourth lens.

The first lens is a negative meniscus lens concave on the image side, and the second lens is a hi-convex lens. The refractive power of the third lens is positive but very weak (almost non-power), and the fourth lens is a negative meniscus lens concave on the object side. The object side and image side surfaces of the first lens, the image side surface of the second lens, and the object side surface of the third lens are aspherical.

Example 8 is composed of, from the object side:

a front lens group with a restrictor (B), a negative first lens, and a positive second lens, and a rear lens group with a positive third lens and a negative fourth lens.

The first lens is a negative meniscus lens concave on the image side, and the second lens is a bi-convex lens. The refractive power of the third lens is positive but very weak (almost non-power) and the fourth lens is a negative meniscus lens concave on the object side. The object side and image side surfaces of the first lens, the image side surface of the second lens and the object side surface of the third lens are aspherical.

Example 9 is composed of, from the object side:

a front lens group with a negative first lens, and a positive second lens, and a rear lens group with a positive third lens and a negative fourth lens.

The first lens is a negative meniscus lens concave on the image side, and the second lens is a bi-convex lens. The refractive power of the third lens is positive but very weak (almost non-power), and the fourth lens is a negative meniscus lens concave on the object side. The object side and image side surfaces of the first lens, the image side surface of the second lens, and the object side surface of the third lens are aspherical.

Example 10 is composed of, from the object side:

a front lens group with a restrictor (B), a negative first lens, and a positive second lens, and a rear lens group with a negative third lens.

The first lens is a negative meniscus lens concave on the object side, and the second lens has a strong power on the object side surface. The third lens is a hi-concave lens. The object side and image side surfaces of the first lens, the image side surface of the second lens, and the object side and image side surfaces of the third lens are aspherical.

Example 11 is composed of, from the object side:

a front lens group with a restrictor (B), a negative first lens, and a positive second lens, and a rear lens group with a negative third lens.

The first lens is a negative meniscus lens concave on the object side, and the second lens has a strong power on the image side surface. The third lens is a bi-concave lens. The object side and image side surfaces of the first lens, the image side surface of the second lens, and the object side and image side surfaces of the third lens are aspherical.

Example 12 is composed of, from the object side:

a front lens group with a restrictor (B), a negative first lens, and a positive second lens, and a rear lens group with a negative third lens.

The first lens is a negative meniscus lens concave on the object side, and the second lens has a strong power on the image side surface. The third lens is a bi-concave lens. The object side and image side surfaces of the first lens, the image side surface of the second lens, and the object side and image side surfaces of the third lens are aspherical.

Examples 13 and 14 are both composed of, from the object side:

a front lens group with a restrictor (B) and a positive first lens, and a rear lens group with a negative second lens.

The first lens is a positive meniscus lens convex on the image side. The second lens is a bi-concave lens. The object side and image side surfaces of the two lenses are aspherical.

Example 15 is composed of, from the object side:

a front lens group with a restrictor (B) and a positive first lens, and a rear lens group with a negative second lens.

The first lens is a positive meniscus lens convex on the image side. The second lens is a negative meniscus lens concave on the object side. The object side and image side surfaces of the two lenses are aspherical.

Example 16 is composed of, from the object side:

a front lens group with a positive first lens, a negative second lens, a positive third lens, and a stop, and a rear lens group with a negative fourth lens and a negative fifth lens.

The first lens is a positive meniscus lens convex on the object side, the second lens is a negative meniscus lens concave on the object side, and the third lens is a bi-convex lens. The refractive power of the fourth lens is negative but very weak (almost non-power), and the fifth lens is a negative meniscus lens concave on the object side. The image side surface of the third lens, and the object side surface of the fourth lens are aspherical.

Example 17 is composed of, from the object side:

a front lens group with a positive first lens, a negative second lens, a positive third lens, and a stop, and a rear lens group with a negative fourth lens and a negative fifth lens.

The first lens is a positive meniscus lens convex on the object side, the second lens is a negative meniscus lens concave on the object side, and the third lens is a bi-convex lens. The refractive power of the fourth lens is negative but very weak (almost non-power), and the fifth lens is a negative meniscus lens concave on the object side. The object side surface of the first lens, the image side surface of the third lens, the object side surface of the fourth lens, and the object side surface of the fifth lens are aspherical.

Example 18 is composed of, from the object side:

a front lens group with a positive first lens, a negative second lens, a positive third lens, and a stop, and a rear lens group with a positive fourth lens and a negative fifth lens.

The first lens is a positive meniscus lens convex on the object side, the second lens is a negative meniscus lens concave on the object side, and the third lens is a bi-convex lens. The refractive power of the fourth lens is positive but very weak (almost non-power), and the fifth lens is a negative meniscus lens concave on the object side. The object side surface of the first lens, the image side surface of the third lens, the object side surface of the fourth lens, and the object side surface of the fifth lens are aspherical.

Example 19 is composed of, from the object side:

a front lens group with a positive first lens, a negative second lens, a positive third lens, and a stop, and a rear lens group with a positive fourth lens and a negative fifth lens.

The first lens is a positive meniscus lens convex on the object side, the second lens is a negative meniscus lens concave on the object side, and the third lens is a bi-convex lens. The refractive power of the fourth lens is positive but very weak (almost non-power), and the fifth lens is a negative meniscus lens concave on the object side. The object side surface of the first lens, the image side surface of the third lens, the object side surface of the fourth lens, and the object side surface of the fifth lens are aspherical. The air distance $d_4$ in the front lens group slightly varies for the floating operation.

Example 20 is composed of, from the object side:

a front lens group with a positive first lens, a negative second lens, a positive third lens, and a stop, and a rear lens group with a negative fourth lens.

The first lens is a positive meniscus lens convex on the image side, the second lens is a bi-concave lens, and the third lens is a bi-convex lens. The fourth lens is a negative meniscus lens concave on the object side. The object side surface of the first lens, the image side surface of the second lens, the image side surface of the third lens, and the object side and image side surfaces of the fourth lens are aspherical. The air distance $d_4$ in the front lens group slightly varies for the floating operation.

Examples 21 and 22 are both composed of, from the object side:

a front lens group with a positive first lens, a negative second lens, a positive third lens, and a stop, and a rear lens group with a negative fourth lens.

The first lens is a positive meniscus lens convex on the image side, the second lens is a bi-concave lens, and the third lens is a bi-convex lens. The fourth lens is a negative meniscus lens concave on the object side. The first lens and the second lens constitute the first sub lens group, as described before, and the third lens and the stop constitute the second sub lens group. The object side surface of the first lens, the image side surface of the second lens, the image side surface of the third lens, and the object side and image side surfaces of the fourth lens are aspherical. The air distance $d_4$ in the front lens group slightly varies by the floating operation in order to correct fluctuation of aberrations, especially spherical aberration and distortion, caused by the change in the axial air distance $d_7$ for zooming.

Examples 23 and 24 are both composed of, from the object side:

a front lens group with a positive first lens, a negative second lens, a positive third lens and a stop, and a rear lens group with a positive fourth lens and a negative fifth lens.

The first lens is a positive meniscus lens convex on the object side, the second lens is a negative meniscus lens concave on the object side and the third lens is a bi-convex lens. The refractive power of the fourth lens is positive but very weak (almost non-power), and the fifth lens is a negative meniscus lens concave on the object side. The first lens and the second lens constitute the first sub lens group, as described before, and the third lens and the stop constitute the second sub lens group. The object side surface of the first lens, the image side surface of the third lens, the object side surface of the fourth lens, and the object side surface of the fifth lens are aspherical. The air distance $d_4$ in the front lens group slightly varies by the floating operation in order to correct fluctuation of aberrations, especially spherical aberration and distortion, caused by the change in the axial air distance $d_7$ for zooming. In the example 24, the air distance $d_4$ becomes maximum at a midpoint (M) rather than at the longest focal length condition (L).

In the examples 21-24, the floating operation is done exclusively in the front lens group. It is possible to perform the floating operation further in the rear lens group.

Example 25 is composed of, from the object side:

a front lens group with a positive first lens, a negative second lens, a positive third lens and a stop, and a rear lens group with a positive fourth lens and a negative fifth lens.

The first lens is a positive meniscus lens convex on the object side, the second lens is a negative meniscus lens concave on the object side and the third lens is a bi-convex lens. The refractive power of the fourth lens is positive but very weak (almost non-power), and the fifth lens is a negative meniscus lens concave on the object side. The first lens and the second lens constitute the first sub lens group, as described before, and the third lens and the stop constitute the second sub lens group. The first sub lens group has a negative refractive power and the second sub lens group has a positive refractive power. The object side surface of the first lens, the image side surface of the third lens, the object side surface of the fourth lens, and the object side surface of the fifth lens are aspherical. The air distance $d_7$ between the front lens group and the rear lens group is changed for zooming. The focusing for a close object is done by shifting the front lens group toward the object side. The floating is done by slightly changing the air distance $d_4$ between the first and second sub lens groups in the front lens group according to the focusing.

Example 26 is composed of, from the object side:

a front lens group with a positive first lens, a negative second lens, a positive third lens and a stop, and a rear lens group with a positive fourth lens and a negative fifth lens.

The first lens is a positive meniscus lens convex on the object side, the second lens is a negative meniscus lens concave on the object side and the third lens has a strong power on the image side surface. The refractive power of the fourth lens is positive but very weak (almost non-power), and the fifth lens is a negative meniscus lens concave on the object side. The first lens and the second lens constitute the first sub lens group, as described before, and the third lens and the stop constitute the second sub lens group. Both the first sub lens group and the second sub lens group have positive refractive powers. The object side surface of the first lens, the image side surface of the second lens, the image side surface of the third lens, the object side surface of the fourth lens, and the object side surface of the fifth lens are aspherical. The air distance $d_7$ between the front lens group and the rear lens group is changed for zooming. The focusing for a close object is done by shifting the front lens group toward the object side. The floating is done by slightly changing the air distance $d_4$ between the first and second sub lens groups in the front lens group according to the focusing.

As shown in the Tables 23 and 24 and FIGS. 25E-26H, the field curvature tends to bend toward the under side when a focusing operation is performed without the floating operation. When, on the other hand, the floating operation is done, the field curvature is adequately corrected. As a result, it is possible to shorten the closest photographing distance and enlarge the magnification $\beta$. In the above examples 25 and 26, it is possible to make the first sub lens group positive and the second sub lens group negative.

Examples 27-29 are composed of, from the object side:

a front lens group with a negative first lens and a positive second lens, and a rear lens group with a positive third lens and a negative fourth lens.

The first lens is a negative meniscus lens concave on the object side and the second lens is a bi-convex lens. The refractive power of the third lens is positive but very weak (almost non-power), and the fourth lens is a negative meniscus lens concave on the object side. The object side and image side surfaces of the first lens and the object side surface of the third lens are aspherical.

Examples 30 and 31 are composed of, from the object side:

a front lens group with a negative first lens and a positive second lens, and rear lens group with a positive third lens and a negative fourth lens.

The first lens is a negative meniscus lens concave on the image side and the second lens is a bi-convex lens. The refractive power of the third lens is positive but very weak (almost non-power), and the fourth lens is a negative meniscus lens concave on the object side. The object side and image side surfaces of the first lens, the image side side surface of the second lens and the object side surface of the third lens are aspherical.

Example 32 is composed of, from the object side:

a front lens group with a negative first lens and a positive second lens, and a rear lens group with a positive third lens and a negative fourth lens.

The first lens is a negative meniscus lens concave on the object side and the second lens is a bi-convex lens. The refractive power of the third lens is positive but very weak (almost non-power), and the fourth lens is a negative meniscus lens concave on the object side. The object side and image side surfaces of the first lens and the object side and image side surfaces of the third lens are aspherical.

Examples 33 and 34 are composed of, from the object side:

a front lens group with a negative first lens and a positive second lens, and a rear lens group with a positive third lens and a negative fourth lens.

The first lens is a negative meniscus lens concave on the image side and the second lens is a bi-convex lens. The refractive power of the third lens is positive but very weak (almost non-power), and the fourth lens is a negative meniscus lens concave on the object side. The image side surface of the first lens and the object side surface of the third lens are aspherical.

Example 35 is composed of, from the object side:

a front lens group with a negative first lens and a positive second Lens, and a rear lens group with a positive third lens and a negative fourth lens.

The first lens is a negative meniscus lens concave on the image side and the second lens is a bi-convex lens. The refractive power of the third lens is positive but very weak (almost non-power), and the fourth lens is a negative meniscus lens concave on the object side. The object side surface of the first lens, the image side surface of the second lens and the object side surface of the third lens are aspherical.

Example 36 is composed of, from the object side:

a front lens group with a negative first lens and a positive second lens, and a rear lens group with a positive third lens and a negative fourth lens.

The first lens is a negative meniscus lens convex on the object side and the second lens is a bi-convex lens. The third lens is a positive meniscus lens concave on the object side and the fourth lens is a negative meniscus lens concave on the object side. The object side and image side surfaces of the first lens and the object side and image side surfaces of the third lens are aspherical.

Example 37 is composed of, from the object side:

a front lens group with a negative first lens and a positive second lens, and a rear lens group with a positive third lens and a negative fourth lens.

The first lens is a negative meniscus lens convex on the object side and the second lens is a bi-convex lens. The third lens is a positive meniscus lens concave on the object side and the fourth lens is a negative meniscus lens concave on the object side. The object side surface of the first lens, the image side surface of the second lens and the object side and image side surfaces of the third lens are aspherical.

Example 38 is composed of, from the object side:

a front lens group with a negative first lens and a positive second lens, and a rear lens group with a positive third lens and a negative fourth lens.

The first lens is a negative meniscus lens convex on the object side and the second lens is a bi-convex lens. The third lens is a positive meniscus lens concave on the object side and the fourth lens is a negative meniscus lens concave on the object side. The image side surface of the first lens and the object side and image side surfaces of the third lens are aspherical.

Example 39 is composed of, from the object side:

a front lens group with a negative first lens and a positive second lens, and a rear lens group with a positive third lens and a negative fourth lens.

The first lens is a negative meniscus lens concave on the object side and the second lens is a bi-convex lens. The third lens is a positive meniscus lens concave on the object side and the fourth lens is a negative meniscus lens concave on the object side. The object side and image side surfaces of the first lens, the object side surface of the third lens and the object side surface of the fourth lens are aspherical.

Example 40 is composed of, from the object side:

a front lens group with a negative first lens and a positive second lens, and a rear lens group with a positive third lens and a negative fourth lens.

The first lens is a negative meniscus lens convex on the object side and the second lens is a bi-convex lens. The third lens is a positive meniscus lens concave on the object side and the fourth lens is a negative meniscus lens concave on the object side. The object side surface of the first lens, the object side surface of the second lens, the object side surface of the third lens and the object side surface of the fourth lens are aspherical.

Example 41 is composed of, from the object side:

a front lens group with a negative first lens and a positive second lens, and a rear lens group with a negative third lens and a negative fourth lens.

The first lens is a negative meniscus lens concave on the object side and the second lens is a bi-convex lens. The refractive power of the third lens is negative but very weak (almost non-power), and the fourth lens is a negative meniscus lens concave on the object side. The object side and image side surfaces of the first lens and the object side surface of the third lens are aspherical.

Examples 42 and 43 are composed of, from the object side:

a front lens group with a negative first lens and a positive second lens, and a rear lens group with a negative third lens and a negative fourth lens.

The first lens is a negative meniscus lens concave on the object side and the second lens is a bi-convex lens. The refractive power of the third lens is negative but very weak (almost non-power), and the fourth lens is a negative meniscus lens concave on the object side. The image side surface of the first lens and the object side surface of the third lens are aspherical.

<Example 1>
$f = 39.3 \sim 58.5 \sim 86.6$  $F_{NO} = 3.6 \sim 5.3 \sim 7.9$

| | radius of curvature | | axial distance | | refractive index | | Abbe number |
|---|---|---|---|---|---|---|---|
| $r_1$ | 25.135 | | | | | | |
| | | $d_1$ | 1.800 | $N_1$ | 1.51680 | $\nu_1$ | 64.20 |
| $r_2$ | 3077.775 | | | | | | |
| | | $d_2$ | 0.820 | | | | |
| $r_3$ | −18.900 | | | | | | |
| | | $d_3$ | 1.000 | $N_2$ | 1.77551 | $\nu_2$ | 37.90 |
| $r_4$ | −103.884 | | | | | | |
| | | $d_4$ | 4.675 | | | | |
| $r_5$ | 31.224 | | | | | | |
| | | $d_5$ | 3.500 | $N_3$ | 1.51680 | $\nu_3$ | 64.20 |
| $r_6^*$ | −15.969 | | | | | | |
| | | $d_6$ | 2.000 | | | | |
| $r_7$ | ∞ (stop) | | | | | | |
| | | $d_7$ | 10.059∼5.248∼2.040 | | | | |
| $r_8^*$ | −35.898 | | | | | | |
| | | $d_8$ | 4.000 | $N_4$ | 1.75520 | $\nu_4$ | 27.51 |
| $r_9$ | −29.512 | | | | | | |
| | | $d_9$ | 6.000 | | | | |
| $r_{10}^*$ | −10.788 | | | | | | |
| | | $d_{10}$ | 1.044 | $N_5$ | 1.74950 | $\nu_5$ | 50.00 |
| $r_{11}$ | −41.278 | | | | | | |

$\Sigma d = 34.897 \sim 30.087 \sim 26.878$ aspherical coefficients $r_6$:  $\epsilon = 0$
$A_4 = 0.28799 \times 10^{-4}$
$A_6 = 0.10540 \times 10^{-6}$
$A_8 = -0.74715 \times 10^{-9}$
$A_{10} = -0.12474 \times 10^{-10}$
$A_{12} = 0.22951 \times 10^{-12}$ $r_8$:  $\epsilon = 0.10000 \times 10$
$A_4 = 0.43638 \times 10^{-4}$
$A_6 = 0.13233 \times 10^{-6}$
$A_8 = 0.17788 \times 10^{-9}$
$A_{10} = -0.39761 \times 10^{-10}$
$A_{12} = 0.38362 \times 10^{-12}$ $r_{10}$:  $\epsilon = 0.10000 \times 10$
$A_4 = 0.29123 \times 10^{-5}$
$A_6 = 0.98436 \times 10^{-7}$
$A_8 = -0.45252 \times 10^{-8}$
$A_{10} = 0.78497 \times 10^{-10}$
$A_{12} = 0.12647 \times 10^{-12}$ <Example 2>
$f = 39.3 \sim 58.5 \sim 86.6$  $F_{NO} = 3.6 \sim 5.3 \sim 7.9$

| | radius of curvature | | axial distance | | refractive index | | Abbe number |
|---|---|---|---|---|---|---|---|
| $r_1^*$ | 18.970 | | | | | | |
| | | $d_1$ | 1.800 | $N_1$ | 1.51680 | $\nu_1$ | 64.20 |
| $r_2$ | 586.748 | | | | | | |

-continued

| | radius of curvature | | axial distance | refractive index | | Abbe number |
|---|---|---|---|---|---|---|
| | | $d_2$ | 0.870 | | | |
| $r_3$ | −21.818 | | | | | |
| | | $d_3$ | 1.000 | $N_2$ 1.77551 | $\nu_2$ | 37.90 |
| $r_4^*$ | 390.318 | | | | | |
| | | $d_4$ | 4.675 | | | |
| $r_5$ | 30.678 | | | | | |
| | | $d_5$ | 3.500 | $N_3$ 1.51680 | $\nu_3$ | 64.20 |
| $r_6^*$ | −15.945 | | | | | |
| | | $d_6$ | 2.000 | | | |
| $r_7$ | ∞ (stop) | | | | | |
| | | $d_7$ | 10.172~5.294~2.040 | | | |
| $r_8^*$ | −47.084 | | | | | |
| | | $d_8$ | 4.000 | $N_4$ 1.75520 | $\nu_4$ | 27.51 |
| $r_9$ | −27.130 | | | | | |
| | | $d_9$ | 4.000 | | | |
| $r_{10}^*$ | −10.117 | | | | | |
| | | $d_{10}$ | 1.044 | $N_5$ 1.74950 | $\nu_5$ | 50.00 |
| $r_{11}$ | −50.063 | | | | | |

$\Sigma d = 33.060 \sim 28.182 \sim 24.928$ aspherical coefficients $r_1$: $\epsilon = 0.16431 \times 10$
$A_2 = 0.11309 \times 10^{-2}$
$A_4 = 0.97700 \times 10^{-5}$
$A_6 = 0.14592 \times 10^{-6}$
$A_8 = 0.14708 \times 10^{-9}$
$A_{10} = 0.16851 \times 10^{-10}$
$A_{12} = 0.12321 \times 10^{-12}$ $r_4$: $\epsilon = 0.99991$
$A_2 = 0.18228 \times 10^{-2}$
$A_4 = 0.15635 \times 10^{-4}$
$A_6 = 0.17170 \times 10^{-6}$
$A_8 = -0.15512 \times 10^{-8}$
$A_{10} = -0.56544 \times 10^{-11}$
$A_{12} = -0.55094 \times 10^{-15}$ $r_6$: $\epsilon = 0.17888$
$A_2 = 0.39011 \times 10^{-4}$
$A_4 = 0.35354 \times 10^{-4}$
$A_6 = 0.18277 \times 10^{-6}$
$A_8 = -0.11572 \times 10^{-7}$
$A_{10} = 0.41379 \times 10^{-9}$
$A_{12} = -0.47714 \times 10^{-11}$ $r_8$: $\epsilon = 0.10000 \times 10$
$A_4 = 0.57941 \times 10^{-4}$
$A_6 = 0.28082 \times 10^{-6}$
$A_8 = 0.24493 \times 10^{-8}$
$A_{10} = -0.74654 \times 10^{-10}$
$A_{12} = 0.91740 \times 10^{-12}$ $r_{10}$: $\epsilon = 0.10000 \times 10$
$A_4 = 0.14506 \times 10^{-5}$
$A_6 = 0.20850 \times 10^{-6}$
$A_8 = -0.13795 \times 10^{-7}$
$A_{10} = 0.28038 \times 10^{-9}$
$A_{12} = -0.12568 \times 10^{-11}$ <Example 3>
$f = 39.3 \sim 58.5 \sim 86.6 \quad F_{NO} = 3.6 \sim 5.3 \sim 7.9$

| | radius of curvature | | axial distance | refractive index | | Abbe number |
|---|---|---|---|---|---|---|
| $r_1^*$ | 19.470 | | | | | |
| | | $d_1$ | 1.800 | $N_1$ 1.51680 | $\nu_1$ | 64.20 |
| $r_2$ | −370.939 | | | | | |
| | | $d_2$ | 0.950 | | | |
| $r_3$ | −18.934 | | | | | |
| | | $d_3$ | 1.000 | $N_2$ 1.77551 | $\nu_2$ | 37.90 |
| $r_4^*$ | −44.051 | | | | | |
| | | $d_4$ | 4.675 | | | |
| $r_5$ | −572.210 | | | | | |
| | | $d_5$ | 3.500 | $N_3$ 1.51680 | $\nu_3$ | 64.20 |
| $r_6^*$ | −14.294 | | | | | |
| | | $d_6$ | 2.000 | | | |
| $r_7$ | ∞ (stop) | | | | | |
| | | $d_7$ | 9.204~4.907~2.040 | | | |
| $r_8^*$ | −27.893 | | | | | |
| | | $d_8$ | 4.000 | $N_4$ 1.75000 | $\nu_4$ | 25.14 |
| $r_9$ | −29.100 | | | | | |
| | | $d_9$ | 6.000 | | | |
| $r_{10}^*$ | −10.986 | | | | | |
| | | $d_{10}$ | 1.044 | $N_5$ 1.75450 | $\nu_5$ | 51.57 |
| $r_{11}$ | −39.051 | | | | | |

$\Sigma d = 34.173 \sim 29.875 \sim 27.008$ aspherical coefficients $r_1$: $\epsilon = 0.25000 \times 10$
$A_4 = -0.12226 \times 10^{-4}$
$A_6 = -0.10475 \times 10^{-7}$
$A_8 = 0.49965 \times 10^{-10}$ $r_4$: $\epsilon = 0.10000 \times 10$
$A_4 = 0.21838 \times 10^{-6}$
$A_6 = 0.20884 \times 10^{-7}$
$A_8 = 0.57958 \times 10^{-10}$ $r_6$: $\epsilon = 0$
$A_4 = 0.36500 \times 10^{-4}$
$A_6 = 0.58936 \times 10^{-7}$
$A_8 = -0.48977 \times 10^{-9}$
$A_{10} = -0.14097 \times 10^{-10}$
$A_{12} = 0.20479 \times 10^{-12}$ $r_8$: $\epsilon = 0.10000 \times 10$
$A_4 = 0.50828 \times 10^{-4}$
$A_6 = 0.30784 \times 10^{-6}$
$A_8 = -0.13168 \times 10^{-8}$
$A_{10} = -0.40828 \times 10^{-10}$
$A_{12} = 0.46214 \times 10^{-12}$ $r_{10}$: $\epsilon = 0.10000 \times 10$
$A_4 = 0.10283 \times 10^{-4}$
$A_6 = 0.12446 \times 10^{-6}$
$A_8 = -0.48134 \times 10^{-8}$
$A_{10} = 0.78053 \times 10^{-10}$
$A_{12} = 0.16921 \times 10^{-12}$ <Example 4>
$f = 39.3 \sim 58.5 \sim 86.6 \quad F_{NO} = 3.6 \sim 5.3 \sim 7.9$

| | radius of curvature | | axial distance | refractive index | | Abbe number |
|---|---|---|---|---|---|---|
| $r_1^*$ | 23.272 | | | | | |
| | | $d_1$ | 1.800 | $N_1$ 1.51680 | $\nu_1$ | 64.20 |
| $r_2$ | 151.188 | | | | | |
| | | $d_2$ | 3.343 | | | |
| $r_3$ | −16.213 | | | | | |
| | | $d_3$ | 1.000 | $N_2$ 1.77551 | $\nu_2$ | 37.90 |
| $r_4^*$ | −99.027 | | | | | |
| | | $d_4$ | 6.125 | | | |
| $r_5$ | 47.993 | | | | | |
| | | $d_5$ | 3.500 | $N_3$ 1.51680 | $\nu_3$ | 64.20 |
| $r_6^*$ | −13.288 | | | | | |
| | | $d_6$ | 2.000 | | | |
| $r_7$ | ∞ (stop) | | | | | |
| | | $d_7$ | 21.500~15.201~11.000 | | | |
| $r_8^*$ | −29.261 | | | | | |
| | | $d_8$ | 1.044 | $N_4$ 1.74950 | $\nu_4$ | 50.00 |
| $r_9$ | 59.197 | | | | | |

$\Sigma d = 40.311 \sim 34.013 \sim 29.811$ aspherical coefficients $r_1$: $\epsilon = 0.20803 \times 10$
$A_4 = 0.17237 \times 10^{-4}$
$A_6 = 0.63541 \times 10^{-7}$
$A_8 = -0.47391 \times 10^{-9}$
$A_{10} = -0.20451 \times 10^{-11}$
$A_{12} = -0.60700 \times 10^{-14}$ $r_4$: $\epsilon = 0.98696$
$A_4 = 0.28086 \times 10^{-4}$
$A_6 = -0.73078 \times 10^{-7}$
$A_8 = -0.67526 \times 10^{-9}$
$A_{10} = -0.82633 \times 10^{-11}$
$A_{12} = -0.19752 \times 10^{-12}$ $r_6$: $\epsilon = -0.22090$
$A_4 = 0.71791 \times 10^{-5}$
$A_6 = -0.10362 \times 10^{-7}$
$A_8 = 0.40625 \times 10^{-9}$
$A_{10} = 0.32410 \times 10^{-11}$
$A_{12} = -0.53636 \times 10^{-13}$ $r_8$: $\epsilon = 0.70994$
$A_4 = 0.30809 \times 10^{-4}$
$A_6 = -0.14938 \times 10^{-6}$
$A_8 = 0.19104 \times 10^{-9}$
$A_{10} = 0.66289 \times 10^{-11}$
$A_{12} = -0.31809 \times 10^{-13}$ <Example 5>
$f = 39.3 \sim 58.5 \sim 86.6 \quad F_{NO} = 3.6 \sim 5.4 \sim 8.2$

| | radius of curvature | | axial distance | refractive index | | Abbe number |
|---|---|---|---|---|---|---|
| $r_1^*$ | −38.976 | | | | | |
| | | $d_1$ | 1.800 | $N_1$ 1.51680 | $\nu_1$ | 64.20 |

-continued

| | $r_2$ | −14.992 | | | | | | |
|---|---|---|---|---|---|---|---|---|
| | | | $d_2$ | 1.000 | | | | |
| | $r_3$ | −16.054 | | | | | | |
| | | | $d_3$ | 1.000 | $N_2$ | 1.77551 | $\nu_2$ | 37.90 |
| | $r_4$* | 290.287 | | | | | | |
| | | | $d_4$ | 6.125~6.650~7.625 | | | | |
| | $r_5$ | 26.802 | | | | | | |
| | | | $d_5$ | 4.500 | $N_3$ | 1.51680 | $\nu_3$ | 64.20 |
| | $r_6$* | −14.117 | | | | | | |
| | | | $d_6$ | 2.000 | | | | |
| | $r_7$ | ∞ (stop) | | | | | | |
| | | | $d_7$ | 23.057~18.139~14.500 | | | | |
| | $r_8$* | −13.611 | | | | | | |
| | | | $d_8$ | 1.044 | $N_4$ | 1.74950 | $\nu_4$ | 50.00 |
| | $r_9$* | −138.027 | | | | | | |

$\Sigma d = 40.526 \sim 36.133 \sim 33.468$ aspherical coefficients $r_1$: $\epsilon = 0$
$A_4 = -0.88580 \times 10^{-4}$
$A_6 = -0.21947 \times 10^{-6}$
$A_8 = -0.21425 \times 10^{-7}$
$A_{10} = 0.81040 \times 10^{-9}$
$A_{12} = -0.11824 \times 10^{-10}$ $r_4$: $\epsilon = 0.10000 \times 10$
$A_4 = 0.12252 \times 10^{-4}$
$A_6 = 0.72190 \times 10^{-8}$
$A_8 = -0.21386 \times 10^{-8}$
$A_{10} = -0.28989 \times 10^{-11}$
$A_{12} = -0.26437 \times 10^{-13}$ $r_6$: $\epsilon = 0.68081$
$A_4 = 0.33088 \times 10^{-4}$
$A_6 = 0.16942 \times 10^{-6}$
$A_8 = -0.17850 \times 10^{-9}$
$A_{10} = 0.22719 \times 10^{-12}$
$A_{12} = 0.35169 \times 10^{-13}$ $r_8$: $\epsilon = 0.10019 \times 10$
$A_4 = 0.29143 \times 10^{-4}$
$A_6 = -0.70790 \times 10^{-7}$
$A_8 = -0.33869 \times 10^{-9}$
$A_{10} = -0.21763 \times 10^{-11}$
$A_{12} = -0.77879 \times 10^{-13}$ $r_9$: $\epsilon = 0.93078$
$A_4 = 0.40781 \times 10^{-5}$
$A_6 = 0.32352 \times 10^{-7}$
$A_8 = -0.87018 \times 10^{-9}$
$A_{10} = 0.17369 \times 10^{-11}$
$A_{12} = 0.18480 \times 10^{-14}$ <Example 6>
$f = 29.0 \sim 44.2 \sim 67.5 \quad F_{NO} = 3.6 \sim 5.5 \sim 8.4$

| radius of curvature | | axial distance | | refractive index | | Abbe number | |
|---|---|---|---|---|---|---|---|
| $r_1$* | −57.697 | | | | | | |
| | | $d_1$ | 4.350 | $N_1$ | 1.68300 | $\nu_1$ | 31.52 |
| $r_2$* | 50.091 | | | | | | |
| | | $d_2$ | 4.110 | | | | |
| $r_3$ | 26.165 | | | | | | |
| | | $d_3$ | 3.500 | $N_2$ | 1.51728 | $\nu_2$ | 69.68 |
| $r_4$* | −12.491 | | | | | | |
| | | $d_4$ | 14.394~8.151~4.040 | | | | |
| $r_5$* | −18.380 | | | | | | |
| | | $d_5$ | 3.000 | $N_3$ | 1.68300 | $\nu_3$ | 31.52 |
| $r_6$ | −14.084 | | | | | | |
| | | $d_6$ | 5.226 | | | | |
| $r_7$* | −10.280 | | | | | | |
| | | $d_7$ | 1.044 | $N_4$ | 1.78100 | $\nu_4$ | 44.55 |
| $r_8$ | −45.743 | | | | | | |

$\Sigma d = 35.624 \sim 44.873 \sim 64.508$ aspherical coefficients $r_1$: $\epsilon = 0.88047$
$A_4 = -0.91081 \times 10^{-4}$
$A_6 = 0.63195 \times 10^{-6}$
$A_8 = -0.86078 \times 10^{-8}$ $r_2$: $\epsilon = 0.88925$
$A_4 = 0.47953 \times 10^{-4}$
$A_6 = 0.18789 \times 10^{-5}$
$A_8 = -0.11747 \times 10^{-8}$ $r_4$: $\epsilon = 0.94697$
$A_4 = 0.21869 \times 10^{-4}$
$A_6 = 0.80788 \times 10^{-8}$
$A_8 = 0.74423 \times 10^{-9}$ -continued $r_5$: $\epsilon = 0.92858$
$A_4 = 0.16011 \times 10^{-4}$
$A_6 = -0.17117 \times 10^{-6}$
$A_8 = 0.25878 \times 10^{-10}$ $r_7$: $\epsilon = 0.53127$
$A_4 = -0.39602 \times 10^{-4}$
$A_6 = -0.57910 \times 10^{-6}$
$A_8 = 0.17833 \times 10^{-8}$ <Example 7>
$f = 36.2 \sim 53.0 \sim 77.5 \quad F_{NO} = 3.6 \sim 5.3 \sim 7.8$

| radius of curvature | | axial distance | | refractive index | | Abbe number | |
|---|---|---|---|---|---|---|---|
| $r_1$* | 67.987 | | | | | | |
| | | $d_1$ | 2.300 | $N_1$ | 1.75000 | $\nu_1$ | 25.14 |
| $r_2$* | 30.826 | | | | | | |
| | | $d_2$ | 5.060 | | | | |
| $r_3$ | 71.908 | | | | | | |
| | | $d_3$ | 4.130 | $N_2$ | 1.51728 | $\nu_2$ | 69.68 |
| $r_4$* | −11.808 | | | | | | |
| | | $d_4$ | 11.268~6.856~3.85 | | | | |
| $r_5$* | −46.863 | | | | | | |
| | | $d_5$ | 3.680 | $N_3$ | 1.58340 | $\nu_3$ | 30.23 |
| $r_6$ | −31.583 | | | | | | |
| | | $d_6$ | 5.520 | | | | |
| $r_7$ | −10.733 | | | | | | |
| | | $d_7$ | 1.000 | $N_4$ | 1.74950 | $\nu_4$ | 50.00 |
| $r_8$ | −52.397 | | | | | | |

$\Sigma d = 32.958 \sim 42.986 \sim 61.038$ aspherical coefficients $r_1$: $\epsilon = 0.99974$
$A_4 = -0.11458 \times 10^{-3}$
$A_5 = 0.55351 \times 10^{-6}$
$A_6 = -0.36548 \times 10^{-7}$
$A_7 = -0.20836 \times 10^{-7}$
$A_8 = -0.25950 \times 10^{-8}$
$A_9 = -0.26722 \times 10^{-10}$
$A_{10} = -0.22478 \times 10^{-11}$
$A_{11} = 0.87106 \times 10^{-13}$
$A_{12} = 0.70965 \times 10^{-14}$ $r_2$: $\epsilon = 0.99533$
$A_4 = -0.38673 \times 10^{-5}$
$A_5 = 0.77894 \times 10^{-6}$
$A_6 = 0.44881 \times 10^{-6}$
$A_7 = 0.56878 \times 10^{-7}$
$A_8 = 0.52402 \times 10^{-8}$
$A_9 = 0.24177 \times 10^{-10}$
$A_{10} = 0.15321 \times 10^{-11}$
$A_{11} = -0.20660 \times 10^{-13}$
$A_{12} = -0.72519 \times 10^{-15}$ $r_4$: $\epsilon = 0.10460 \times 10$
$A_4 = 0.23043 \times 10^{-4}$
$A_5 = -0.48540 \times 10^{-6}$
$A_6 = -0.10846 \times 10^{-7}$
$A_7 = 0.33309 \times 10^{-8}$
$A_8 = 0.59141 \times 10^{-9}$
$A_9 = -0.53330 \times 10^{-10}$
$A_{10} = -0.48335 \times 10^{-11}$
$A_{11} = -0.63408 \times 10^{-13}$
$A_{12} = -0.62213 \times 10^{-15}$ $r_5$: $\epsilon = 0.99966$
$A_4 = 0.66243 \times 10^{-4}$
$A_5 = -0.24166 \times 10^{-5}$
$A_6 = 0.60706 \times 10^{-7}$
$A_7 = 0.33708 \times 10^{-7}$
$A_8 = 0.25499 \times 10^{-8}$
$A_9 = 0.46857 \times 10^{-10}$
$A_{10} = -0.20217 \times 10^{-10}$
$A_{11} = 0.10135 \times 10^{-12}$
$A_{12} = -0.53134 \times 10^{-13}$ <Example 8>
$f = 39.3 \sim 58.5 \sim 86.6 \quad F_{NO} = 3.6 \sim 5.4 \sim 8.0$

| radius of curvature | | axial distance | | refractive index | | Abbe number | |
|---|---|---|---|---|---|---|---|
| restrictor | | | | | | | |
| | | $d_0$ | 0.500 | | | | |
| $r_1$* | 64.806 | | | | | | |
| | | $d_1$ | 3.780 | $N_1$ | 1.84666 | $\nu_1$ | 23.82 |
| $r_2$* | 30.499 | | | | | | |
| | | $d_2$ | 3.925 | | | | |

-continued

| | | | | | | | |
|---|---|---|---|---|---|---|---|
| $r_3$ | 48.115 | | | | | | |
| | | $d_3$ | 4.276 | $N_2$ | 1.51680 | $\nu_2$ | 64.20 |
| $r_4^*$ | −13.090 | | | | | | |
| | | $d_4$ | 10.766~5.804~2.495 | | | | |
| $r_5^*$ | −184.203 | | | | | | |
| | | $d_5$ | 3.814 | $N_3$ | 1.58340 | $\nu_3$ | 30.23 |
| $r_6$ | −66.941 | | | | | | |
| | | $d_6$ | 6.076 | | | | |
| $r_7$ | −11.248 | | | | | | |
| | | $d_7$ | 1.044 | $N_4$ | 1.74250 | $\nu_4$ | 52.47 |
| $r_8$ | −51.612 | | | | | | |

$\Sigma d = 34.181 \sim 45.710 \sim 66.620$
aspherical coefficients $r_1$:  $\epsilon = 0.94452$
 $A_4 = -0.15559 \times 10^{-3}$
 $A_6 = -0.51681 \times 10^{-6}$
 $A_8 = -0.51738 \times 10^{-8}$
 $A_{10} = 0.24615 \times 10^{-9}$
 $A_{12} = -0.36511 \times 10^{-11}$ $r_2$:  $\epsilon = 0.98545$
 $A_4 = -0.11309 \times 10^{-3}$
 $A_6 = -0.66474 \times 10^{-7}$
 $A_8 = 0.43833 \times 10^{-8}$
 $A_{10} = 0.25242 \times 10^{-10}$
 $A_{12} = 0.90965 \times 10^{-13}$ $r_4$:  $\epsilon = 0.12190 \times 10$
 $A_4 = 0.45339 \times 10^{-4}$
 $A_6 = 0.15830 \times 10^{-6}$
 $A_8 = 0.51464 \times 10^{-9}$
 $A_{10} = 0.11085 \times 10^{-11}$
 $A_{12} = -0.28678 \times 10^{-13}$ $r_5$:  $\epsilon = 0.97677$
 $A_4 = 0.51730 \times 10^{-4}$
 $A_6 = -0.91612 \times 10^{-7}$
 $A_8 = 0.59152 \times 10^{-8}$
 $A_{10} = -0.34323 \times 10^{-10}$
 $A_{12} = 0.20409 \times 10^{-13}$ <Example 9>
$f = 39.3 \sim 58.5 \sim 86.6$  $F_{NO} = 3.6 \sim 5.4 \sim 8.0$

| radius of curvature | axial distance | refractive index | Abbe number |
|---|---|---|---|
| $r_1^*$ 59.908 | | | |
| | $d_1$ 2.500 | $N_1$ 1.68300 | $\nu_1$ 31.52 |
| $r_2^*$ 26.433 | | | |
| | $d_2$ 5.500 | | |
| $r_3$ 56.679 | | | |
| | $d_3$ 4.492 | $N_2$ 1.51728 | $\nu_2$ 69.68 |
| $r_4^*$ −13.112 | | | |
| | $d_4$ 12.829~7.533~4.000 | | |
| $r_5^*$ −40.106 | | | |
| | $d_5$ 4.000 | $N_3$ 1.58340 | $\nu_3$ 30.23 |
| $r_6$ −34.290 | | | |
| | $d_6$ 6.000 | | |
| $r_7$ −11.520 | | | |
| | $d_7$ 1.044 | $N_4$ 1.74950 | $\nu_4$ 50.00 |
| $r_8$ −36.299 | | | |

$\Sigma d = 36.365 \sim 48.671 \sim 70.990$
aspherical coefficients $r_1$:  $\epsilon = 0.94578$
 $A_4 = -0.13691 \times 10^{-3}$
 $A_6 = -0.23575 \times 10^{-6}$
 $A_8 = -0.53927 \times 10^{-8}$
 $A_{10} = 0.24048 \times 10^{-9}$
 $A_{12} = -0.36885 \times 10^{-11}$ $r_2$:  $\epsilon = 0.99970$
 $A_4 = -0.61808 \times 10^{-4}$
 $A_6 = 0.27904 \times 10^{-6}$
 $A_8 = 0.35480 \times 10^{-8}$
 $A_{10} = 0.17160 \times 10^{-10}$
 $A_{12} = 0.57399 \times 10^{-13}$ $r_4$:  $\epsilon = 0.11220 \times 10$
 $A_4 = 0.26858 \times 10^{-4}$
 $A_6 = 0.10706 \times 10^{-6}$
 $A_8 = 0.52652 \times 10^{-9}$
 $A_{10} = 0.12697 \times 10^{-11}$
 $A_{12} = -0.91989 \times 10^{-14}$ $r_5$:  $\epsilon = 0.97859$
 $A_4 = 0.51098 \times 10^{-4}$
 $A_6 = -0.35822 \times 10^{-7}$
 $A_8 = 0.55418 \times 10^{-8}$ -continued $A_{10} = -0.27229 \times 10^{-10}$
 $A_{12} = -0.13648 \times 10^{-13}$ <Example 10>
$f = 39.3 \sim 51.8 \sim 68.2$  $F_{NO} = 4.1 \sim 5.3 \sim 7.0$

| radius of curvature | axial distance | refractive index | Abbe number |
|---|---|---|---|
| restrictor | | | |
| | $d_0$ 4.896~7.396~10.896 | | |
| $r_1^*$ −51.463 | | | |
| | $d_1$ 1.000 | $N_1$ 1.83350 | $\nu_1$ 21.00 |
| $r_2^*$ −209.509 | | | |
| | $d_2$ 5.349 | | |
| $r_3$ −334.805 | | | |
| | $d_3$ 4.989 | $N_2$ 1.51680 | $\nu_2$ 64.20 |
| $r_4^*$ −11.561 | | | |
| | $d_4$ 22.876~18.367~14.943 | | |
| $r_5^*$ −24.139 | | | |
| | $d_5$ 1.044 | $N_3$ 1.77250 | $\nu_3$ 49.77 |
| $r_6^*$ 144.891 | | | |

$\Sigma d = 40.153 \sim 38.145 \sim 38.220$
aspherical coefficients $r_1$:  $\epsilon = 0.27563 \times 10$
 $A_4 = -0.57377 \times 10^{-4}$
 $A_6 = -0.28791 \times 10^{-6}$
 $A_8 = -0.25981 \times 10^{-7}$
 $A_{10} = 0.71952 \times 10^{-9}$
 $A_{12} = -0.17910 \times 10^{-10}$ $r_2$:  $\epsilon = -0.95676$
 $A_4 = 0.32319 \times 10^{-4}$
 $A_6 = 0.31975 \times 10^{-6}$
 $A_8 = -0.29096 \times 10^{-8}$
 $A_{10} = -0.86424 \times 10^{-10}$
 $A_{12} = -0.16278 \times 10^{-11}$ $r_4$:  $\epsilon = 0.11348 \times 10$
 $A_4 = 0.34973 \times 10^{-4}$
 $A_6 = 0.13838 \times 10^{-6}$
 $A_8 = 0.65555 \times 10^{-9}$
 $A_{10} = -0.92932 \times 10^{-11}$
 $A_{12} = 0.48225 \times 10^{-12}$ $r_5$:  $\epsilon = 0.25432 \times 10$
 $A_4 = 0.55479 \times 10^{-4}$
 $A_6 = -0.16122 \times 10^{-6}$
 $A_8 = 0.22221 \times 10^{-8}$
 $A_{10} = -0.53141 \times 10^{-10}$
 $A_{12} = 0.26081 \times 10^{-12}$ $r_6$:  $\epsilon = -0.22241 \times 10$
 $A_4 = 0.26936 \times 10^{-4}$
 $A_6 = 0.27385 \times 10^{-8}$
 $A_8 = -0.25504 \times 10^{-8}$
 $A_{10} = 0.11840 \times 10^{-10}$
 $A_{12} = 0.11070 \times 10^{-13}$ <Example 11>
$f = 39.3 \sim 55.2 \sim 77.5$  $F_{NO} = 4.0 \sim 5.7 \sim 8.0$

| radius of curvature | axial distance | refractive index | Abbe number |
|---|---|---|---|
| restrictor | | | |
| | $d_0$ 5.215~8.715~15.215 | | |
| $r_1^*$ −36.716 | | | |
| | $d_1$ 1.222 | $N_1$ 1.83350 | $\nu_1$ 21.00 |
| $r_2^*$ −64.476 | | | |
| | $d_2$ 7.66 | | |
| $r_3$ −188.456 | | | |
| | $d_3$ 4.548 | $N_2$ 1.51680 | $\nu_2$ 64.20 |
| $r_4^*$ −12.087 | | | |
| | $d_4$ 22.768~16.425~11.908 | | |
| $r_5^*$ −50.454 | | | |
| | $d_5$ 1.000 | $N_3$ 1.77250 | $\nu_3$ 49.77 |
| $r_6^*$ 45.050 | | | |

$\Sigma d = 41.818 \sim 38.975 \sim 40.958$
aspherical coefficients $r_1$:  $\epsilon = 0.15018 \times 10$
 $A_4 = -0.32667 \times 10^{-4}$
 $A_6 = -0.19314 \times 10^{-6}$
 $A_8 = -0.26162 \times 10^{-7}$
 $A_{10} = 0.75722 \times 10^{-9}$
 $A_{12} = -0.13941 \times 10^{-10}$ $r_2$:  $\epsilon = -0.94829$
 $A_4 = 0.28608 \times 10^{-4}$
 $A_6 = 0.18842 \times 10^{-6}$ -continued $A_8 = -0.24996 \times 10^{-8}$
$A_{10} = 0.49380 \times 10^{-10}$
$A_{12} = -0.67270 \times 10^{-11}$ $r_4$: $\epsilon = 0.10020 \times 10$
$A_4 = 0.41090 \times 10^{-4}$
$A_6 = 0.37818 \times 10^{-7}$
$A_8 = 0.58283 \times 10^{-9}$
$A_{10} = 0.36793 \times 10^{-10}$
$A_{12} = -0.34580 \times 10^{-12}$ $r_5$: $\epsilon = 0.27377 \times 10$
$A_4 = 0.48509 \times 10^{-4}$
$A_6 = -0.23791 \times 10^{-6}$
$A_8 = 0.21497 \times 10^{-8}$
$A_{10} = -0.42474 \times 10^{-10}$
$A_{12} = 0.17971 \times 10^{-12}$ $r_6$: $\epsilon = -0.21359 \times 10$
$A_4 = 0.29356 \times 10^{-4}$
$A_6 = 0.29483 \times 10^{-7}$
$A_8 = -0.25430 \times 10^{-8}$
$A_{10} = 0.79055 \times 10^{-11}$
$A_{12} = 0.40582 \times 10^{-14}$ <Example 12>

$f = 39.3 \sim 51.8 \sim 68.2$   $F_{NO} = 3.6 \sim 4.7 \sim 6.0$

| radius of curvature | axial distance | refractive index | Abbe number |
|---|---|---|---|
| restrictor | | | |
| | $d_0$   $2.000 \sim 5.500 \sim 9.000$ | | |
| $r_1^*$   $-45.265$ | | | |
| | $d_1$   2.737   $N_1$   1.84666 | | $\nu_1$   23.82 |
| $r_2^*$   $-134.812$ | | | |
| | $d_2$   6.647 | | |
| $r_3$   443.093 | | | |
| | $d_3$   4.479   $N_2$   1.51680 | | $\nu_2$   64.20 |
| $r_4^*$   $-13.153$ | | | |
| | $d_4$   $24.881 \sim 18.640 \sim 13.900$ | | |
| $r_5^*$   $-32.438$ | | | |
| | $d_5$   1.044   $N_3$   1.72900 | | $\nu_3$   53.48 |
| $r_6^*$   115.276 | | | |

$\Sigma d = 41.789 \sim 53.664 \sim 71.663$ aspherical coefficients $r_1$: $\epsilon = -0.17535$
$A_4 = -0.29592 \times 10^{-4}$
$A_6 = 0.12066 \times 10^{-6}$
$A_8 = -0.20055 \times 10^{-7}$
$A_{10} = 0.82177 \times 10^{-9}$
$A_{12} = -0.11741 \times 10^{-10}$ $r_2$: $\epsilon = 0.23617 \times 10$
$A_4 = 0.27941 \times 10^{-4}$
$A_6 = 0.54904 \times 10^{-6}$
$A_8 = 0.98187 \times 10^{-9}$
$A_{10} = 0.84612 \times 10^{-11}$
$A_{12} = -0.11309 \times 10^{-11}$ $r_4$: $\epsilon = 0.13359 \times 10$
$A_4 = 0.43666 \times 10^{-4}$
$A_6 = 0.42178 \times 10^{-7}$
$A_8 = 0.71801 \times 10^{-9}$
$A_{10} = 0.18344 \times 10^{-10}$
$A_{12} = 0.13664 \times 10^{-12}$ $r_5$: $\epsilon = 0.26567 \times 10$
$A_4 = 0.24062 \times 10^{-4}$
$A_6 = -0.21968 \times 10^{-6}$
$A_8 = 0.13828 \times 10^{-8}$
$A_{10} = -0.88598 \times 10^{-11}$
$A_{12} = 0.13382 \times 10^{-13}$ $r_6$: $\epsilon = 0.13573 \times 10$
$A_4 = 0.17944 \times 10^{-5}$
$A_6 = 0.55391 \times 10^{-7}$
$A_8 = -0.18417 \times 10^{-8}$
$A_{10} = 0.11461 \times 10^{-10}$
$A_{12} = -0.27114 \times 10^{-13}$ <Example 13>

$f = 39.3 \sim 51.8 \sim 68.2$   $F_{NO} = 5.6 \sim 7.4 \sim 9.7$

| radius of curvature | axial distance | refractive index | Abbe number |
|---|---|---|---|
| restrictor | | | |
| | $d_0$   $13.584 \sim 18.584 \sim 21.084$ | | |
| $r_1^*$   $-40.791$ | | | |
| | $d_1$   8.431   $N_1$   1.49140 | | $\nu_1$   57.82 |
| $r_2^*$   $-12.062$ | | | |
| | $d_2$   $21.823 \sim 9.798 \sim 0.665$ | | |
| $r_3^*$   $-40.280$ | | | |
| | $d_3$   3.329   $N_2$   1.58400 | | $\nu_2$   31.00 |
| $r_4^*$   364.860 | | | | aspherical coefficients $r_1$: $\epsilon = 0.25327 \times 10$
$A_4 = -0.14421 \times 10^{-3}$
$A_6 = -0.86138 \times 10^{-6}$
$A_8 = -0.58631 \times 10^{-7}$
$A_{10} = 0.64932 \times 10^{-9}$
$A_{12} = 0.63880 \times 10^{-11}$ $r_2$: $\epsilon = 0.15844 \times 10$
$A_4 = 0.39006 \times 10^{-4}$
$A_6 = -0.40428 \times 10^{-6}$
$A_8 = -0.29743 \times 10^{-8}$
$A_{10} = 0.12607 \times 10^{-10}$
$A_{12} = 0.19167 \times 10^{-11}$ $r_3$: $\epsilon = 0.30079 \times 10$
$A_4 = 0.35939 \times 10^{-4}$
$A_6 = -0.40172 \times 10^{-6}$
$A_8 = 0.31202 \times 10^{-8}$
$A_{10} = -0.44959 \times 10^{-10}$
$A_{12} = 0.15913 \times 10^{-12}$ $r_4$: $\epsilon = 0.69001 \times 10$
$A_4 = 0.16010 \times 10^{-4}$
$A_6 = 0.20689 \times 10^{-6}$
$A_8 = -0.34780 \times 10^{-8}$
$A_{10} = 0.11114 \times 10^{-10}$
$A_{12} = -0.91437 \times 10^{-14}$ <Example 14>

$f = 39.3 \sim 51.8 \sim 68.2$   $F_{NO} = 4.1 \sim 5.4 \sim 7.1$

| radius of curvature | axial distance | refractive index | Abbe number |
|---|---|---|---|
| restrictor | | | |
| | $d_0$   $13.955 \sim 18.955 \sim 21.455$ | | |
| $r_1^*$   $-45.475$ | | | |
| | $d_1$   8.263   $N_1$   1.49310 | | $\nu_1$   83.58 |
| $r_2^*$   $-12.028$ | | | |
| | $d_2$   $21.499 \sim 12.608 \sim 5.855$ | | |
| $r_3^*$   $-40.542$ | | | |
| | $d_3$   2.995   $N_2$   1.60565 | | $\nu_2$   37.81 |
| $r_4^*$   101.485 | | | | aspherical coefficients $r_1$: $\epsilon = 0.25236 \times 10$
$A_4 = -0.13828 \times 10^{-3}$
$A_6 = -0.78691 \times 10^{-6}$
$A_8 = -0.64135 \times 10^{-7}$
$A_{10} = 0.38756 \times 10^{-9}$
$A_{12} = 0.21312 \times 10^{-11}$ $r_2$: $\epsilon = 0.15669 \times 10$
$A_4 = 0.47838 \times 10^{-4}$
$A_6 = -0.41710 \times 10^{-6}$
$A_8 = -0.40966 \times 10^{-8}$
$A_{10} = 0.40273 \times 10^{-11}$
$A_{12} = 0.21790 \times 10^{-11}$ $r_3$: $\epsilon = 0.28727 \times 10$
$A_4 = 0.42110 \times 10^{-4}$
$A_6 = -0.40939 \times 10^{-6}$
$A_8 = 0.30581 \times 10^{-8}$
$A_{10} = -0.44886 \times 10^{-10}$
$A_{12} = 0.16107 \times 10^{-12}$ $r_4$: $\epsilon = 0.64106 \times 10$
$A_4 = 0.15045 \times 10^{-4}$
$A_6 = 0.21081 \times 10^{-6}$
$A_8 = -0.34710 \times 10^{-8}$
$A_{10} = 0.11130 \times 10^{-10}$
$A_{12} = -0.91588 \times 10^{-14}$ <Example 15>

$f = 39.3 \sim 51.8 \sim 68.2$   $F_{NO} = 11.0$

| radius of curvature | axial distance | refractive index | Abbe number |
|---|---|---|---|
| restrictor | | | |
| | $d_0$   $9.558 \sim 12.058 \sim 16.558$ | | |
| $r_1^*$   $-36.353$ | | | |
| | $d_1$   9.127   $N_1$   1.49140 | | $\nu_1$   57.82 |
| $r_2^*$   $-11.768$ | | | |
| | $d_2$   $22.269 \sim 10.239 \sim 1.103$ | | |
| $r_3^*$   $-31.942$ | | | |
| | $d_3$   5.642   $N_2$   1.58400 | | $\nu_2$   31.00 |

| | |
|---|---|
| $r_4^*$ | $-275.664$ | aspherical coefficients $r_1$:
$\epsilon = 0.25773 \times 10$
$A_4 = -0.14641 \times 10^{-3}$
$A_6 = -0.92491 \times 10^{-6}$
$A_8 = -0.59986 \times 10^{-7}$
$A_{10} = 0.64032 \times 10^{-9}$
$A_{12} = 0.63058 \times 10^{-11}$ $r_2$:
$\epsilon = 0.14823 \times 10$
$A_4 = 0.38426 \times 10^{-4}$
$A_6 = -0.40152 \times 10^{-6}$
$A_8 = -0.27019 \times 10^{-8}$
$A_{10} = 0.14298 \times 10^{-10}$
$A_{12} = 0.19323 \times 10^{-11}$ $r_3$:
$\epsilon = 0.30209 \times 10$
$A_4 = 0.35350 \times 10^{-4}$
$A_6 = -0.40566 \times 10^{-6}$
$A_8 = 0.30804 \times 10^{-8}$
$A_{10} = -0.43954 \times 10^{-10}$
$A_{12} = 0.19676 \times 10^{-12}$ $r_4$:
$\epsilon = 0.69226 \times 10$
$A_4 = 0.10607 \times 10^{-4}$
$A_6 = 0.17452 \times 10^{-6}$
$A_8 = -0.30688 \times 10^{-8}$
$A_{10} = 0.10826 \times 10^{-10}$
$A_{12} = -0.87607 \times 10^{-14}$

\<Example 16\>
$f = 39.3 \sim 58.5 \sim 86.6 \quad F_{NO} = 3.6 \sim 5.3 \sim 7.9$

| radius of curvature | axial distance | refractive index | Abbe number |
|---|---|---|---|
| $r_1$ 20.888 | | | |
| | $d_1$ 1.800 | $N_1$ 1.51680 | $\nu_1$ 64.20 |
| $r_2$ 49.855 | | | |
| | $d_2$ 1.200 | | |
| $r_3$ $-17.949$ | | | |
| | $d_3$ 1.000 | $N_2$ 1.77551 | $\nu_2$ 37.90 |
| $r_4$ $-37.815$ | | | |
| | $d_4$ 4.675 | | |
| $r_5$ 35.945 | | | |
| | $d_5$ 3.500 | $N_3$ 1.51680 | $\nu_3$ 64.20 |
| $r_6^*$ $-16.745$ | | | |
| | $d_6$ 2.000 | | |
| $r_7$ $\infty$ (stop) | | | |
| | $d_7$ 10.060~5.249~2.040 | | |
| $r_8^*$ $-70.680$ | | | |
| | $d_8$ 4.000 | $N_4$ 1.75520 | $\nu_4$ 27.51 |
| $r_9$ $-102.492$ | | | |
| | $d_9$ 6.000 | | |
| $r_{10}$ $-9.637$ | | | |
| | $d_{10}$ 1.044 | $N_5$ 1.74950 | $\nu_5$ 50.00 |
| $r_{11}$ $-21.150$ | | | |

$\Sigma d = 35.279 \sim 30.468 \sim 27.258$ aspherical coefficients $r_6$:
$\epsilon = 0$
$A_4 = 0.29669 \times 10^{-4}$
$A_6 = 0.11162 \times 10^{-6}$
$A_8 = -0.16093 \times 10^{-8}$
$A_{10} = 0.15341 \times 10^{-10}$
$A_{12} = 0.71730 \times 10^{-13}$ $r_8$:
$\epsilon = 0.10000 \times 10$
$A_4 = 0.58053 \times 10^{-4}$
$A_6 = 0.24050 \times 10^{-7}$
$A_8 = 0.10665 \times 10^{-7}$
$A_{10} = -0.12709 \times 10^{-9}$
$A_{12} = 0.87161 \times 10^{-12}$

\<Example 17\>
$f = 39.3 \sim 58.5 \sim 86.6 \quad F_{NO} = 3.6 \sim 5.3 \sim 7.9$

| radius of curvature | axial distance | refractive index | Abbe number |
|---|---|---|---|
| $r_1^*$ 24.078 | | | |
| | $d_1$ 1.800 | $N_1$ 1.51680 | $\nu_1$ 64.20 |
| $r_2$ 276.227 | | | |
| | $d_2$ 0.870 | | |
| $r_3$ $-18.044$ | | | |
| | $d_3$ 1.000 | $N_2$ 1.77551 | $\nu_2$ 37.90 |
| $r_4$ $-102.950$ | | | |
| | $d_4$ 4.675 | | |
| $r_5$ 27.314 | | | |
| | $d_5$ 3.500 | $N_3$ 1.51680 | $\nu_3$ 64.20 |
| $r_6^*$ $-16.223$ | | | |
| | $d_6$ 2.000 | | |
| $r_7$ $\infty$ (stop) | | | |
| | $d_7$ 10.202~5.306~2.040 | | |
| $r_8^*$ $-35.276$ | | | |
| | $d_8$ 4.000 | $N_4$ 1.75520 | $\nu_4$ 27.51 |
| $r_9$ $-28.708$ | | | |
| | $d_9$ 6.000 | | |
| $r_{10}^*$ $-10.831$ | | | |
| | $d_{10}$ 1.044 | $N_5$ 1.74950 | $\nu_5$ 50.00 |
| $r_{11}$ $-41.196$ | | | |

$\Sigma d = 35.090 \sim 30.194 \sim 26.928$ aspherical coefficients $r_1$: $\epsilon = 0.25000 \times 10$ $r_6$:
$\epsilon = 0$
$A_4 = 0.41708 \times 10^{-4}$
$A_6 = 0.72248 \times 10^{-7}$
$A_8 = -0.80125 \times 10^{-9}$
$A_{10} = -0.12351 \times 10^{-10}$
$A_{12} = 0.23096 \times 10^{-12}$ $r_8$:
$\epsilon = 0.10000 \times 10$
$A_4 = 0.41282 \times 10^{-4}$
$A_6 = 0.17308 \times 10^{-6}$
$A_8 = -0.29099 \times 10^{-9}$
$A_{10} = -0.42090 \times 10^{-10}$
$A_{12} = 0.39220 \times 10^{-12}$ $r_{10}$:
$\epsilon = 0.10000 \times 10$
$A_4 = 0.31957 \times 10^{-5}$
$A_6 = 0.10038 \times 10^{-6}$
$A_8 = -0.45587 \times 10^{-8}$
$A_{10} = 0.78343 \times 10^{-10}$
$A_{12} = 0.12848 \times 10^{-12}$

\<Example 18\>
$f = 39.3 \sim 58.5 \sim 86.6 \quad F_{NO} = 3.6 \sim 5.3 \sim 7.9$

| radius of curvature | axial distance | refractive index | Abbe number |
|---|---|---|---|
| $r_1^*$ 22.226 | | | |
| | $d_1$ 1.800 | $N_1$ 1.51680 | $\nu_1$ 64.20 |
| $r_2$ 260.756 | | | |
| | $d_2$ 0.950 | | |
| $r_3$ $-17.957$ | | | |
| | $d_3$ 1.000 | $N_2$ 1.77551 | $\nu_2$ 37.90 |
| $r_4$ $-63.336$ | | | |
| | $d_4$ 4.675 | | |
| $r_5$ 35.604 | | | |
| | $d_5$ 3.500 | $N_3$ 1.51680 | $\nu_3$ 64.20 |
| $r_6^*$ $-16.184$ | | | |
| | $d_6$ 2.000 | | |
| $r_7$ $\infty$ (stop) | | | |
| | $d_7$ 9.857~5.168~2.040 | | |
| $r_8^*$ $-34.374$ | | | |
| | $d_8$ 4.000 | $N_4$ 1.75520 | $\nu_4$ 27.51 |
| $r_9$ $-30.290$ | | | |
| | $d_9$ 6.000 | | |
| $r_{10}^*$ $-10.772$ | | | |
| | $d_{10}$ 1.044 | $N_5$ 1.74950 | $\nu_5$ 50.00 |
| $r_{11}$ $-39.130$ | | | |

$\Sigma d = 34.826 \sim 30.136 \sim 27.008$ aspherical coefficients $r_1$: $\epsilon = 0.25000 \times 10$ $r_6$:
$\epsilon = 0$
$A_4 = 0.37578 \times 10^{-4}$
$A_6 = 0.72107 \times 10^{-7}$
$A_8 = -0.64255 \times 10^{-9}$
$A_{10} = -0.12552 \times 10^{-10}$
$A_{12} = 0.22453 \times 10^{-12}$ $r_8$:
$\epsilon = 0.10000 \times 10$
$A_4 = 0.43632 \times 10^{-4}$
$A_6 = 0.24093 \times 10^{-6}$
$A_8 = -0.41143 \times 10^{-9}$
$A_{10} = -0.40459 \times 10^{-10}$
$A_{12} = 0.43122 \times 10^{-12}$ $r_{10}$:
$\epsilon = 0.10000 \times 10$
$A_4 = 0.53459 \times 10^{-5}$
$A_6 = 0.10294 \times 10^{-6}$
$A_8 = -0.46518 \times 10^{-8}$
$A_{10} = 0.77993 \times 10^{-10}$
$A_{12} = 0.13476 \times 10^{-12}$

\<Example 19\>
$f = 39.3 \sim 58.5 \sim 86.6 \quad F_{NO} = 3.6 \sim 5.3 \sim 7.9$ -continued

| radius of curvature | axial distance | refractive index | Abbe number |
|---|---|---|---|
| $r_1^*$ 30.256 | | | |
| | $d_1$ 1.800 | $N_1$ 1.51680 | $\nu_1$ 64.20 |
| $r_2$ 365.873 | | | |
| | $d_2$ 0.920 | | |
| $r_3$ −17.429 | | | |
| | $d_3$ 1.000 | $N_2$ 1.77551 | $\nu_2$ 37.90 |
| $r_4$ −88.659 | | | |
| | $d_4$ 4.675∼5.175∼5.675 | | |
| $r_5$ 24.217 | | | |
| | $d_5$ 3.500 | $N_3$ 1.51680 | $\nu_3$ 64.20 |
| $r_6^*$ −16.143 | | | |
| | $d_6$ 2.000 | | |
| $r_7$ ∞ (stop) | | | |
| | $d_7$ 10.951∼5.601∼2.040 | | |
| $r_8^*$ −38.699 | | | |
| | $d_8$ 4.000 | $N_4$ 1.75520 | $\nu_4$ 27.51 |
| $r_9$ −32.368 | | | |
| | $d_9$ 6.000 | | |
| $r_{10}^*$ −10.771 | | | |
| | $d_{10}$ 1.044 | $N_5$ 1.74950 | $\nu_5$ 50.00 |
| $r_{11}$ −34.595 | | | |

$\Sigma d = 35.890 \sim 31.040 \sim 27.978$ aspherical coefficients $r_1$: $\epsilon = 0.25000 \times 10$
$r_6$: $\epsilon = 0$
$A_4 = 0.43878 \times 10^{-4}$
$A_6 = 0.63853 \times 10^{-7}$
$A_8 = -0.91277 \times 10^{-9}$
$A_{10} = -0.12947 \times 10^{-10}$
$A_{12} = 0.22813 \times 10^{-12}$
$r_8$: $\epsilon = 0.10000 \times 10$
$A_4 = 0.43511 \times 10^{-4}$
$A_6 = 0.92644 \times 10^{-7}$
$A_8 = -0.16787 \times 10^{-9}$
$A_{10} = -0.38739 \times 10^{-10}$
$A_{12} = 0.41589 \times 10^{-12}$
$r_{10}$: $\epsilon = 0.10000 \times 10$
$A_4 = 0.58142 \times 10^{-5}$
$A_6 = 0.93781 \times 10^{-7}$
$A_8 = -0.46268 \times 10^{-8}$
$A_{10} = 0.78204 \times 10^{-10}$
$A_{12} = 0.13156 \times 10^{-12}$ <Example 20>
$f = 39.3 \sim 58.5 \sim 86.6$   $F_{NO} = 3.6 \sim 5.4 \sim 8.1$

| radius of curvature | axial distance | refractive index | Abbe number |
|---|---|---|---|
| $r_1^*$ −37.740 | | | |
| | $d_1$ 1.800 | $N_1$ 1.51680 | $\nu_1$ 64.20 |
| $r_2$ −15.220 | | | |
| | $d_2$ 1.000 | | |
| $r_3$ −17.076 | | | |
| | $d_3$ 1.000 | $N_2$ 1.77551 | $\nu_2$ 37.90 |
| $r_4^*$ 148.974 | | | |
| | $d_4$ 6.125∼6.475∼7.125 | | |
| $r_5$ 29.510 | | | |
| | $d_5$ 4.500 | $N_3$ 1.51680 | $\nu_3$ 64.20 |
| $r_6^*$ −13.439 | | | |
| | $d_6$ 2.000 | | |
| $r_7$ ∞ (stop) | | | |
| | $d_7$ 23.064∼18.085∼14.500 | | |
| $r_8^*$ −14.708 | | | |
| | $d_8$ 1.044 | $N_4$ 1.74950 | $\nu_4$ 50.00 |
| $r_9^*$ −210.408 | | | |

$\Sigma d = 40.532 \sim 35.903 \sim 32.969$ aspherical coefficients $r_1$: $\epsilon = 0.97223$
$A_4 = -0.83452 \times 10^{-4}$
$A_6 = -0.47778 \times 10^{-6}$
$r_4$: $\epsilon = 0.96863$
$A_4 = 0.31118 \times 10^{-4}$
$A_6 = 0.25972 \times 10^{-7}$
$r_6$: $\epsilon = 0.64974$
$A_4 = 0.23514 \times 10^{-4}$
$A_6 = 0.17102 \times 10^{-6}$
$r_8$: $\epsilon = 0.11397 \times 10$
$A_4 = 0.24642 \times 10^{-4}$
$A_6 = -0.69500 \times 10^{-7}$
$A_8 = -0.24988 \times 10^{-9}$
$A_{10} = -0.22930 \times 10^{-11}$
$A_{12} = -0.36189 \times 10^{-13}$
$r_9$: $\epsilon = 0.99085$
$A_4 = 0.19054 \times 10^{-5}$
$A_6 = 0.21879 \times 10^{-7}$
$A_8 = -0.70301 \times 10^{-9}$
$A_{10} = 0.14671 \times 10^{-11}$
$A_{12} = 0.19487 \times 10^{-14}$ <Example 21>
$f = 39.3 \sim 58.5 \sim 86.6$   $F_{NO} = 3.6 \sim 5.4 \sim 8.1$

| radius of curvature | axial distance | refractive index | Abbe number |
|---|---|---|---|
| $r_1^*$ −37.740 | | | |
| | $d_1$ 1.800 | $N_1$ 1.51680 | $\nu_1$ 64.20 |
| $r_2$ −15.220 | | | |
| | $d_2$ 1.000 | | |
| $r_3$ −17.076 | | | |
| | $d_3$ 1.000 | $N_2$ 1.77551 | $\nu_2$ 37.90 |
| $r_4^*$ 148.974 | | | |
| | $d_4$ 6.125∼6.475∼7.125 | | |
| $r_5$ 29.510 | | | |
| | $d_5$ 4.500 | $N_3$ 1.51680 | $\nu_3$ 64.20 |
| $r_6^*$ −13.439 | | | |
| | $d_6$ 2.000 | | |
| $r_7$ ∞ (stop) | | | |
| | $d_7$ 23.064∼18.085∼14.500 | | |
| $r_8^*$ −14.708 | | | |
| | $d_8$ 1.044 | $N_4$ 1.74950 | $\nu_4$ 50.00 |
| $r_9^*$ −210.408 | | | |

$\Sigma d = 40.532 \sim 35.903 \sim 32.969$ aspherical coefficients $r_1$: $\epsilon = 0.97223$
$A_4 = -0.83452 \times 10^{-4}$
$A_6 = -0.47778 \times 10^{-6}$
$r_4$: $\epsilon = 0.96863$
$A_4 = 0.31118 \times 10^{-4}$
$A_6 = 0.25972 \times 10^{-7}$
$r_6$: $\epsilon = 0.64974$
$A_4 = 0.23514 \times 10^{-4}$
$A_6 = 0.17102 \times 10^{-6}$
$r_8$: $\epsilon = 0.11397 \times 10$
$A_4 = 0.24642 \times 10^{-4}$
$A_6 = -0.69500 \times 10^{-7}$
$A_8 = -0.24988 \times 10^{-9}$
$A_{10} = -0.22930 \times 10^{-11}$
$A_{12} = -0.36189 \times 10^{-13}$
$r_9$: $\epsilon = 0.99085$
$A_4 = 0.19054 \times 10^{-5}$
$A_6 = 0.21879 \times 10^{-7}$
$A_8 = -0.70301 \times 10^{-9}$
$A_{10} = 0.14671 \times 10^{-11}$
$A_{12} = 0.19487 \times 10^{-14}$ <Example 22>
$f = 39.3 \sim 58.5 \sim 86.6$   $F_{NO} = 3.6 \sim 5.4 \sim 8.3$

| radius of curvature | axial distance | refractive index | Abbe number |
|---|---|---|---|
| $r_1^*$ −38.976 | | | |
| | $d_1$ 1.800 | $N_1$ 1.51680 | $\nu_1$ 64.20 |
| $r_2$ −14.992 | | | |
| | $d_2$ 1.000 | | |
| $r_3$ −16.054 | | | |
| | $d_3$ 1.000 | $N_2$ 1.77551 | $\nu_2$ 37.90 |
| $r_4^*$ 290.287 | | | |
| | $d_4$ 6.125∼6.650∼7.625 | | |
| $r_5$ 26.802 | | | |
| | $d_5$ 4.500 | $N_3$ 1.51680 | $\nu_3$ 64.20 |
| $r_6^*$ −14.117 | | | |
| | $d_6$ 2.000 | | |
| $r_7$ ∞ (stop) | | | |
| | $d_7$ 23.057∼18.139∼14.500 | | |
| $r_8^*$ −13.611 | | | |
| | $d_8$ 1.044 | $N_4$ 1.74950 | $\nu_4$ 50.00 |
| $r_9^*$ −138.027 | | | |

$\Sigma d = 40.526 \sim 36.133 \sim 33.468$ aspherical coefficients $r_1$: $\epsilon = 0$
$A_4 = -0.88580 \times 10^{-4}$
$A_6 = -0.21947 \times 10^{-6}$
$A_8 = -0.21425 \times 10^{-7}$ -continued

|  |  |
|---|---|
| | $A_{10} = 0.81040 \times 10^{-9}$ |
| | $A_{12} = -0.11824 \times 10^{-10}$ |
| $r_4$: | $\epsilon = 0.10000 \times 10$ |
| | $A_4 = 0.12252 \times 10^{-4}$ |
| | $A_6 = 0.72190 \times 10^{-8}$ |
| | $A_8 = -0.21386 \times 10^{-8}$ |
| | $A_{10} = -0.28989 \times 10^{-11}$ |
| | $A_{12} = -0.26437 \times 10^{-13}$ |
| $r_6$: | $\epsilon = 0.68081$ |
| | $A_4 = 0.33088 \times 10^{-4}$ |
| | $A_6 = 0.16942 \times 10^{-6}$ |
| | $A_8 = -0.17850 \times 10^{-9}$ |
| | $A_{10} = 0.22719 \times 10^{-12}$ |
| | $A_{12} = 0.35169 \times 10^{-13}$ |
| $r_8$: | $\epsilon = 0.10019 \times 10$ |
| | $A_4 = 0.29143 \times 10^{-4}$ |
| | $A_6 = -0.70790 \times 10^{-7}$ |
| | $A_8 = -0.33869 \times 10^{-9}$ |
| | $A_{10} = -0.21763 \times 10^{-11}$ |
| | $A_{12} = -0.77879 \times 10^{-13}$ |
| $r_9$: | $\epsilon = 0.93078$ |
| | $A_4 = 0.40781 \times 10^{-5}$ |
| | $A_6 = 0.32352 \times 10^{-7}$ |
| | $A_8 = -0.87018 \times 10^{-9}$ |
| | $A_{10} = 0.17369 \times 10^{-11}$ |
| | $A_{12} = 0.18480 \times 10^{-14}$ |

<Example 23>
f = 39.3~58.5~86.6    $F_{NO}$ = 3.6~5.4~8.1

| radius of curvature | axial distance | refractive index | Abbe number |
|---|---|---|---|
| $r_1$* 30.256 | | | |
| | $d_1$ 1.800 | $N_1$ 1.51680 | $\nu_1$ 64.20 |
| $r_2$ 365.873 | | | |
| | $d_2$ 0.920 | | |
| $r_3$ −17.429 | | | |
| | $d_3$ 1.000 | $N_2$ 1.77551 | $\nu_2$ 37.90 |
| $r_4$ −88.659 | | | |
| | $d_4$ 4.675~5.175~5.675 | | |
| $r_5$ 24.217 | | | |
| | $d_5$ 3.500 | $N_3$ 1.51680 | $\nu_3$ 64.20 |
| $r_6$* −16.143 | | | |
| | $d_6$ 2.000 | | |
| $r_7$ ∞ (stop) | | | |
| | $d_7$ 10.951~5.601~2.040 | | |
| $r_8$* −38.699 | | | |
| | $d_8$ 4.000 | $N_4$ 1.75520 | $\nu_4$ 27.51 |
| $r_9$ −32.368 | | | |
| | $d_9$ 6.000 | | |
| $r_{10}$* −10.771 | | | |
| | $d_{10}$ 1.044 | $N_4$ 1.74950 | $\nu_4$ 50.00 |
| $r_{11}$ −34.595 | | | |

Σ d = 35.890~31.040~27.978
aspherical coefficients

| $r_1$: | $\epsilon = 0.25000 \times 10$ |
|---|---|
| $r_6$: | $\epsilon = 0$ |
| | $A_4 = 0.43878 \times 10^{-4}$ |
| | $A_6 = 0.63853 \times 10^{-7}$ |
| | $A_8 = -0.91277 \times 10^{-9}$ |
| | $A_{10} = -0.12947 \times 10^{-10}$ |
| | $A_{12} = 0.22813 \times 10^{-12}$ |
| $r_8$: | $\epsilon = 0.10000 \times 10$ |
| | $A_4 = 0.43511 \times 10^{-4}$ |
| | $A_6 = 0.92644 \times 10^{-7}$ |
| | $A_8 = -0.16787 \times 10^{-9}$ |
| | $A_{10} = -0.38739 \times 10^{-10}$ |
| | $A_{12} = 0.41589 \times 10^{-12}$ |
| $r_{10}$: | $\epsilon = 0.10000 \times 10$ |
| | $A_4 = 0.58142 \times 10^{-5}$ |
| | $A_6 = 0.93781 \times 10^{-7}$ |
| | $A_8 = -0.46268 \times 10^{-8}$ |
| | $A_{10} = 0.78204 \times 10^{-10}$ |
| | $A_{12} = 0.13156 \times 10^{-12}$ |

<Example 24>
f = 39.3~58.5~86.6    $F_{NO}$ = 3.6~5.4~8.1

| radius of curvature | axial distance | refractive index | Abbe number |
|---|---|---|---|
| $r_1$* 30.116 | | | |
| | $d_1$ 1.800 | $N_1$ 1.51680 | $\nu_1$ 64.20 |
| $r_2$ 372.674 | | | |
| | $d_2$ 0.920 | | |
| $r_3$ −17.427 | | | |
| | $d_3$ 1.000 | $N_2$ 1.77551 | $\nu_2$ 37.90 |
| $r_4$ −88.486 | | | |
| | $d_4$ 4.675~5.375~5.365 | | |
| $r_5$ 24.246 | | | |
| | $d_5$ 3.500 | $N_3$ 1.51680 | $\nu_3$ 64.20 |
| $r_6$* −16.165 | | | |
| | $d_6$ 2.000 | | |
| $r_7$ ∞ (stop) | | | |
| | $d_7$ 10.793~5.366~2.040 | | |
| $r_8$* −39.855 | | | |
| | $d_8$ 4.000 | $N_4$ 1.75520 | $\nu_4$ 27.51 |
| $r_9$ −32.300 | | | |
| | $d_9$ 6.000 | | |
| $r_{10}$* −10.773 | | | |
| | $d_{10}$ 1.044 | $N_4$ 1.74950 | $\nu_4$ 50.00 |
| $r_{11}$ −36.126 | | | |

Σ d = 35.731~31.005~27.668
aspherical coefficients

| $r_1$: | $\epsilon = 0.25000 \times 10$ |
|---|---|
| $r_6$: | $\epsilon = 0$ |
| | $A_4 = 0.43908 \times 10^{-4}$ |
| | $A_6 = 0.63970 \times 10^{-7}$ |
| | $A_8 = -0.83033 \times 10^{-9}$ |
| | $A_{10} = -0.12806 \times 10^{-10}$ |
| | $A_{12} = 0.22826 \times 10^{-12}$ |
| $r_8$: | $\epsilon = 0.10000 \times 10$ |
| | $A_4 = 0.42879 \times 10^{-4}$ |
| | $A_6 = 0.11443 \times 10^{-6}$ |
| | $A_8 = -0.26072 \times 10^{-9}$ |
| | $A_{10} = -0.40034 \times 10^{-10}$ |
| | $A_{12} = 0.40319 \times 10^{-12}$ |
| $r_{10}$: | $\epsilon = 0.10000 \times 10$ |
| | $A_4 = 0.52763 \times 10^{-5}$ |
| | $A_6 = 0.97538 \times 10^{-7}$ |
| | $A_8 = -0.46057 \times 10^{-8}$ |
| | $A_{10} = 0.78205 \times 10^{-10}$ |
| | $A_{12} = 0.13158 \times 10^{-12}$ |

<Example 25>
f = 39.3~58.5~86.6    $F_{NO}$ = 3.6~5.4~8.0

| radius of curvature | axial distance | refractive index | Abbe number |
|---|---|---|---|
| $r_1$* 24.078 | | | |
| | $d_1$ 1.800 | $N_1$ 1.51680 | $\nu_1$ 64.20 |
| $r_2$ 276.227 | | | |
| | $d_2$ 0.870 | | |
| $r_3$ −18.044 | | | |
| | $d_3$ 1.000 | $N_2$ 1.77551 | $\nu_2$ 37.90 |
| $r_4$ −102.950 | | | |
| | $d_4$ 4.675 | | |
| $r_5$ 27.314 | | | |
| | $d_5$ 3.500 | $N_3$ 1.51680 | $\nu_3$ 64.20 |
| $r_6$* −16.223 | | | |
| | $d_6$ 2.000 | | |
| $r_7$ ∞ (stop) | | | |
| | $d_7$ 10.202~5.306~2.040 | | |
| $r_8$* −35.276 | | | |
| | $d_8$ 4.000 | $N_4$ 1.75520 | $\nu_4$ 27.51 |
| $r_9$ −28.708 | | | |
| | $d_9$ 6.000 | | |
| $r_{10}$* −10.831 | | | |
| | $d_{10}$ 1.044 | $N_5$ 1.74950 | $\nu_5$ 50.00 |
| $r_{11}$ −41.196 | | | |

Σ d = 35.090~30.194~26.928
aspherical coefficients

| $r_1$: | $\epsilon = 0.25000 \times 10$ |
|---|---|
| $r_6$: | $\epsilon = 0$ |
| | $A_4 = 0.41708 \times 10^{-4}$ |
| | $A_6 = 0.72248 \times 10^{-7}$ |
| | $A_8 = -0.80125 \times 10^{-9}$ |
| | $A_{10} = -0.12351 \times 10^{-10}$ |
| | $A_{12} = 0.23096 \times 10^{-12}$ |
| $r_8$: | $\epsilon = 0.10000 \times 10$ |
| | $A_4 = 0.41282 \times 10^{-4}$ |
| | $A_6 = 0.17308 \times 10^{-6}$ |
| | $A_8 = -0.29099 \times 10^{-9}$ |
| | $A_{10} = -0.42090 \times 10^{-10}$ |
| | $A_{12} = 0.39220 \times 10^{-12}$ |
| $r_{10}$: | $\epsilon = 0.10000 \times 10$ |

-continued $A_4 = 0.31957 \times 10^{-5}$
$A_6 = 0.10038 \times 10^{-6}$
$A_8 = -0.45587 \times 10^{-8}$
$A_{10} = 0.78343 \times 10^{-10}$
$A_{12} = 0.12848 \times 10^{-12}$ <Example 26>
$f = 39.3 \sim 58.5 \sim 86.6$  $F_{NO} = 3.6 \sim 5.4 \sim 8.0$

| radius of curvature | axial distance | refractive index | Abbe number |
|---|---|---|---|
| $r_1^*$ 19.425 | | | |
| | $d_1$ 1.800 | $N_1$ 1.51680 | $\nu_1$ 64.20 |
| $r_2$ 570.913 | | | |
| | $d_2$ 0.950 | | |
| $r_3$ −19.271 | | | |
| | $d_3$ 1.000 | $N_2$ 1.77551 | $\nu_2$ 37.90 |
| $r_4^*$ −40.386 | | | |
| | $d_4$ 4.675 | | |
| $r_5$ −515.440 | | | |
| | $d_5$ 3.500 | $N_3$ 1.51680 | $\nu_3$ 64.20 |
| $r_6^*$ −14.301 | | | |
| | $d_6$ 2.000 | | |
| $r_7$ ∞ (stop) | | | |
| | $d_7$ 9.408∼4.988∼2.040 | | |
| $r_8^*$ −28.404 | | | |
| | $d_8$ 4.000 | $N_4$ 1.75000 | $\nu_4$ 25.14 |
| $r_9$ −31.797 | | | |
| | $d_9$ 6.000 | | |
| $r_{10}^*$ −10.808 | | | |
| | $d_{10}$ 1.044 | $N_5$ 1.75450 | $\nu_5$ 51.57 |
| $r_{11}$ −31.774 | | | |

$\Sigma d = 34.376 \sim 29.956 \sim 27.008$ aspherical coefficients $r_1$:  $\epsilon = 0.25000 \times 10$
$A_4 = -0.18344 \times 10^{-4}$
$A_6 = -0.21208 \times 10^{-7}$
$A_8 = -0.13803 \times 10^{-10}$ $r_4$:  $\epsilon = 0.10000 \times 10$
$A_4 = 0.28614 \times 10^{-6}$
$A_6 = 0.52158 \times 10^{-7}$
$A_8 = 0.35127 \times 10^{-10}$ $r_6$:  $\epsilon = 0$
$A_4 = 0.32427 \times 10^{-4}$
$A_6 = 0.60231 \times 10^{-7}$
$A_8 = -0.56481 \times 10^{-9}$
$A_{10} = -0.14810 \times 10^{-10}$
$A_{12} = 0.19944 \times 10^{-12}$ $r_8$:  $\epsilon = 0.10000 \times 10$
$A_4 = 0.53837 \times 10^{-4}$
$A_6 = 0.32092 \times 10^{-6}$
$A_8 = -0.10082 \times 10^{-8}$
$A_{10} = -0.35108 \times 10^{-10}$
$A_{12} = 0.51709 \times 10^{-12}$ $r_{10}$:  $\epsilon = 0.10000 \times 10$
$A_4 = 0.96372 \times 10^{-5}$
$A_6 = 0.13117 \times 10^{-6}$
$A_8 = -0.48279 \times 10^{-8}$
$A_{10} = 0.77903 \times 10^{-10}$
$A_{12} = 0.17155 \times 10^{-12}$ <Example 27>
$f = 29.0 \sim 39.3 \sim 53.3$  $F_{NO} = 4.1 \sim 5.6 \sim 7.6$

| radius of curvature | axial distance | refractive index | Abbe number |
|---|---|---|---|
| $r_1^*$ −17.696 | | | |
| | $d_1$ 3.200 | $N_1$ 1.58340 | $\nu_1$ 30.23 |
| $r_2^*$ −46.259 | | | |
| | $d_2$ 1.500 | | |
| $r_3$ 42.566 | | | |
| | $d_3$ 8.610 | $N_2$ 1.51728 | $\nu_2$ 69.68 |
| $r_4$ −11.655 | | | |
| | $d_4$ 13.287∼8.172∼4.400 | | |
| $r_5^*$ −24.099 | | | |
| | $d_5$ 3.000 | $N_3$ 1.58340 | $\nu_3$ 30.23 |
| $r_6$ −17.743 | | | |
| | $d_6$ 5.500 | | |
| $r_7$ −10.800 | | | |
| | $d_7$ 1.044 | $N_4$ 1.80750 | $\nu_4$ 35.43 |
| $r_8$ −35.152 | | | | aspherical coefficients $r_1$:  $\epsilon = 0.21656 \times 10$
$A_4 = 0.14925 \times 10^{-3}$
$A_6 = 0.12754 \times 10^{-5}$
$A_8 = -0.14269 \times 10^{-7}$ $r_2$:  $\epsilon = 0.11927 \times 10$
$A_4 = 0.25952 \times 10^{-3}$
$A_6 = 0.23574 \times 10^{-5}$
$A_8 = 0.12146 \times 10^{-7}$ $r_5$:  $\epsilon = 0.61354$
$A_4 = 0.39082 \times 10^{-4}$
$A_6 = 0.17456 \times 10^{-6}$
$A_8 = 0.25816 \times 10^{-8}$ <Example 28>
$f = 29.0 \sim 39.3 \sim 53.3$  $F_{NO} = 4.1 \sim 5.6 \sim 7.6$

| radius of curvature | axial distance | refractive index | Abbe number |
|---|---|---|---|
| $r_1^*$ −16.925 | | | |
| | $d_1$ 3.200 | $N_1$ 1.58340 | $\nu_1$ 30.23 |
| $r_2^*$ −97.752 | | | |
| | $d_2$ 1.500 | | |
| $r_3$ 25.829 | | | |
| | $d_3$ 8.357 | $N_2$ 1.49300 | $\nu_2$ 58.34 |
| $r_4$ −11.148 | | | |
| | $d_4$ 13.410∼8.224∼4.400 | | |
| $r_5^*$ −25.527 | | | |
| | $d_5$ 3.000 | $N_3$ 1.58340 | $\nu_3$ 30.23 |
| $r_6$ −18.149 | | | |
| | $d_6$ 5.500 | | |
| $r_7$ −11.378 | | | |
| | $d_7$ 1.044 | $N_4$ 1.80750 | $\nu_4$ 35.43 |
| $r_8$ −42.210 | | | | aspherical coefficients $r_1$:  $\epsilon = 0.22038 \times 10$
$A_4 = 0.22559 \times 10^{-3}$
$A_6 = 0.47146 \times 10^{-6}$
$A_8 = -0.12054 \times 10^{-7}$ $r_2$:  $\epsilon = 0.12202 \times 10$
$A_4 = 0.33655 \times 10^{-3}$
$A_6 = 0.22956 \times 10^{-5}$
$A_8 = 0.18420 \times 10^{-7}$ $r_5$:  $\epsilon = 0.66020$
$A_4 = 0.22371 \times 10^{-4}$
$A_6 = 0.12042 \times 10^{-6}$
$A_8 = 0.16891 \times 10^{-8}$ <Example 29>
$f = 29.0 \sim 39.3 \sim 53.3$  $F_{NO} = 3.6 \sim 5.0 \sim 6.7$

| radius of curvature | axial distance | refractive index | Abbe number |
|---|---|---|---|
| $r_1^*$ −22.097 | | | |
| | $d_1$ 3.000 | $N_1$ 1.84666 | $\nu_1$ 23.82 |
| $r_2^*$ −49.435 | | | |
| | $d_2$ 1.600 | | |
| $r_3$ 43.967 | | | |
| | $d_3$ 8.000 | $N_2$ 1.49300 | $\nu_2$ 58.34 |
| $r_4$ −10.415 | | | |
| | $d_4$ 12.172∼7.814∼4.600 | | |
| $r_5^*$ −28.782 | | | |
| | $d_5$ 3.000 | $N_3$ 1.49300 | $\nu_3$ 58.34 |
| $r_6$ −20.781 | | | |
| | $d_6$ 5.400 | | |
| $r_7$ −10.229 | | | |
| | $d_7$ 1.100 | $N_4$ 1.74400 | $\nu_4$ 44.93 |
| $r_8$ −39.148 | | | | aspherical coefficients $r_1$:  $\epsilon = -0.12243$
$A_4 = 0.80992 \times 10^{-4}$
$A_6 = 0.15371 \times 10^{-5}$
$A_8 = -0.15720 \times 10^{-7}$ $r_2$:  $\epsilon = -0.51536 \times 10$
$A_4 = 0.22100 \times 10^{-3}$
$A_6 = 0.23097 \times 10^{-5}$
$A_8 = 0.28762 \times 10^{-7}$ $r_5$:  $\epsilon = -0.50602 \times 10$
$A_4 = 0.31888 \times 10^{-4}$
$A_6 = 0.21809 \times 10^{-6}$
$A_8 = 0.44687 \times 10^{-8}$ <Example 30>
$f = 36.2 \sim 53.0 \sim 77.5$  $F_{NO} = 3.6 \sim 5.3 \sim 7.8$

| radius of | axial | refractive | Abbe |

-continued

| curvature | | distance | | index | | number | |
|---|---|---|---|---|---|---|---|
| $r_1$* | 23.106 | | | | | | |
| | | $d_1$ | 2.300 | $N_1$ | 1.58340 | $\nu_1$ | 30.23 |
| $r_2$* | 12.604 | | | | | | |
| | | $d_2$ | 4.568 | | | | |
| $r_3$ | 39.982 | | | | | | |
| | | $d_3$ | 4.130 | $N_2$ | 1.51728 | $\nu_2$ | 69.68 |
| $r_4$* | −12.342 | | | | | | |
| | | $d_4$ | 13.003∼7.559∼3.850 | | | | |
| $r_5$* | −42.405 | | | | | | |
| | | $d_5$ | 3.680 | $N_3$ | 1.49300 | $\nu_3$ | 58.34 |
| $r_6$ | −24.822 | | | | | | |
| | | $d_6$ | 4.825 | | | | |
| $r_7$ | −10.680 | | | | | | |
| | | $d_7$ | 1.000 | $N_4$ | 1.69680 | $\nu_4$ | 56.47 |
| $r_8$ | −49.657 | | | | | | | aspherical coefficients $r_1$: $\epsilon = 0.97655$
$A_4 = -0.33474 \times 10^{-3}$
$A_5 = -0.60425 \times 10^{-5}$
$A_6 = 0.11236 \times 10^{-6}$
$A_7 = 0.56836 \times 10^{-8}$
$A_8 = -0.75125 \times 10^{-9}$
$A_9 = -0.14727 \times 10^{-10}$
$A_{10} = -0.21764 \times 10^{-11}$
$A_{11} = -0.26297 \times 10^{-12}$
$A_{12} = -0.29088 \times 10^{-13}$ $r_2$: $\epsilon = 0.11103 \times 10$
$A_4 = -0.29953 \times 10^{-3}$
$A_5 = -0.54132 \times 10^{-5}$
$A_6 = 0.64104 \times 10^{-6}$
$A_7 = 0.83544 \times 10^{-7}$
$A_8 = 0.62675 \times 10^{-8}$
$A_9 = -0.20359 \times 10^{-10}$
$A_{10} = -0.25639 \times 10^{-11}$
$A_{11} = -0.28984 \times 10^{-12}$
$A_{12} = -0.30917 \times 10^{-13}$ $r_4$: $\epsilon = 0.12965 \times 10$
$A_4 = 0.34637 \times 10^{-4}$
$A_5 = -0.24973 \times 10^{-6}$
$A_6 = 0.87763 \times 10^{-7}$
$A_7 = 0.17228 \times 10^{-7}$
$A_8 = 0.16024 \times 10^{-8}$
$A_9 = 0.29245 \times 10^{-11}$
$A_{10} = -0.70529 \times 10^{-12}$
$A_{11} = -0.15113 \times 10^{-12}$
$A_{12} = -0.20952 \times 10^{-13}$ $r_5$: $\epsilon = 0.97478$
$A_4 = 0.81649 \times 10^{-4}$
$A_5 = -0.59969 \times 10^{-5}$
$A_6 = 0.58736 \times 10^{-6}$
$A_7 = 0.44158 \times 10^{-7}$
$A_8 = -0.18426 \times 10^{-8}$
$A_9 = -0.35058 \times 10^{-10}$
$A_{10} = -0.15637 \times 10^{-11}$
$A_{11} = 0.19821 \times 10^{-12}$
$A_{12} = 0.59421 \times 10^{-13}$ <Example 31>
$f = 36.2 \sim 53.0 \sim 77.5$  $F_{NO} = 3.6 \sim 5.3 \sim 7.8$

| radius of curvature | | axial distance | | refractive index | | Abbe number | |
|---|---|---|---|---|---|---|---|
| $r_1$* | 30.322 | | | | | | |
| | | $d_1$ | 2.300 | $N_1$ | 1.58340 | $\nu_1$ | 30.23 |
| $r_2$* | 12.723 | | | | | | |
| | | $d_2$ | 3.875 | | | | |
| $r_3$ | 35.181 | | | | | | |
| | | $d_3$ | 4.130 | $N_2$ | 1.49300 | $\nu_2$ | 58.34 |
| $r_4$* | −10.980 | | | | | | |
| | | $d_4$ | 13.951∼7.943∼3.850 | | | | |
| $r_5$* | −27.610 | | | | | | |
| | | $d_5$ | 3.680 | $N_3$ | 1.49300 | $\nu_3$ | 58.34 |
| $r_6$ | −20.475 | | | | | | |
| | | $d_6$ | 4.852 | | | | |
| $r_7$ | −10.953 | | | | | | |
| | | $d_7$ | 1.000 | $N_4$ | 1.72000 | $\nu_4$ | 50.31 |
| $r_8$ | −34.678 | | | | | | | aspherical coefficients $r_1$: $\epsilon = 0.95658$
$A_4 = -0.36046 \times 10^{-3}$
$A_5 = -0.62131 \times 10^{-5}$
$A_6 = 0.72014 \times 10^{-7}$
$A_7 = 0.63443 \times 10^{-9}$
$A_8 = -0.11660 \times 10^{-8}$
$A_9 = -0.43043 \times 10^{-10}$
$A_{10} = -0.39259 \times 10^{-11}$
$A_{11} = -0.36425 \times 10^{-12}$
$A_{12} = -0.34643 \times 10^{-13}$ $r_2$: $\epsilon = 0.12515 \times 10$
$A_4 = -0.29680 \times 10^{-3}$
$A_5 = -0.44849 \times 10^{-5}$
$A_6 = 0.76943 \times 10^{-6}$
$A_7 = 0.94109 \times 10^{-7}$
$A_8 = 0.69823 \times 10^{-8}$
$A_9 = 0.23641 \times 10^{-10}$
$A_{10} = 0.93349 \times 10^{-14}$
$A_{11} = -0.14338 \times 10^{-12}$
$A_{12} = -0.22658 \times 10^{-13}$ $r_4$: $\epsilon = 0.11804 \times 10$
$A_4 = 0.36394 \times 10^{-4}$
$A_5 = -0.45598 \times 10^{-6}$
$A_6 = 0.13964 \times 10^{-6}$
$A_7 = 0.25012 \times 10^{-7}$
$A_8 = 0.23532 \times 10^{-8}$
$A_9 = 0.64998 \times 10^{-10}$
$A_{10} = 0.40513 \times 10^{-11}$
$A_{11} = 0.19753 \times 10^{-12}$
$A_{12} = 0.39046 \times 10^{-14}$ $r_5$: $\epsilon = 0.97670$
$A_4 = 0.72747 \times 10^{-4}$
$A_5 = -0.50282 \times 10^{-5}$
$A_6 = 0.61192 \times 10^{-6}$
$A_7 = 0.42032 \times 10^{-7}$
$A_8 = -0.21139 \times 10^{-8}$
$A_9 = -0.51894 \times 10^{-10}$
$A_{10} = -0.20801 \times 10^{-11}$
$A_{11} = 0.22556 \times 10^{-12}$
$A_{12} = 0.65815 \times 10^{-13}$ <Example 32>
$f = 29.0 \sim 39.3 \sim 53.3$  $F_{NO} = 4.1 \sim 5.8 \sim 7.6$

| radius of curvature | | axial distance | | refractive index | | Abbe number | |
|---|---|---|---|---|---|---|---|
| $r_1$* | −17.750 | | | | | | |
| | | $d_1$ | 3.200 | $N_1$ | 1.58340 | $\nu_1$ | 30.23 |
| $r_2$* | −46.965 | | | | | | |
| | | $d_2$ | 1.500 | | | | |
| $r_3$ | 42.359 | | | | | | |
| | | $d_3$ | 8.609 | $N_2$ | 1.51728 | $\nu_2$ | 69.68 |
| $r_4$ | −11.648 | | | | | | |
| | | $d_4$ | 13.305∼8.179∼4.399 | | | | |
| $r_5$* | −24.045 | | | | | | |
| | | $d_5$ | 3.000 | $N_3$ | 1.58340 | $\nu_3$ | 30.23 |
| $r_6$* | −17.770 | | | | | | |
| | | $d_6$ | 5.500 | | | | |
| $r_7$ | −10.781 | | | | | | |
| | | $d_7$ | 1.044 | $N_4$ | 1.80750 | $\nu_4$ | 35.43 |
| $r_8$ | −34.640 | | | | | | | aspherical coefficients $r_1$: $\epsilon = 0.21680 \times 10$
$A_4 = 0.15318 \times 10^{-3}$
$A_6 = 0.12171 \times 10^{-5}$
$A_8 = -0.13072 \times 10^{-7}$ $r_2$: $\epsilon = 0.11369 \times 10$
$A_4 = 0.26026 \times 10^{-3}$
$A_6 = 0.26458 \times 10^{-5}$
$A_8 = 0.73430 \times 10^{-8}$ $r_5$: $\epsilon = 0.62310$
$A_4 = 0.45079 \times 10^{-4}$
$A_6 = 0.17834 \times 10^{-6}$
$A_8 = 0.26092 \times 10^{-8}$ $r_6$: $\epsilon = 0.10000 \times 10$
$A_4 = 0.41364 \times 10^{-5}$
$A_6 = 0.14385 \times 10^{-7}$
$A_8 = 0.23560 \times 10^{-9}$ <Example 33>
$f = 29.0 \sim 37.7 \sim 49.0$  $F_{NO} = 4.1 \sim 5.4 \sim 7.0$

| radius of curvature | | axial distance | | refractive index | | Abbe number | |
|---|---|---|---|---|---|---|---|
| $r_1$ | 47.780 | | | | | | |
| | | $d_1$ | 2.850 | $N_1$ | 1.84666 | $\nu_1$ | 23.82 |

-continued

| radius of curvature | axial distance | refractive index | Abbe number |
|---|---|---|---|
| $r_2^*$ 23.111 | | | |
| | $d_2$ 2.900 | | |
| $r_3$ 100.143 | | | |
| | $d_3$ 6.500 | $N_2$ 1.51680 | $\nu_2$ 64.20 |
| $r_4$ −9.497 | | | |
| | $d_4$ 11.220~7.477~4.600 | | |
| $r_5^*$ −31.330 | | | |
| | $d_5$ 2.700 | $N_3$ 1.49140 | $\nu_3$ 57.82 |
| $r_6$ −25.015 | | | |
| | $d_6$ 5.600 | | |
| $r_7$ −9.521 | | | |
| | $d_7$ 1.300 | $N_4$ 1.71700 | $\nu_4$ 47.86 |
| $r_8$ −30.450 | | | | aspherical coefficients $r_2$: $\epsilon = 0.11696 \times 10$
$A_4 = 0.22023 \times 10^{-3}$
$A_6 = 0.22847 \times 10^{-6}$
$A_8 = 0.15116 \times 10^{-6}$
$r_5$: $\epsilon = -0.32119 \times 10^{-1}$
$A_4 = 0.77454 \times 10^{-4}$
$A_6 = 0.59704 \times 10^{-6}$
$A_8 = 0.42290 \times 10^{-8}$ <Example 34>
f = 29.0~39.3~53.3  $F_{NO}$ = 4.1~5.6~7.6

| radius of curvature | axial distance | refractive index | Abbe number |
|---|---|---|---|
| $r_1$ 54.066 | | | |
| | $d_1$ 2.750 | $N_1$ 1.84666 | $\nu_1$ 23.82 |
| $r_2^*$ 25.096 | | | |
| | $d_2$ 2.906 | | |
| $r_3$ 112.796 | | | |
| | $d_3$ 6.401 | $N_2$ 1.51680 | $\nu_2$ 64.20 |
| $r_4$ −9.551 | | | |
| | $d_4$ 11.848~7.676~4.600 | | |
| $r_5^*$ −31.468 | | | |
| | $d_5$ 2.700 | $N_3$ 1.49140 | $\nu_3$ 57.82 |
| $r_6$ −27.442 | | | |
| | $d_6$ 5.600 | | |
| $r_7$ −9.324 | | | |
| | $d_7$ 1.300 | $N_4$ 1.71700 | $\nu_4$ 47.86 |
| $r_8$ −27.664 | | | | aspherical coefficients $r_2$: $\epsilon = 0.11705 \times 10$
$A_4 = 0.21102 \times 10^{-3}$
$A_6 = 0.56685 \times 10^{-6}$
$A_8 = 0.13544 \times 10^{-6}$
$r_5$: $\epsilon = 0.93069 \times 10^{-1}$
$A_4 = 0.84330 \times 10^{-4}$
$A_6 = 0.65716 \times 10^{-6}$
$A_8 = 0.47702 \times 10^{-8}$ <Example 35>
f = 39.3~59.3~77.6  $F_{NO}$ = 3.6~5.4~7.1

| radius of curvature | axial distance | refractive index | Abbe number |
|---|---|---|---|
| $r_1^*$ 27.369 | | | |
| | $d_1$ 6.042 | $N_1$ 1.84666 | $\nu_1$ 23.82 |
| $r_2$ 15.687 | | | |
| | $d_2$ 4.331 | | |
| $r_3$ 36.087 | | | |
| | $d_3$ 4.523 | $N_2$ 1.51680 | $\nu_2$ 64.20 |
| $r_4^*$ −12.241 | | | |
| | $d_4$ 10.281~4.770~2.195 | | |
| $r_5^*$ −32.917 | | | |
| | $d_5$ 3.134 | $N_3$ 1.58340 | $\nu_3$ 30.23 |
| $r_6$ −24.920 | | | |
| | $d_6$ 5.963 | | |
| $r_7$ −11.416 | | | |
| | $d_7$ 1.044 | $N_4$ 1.74250 | $\nu_4$ 52.47 |
| $r_8$ −43.715 | | | | aspherical coefficients $r_1$: $\epsilon = 0.94094$
$A_4 = -0.59352 \times 10^{-4}$
$A_6 = -0.28408 \times 10^{-6}$
$A_8 = -0.75442 \times 10^{-8}$
$A_{10} = 0.22547 \times 10^{-9}$
$A_{12} = -0.37254 \times 10^{-11}$
$r_4$: $\epsilon = 0.15368 \times 10$
$A_4 = 0.42112 \times 10^{-4}$
$A_6 = 0.39801 \times 10^{-6}$
$A_8 = 0.38496 \times 10^{-8}$
$A_{10} = 0.14341 \times 10^{-10}$
$A_{12} = -0.60344 \times 10^{-13}$
$r_5$: $\epsilon = 0.98317$
$A_4 = 0.46130 \times 10^{-4}$
$A_6 = -0.95564 \times 10^{-7}$
$A_8 = 0.73399 \times 10^{-8}$
$A_{10} = -0.55232 \times 10^{-10}$
$A_{12} = 0.35505 \times 10^{-13}$ <Example 36>
f = 39.3~58.5~86.6  $F_{NO}$ = 3.6~5.4~8.0

| radius of curvature | axial distance | refractive index | Abbe number |
|---|---|---|---|
| $r_1^*$ 22.992 | | | |
| | $d_1$ 2.943 | $N_1$ 1.84666 | $\nu_1$ 23.82 |
| $r_2^*$ 15.542 | | | |
| | $d_2$ 4.284 | | |
| $r_3$ 53.885 | | | |
| | $d_3$ 5.221 | $N_2$ 1.51680 | $\nu_2$ 64.20 |
| $r_4$ −12.305 | | | |
| | $d_4$ 12.461~7.385~4.000 | | |
| $r_5^*$ −34.385 | | | |
| | $d_5$ 2.400 | $N_3$ 1.58340 | $\nu_3$ 30.23 |
| $r_6^*$ −28.763 | | | |
| | $d_6$ 5.800 | | |
| $r_7$ −10.364 | | | |
| | $d_7$ 1.044 | $N_4$ 1.74250 | $\nu_4$ 52.47 |
| $r_8$ −31.130 | | | | aspherical coefficients $r_1$: $\epsilon = 0.11243 \times 10$
$A_4 = -0.13352 \times 10^{-3}$
$A_6 = -0.22319 \times 10^{-6}$
$A_8 = -0.18564 \times 10^{-7}$
$A_{10} = 0.27791 \times 10^{-9}$
$A_{12} = -0.29732 \times 10^{-11}$
$r_2$: $\epsilon = 0.15798 \times 10$
$A_4 = -0.97176 \times 10^{-4}$
$A_6 = -0.18961 \times 10^{-6}$
$A_8 = 0.20990 \times 10^{-8}$
$A_{10} = -0.58572 \times 10^{-10}$
$A_{12} = -0.50061 \times 10^{-12}$
$r_5$: $\epsilon = 0.94541$
$A_4 = 0.70385 \times 10^{-4}$
$A_6 = 0.17433 \times 10^{-6}$
$A_8 = 0.13345 \times 10^{-7}$
$A_{10} = -0.27731 \times 10^{-9}$
$A_{12} = 0.18257 \times 10^{-11}$
$r_6$: $\epsilon = 0.99566$
$A_4 = 0.87637 \times 10^{-5}$
$A_6 = 0.27499 \times 10^{-6}$
$A_8 = -0.32285 \times 10^{-8}$
$A_{10} = 0.23672 \times 10^{-12}$
$A_{12} = -0.13116 \times 10^{-13}$ <Example 37>
f = 39.3~59.3~77.6  $F_{NO}$ = 3.6~5.4~7.1

| radius of curvature | axial distance | refractive index | Abbe number |
|---|---|---|---|
| $r_1^*$ 20.501 | | | |
| | $d_1$ 4.000 | $N_1$ 1.84666 | $\nu_1$ 23.82 |
| $r_2$ 13.309 | | | |
| | $d_2$ 4.331 | | |
| $r_3$ 49.305 | | | |
| | $d_3$ 4.523 | $N_2$ 1.51680 | $\nu_2$ 64.20 |
| $r_4^*$ −11.675 | | | |
| | $d_4$ 10.800~4.935~2.195 | | |
| $r_5^*$ −28.492 | | | |
| | $d_5$ 3.134 | $N_3$ 1.58340 | $\nu_3$ 30.23 |
| $r_6^*$ −23.938 | | | |
| | $d_6$ 5.963 | | |
| $r_7$ −11.057 | | | |
| | $d_7$ 1.044 | $N_4$ 1.74250 | $\nu_4$ 52.47 |
| $r_8$ −31.509 | | | | aspherical coefficients $r_1$: $\epsilon = 0.91552$
$A_4 = -0.74248 \times 10^{-4}$
$A_6 = -0.47770 \times 10^{-6}$
$A_8 = -0.11202 \times 10^{-7}$
$A_{10} = 0.20401 \times 10^{-9}$
$A_{12} = -0.38182 \times 10^{-11}$ -continued $r_4$: $\epsilon = 0.16521 \times 10$
$A_4 = 0.36959 \times 10^{-4}$
$A_6 = 0.36908 \times 10^{-6}$
$A_8 = 0.53794 \times 10^{-8}$
$A_{10} = 0.25381 \times 10^{-10}$
$A_{12} = -0.74858 \times 10^{-14}$ $r_5$: $\epsilon = 0.97779$
$A_4 = 0.71668 \times 10^{-4}$
$A_6 = 0.28865 \times 10^{-7}$
$A_8 = 0.60884 \times 10^{-8}$
$A_{10} = -0.64522 \times 10^{-10}$
$A_{12} = 0.60779 \times 10^{-13}$ $r_6$: $\epsilon = 0.99202$
$A_4 = 0.21076 \times 10^{-4}$
$A_6 = 0.73683 \times 10^{-7}$
$A_8 = 0.87149 \times 10^{-11}$
$A_{10} = -0.95783 \times 10^{-12}$
$A_{12} = -0.12345 \times 10^{-12}$

<Example 38>
$f = 29.0 \sim 39.3 \sim 53.3$  $F_{NO} = 4.1 \sim 5.6 \sim 7.6$

| radius of curvature | axial distance | refractive index | Abbe number |
|---|---|---|---|
| $r_1$  58.555 | | | |
| | $d_1$  2.734 | $N_1$  1.84666 | $\nu_1$  23.82 |
| $r_2^*$  26.096 | | | |
| | $d_2$  2.934 | | |
| $r_3$  94.498 | | | |
| | $d_3$  6.402 | $N_2$  1.51680 | $\nu_2$  64.20 |
| $r_4$  −9.642 | | | |
| | $d_4$  11.708~7.617~4.600 | | |
| $r_5^*$  −31.693 | | | |
| | $d_5$  2.700 | $N_3$  1.49140 | $\nu_3$  57.82 |
| $r_6^*$  −28.461 | | | |
| | $d_6$  5.600 | | |
| $r_7$  −9.250 | | | |
| | $d_7$  1.300 | $N_4$  1.71700 | $\nu_4$  47.86 |
| $r_8$  −27.014 | | | | aspherical coefficients $r_2$: $\epsilon = 0.11813 \times 10$
$A_4 = 0.20722 \times 10^{-3}$
$A_6 = 0.57554 \times 10^{-6}$
$A_8 = 0.12510 \times 10^{-6}$ $r_5$: $\epsilon = 0.16584$
$A_4 = 0.90735 \times 10^{-4}$
$A_6 = 0.33958 \times 10^{-6}$
$A_8 = 0.69684 \times 10^{-8}$ $r_6$: $\epsilon = 0.10023 \times 10$
$A_4 = 0.26131 \times 10^{-5}$
$A_6 = -0.79431 \times 10^{-7}$
$A_8 = -0.13306 \times 10^{-8}$

<Example 39>
$f = 29.0 \sim 39.3 \sim 53.3$  $F_{NO} = 4.1 \sim 5.6 \sim 7.6$

| radius of curvature | axial distance | refractive index | Abbe number |
|---|---|---|---|
| $r_1^*$  −23.152 | | | |
| | $d_1$  3.200 | $N_1$  1.58340 | $\nu_1$  30.23 |
| $r_2^*$  −128.929 | | | |
| | $d_2$  1.500 | | |
| $r_3$  47.394 | | | |
| | $d_3$  8.556 | $N_2$  1.51728 | $\nu_2$  69.68 |
| $r_4$  −11.107 | | | |
| | $d_4$  13.287~8.172~4.400 | | |
| $r_5^*$  −19.810 | | | |
| | $d_5$  3.000 | $N_3$  1.58340 | $\nu_3$  30.23 |
| $r_6$  −14.782 | | | |
| | $d_6$  5.500 | | |
| $r_7^*$  −10.603 | | | |
| | $d_7$  1.044 | $N_4$  1.80750 | $\nu_4$  35.43 |
| $r_8$  −36.267 | | | | aspherical coefficients $r_1$: $\epsilon = 0.23111 \times 10$
$A_4 = 0.11200 \times 10^{-3}$
$A_6 = 0.84687 \times 10^{-6}$
$A_8 = -0.12491 \times 10^{-7}$ $r_2$: $\epsilon = 0.11805 \times 10$
$A_4 = 0.27319 \times 10^{-3}$
$A_6 = 0.28523 \times 10^{-5}$
$A_8 = 0.12017 \times 10^{-7}$ $r_5$: $\epsilon = 0.63667$
$A_4 = 0.24033 \times 10^{-4}$
$A_6 = 0.11763 \times 10^{-6}$
$A_8 = 0.10013 \times 10^{-8}$ $r_7$: $\epsilon = 0.84961$
$A_4 = -0.40555 \times 10^{-5}$
$A_6 = -0.19877 \times 10^{-6}$
$A_8 = 0.81245 \times 10^{-9}$

<Example 40>
$f = 39.3 \sim 59.3 \sim 77.6$  $F_{NO} = 3.6 \sim 5.4 \sim 7.1$

| radius of curvature | axial distance | refractive index | Abbe number |
|---|---|---|---|
| $r_1^*$  18.470 | | | |
| | $d_1$  4.000 | $N_1$  1.84666 | $\nu_1$  23.82 |
| $r_2$  11.545 | | | |
| | $d_2$  4.333 | | |
| $r_3^*$  39.577 | | | |
| | $d_3$  4.520 | $N_2$  1.51680 | $\nu_2$  64.20 |
| $r_4$  −11.521 | | | |
| | $d_4$  10.754~4.921~2.196 | | |
| $r_5^*$  −23.871 | | | |
| | $d_5$  3.142 | $N_3$  1.58340 | $\nu_3$  30.23 |
| $r_6$  −18.796 | | | |
| | $d_6$  5.928 | | |
| $r_7^*$  −11.123 | | | |
| | $d_7$  1.044 | $N_4$  1.74250 | $\nu_4$  52.47 |
| $r_8$  −38.151 | | | | aspherical coefficients $r_1$: $\epsilon = 0.91393$
$A_4 = -0.78212 \times 10^{-4}$
$A_6 = -0.54025 \times 10^{-6}$
$A_8 = -0.11950 \times 10^{-7}$
$A_{10} = 0.20314 \times 10^{-9}$
$A_{12} = -0.38096 \times 10^{-11}$ $r_3$: $\epsilon = 0.10057 \times 10$
$A_4 = 0.30998 \times 10^{-4}$
$A_6 = 0.33398 \times 10^{-6}$
$A_8 = 0.94506 \times 10^{-9}$ $r_5$: $\epsilon = 0.98593$
$A_4 = 0.47405 \times 10^{-4}$
$A_6 = -0.29894 \times 10^{-6}$
$A_8 = 0.64291 \times 10^{-8}$
$A_{10} = -0.59906 \times 10^{-10}$
$A_{12} = 0.20875 \times 10^{-13}$ $r_7$: $\epsilon = 0.78273$
$A_4 = -0.18788 \times 10^{-4}$
$A_6 = -0.31898 \times 10^{-6}$
$A_8 = 0.16678 \times 10^{-8}$

<Example 41>
$f = 29.0 \sim 37.7 \sim 49.0$  $F_{NO} = 4.1 \sim 5.4 \sim 7.0$

| radius of curvature | axial distance | refractive index | Abbe number |
|---|---|---|---|
| $r_1^*$  −36.285 | | | |
| | $d_1$  2.900 | $N_1$  1.84666 | $\nu_1$  23.82 |
| $r_2^*$  −169.157 | | | |
| | $d_2$  2.000 | | |
| $r_3$  381.781 | | | |
| | $d_3$  5.800 | $N_2$  1.51680 | $\nu_2$  64.20 |
| $r_4$  −9.224 | | | |
| | $d_4$  10.946~7.245~4.400 | | |
| $r_5^*$  −74.315 | | | |
| | $d_5$  2.800 | $N_3$  1.49140 | $\nu_3$  57.82 |
| $r_6$  −75.238 | | | |
| | $d_6$  6.400 | | |
| $r_7$  −9.686 | | | |
| | $d_7$  1.100 | $N_4$  1.74400 | $\nu_4$  44.93 |
| $r_8$  −24.664 | | | | aspherical coefficients $r_1$: $\epsilon = 0.10011 \times 10$
$A_4 = -0.10884 \times 10^{-5}$
$A_6 = 0.30799 \times 10^{-6}$
$A_8 = 0.17353 \times 10^{-8}$ $r_2$: $\epsilon = 0.36082$
$A_4 = 0.24372 \times 10^{-3}$
$A_6 = -0.41879 \times 10^{-6}$
$A_8 = 0.16047 \times 10^{-6}$ $r_5$: $\epsilon = -0.22153 \times 10$
$A_4 = 0.96871 \times 10^{-4}$
$A_6 = 0.22152 \times 10^{-6}$
$A_8 = 0.47779 \times 10^{-8}$ -continued <Example 42>
f = 29.0~37.7~49.0   $F_{NO} = 4.1~5.4~7.0$

| | radius of curvature | | axial distance | | refractive index | | Abbe number |
|---|---|---|---|---|---|---|---|
| $r_1$ | −43.159 | | | | | | |
| | | $d_1$ | 2.900 | $N_1$ | 1.84666 | $\nu_1$ | 23.82 |
| $r_2$* | −652.307 | | | | | | |
| | | $d_2$ | 2.000 | | | | |
| $r_3$ | 891.035 | | | | | | |
| | | $d_3$ | 5.800 | $N_2$ | 1.51680 | $\nu_2$ | 64.20 |
| $r_4$ | −9.071 | | | | | | |
| | | $d_4$ | 11.017~7.276~4.400 | | | | |
| $r_5$* | −113.778 | | | | | | |
| | | $d_5$ | 2.800 | $N_3$ | 1.49140 | $\nu_3$ | 57.82 |
| $r_6$ | −186.823 | | | | | | |
| | | $d_6$ | 6.400 | | | | |
| $r_7$ | −9.703 | | | | | | |
| | | $d_7$ | 1.100 | $N_4$ | 1.74400 | $\nu_4$ | 44.93 |
| $r_8$ | −23.039 | | | | | | | aspherical coefficients $r_2$: $\epsilon = 0.35784$
$A_4 = 0.25393 \times 10^{-3}$
$A_6 = -0.40986 \times 10^{-6}$
$A_8 = 0.16116 \times 10^{-6}$ $r_5$: $\epsilon = -0.22234 \times 10$
$A_4 = 0.95134 \times 10^{-4}$
$A_6 = 0.18063 \times 10^{-6}$
$A_8 = 0.44677 \times 10^{-8}$ <Example 43>
f = 29.0~37.7~49.0   $F_{NO} = 4.1~5.4~7.0$

| | radius of curvature | | axial distance | | refractive index | | Abbe number |
|---|---|---|---|---|---|---|---|
| $r_1$ | −42.102 | | | | | | |
| | | $d_1$ | 2.900 | $N_1$ | 1.84666 | $\nu_1$ | 23.82 |
| $r_2$* | −348.602 | | | | | | |
| | | $d_2$ | 2.000 | | | | |
| $r_3$ | 308.875 | | | | | | |
| | | $d_3$ | 5.800 | $N_2$ | 1.51680 | $\nu_2$ | 64.20 |
| $r_4$ | −9.318 | | | | | | |
| | | $d_4$ | 11.242~7.374~4.400 | | | | |
| $r_5$* | −95.091 | | | | | | |
| | | $d_5$ | 2.800 | $N_3$ | 1.49140 | $\nu_3$ | 57.82 |
| $r_6$ | −173.880 | | | | | | |
| | | $d_6$ | 6.400 | | | | |
| $r_7$ | −9.086 | | | | | | |
| | | $d_7$ | 1.100 | $N_4$ | 1.74400 | $\nu_4$ | 44.93 |
| $r_8$ | −19.039 | | | | | | | aspherical coefficients $r_2$: $\epsilon = 0.12747 \times 10$
$A_4 = 0.23311 \times 10^{-3}$
$A_6 = -0.84227 \times 10^{-7}$
$A_8 = 0.12900 \times 10^{-6}$ $r_5$: $\epsilon = 0.31748$
$A_4 = 0.11215 \times 10^{-3}$
$A_6 = 0.12314 \times 10^{-6}$
$A_8 = 0.83689 \times 10^{-8}$

TABLE 1

[Example 1]

| y | $A_{FR}$*1 $r_6$ | $A_{RE}$*2 $r_8$ | $r_{10}$ |
|---|---|---|---|
| 0.1 $y_{MAX}$ | $-0.923 \times 10^{-6}$ | $-0.320 \times 10^{-5}$ | $-0.341 \times 10^{-6}$ |
| 0.2 $y_{MAX}$ | $-0.748 \times 10^{-5}$ | $-0.257 \times 10^{-4}$ | $-0.287 \times 10^{-5}$ |
| 0.3 $y_{MAX}$ | $-0.255 \times 10^{-4}$ | $-0.881 \times 10^{-4}$ | $-0.105 \times 10^{-4}$ |
| 0.4 $y_{MAX}$ | $-0.609 \times 10^{-4}$ | $-0.213 \times 10^{-3}$ | $-0.259 \times 10^{-4}$ |
| 0.5 $y_{MAX}$ | $-0.120 \times 10^{-3}$ | $-0.424 \times 10^{-3}$ | $-0.529 \times 10^{-4}$ |
| 0.6 $y_{MAX}$ | $-0.211 \times 10^{-3}$ | $-0.748 \times 10^{-3}$ | $-0.115 \times 10^{-3}$ |
| 0.7 $y_{MAX}$ | $-0.339 \times 10^{-3}$ | $-0.121 \times 10^{-2}$ | $-0.324 \times 10^{-3}$ |
| 0.8 $y_{MAX}$ | $-0.514 \times 10^{-3}$ | $-0.182 \times 10^{-2}$ | $-0.107 \times 10^{-2}$ |
| 0.9 $y_{MAX}$ | $-0.744 \times 10^{-3}$ | $-0.262 \times 10^{-2}$ | $-0.341 \times 10^{-2}$ |
| 1.0 $y_{MAX}$ | $-0.104 \times 10^{-2}$ | $-0.374 \times 10^{-2}$ | $-0.989 \times 10^{-2}$ |

*1 $A_{FR} = 100_1 \cdot (N'-N) \cdot d\{x(y)-x_0(y)\}/dy$
*2 $A_{RE} = 100_2 \cdot (N'-N) \cdot d\{x(y)-x_0(y)\}/dy$

TABLE 2

[Example 2]

| y | $A_{FR}$ $r_1$ | $r_4$ | $r_6$ | $A_{RE}$ $r_8$ | $r_{10}$ |
|---|---|---|---|---|---|
| 0.1 $y_{MAX}$ | $0.245 \times 10^{-4}$ | $-0.576 \times 10^{-4}$ | $-0.173 \times 10^{-5}$ | $-0.588 \times 10^{-5}$ | $-0.135 \times 10^{-6}$ |
| 0.2 $y_{MAX}$ | $0.506 \times 10^{-4}$ | $-0.117 \times 10^{-3}$ | $-0.866 \times 10^{-5}$ | $-0.479 \times 10^{-4}$ | $-0.155 \times 10^{-5}$ |
| 0.3 $y_{MAX}$ | $0.803 \times 10^{-4}$ | $-0.180 \times 10^{-3}$ | $-0.261 \times 10^{-4}$ | $-0.166 \times 10^{-3}$ | $-0.602 \times 10^{-5}$ |
| 0.4 $y_{MAX}$ | $0.115 \times 10^{-3}$ | $-0.249 \times 10^{-3}$ | $-0.597 \times 10^{-4}$ | $-0.408 \times 10^{-3}$ | $-0.134 \times 10^{-4}$ |
| 0.5 $y_{MAX}$ | $0.159 \times 10^{-3}$ | $-0.325 \times 10^{-3}$ | $-0.115 \times 10^{-3}$ | $-0.833 \times 10^{-3}$ | $-0.194 \times 10^{-4}$ |
| 0.6 $y_{MAX}$ | $0.213 \times 10^{-3}$ | $-0.414 \times 10^{-3}$ | $-0.198 \times 10^{-3}$ | $-0.152 \times 10^{-2}$ | $-0.304 \times 10^{-4}$ |
| 0.7 $y_{MAX}$ | $0.283 \times 10^{-3}$ | $-0.516 \times 10^{-3}$ | $-0.316 \times 10^{-3}$ | $-0.257 \times 10^{-2}$ | $-0.113 \times 10^{-3}$ |
| 0.8 $y_{MAX}$ | $0.373 \times 10^{-3}$ | $-0.635 \times 10^{-3}$ | $-0.478 \times 10^{-3}$ | $-0.415 \times 10^{-2}$ | $-0.489 \times 10^{-3}$ |
| 0.9 $y_{MAX}$ | $0.491 \times 10^{-3}$ | $-0.774 \times 10^{-3}$ | $-0.692 \times 10^{-3}$ | $-0.667 \times 10^{-2}$ | $-0.163 \times 10^{-2}$ |
| 1.0 $y_{MAX}$ | $0.648 \times 10^{-3}$ | $-0.934 \times 10^{-3}$ | $-0.969 \times 10^{-3}$ | $-1.11 \times 10^{-1}$ | $-0.419 \times 10^{-2}$ |

TABLE 3

[Example 3]

| y | $A_{FR}$ $r_1$ | $r_4$ | $r_6$ | $A_{RE}$ $r_8$ | $r_{10}$ |
|---|---|---|---|---|---|
| 0.1 $y_{MAX}$ | $0.177 \times 10^{-6}$ | $-0.295 \times 10^{-7}$ | $-0.864 \times 10^{-6}$ | $-0.390 \times 10^{-5}$ | $-0.142 \times 10^{-6}$ |
| 0.2 $y_{MAX}$ | $0.136 \times 10^{-5}$ | $-0.295 \times 10^{-7}$ | $-0.699 \times 10^{-5}$ | $-0.317 \times 10^{-4}$ | $-0.118 \times 10^{-4}$ |
| 0.3 $y_{MAX}$ | $0.467 \times 10^{-5}$ | $-0.147 \times 10^{-6}$ | $-0.237 \times 10^{-4}$ | $-0.110 \times 10^{-3}$ | $-0.413 \times 10^{-4}$ |
| 0.4 $y_{MAX}$ | $0.114 \times 10^{-4}$ | $-0.413 \times 10^{-6}$ | $-0.565 \times 10^{-4}$ | $-0.269 \times 10^{-3}$ | $-0.101 \times 10^{-3}$ |
| 0.5 $y_{MAX}$ | $0.229 \times 10^{-4}$ | $-0.103 \times 10^{-5}$ | $-0.111 \times 10^{-3}$ | $-0.544 \times 10^{-3}$ | $-0.203 \times 10^{-3}$ |
| 0.6 $y_{MAX}$ | $0.413 \times 10^{-4}$ | $-0.218 \times 10^{-5}$ | $-0.194 \times 10^{-3}$ | $-0.973 \times 10^{-3}$ | $-0.399 \times 10^{-3}$ |
| 0.7 $y_{MAX}$ | $0.688 \times 10^{-4}$ | $-0.424 \times 10^{-5}$ | $-0.310 \times 10^{-3}$ | $-0.159 \times 10^{-2}$ | $-0.888 \times 10^{-3}$ |
| 0.8 $y_{MAX}$ | $0.109 \times 10^{-3}$ | $-0.775 \times 10^{-5}$ | $-0.468 \times 10^{-3}$ | $-0.242 \times 10^{-2}$ | $-0.235 \times 10^{-2}$ |
| 0.9 $y_{MAX}$ | $0.165 \times 10^{-3}$ | $-0.134 \times 10^{-4}$ | $-0.675 \times 10^{-3}$ | $-0.352 \times 10^{-2}$ | $-0.663 \times 10^{-2}$ |
| 1.0 $y_{MAX}$ | $0.244 \times 10^{-3}$ | $-0.220 \times 10^{-4}$ | $-0.937 \times 10^{-3}$ | $-0.501 \times 10^{-2}$ | $-0.182 \times 10^{-1}$ |

TABLE 4

[Example 4]

| y | $A_{FR}$ | | | $A_{RE}$ |
|---|---|---|---|---|
| | $r_1$ | $r_4$ | $r_6$ | $r_8$ |
| 0.1 $y_{MAX}$ | $0.319 \times 10^{-6}$ | $-0.426 \times 10^{-6}$ | $-0.110 \times 10^{-5}$ | $-0.577 \times 10^{-5}$ |
| 0.2 $y_{MAX}$ | $0.259 \times 10^{-5}$ | $-0.333 \times 10^{-5}$ | $-0.877 \times 10^{-5}$ | $-0.449 \times 10^{-4}$ |
| 0.3 $y_{MAX}$ | $0.879 \times 10^{-5}$ | $-0.112 \times 10^{-4}$ | $-0.297 \times 10^{-4}$ | $-0.144 \times 10^{-3}$ |
| 0.4 $y_{MAX}$ | $0.210 \times 10^{-4}$ | $-0.263 \times 10^{-4}$ | $-0.710 \times 10^{-4}$ | $-0.321 \times 10^{-3}$ |
| 0.5 $y_{MAX}$ | $0.416 \times 10^{-4}$ | $-0.508 \times 10^{-4}$ | $-0.140 \times 10^{-3}$ | $-0.580 \times 10^{-3}$ |
| 0.6 $y_{MAX}$ | $0.729 \times 10^{-4}$ | $-0.864 \times 10^{-4}$ | $-0.245 \times 10^{-3}$ | $-0.927 \times 10^{-3}$ |
| 0.7 $y_{MAX}$ | $0.118 \times 10^{-3}$ | $-0.134 \times 10^{-3}$ | $-0.396 \times 10^{-3}$ | $-0.138 \times 10^{-2}$ |
| 0.8 $y_{MAX}$ | $0.178 \times 10^{-3}$ | $-0.195 \times 10^{-3}$ | $-0.602 \times 10^{-3}$ | $-0.197 \times 10^{-2}$ |
| 0.9 $y_{MAX}$ | $0.258 \times 10^{-3}$ | $-0.268 \times 10^{-3}$ | $-0.879 \times 10^{-3}$ | $-0.271 \times 10^{-2}$ |
| 1.0 $y_{MAX}$ | $0.360 \times 10^{-3}$ | $-0.349 \times 10^{-3}$ | $-0.124 \times 10^{-2}$ | $-0.333 \times 10^{-2}$ |

TABLE 5

[Example 5]

| y | $A_{FR}$ | | | $A_{RE}$ | |
|---|---|---|---|---|---|
| | $r_1$ | $r_4$ | $r_6$ | $r_8$ | $r_{10}$ |
| 0.1 $y_{MAX}$ | $-0.110 \times 10^{-5}$ | $-0.265 \times 10^{-6}$ | $-0.134 \times 10^{-5}$ | $-0.419 \times 10^{-5}$ | $0.115 \times 10^{-5}$ |
| 0.2 $y_{MAX}$ | $-0.884 \times 10^{-5}$ | $-0.206 \times 10^{-5}$ | $-0.108 \times 10^{-4}$ | $-0.330 \times 10^{-4}$ | $0.960 \times 10^{-5}$ |
| 0.3 $y_{MAX}$ | $-0.301 \times 10^{-4}$ | $-0.695 \times 10^{-5}$ | $-0.372 \times 10^{-4}$ | $-0.109 \times 10^{-3}$ | $0.333 \times 10^{-4}$ |
| 0.4 $y_{MAX}$ | $-0.723 \times 10^{-4}$ | $-0.164 \times 10^{-4}$ | $-0.905 \times 10^{-4}$ | $-0.251 \times 10^{-3}$ | $0.766 \times 10^{-4}$ |
| 0.5 $y_{MAX}$ | $-0.144 \times 10^{-3}$ | $-0.317 \times 10^{-4}$ | $-0.182 \times 10^{-3}$ | $-0.466 \times 10^{-3}$ | $0.127 \times 10^{-3}$ |
| 0.6 $y_{MAX}$ | $-0.255 \times 10^{-3}$ | $-0.536 \times 10^{-4}$ | $-0.327 \times 10^{-3}$ | $-0.742 \times 10^{-2}$ | $0.137 \times 10^{-3}$ |
| 0.7 $y_{MAX}$ | $-0.417 \times 10^{-3}$ | $-0.819 \times 10^{-4}$ | $-0.542 \times 10^{-3}$ | $-0.101 \times 10^{-2}$ | $-0.107 \times 10^{-5}$ |
| 0.8 $y_{MAX}$ | $-0.644 \times 10^{-3}$ | $-0.115 \times 10^{-3}$ | $-0.849 \times 10^{-3}$ | $-0.108 \times 10^{-2}$ | $-0.456 \times 10^{-3}$ |
| 0.9 $y_{MAX}$ | $-0.953 \times 10^{-3}$ | $-0.146 \times 10^{-3}$ | $-0.128 \times 10^{-2}$ | $-0.430 \times 10^{-3}$ | $-0.142 \times 10^{-2}$ |
| 1.0 $y_{MAX}$ | $-0.138 \times 10^{-2}$ | $-0.168 \times 10^{-3}$ | $-0.187 \times 10^{-2}$ | $0.217 \times 10^{-2}$ | $-0.295 \times 10^{-2}$ |

TABLE 6

[Example 6]

| y | $A_{FR}$ | | | $A_{RE}$ | |
|---|---|---|---|---|---|
| | $r_1$ | $r_2$ | $r_4$ | $r_5$ | $r_7$ |
| 0.1 $y_{MAX}$ | $-3.78 \times 10^{-6}$ | $-1.14 \times 10^{-6}$ | $-2.73 \times 10^{-7}$ | $-1.06 \times 10^{-6}$ | $-1.58 \times 10^{-6}$ |
| 0.2 $y_{MAX}$ | $-2.99 \times 10^{-5}$ | $-9.58 \times 10^{-6}$ | $-2.09 \times 10^{-6}$ | $-8.19 \times 10^{-6}$ | $-1.22 \times 10^{-5}$ |
| 0.3 $y_{MAX}$ | $-9.86 \times 10^{-5}$ | $-3.52 \times 10^{-5}$ | $-7.12 \times 10^{-6}$ | $-2.63 \times 10^{-5}$ | $-3.88 \times 10^{-5}$ |
| 0.4 $y_{MAX}$ | $-2.27 \times 10^{-4}$ | $-9.33 \times 10^{-5}$ | $-1.69 \times 10^{-5}$ | $-5.81 \times 10^{-5}$ | $-8.93 \times 10^{-5}$ |
| 0.5 $y_{MAX}$ | $-4.29 \times 10^{-4}$ | $-2.06 \times 10^{-4}$ | $-3.32 \times 10^{-5}$ | $-1.02 \times 10^{-4}$ | $-1.87 \times 10^{-4}$ |
| 0.6 $y_{MAX}$ | $-7.20 \times 10^{-4}$ | $-4.08 \times 10^{-4}$ | $-5.78 \times 10^{-5}$ | $-1.53 \times 10^{-4}$ | $-4.12 \times 10^{-4}$ |
| 0.7 $y_{MAX}$ | $-1.12 \times 10^{-3}$ | $-7.43 \times 10^{-4}$ | $-9.26 \times 10^{-5}$ | $-2.26 \times 10^{-4}$ | $-1.00 \times 10^{-3}$ |
| 0.8 $y_{MAX}$ | $-1.68 \times 10^{-3}$ | $-1.27 \times 10^{-3}$ | $-1.40 \times 10^{-4}$ | $-2.26 \times 10^{-4}$ | $-2.67 \times 10^{-3}$ |
| 0.9 $y_{MAX}$ | $-2.46 \times 10^{-3}$ | $-2.07 \times 10^{-3}$ | $-2.02 \times 10^{-4}$ | $-2.03 \times 10^{-4}$ | $-7.66 \times 10^{-3}$ |
| 1.0 $y_{MAX}$ | $-3.61 \times 10^{-3}$ | $-3.23 \times 10^{-3}$ | $-2.83 \times 10^{-4}$ | $-9.90 \times 10^{-5}$ | $-0.02648$ |

TABLE 7

[Example 7]

| y | $A_{FR}$ | | | $A_{RE}$ |
|---|---|---|---|---|
| | $r_1$ | $r_2$ | $r_4$ | $r_5$ |
| 0.1 $y_{MAX}$ | $-1.76 \times 10^{-6}$ | $6.19 \times 10^{-8}$ | $-3.20 \times 10^{-7}$ | $-3.47 \times 10^{-6}$ |
| 0.2 $y_{MAX}$ | $-1.41 \times 10^{-5}$ | $2.47 \times 10^{-7}$ | $-2.45 \times 10^{-6}$ | $-2.69 \times 10^{-5}$ |
| 0.3 $y_{MAX}$ | $-4.76 \times 10^{-5}$ | $2.16 \times 10^{-7}$ | $-8.09 \times 10^{-6}$ | $-8.87 \times 10^{-5}$ |
| 0.4 $y_{MAX}$ | $-1.12 \times 10^{-4}$ | $-1.67 \times 10^{-6}$ | $-1.87 \times 10^{-5}$ | $-2.08 \times 10^{-4}$ |
| 0.5 $y_{MAX}$ | $-2.20 \times 10^{-4}$ | $-8.98 \times 10^{-6}$ | $-3.57 \times 10^{-5}$ | $-4.10 \times 10^{-4}$ |
| 0.6 $y_{MAX}$ | $-3.82 \times 10^{-4}$ | $-2.84 \times 10^{-5}$ | $-6.01 \times 10^{-5}$ | $-7.31 \times 10^{-4}$ |
| 0.7 $y_{MAX}$ | $-6.12 \times 10^{-4}$ | $-7.13 \times 10^{-5}$ | $-9.30 \times 10^{-5}$ | $-1.22 \times 10^{-3}$ |
| 0.8 $y_{MAX}$ | $-9.23 \times 10^{-4}$ | $-1.55 \times 10^{-4}$ | $-1.34 \times 10^{-4}$ | $-1.97 \times 10^{-3}$ |
| 0.9 $y_{MAX}$ | $-1.33 \times 10^{-3}$ | $-3.06 \times 10^{-4}$ | $-1.85 \times 10^{-4}$ | $-3.07 \times 10^{-3}$ |
| 1.0 $y_{MAX}$ | $-1.86 \times 10^{-3}$ | $-5.64 \times 10^{-4}$ | $-2.42 \times 10^{-4}$ | $-4.64 \times 10^{-3}$ |

TABLE 8

[Example 8]

| y | $A_{FR}$ | | | $A_{RE}$ |
|---|---|---|---|---|
| | $r_1$ | $r_2$ | $r_4$ | $r_5$ |
| 0.1 $y_{MAX}$ | $-3.21 \times 10^{-6}$ | $2.41 \times 10^{-6}$ | $-5.89 \times 10^{-7}$ | $-2.70 \times 10^{-6}$ |
| 0.2 $y_{MAX}$ | $-2.59 \times 10^{-5}$ | $1.94 \times 10^{-5}$ | $-4.69 \times 10^{-6}$ | $-2.15 \times 10^{-5}$ |
| 0.3 $y_{MAX}$ | $-8.82 \times 10^{-5}$ | $6.55 \times 10^{-5}$ | $-1.59 \times 10^{-5}$ | $-7.25 \times 10^{-5}$ |
| 0.4 $y_{MAX}$ | $-2.11 \times 10^{-4}$ | $1.55 \times 10^{-4}$ | $-3.81 \times 10^{-5}$ | $-1.72 \times 10^{-4}$ |
| 0.5 $y_{MAX}$ | $-4.18 \times 10^{-4}$ | $3.03 \times 10^{-4}$ | $-7.54 \times 10^{-5}$ | $-3.41 \times 10^{-4}$ |
| 0.6 $y_{MAX}$ | $-7.36 \times 10^{-4}$ | $5.23 \times 10^{-4}$ | $-1.32 \times 10^{-4}$ | $-6.08 \times 10^{-4}$ |
| 0.7 $y_{MAX}$ | $-1.19 \times 10^{-3}$ | $8.26 \times 10^{-4}$ | $-2.13 \times 10^{-4}$ | $-1.01 \times 10^{-3}$ |
| 0.8 $y_{MAX}$ | $-1.81 \times 10^{-3}$ | $1.22 \times 10^{-3}$ | $-3.23 \times 10^{-4}$ | $-1.61 \times 10^{-3}$ |
| 0.9 $y_{MAX}$ | $-2.64 \times 10^{-3}$ | $1.70 \times 10^{-3}$ | $-4.69 \times 10^{-4}$ | $-2.47 \times 10^{-3}$ |
| 1.0 $y_{MAX}$ | $-3.73 \times 10^{-3}$ | $2.27 \times 10^{-3}$ | $-6.53 \times 10^{-4}$ | $-3.65 \times 10^{-3}$ |

TABLE 9

[Example 9]

| y | $A_{FR}$ | | | $A_{RE}$ |
|---|---|---|---|---|
| | $r_1$ | $r_2$ | $r_4$ | $r_5$ |
| 0.1 $y_{MAX}$ | $-2.28 \times 10^{-6}$ | $1.03 \times 10^{-6}$ | $-3.93 \times 10^{-7}$ | $-2.94 \times 10^{-6}$ |
| 0.2 $y_{MAX}$ | $-1.83 \times 10^{-5}$ | $8.22 \times 10^{-6}$ | $-3.14 \times 10^{-6}$ | $-2.36 \times 10^{-5}$ |
| 0.3 $y_{MAX}$ | $-6.22 \times 10^{-5}$ | $2.74 \times 10^{-5}$ | $-1.07 \times 10^{-5}$ | $-7.99 \times 10^{-5}$ |
| 0.4 $y_{MAX}$ | $-1.48 \times 10^{-4}$ | $6.40 \times 10^{-5}$ | $-2.57 \times 10^{-5}$ | $-1.91 \times 10^{-4}$ |
| 0.5 $y_{MAX}$ | $-2.92 \times 10^{-4}$ | $1.22 \times 10^{-4}$ | $-5.11 \times 10^{-5}$ | $-3.85 \times 10^{-4}$ |
| 0.6 $y_{MAX}$ | $-5.10 \times 10^{-4}$ | $2.04 \times 10^{-4}$ | $-9.04 \times 10^{-5}$ | $-6.91 \times 10^{-4}$ |
| 0.7 $y_{MAX}$ | $-8.20 \times 10^{-4}$ | $3.11 \times 10^{-4}$ | $-1.47 \times 10^{-4}$ | $-1.18 \times 10^{-3}$ |
| 0.8 $y_{MAX}$ | $-1.24 \times 10^{-3}$ | $4.37 \times 10^{-4}$ | $-2.27 \times 10^{-4}$ | $-1.92 \times 10^{-3}$ |
| 0.9 $y_{MAX}$ | $-1.79 \times 10^{-3}$ | $5.74 \times 10^{-4}$ | $-3.35 \times 10^{-4}$ | $-3.00 \times 10^{-3}$ |
| 1.0 $y_{MAX}$ | $-2.50 \times 10^{-3}$ | $7.02 \times 10^{-4}$ | $-4.78 \times 10^{-4}$ | $-4.49 \times 10^{-3}$ |

TABLE 10

[Example 10]

| y | $A_{FR}$ | | | $A_{RE}$ | |
|---|---|---|---|---|---|
| | $r_1$ | $r_2$ | $r_4$ | $r_5$ | $r_6$ |
| 0.1 $y_{MAX}$ | $-1.12 \times 10^{-6}$ | $-6.64 \times 10^{-6}$ | $-6.04 \times 10^{-6}$ | $-6.04 \times 10^{-6}$ | $6.80 \times 10^{-6}$ |
| 0.2 $y_{MAX}$ | $-9.08 \times 10^{-6}$ | $-5.40 \times 10^{-6}$ | $-4.19 \times 10^{-6}$ | $-4.71 \times 10^{-5}$ | $5.41 \times 10^{-5}$ |
| 0.3 $y_{MAX}$ | $-3.10 \times 10^{-5}$ | $-1.86 \times 10^{-5}$ | $-1.42 \times 10^{-5}$ | $-1.53 \times 10^{-4}$ | $-6.83 \times 10^{-3}$ |
| 0.4 $y_{MAX}$ | $-7.54 \times 10^{-5}$ | $-4.53 \times 10^{-5}$ | $-3.41 \times 10^{-5}$ | $-3.43 \times 10^{-4}$ | $3.86 \times 10^{-4}$ |
| 0.5 $y_{MAX}$ | $-1.53 \times 10^{-4}$ | $-9.12 \times 10^{-5}$ | $-6.73 \times 10^{-5}$ | $-6.14 \times 10^{-4}$ | $6.35 \times 10^{-4}$ |
| 0.6 $y_{MAX}$ | $-2.79 \times 10^{-4}$ | $-1.62 \times 10^{-4}$ | $-1.23 \times 10^{-4}$ | $-9.09 \times 10^{-4}$ | $7.90 \times 10^{-4}$ |
| 0.7 $y_{MAX}$ | $-4.75 \times 10^{-4}$ | $-2.62 \times 10^{-4}$ | $-1.90 \times 10^{-4}$ | $-1.07 \times 10^{-3}$ | $1.57 \times 10^{-2}$ |
| 0.8 $y_{MAX}$ | $-7.80 \times 10^{-4}$ | $-3.90 \times 10^{-4}$ | $-2.91 \times 10^{-4}$ | $-8.09 \times 10^{-4}$ | $6.30 \times 10^{-5}$ |
| 0.9 $y_{MAX}$ | $-1.26 \times 10^{-3}$ | $-5.31 \times 10^{-4}$ | $-4.30 \times 10^{-4}$ | $6.74 \times 10^{-5}$ | $-2.18 \times 10^{-2}$ |
| 1.0 $y_{MAX}$ | $-2.18 \times 10^{-3}$ | $-6.37 \times 10^{-4}$ | $-6.30 \times 10^{-4}$ | $8.31 \times 10^{-4}$ | $-2.61 \times 10^{-3}$ |

TABLE 11

[Example 11]

| y | $A_{FR}$ | | | $A_{RE}$ | |
|---|---|---|---|---|---|
| | $r_1$ | $r_2$ | $r_4$ | $r_5$ | $r_6$ |
| 0.1 $y_{MAX}$ | $-6.48 \times 10^{-7}$ | $-6.19 \times 10^{-7}$ | $-5.48 \times 10^{-7}$ | $-4.59 \times 10^{-5}$ | $5.57 \times 10^{-6}$ |
| 0.2 $y_{MAX}$ | $-5.22 \times 10^{-6}$ | $-4.77 \times 10^{-6}$ | $-4.35 \times 10^{-6}$ | $-1.59 \times 10^{-4}$ | $4.45 \times 10^{-5}$ |
| 0.3 $y_{MAX}$ | $-1.80 \times 10^{-5}$ | $-1.64 \times 10^{-5}$ | $-1.47 \times 10^{-5}$ | $-3.68 \times 10^{-4}$ | $1.47 \times 10^{-4}$ |
| 0.4 $y_{MAX}$ | $-4.41 \times 10^{-5}$ | $-3.94 \times 10^{-5}$ | $-3.50 \times 10^{-5}$ | $-6.67 \times 10^{-4}$ | $3.26 \times 10^{-4}$ |
| 0.5 $y_{MAX}$ | $-9.09 \times 10^{-5}$ | $-7.85 \times 10^{-5}$ | $-6.88 \times 10^{-5}$ | $-9.94 \times 10^{-4}$ | $5.38 \times 10^{-4}$ |
| 0.6 $y_{MAX}$ | $-1.69 \times 10^{-4}$ | $-1.38 \times 10^{-4}$ | $-1.20 \times 10^{-4}$ | $-1.17 \times 10^{-3}$ | $6.53 \times 10^{-4}$ |
| 0.7 $y_{MAX}$ | $-2.95 \times 10^{-4}$ | $-2.20 \times 10^{-4}$ | $-1.93 \times 10^{-4}$ | $-8.72 \times 10^{-4}$ | $4.39 \times 10^{-4}$ |
| 0.8 $y_{MAX}$ | $-4.93 \times 10^{-4}$ | $-3.19 \times 10^{-4}$ | $-2.93 \times 10^{-4}$ | $1.29 \times 10^{-4}$ | $-3.18 \times 10^{-4}$ |
| 0.9 $y_{MAX}$ | $-8.13 \times 10^{-4}$ | $-4.04 \times 10^{-4}$ | $-4.28 \times 10^{-4}$ | $9.64 \times 10^{-4}$ | $-1.45 \times 10^{-3}$ |
| 1.0 $y_{MAX}$ | $-1.36 \times 10^{-3}$ | $-3.84 \times 10^{-4}$ | $-6.08 \times 10^{-4}$ | $8.82 \times 10^{-4}$ | $-1.58 \times 10^{-3}$ |

TABLE 12

[Example 12]

| y | $A_{FR}$ | | | $A_{RE}$ | |
|---|---|---|---|---|---|
| | $r_1$ | $r_2$ | $r_4$ | $r_5$ | $r_6$ |
| 0.1 $y_{MAX}$ | $-0.516 \times 10^{-6}$ | $-0.602 \times 10^{-6}$ | $-0.525 \times 10^{-6}$ | $-0.208 \times 10^{-5}$ | $0.315 \times 10^{-6}$ |
| 0.2 $y_{MAX}$ | $-0.413 \times 10^{-5}$ | $-0.499 \times 10^{-5}$ | $-0.666 \times 10^{-5}$ | $-0.155 \times 10^{-4}$ | $0.291 \times 10^{-5}$ |
| 0.3 $y_{MAX}$ | $-0.139 \times 10^{-4}$ | $-0.176 \times 10^{-4}$ | $-0.139 \times 10^{-4}$ | $-0.460 \times 10^{-4}$ | $0.104 \times 10^{-4}$ |
| 0.4 $y_{MAX}$ | $-0.329 \times 10^{-4}$ | $-0.445 \times 10^{-4}$ | $-0.325 \times 10^{-4}$ | $-0.908 \times 10^{-4}$ | $0.212 \times 10^{-4}$ |
| 0.5 $y_{MAX}$ | $-0.650 \times 10^{-4}$ | $-0.937 \times 10^{-4}$ | $-0.623 \times 10^{-4}$ | $-0.136 \times 10^{-3}$ | $0.198 \times 10^{-4}$ |
| 0.6 $y_{MAX}$ | $-0.114 \times 10^{-3}$ | $-0.176 \times 10^{-3}$ | $-0.105 \times 10^{-3}$ | $-0.155 \times 10^{-3}$ | $-0.310 \times 10^{-4}$ |

TABLE 12-continued

[Example 12]

| y | $A_{FR}$ | | | $A_{RE}$ | |
|---|---|---|---|---|---|
| | $r_1$ | $r_2$ | $r_4$ | $r_5$ | $r_6$ |
| 0.7 $y_{MAX}$ | $-0.185 \times 10^{-3}$ | $-0.307 \times 10^{-3}$ | $-0.164 \times 10^{-3}$ | $-0.100 \times 10^{-3}$ | $-0.189 \times 10^{-3}$ |
| 0.8 $y_{MAX}$ | $-0.280 \times 10^{-3}$ | $-0.503 \times 10^{-3}$ | $-0.241 \times 10^{-3}$ | $0.120 \times 10^{-3}$ | $-0.521 \times 10^{-3}$ |
| 0.9 $y_{MAX}$ | $-0.405 \times 10^{-3}$ | $-0.783 \times 10^{-3}$ | $-0.344 \times 10^{-3}$ | $0.689 \times 10^{-3}$ | $-0.113 \times 10^{-2}$ |
| 1.0 $y_{MAX}$ | $-0.583 \times 10^{-3}$ | $-0.116 \times 10^{-2}$ | $-0.485 \times 10^{-3}$ | $0.194 \times 10^{-2}$ | $-0.235 \times 10^{-2}$ |

TABLE 13

[Example 13]

| y | $A_{FR}$ | | $A_{RE}$ | |
|---|---|---|---|---|
| | $r_1$ | $r_2$ | $r_3$ | $r_4$ |
| 0.1 $y_{MAX}$ | $-4.02049 \times 10^{-7}$ | $4.63903 \times 10^{-8}$ | $-2.03696 \times 10^{-6}$ | $2.84797 \times 10^{-6}$ |
| 0.2 $y_{MAX}$ | $-3.17000 \times 10^{-6}$ | $6.34000 \times 10^{-7}$ | $-1.50037 \times 10^{-5}$ | $2.52357 \times 10^{-5}$ |
| 0.3 $y_{MAX}$ | $-1.07625 \times 10^{-5}$ | $3.30917 \times 10^{-6}$ | $-4.40210 \times 10^{-5}$ | $9.08239 \times 10^{-5}$ |
| 0.4 $y_{MAX}$ | $-2.57466 \times 10^{-5}$ | $1.19842 \times 10^{-5}$ | $-8.39209 \times 10^{-5}$ | $2.01084 \times 10^{-4}$ |
| 0.5 $y_{MAX}$ | $-5.09829 \times 10^{-5}$ | $3.44525 \times 10^{-5}$ | $-1.12259 \times 10^{-4}$ | $2.77376 \times 10^{-4}$ |
| 0.6 $y_{MAX}$ | $-8.97497 \times 10^{-5}$ | $8.42602 \times 10^{-5}$ | $-7.06241 \times 10^{-5}$ | $1.18936 \times 10^{-4}$ |
| 0.7 $y_{MAX}$ | $-1.46037 \times 10^{-4}$ | $1.82437 \times 10^{-4}$ | $1.69285 \times 10^{-4}$ | $-5.28422 \times 10^{-4}$ |
| 0.8 $y_{MAX}$ | $-2.24776 \times 10^{-4}$ | $3.57375 \times 10^{-4}$ | $8.25988 \times 10^{-4}$ | $-1.68243 \times 10^{-3}$ |
| 0.9 $y_{MAX}$ | $-3.32139 \times 10^{-4}$ | $6.40031 \times 10^{-4}$ | $2.10585 \times 10^{-3}$ | $-2.55992 \times 10^{-3}$ |
| 1.0 $y_{MAX}$ | $-4.75717 \times 10^{-4}$ | $1.05007 \times 10^{-4}$ | $3.71346 \times 10^{-3}$ | $-8.65010 \times 10^{-4}$ |

TABLE 14

[Example 14]

| y | $A_{FR}$ | | $A_{RE}$ | |
|---|---|---|---|---|
| | $r_1$ | $r_2$ | $r_3$ | $r_4$ |
| 0.1 $y_{MAX}$ | $-9.97091 \times 10^{-7}$ | $-9.64927 \times 10^{-8}$ | $-3.33109 \times 10^{-5}$ | $3.79055 \times 10^{-6}$ |
| 0.2 $y_{MAX}$ | $-8.04106 \times 10^{-6}$ | $-5.95038 \times 10^{-7}$ | $-2.48492 \times 10^{-5}$ | $3.36683 \times 10^{-5}$ |
| 0.3 $y_{MAX}$ | $-2.74843 \times 10^{-5}$ | $-1.19008 \times 10^{-6}$ | $-7.46752 \times 10^{-5}$ | $1.21859 \times 10^{-4}$ |
| 0.4 $y_{MAX}$ | $-6.65478 \times 10^{-5}$ | $8.04106 \times 10^{-8}$ | $-1.48546 \times 10^{-4}$ | $2.71682 \times 10^{-4}$ |
| 0.5 $y_{MAX}$ | $-1.34270 \times 10^{-4}$ | $7.92848 \times 10^{-6}$ | $-2.17848 \times 10^{-4}$ | $3.80217 \times 10^{-4}$ |
| 0.6 $y_{MAX}$ | $-2.43017 \times 10^{-4}$ | $3.11671 \times 10^{-5}$ | $-2.03988 \times 10^{-4}$ | $1.83095 \times 10^{-4}$ |
| 0.7 $y_{MAX}$ | $-4.10608 \times 10^{-4}$ | $8.43024 \times 10^{-5}$ | $6.71451 \times 10^{-5}$ | $-6.49869 \times 10^{-4}$ |
| 0.8 $y_{MAX}$ | $-6.62760 \times 10^{-4}$ | $1.88322 \times 10^{-4}$ | $8.89759 \times 10^{-4}$ | $-2.11833 \times 10^{-3}$ |
| 0.9 $y_{MAX}$ | $-1.03549 \times 10^{-3}$ | $3.69213 \times 10^{-4}$ | $2.53014 \times 10^{-3}$ | $-3.12197 \times 10^{-3}$ |
| 1.0 $y_{MAX}$ | $-1.57669 \times 10^{-3}$ | $6.51422 \times 10^{-4}$ | $4.54056 \times 10^{-3}$ | $-4.90143 \times 10^{-4}$ |

TABLE 15

[Example 15]

| y | $A_{FR}$ | | $A_{RE}$ | |
|---|---|---|---|---|
| | $r_1$ | $r_2$ | $r_3$ | $r_4$ |
| 0.1 $y_{MAX}$ | $-4.67252 \times 10^{-8}$ | $-1.55751 \times 10^{-8}$ | $-1.73149 \times 10^{-6}$ | $1.89060 \times 10^{-6}$ |
| 0.2 $y_{MAX}$ | $-4.36102 \times 10^{-7}$ | $6.23003 \times 10^{-8}$ | $-1.24948 \times 10^{-5}$ | $1.71277 \times 10^{-5}$ |
| 0.3 $y_{MAX}$ | $-1.44848 \times 10^{-6}$ | $1.33946 \times 10^{-6}$ | $-3.53131 \times 10^{-5}$ | $6.21653 \times 10^{-5}$ |
| 0.4 $y_{MAX}$ | $-3.44209 \times 10^{-6}$ | $7.11781 \times 10^{-6}$ | $-6.25583 \times 10^{-5}$ | $1.34233 \times 10^{-4}$ |
| 0.5 $y_{MAX}$ | $-6.75958 \times 10^{-6}$ | $2.43438 \times 10^{-5}$ | $-6.97932 \times 10^{-5}$ | $1.66616 \times 10^{-4}$ |
| 0.6 $y_{MAX}$ | $-1.17125 \times 10^{-5}$ | $6.52751 \times 10^{-5}$ | $-2.63000 \times 10^{-6}$ | $1.18677 \times 10^{-5}$ |
| 0.7 $y_{MAX}$ | $-1.86901 \times 10^{-5}$ | $1.48867 \times 10^{-4}$ | $2.35745 \times 10^{-4}$ | $-4.50151 \times 10^{-4}$ |
| 0.8 $y_{MAX}$ | $-2.80507 \times 10^{-5}$ | $2.99898 \times 10^{-4}$ | $7.41359 \times 10^{-4}$ | $-9.65181 \times 10^{-4}$ |
| 0.9 $y_{MAX}$ | $-4.02148 \times 10^{-5}$ | $5.42729 \times 10^{-4}$ | $1.34658 \times 10^{-3}$ | $-2.56177 \times 10^{-4}$ |
| 1.0 $y_{MAX}$ | $-5.56030 \times 10^{-5}$ | $8.84571 \times 10^{-4}$ | $7.72096 \times 10^{-4}$ | $4.82086 \times 10^{-3}$ |

TABLE 16

[Example 16]

| y | $A_{FR}$ $r_6$ | $A_{RE}$ $r_8$ |
|---|---|---|
| 0.1 $y_{MAX}$ | $-0.786 \times 10^{-6}$ | $-0.461 \times 10^{-5}$ |
| 0.2 $y_{MAX}$ | $-0.634 \times 10^{-5}$ | $-0.370 \times 10^{-4}$ |
| 0.3 $y_{MAX}$ | $-0.216 \times 10^{-4}$ | $-0.126 \times 10^{-3}$ |
| 0.4 $y_{MAX}$ | $-0.515 \times 10^{-4}$ | $-0.308 \times 10^{-3}$ |
| 0.5 $y_{MAX}$ | $-0.102 \times 10^{-3}$ | $-0.630 \times 10^{-3}$ |
| 0.6 $y_{MAX}$ | $-0.178 \times 10^{-3}$ | $-0.117 \times 10^{-2}$ |
| 0.7 $y_{MAX}$ | $-0.286 \times 10^{-3}$ | $-0.203 \times 10^{-2}$ |
| 0.8 $y_{MAX}$ | $-0.433 \times 10^{-3}$ | $-0.340 \times 10^{-2}$ |
| 0.9 $y_{MAX}$ | $-0.625 \times 10^{-3}$ | $-0.560 \times 10^{-2}$ |
| 1.0 $y_{MAX}$ | $-0.873 \times 10^{-3}$ | $-0.930 \times 10^{-2}$ |

TABLE 17

[Example 17]

| y | $A_{FR}$ | | $A_{RE}$ | |
|---|---|---|---|---|
| | $r_1$ | $r_6$ | $r_8$ | $r_{10}$ |
| 0.1 $y_{MAX}$ | $0.177 \times 10^{-6}$ | $-0.114 \times 10^{-5}$ | $-0.301 \times 10^{-5}$ | $-0.369 \times 10^{-6}$ |
| 0.2 $y_{MAX}$ | $0.137 \times 10^{-5}$ | $-0.919 \times 10^{-5}$ | $-0.243 \times 10^{-4}$ | $-0.308 \times 10^{-5}$ |
| 0.3 $y_{MAX}$ | $0.467 \times 10^{-5}$ | $-0.312 \times 10^{-4}$ | $-0.836 \times 10^{-4}$ | $-0.113 \times 10^{-4}$ |
| 0.4 $y_{MAX}$ | $0.112 \times 10^{-4}$ | $-0.744 \times 10^{-4}$ | $-0.203 \times 10^{-3}$ | $-0.278 \times 10^{-4}$ |
| 0.5 $y_{MAX}$ | $0.221 \times 10^{-4}$ | $-0.146 \times 10^{-3}$ | $-0.407 \times 10^{-3}$ | $-0.567 \times 10^{-4}$ |
| 0.6 $y_{MAX}$ | $0.388 \times 10^{-4}$ | $-0.255 \times 10^{-3}$ | $-0.720 \times 10^{-3}$ | $-0.122 \times 10^{-3}$ |
| 0.7 $y_{MAX}$ | $0.627 \times 10^{-4}$ | $-0.408 \times 10^{-3}$ | $-0.116 \times 10^{-2}$ | $-0.337 \times 10^{-3}$ |
| 0.8 $y_{MAX}$ | $0.956 \times 10^{-4}$ | $-0.615 \times 10^{-3}$ | $-0.174 \times 10^{-2}$ | $-0.109 \times 10^{-2}$ |
| 0.9 $y_{MAX}$ | $0.140 \times 10^{-3}$ | $-0.883 \times 10^{-3}$ | $-0.248 \times 10^{-2}$ | $-0.347 \times 10^{-2}$ |
| 1.0 $y_{MAX}$ | $0.197 \times 10^{-3}$ | $-0.122 \times 10^{-2}$ | $-0.347 \times 10^{-2}$ | $-0.101 \times 10^{-1}$ |

TABLE 18

[Example 18]

| y | $A_{FR}$ | | $A_{RE}$ | |
|---|---|---|---|---|
| | $r_1$ | $r_6$ | $r_8$ | $r_{10}$ |
| 0.1 $y_{MAX}$ | $0.216 \times 10^{-6}$ | $-0.962 \times 10^{-6}$ | $-0.324 \times 10^{-5}$ | $-0.630 \times 10^{-6}$ |
| 0.2 $y_{MAX}$ | $0.175 \times 10^{-5}$ | $-0.768 \times 10^{-5}$ | $-0.264 \times 10^{-4}$ | $-0.522 \times 10^{-5}$ |
| 0.3 $y_{MAX}$ | $0.595 \times 10^{-5}$ | $-0.260 \times 10^{-4}$ | $-0.915 \times 10^{-4}$ | $-0.185 \times 10^{-4}$ |
| 0.4 $y_{MAX}$ | $0.143 \times 10^{-4}$ | $-0.620 \times 10^{-4}$ | $-0.224 \times 10^{-3}$ | $-0.449 \times 10^{-4}$ |
| 0.5 $y_{MAX}$ | $0.283 \times 10^{-4}$ | $-0.122 \times 10^{-3}$ | $-0.454 \times 10^{-3}$ | $-0.900 \times 10^{-4}$ |
| 0.6 $y_{MAX}$ | $0.497 \times 10^{-4}$ | $-0.213 \times 10^{-3}$ | $-0.813 \times 10^{-3}$ | $-0.180 \times 10^{-3}$ |
| 0.7 $y_{MAX}$ | $0.807 \times 10^{-4}$ | $-0.341 \times 10^{-3}$ | $-0.133 \times 10^{-2}$ | $-0.437 \times 10^{-3}$ |
| 0.8 $y_{MAX}$ | $0.124 \times 10^{-3}$ | $-0.514 \times 10^{-3}$ | $-0.204 \times 10^{-2}$ | $-0.128 \times 10^{-2}$ |
| 0.9 $y_{MAX}$ | $0.181 \times 10^{-3}$ | $-0.739 \times 10^{-3}$ | $-0.300 \times 10^{-2}$ | $-0.388 \times 10^{-2}$ |
| 1.0 $y_{MAX}$ | $0.257 \times 10^{-3}$ | $-0.102 \times 10^{-2}$ | $-0.437 \times 10^{-2}$ | $-0.110 \times 10^{-1}$ |

TABLE 19

[Example 19]

| y | $A_{FR}$ | | $A_{RE}$ | |
|---|---|---|---|---|
| | $r_1$ | $r_6$ | $r_8$ | $r_{10}$ |
| 0.1 $y_{MAX}$ | $0.786 \times 10^{-7}$ | $-0.134 \times 10^{-5}$ | $-0.334 \times 10^{-5}$ | $-0.644 \times 10^{-6}$ |
| 0.2 $y_{MAX}$ | $0.687 \times 10^{-6}$ | $-0.106 \times 10^{-4}$ | $-0.269 \times 10^{-4}$ | $-0.528 \times 10^{-5}$ |
| 0.3 $y_{MAX}$ | $0.234 \times 10^{-5}$ | $-0.361 \times 10^{-4}$ | $-0.918 \times 10^{-4}$ | $-0.185 \times 10^{-4}$ |
| 0.4 $y_{MAX}$ | $0.558 \times 10^{-5}$ | $-0.860 \times 10^{-4}$ | $-0.220 \times 10^{-3}$ | $-0.445 \times 10^{-4}$ |
| 0.5 $y_{MAX}$ | $0.110 \times 10^{-4}$ | $-0.169 \times 10^{-3}$ | $-0.435 \times 10^{-3}$ | $-0.880 \times 10^{-4}$ |
| 0.6 $y_{MAX}$ | $0.192 \times 10^{-4}$ | $-0.294 \times 10^{-3}$ | $-0.757 \times 10^{-3}$ | $-0.175 \times 10^{-3}$ |
| 0.7 $y_{MAX}$ | $0.308 \times 10^{-4}$ | $-0.471 \times 10^{-3}$ | $-0.120 \times 10^{-2}$ | $-0.430 \times 10^{-3}$ |
| 0.8 $y_{MAX}$ | $0.466 \times 10^{-4}$ | $-0.708 \times 10^{-3}$ | $-0.178 \times 10^{-2}$ | $-0.128 \times 10^{-2}$ |
| 0.9 $y_{MAX}$ | $0.674 \times 10^{-4}$ | $-0.102 \times 10^{-2}$ | $-0.255 \times 10^{-2}$ | $-0.390 \times 10^{-2}$ |
| 1.0 $y_{MAX}$ | $0.940 \times 10^{-4}$ | $-0.140 \times 10^{-2}$ | $-0.371 \times 10^{-2}$ | $-0.111 \times 10^{-1}$ |

TABLE 20

[Example 20]

| y | $A_{FR}$ | | | $A_{RE}$ | |
|---|---|---|---|---|---|
| | $r_1$ | $r_4$ | $r_6$ | $r_8$ | $r_9$ |
| 0.1 $y_{MAX}$ | $-0.106 \times 10^{-6}$ | $-0.648 \times 10^{-6}$ | $-0.124 \times 10^{-5}$ | $-0.269 \times 10^{-5}$ | $0.496 \times 10^{-6}$ |
| 0.2 $y_{MAX}$ | $-0.856 \times 10^{-5}$ | $-0.521 \times 10^{-5}$ | $-0.998 \times 10^{-5}$ | $-0.211 \times 10^{-4}$ | $0.427 \times 10^{-5}$ |
| 0.3 $y_{MAX}$ | $-0.293 \times 10^{-4}$ | $-0.176 \times 10^{-4}$ | $-0.345 \times 10^{-4}$ | $-0.681 \times 10^{-4}$ | $0.148 \times 10^{-4}$ |
| 0.4 $y_{MAX}$ | $-0.706 \times 10^{-4}$ | $-0.419 \times 10^{-4}$ | $-0.843 \times 10^{-4}$ | $-0.151 \times 10^{-3}$ | $0.323 \times 10^{-4}$ |
| 0.5 $y_{MAX}$ | $-0.141 \times 10^{-3}$ | $-0.821 \times 10^{-4}$ | $-0.172 \times 10^{-3}$ | $-0.263 \times 10^{-3}$ | $0.444 \times 10^{-4}$ |
| 0.6 $y_{MAX}$ | $-0.250 \times 10^{-3}$ | $-0.143 \times 10^{-3}$ | $-0.311 \times 10^{-3}$ | $-0.381 \times 10^{-3}$ | $0.114 \times 10^{-4}$ |
| 0.7 $y_{MAX}$ | $-0.409 \times 10^{-3}$ | $-0.228 \times 10^{-3}$ | $-0.523 \times 10^{-3}$ | $-0.424 \times 10^{-3}$ | $-0.148 \times 10^{-3}$ |
| 0.8 $y_{MAX}$ | $-0.632 \times 10^{-3}$ | $-0.342 \times 10^{-3}$ | $-0.832 \times 10^{-3}$ | $-0.209 \times 10^{-3}$ | $-0.556 \times 10^{-3}$ |
| 0.9 $y_{MAX}$ | $-0.933 \times 10^{-3}$ | $-0.490 \times 10^{-3}$ | $-0.127 \times 10^{-2}$ | $0.686 \times 10^{-3}$ | $-0.133 \times 10^{-2}$ |
| 1.0 $y_{MAX}$ | $-0.133 \times 10^{-2}$ | $-0.676 \times 10^{-3}$ | $-0.188 \times 10^{-2}$ | $0.321 \times 10^{-2}$ | $-0.247 \times 10^{-2}$ |

TABLE 21

| | $\dfrac{\sqrt{\phi_W \cdot \phi_T}}{\beta \cdot \phi_1}$ | $\dfrac{\sqrt{\phi_W \cdot \phi_T}}{\beta \cdot \phi_2}$ | $\left|\dfrac{\phi_1}{\phi_W}\right|$ | $\left|\dfrac{\phi_2}{\phi_W}\right|$ |
|---|---|---|---|---|
| Example 1 | 0.20 | 0.17 | 1.50 | 1.79 |
| Example 2 | 0.20 | 0.17 | 1.50 | 1.77 |
| Example 3 | 0.20 | 0.15 | 1.50 | 2.00 |
| Example 4 | 0.23 | 0.20 | 1.35 | 1.51 |
| Example 5 | 0.20 | 0.16 | 1.50 | 1.95 |
| Example 6 | 0.222 | 0.227 | 1.294 | 1.264 |
| Example 7 | 0.213 | 0.184 | 1.496 | 1.739 |
| Example 8 | 0.204 | 0.176 | 1.496 | 1.732 |
| Example 9 | 0.203 | 0.187 | 1.496 | 1.625 |
| Example 10 | 0.308 | 0.298 | 1.425 | 1.473 |
| Example 11 | 0.260 | 0.282 | 1.391 | 1.283 |
| Example 12 | 0.329 | 0.386 | 1.334 | 1.137 |

TABLE 21-continued

|  | $\sqrt{\dfrac{\phi_W \cdot \phi_T}{\beta \cdot \phi_1}}$ | $\sqrt{\dfrac{\phi_W \cdot \phi_T}{\beta \cdot \phi_2}}$ | $\left|\dfrac{\phi_1}{\phi_W}\right|$ | $\left|\dfrac{\phi_2}{\phi_W}\right|$ |
|---|---|---|---|---|
| Example 13 | 0.354 | 0.690 | 1.24 | 0.635 |
| Example 14 | 0.342 | 0.529 | 1.28 | 0.829 |
| Example 15 | 0.351 | 0.695 | 1.25 | 0.631 |
| Example 16 | 0.20 | 0.17 | 1.50 | 1.79 |
| Example 17 | 0.20 | 0.17 | 1.50 | 1.76 |
| Example 18 | 0.20 | 0.17 | 1.50 | 1.84 |
| Example 19 | 0.20 | 0.18 | 1.50 | 1.69 |
| Example 20 | 0.20 | 0.16 | 1.50 | 1.86 |

TABLE 22

|  | $\dfrac{A_W - A_T}{B_W - B_T}$ | $\dfrac{\phi_{1T}}{\phi_{1W}}$ |
|---|---|---|
| Example 21 | 0.12 | 1.04 |
| Example 22 | 0.18 | 1.06 |
| Example 23 | 0.11 | 1.03 |
| Example 24 | 0.08 | 1.02 |

TABLE 23

[Example 25]

|  | $d_4$ | $d_7$ | $|\{Tf\}|$ |
|---|---|---|---|
| $\beta = 0.0$ | 4.675 | 2.040 | — |
| $\beta = -\frac{1}{4}$ | 5.244 | 3.939 | 0.3 |
| $\beta = -\frac{1}{3}$ | 5.432 | 4.564 | 0.3 |

TABLE 24

[Example 26]

|  | $d_4$ | $d_7$ | $|\{Tf\}|$ |
|---|---|---|---|
| $\beta = 0.0$ | 4.675 | 2.040 | — |
| $\beta = -\frac{1}{4}$ | 5.278 | 4.052 | 0.3 |
| $\beta = -\frac{1}{3}$ | 5.480 | 4.725 | 0.3 |

TABLE 25

[Example 27]

| y | $A_{FR}$ | | $A_{RE}$ |
|---|---|---|---|
|  | $r_1$ | $r_2$ | $r_5$ |
| 0.1 $y_{MAX}$ | $2.46 \times 10^{-6}$ | $-2.95 \times 10^{-6}$ | $-2.04 \times 10^{-6}$ |
| 0.2 $y_{MAX}$ | $2.01 \times 10^{-5}$ | $-2.38 \times 10^{-5}$ | $-1.66 \times 10^{-5}$ |
| 0.3 $y_{MAX}$ | $6.92 \times 10^{-5}$ | $-8.18 \times 10^{-5}$ | $-5.75 \times 10^{-5}$ |
| 0.4 $y_{MAX}$ | $1.68 \times 10^{-4}$ | $-1.98 \times 10^{-4}$ | $-1.41 \times 10^{-4}$ |
| 0.5 $y_{MAX}$ | $3.39 \times 10^{-4}$ | $-3.98 \times 10^{-4}$ | $-2.90 \times 10^{-4}$ |
| 0.6 $y_{MAX}$ | $6.03 \times 10^{-4}$ | $-7.12 \times 10^{-4}$ | $-5.35 \times 10^{-4}$ |
| 0.7 $y_{MAX}$ | $9.83 \times 10^{-4}$ | $-1.18 \times 10^{-3}$ | $-9.25 \times 10^{-4}$ |
| 0.8 $y_{MAX}$ | $1.50 \times 10^{-3}$ | $-1.84 \times 10^{-3}$ | $-1.53 \times 10^{-3}$ |
| 0.9 $y_{MAX}$ | $2.15 \times 10^{-3}$ | $-2.76 \times 10^{-3}$ | $-2.47 \times 10^{-3}$ |
| 1.0 $y_{MAX}$ | $2.93 \times 10^{-3}$ | $-4.02 \times 10^{-3}$ | $-3.89 \times 10^{-3}$ |

TABLE 26

[Example 28]

| y | $A_{FR}$ | | $A_{RE}$ |
|---|---|---|---|
|  | $r_1$ | $r_2$ | $r_5$ |
| 0.1 $y_{MAX}$ | $3.90 \times 10^{-6}$ | $-3.82 \times 10^{-6}$ | $-1.18 \times 10^{-6}$ |
| 0.2 $y_{MAX}$ | $3.13 \times 10^{-5}$ | $-3.09 \times 10^{-5}$ | $-9.66 \times 10^{-6}$ |
| 0.3 $y_{MAX}$ | $1.06 \times 10^{-4}$ | $-1.05 \times 10^{-4}$ | $-3.34 \times 10^{-5}$ |
| 0.4 $y_{MAX}$ | $2.52 \times 10^{-4}$ | $-2.54 \times 10^{-4}$ | $-8.25 \times 10^{-5}$ |
| 0.5 $y_{MAX}$ | $4.92 \times 10^{-4}$ | $-5.08 \times 10^{-4}$ | $-1.71 \times 10^{-4}$ |
| 0.6 $y_{MAX}$ | $8.49 \times 10^{-4}$ | $-9.02 \times 10^{-4}$ | $-3.18 \times 10^{-4}$ |
| 0.7 $y_{MAX}$ | $1.34 \times 10^{-3}$ | $-1.48 \times 10^{-3}$ | $-5.54 \times 10^{-4}$ |
| 0.8 $y_{MAX}$ | $1.97 \times 10^{-3}$ | $-2.30 \times 10^{-3}$ | $-9.28 \times 10^{-4}$ |
| 0.9 $y_{MAX}$ | $2.73 \times 10^{-3}$ | $-3.42 \times 10^{-3}$ | $-1.51 \times 10^{-3}$ |
| 1.0 $y_{MAX}$ | $3.60 \times 10^{-3}$ | $-4.94 \times 10^{-3}$ | $-2.40 \times 10^{-3}$ |

TABLE 27

[Example 29]

| y | $A_{FR}$ | | $A_{RE}$ |
|---|---|---|---|
|  | $r_1$ | $r_2$ | $r_5$ |
| 0.1 $y_{MAX}$ | $2.72 \times 10^{-6}$ | $-3.70 \times 10^{-6}$ | $-2.92 \times 10^{-6}$ |
| 0.2 $y_{MAX}$ | $2.24 \times 10^{-5}$ | $-2.98 \times 10^{-5}$ | $-2.35 \times 10^{-5}$ |
| 0.3 $y_{MAX}$ | $7.82 \times 10^{-5}$ | $-1.02 \times 10^{-4}$ | $-8.04 \times 10^{-5}$ |
| 0.4 $y_{MAX}$ | $1.94 \times 10^{-4}$ | $-2.48 \times 10^{-4}$ | $-1.95 \times 10^{-4}$ |
| 0.5 $y_{MAX}$ | $3.99 \times 10^{-4}$ | $-5.01 \times 10^{-4}$ | $-3.97 \times 10^{-4}$ |
| 0.6 $y_{MAX}$ | $7.27 \times 10^{-4}$ | $-9.02 \times 10^{-4}$ | $-7.26 \times 10^{-4}$ |
| 0.7 $y_{MAX}$ | $1.22 \times 10^{-3}$ | $-1.50 \times 10^{-3}$ | $-1.25 \times 10^{-3}$ |
| 0.8 $y_{MAX}$ | $1.90 \times 10^{-3}$ | $-2.38 \times 10^{-3}$ | $-2.06 \times 10^{-3}$ |
| 0.9 $y_{MAX}$ | $2.80 \times 10^{-3}$ | $-3.62 \times 10^{-3}$ | $-3.33 \times 10^{-3}$ |
| 1.0 $y_{MAX}$ | $3.93 \times 10^{-3}$ | $-5.36 \times 10^{-3}$ | $-5.28 \times 10^{-3}$ |

TABLE 28

[Example 30]

| y | $A_{FR}$ | | | $A_{RE}$ |
|---|---|---|---|---|
|  | $r_1$ | $r_2$ | $r_4$ | $r_5$ |
| 0.1 $y_{MAX}$ | $-3.85 \times 10^{-6}$ | $3.34 \times 10^{-6}$ | $-2.42 \times 10^{-7}$ | $-6.67 \times 10^{-6}$ |
| 0.2 $y_{MAX}$ | $-3.11 \times 10^{-5}$ | $2.69 \times 10^{-5}$ | $-1.88 \times 10^{-6}$ | $-5.02 \times 10^{-5}$ |
| 0.3 $y_{MAX}$ | $-1.06 \times 10^{-4}$ | $9.14 \times 10^{-5}$ | $-6.23 \times 10^{-6}$ | $-1.65 \times 10^{-4}$ |
| 0.4 $y_{MAX}$ | $-2.54 \times 10^{-4}$ | $2.17 \times 10^{-4}$ | $-1.46 \times 10^{-5}$ | $-3.99 \times 10^{-4}$ |
| 0.5 $y_{MAX}$ | $-5.02 \times 10^{-4}$ | $4.24 \times 10^{-4}$ | $-2.84 \times 10^{-5}$ | $-8.25 \times 10^{-4}$ |
| 0.6 $y_{MAX}$ | $-8.75 \times 10^{-4}$ | $7.28 \times 10^{-4}$ | $-4.93 \times 10^{-5}$ | $-1.57 \times 10^{-3}$ |
| 0.7 $y_{MAX}$ | $-1.40 \times 10^{-3}$ | $1.14 \times 10^{-3}$ | $-7.97 \times 10^{-5}$ | $-2.82 \times 10^{-3}$ |
| 0.8 $y_{MAX}$ | $-2.11 \times 10^{-3}$ | $1.68 \times 10^{-3}$ | $-1.23 \times 10^{-4}$ | $-4.87 \times 10^{-3}$ |
| 0.9 $y_{MAX}$ | $-3.03 \times 10^{-3}$ | $2.34 \times 10^{-3}$ | $-1.81 \times 10^{-4}$ | $-8.26 \times 10^{-3}$ |
| 1.0 $y_{MAX}$ | $-4.19 \times 10^{-3}$ | $3.10 \times 10^{-3}$ | $-2.59 \times 10^{-4}$ | $-1.39 \times 10^{-2}$ |

TABLE 29

[Example 31]

| y | $A_{FR}$ | | | $A_{RE}$ |
|---|---|---|---|---|
|  | $r_1$ | $r_2$ | $r_4$ | $r_5$ |
| 0.1 $y_{MAX}$ | $-4.14 \times 10^{-6}$ | $3.30 \times 10^{-6}$ | $-3.27 \times 10^{-7}$ | $-5.43 \times 10^{-6}$ |
| 0.2 $y_{MAX}$ | $-3.35 \times 10^{-5}$ | $2.66 \times 10^{-5}$ | $-2.54 \times 10^{-6}$ | $-4.15 \times 10^{-5}$ |
| 0.3 $y_{MAX}$ | $-1.14 \times 10^{-4}$ | $8.99 \times 10^{-5}$ | $-8.45 \times 10^{-6}$ | $-1.39 \times 10^{-4}$ |
| 0.4 $y_{MAX}$ | $-2.74 \times 10^{-4}$ | $2.13 \times 10^{-4}$ | $-2.01 \times 10^{-5}$ | $-3.42 \times 10^{-4}$ |
| 0.5 $y_{MAX}$ | $-5.40 \times 10^{-4}$ | $4.13 \times 10^{-4}$ | $-3.98 \times 10^{-5}$ | $-7.21 \times 10^{-4}$ |
| 0.6 $y_{MAX}$ | $-9.42 \times 10^{-4}$ | $7.05 \times 10^{-4}$ | $-7.11 \times 10^{-5}$ | $-1.39 \times 10^{-3}$ |

TABLE 29-continued

[Example 31]

| y | $A_{FR}$ $r_1$ | $r_2$ | $r_4$ | $A_{RE}$ $r_5$ |
|---|---|---|---|---|
| 0.7 $y_{MAX}$ | $-1.51 \times 10^{-3}$ | $1.10 \times 10^{-3}$ | $-1.19 \times 10^{-4}$ | $-2.50 \times 10^{-3}$ |
| 0.8 $y_{MAX}$ | $-2.28 \times 10^{-3}$ | $1.59 \times 10^{-3}$ | $-1.92 \times 10^{-4}$ | $-4.33 \times 10^{-3}$ |
| 0.9 $y_{MAX}$ | $-3.27 \times 10^{-3}$ | $2.19 \times 10^{-3}$ | $-3.01 \times 10^{-4}$ | $-7.29 \times 10^{-3}$ |
| 1.0 $y_{MAX}$ | $-4.54 \times 10^{-3}$ | $2.85 \times 10^{-3}$ | $-4.60 \times 10^{-4}$ | $-1.22 \times 10^{-2}$ |

TABLE 30

[Example 32]

| y | $A_{FR}$ $r_1$ | $r_2$ | $r_5$ | $A_{RE}$ $r_6$ |
|---|---|---|---|---|
| 0.1 $y_{MAX}$ | $2.57 \times 10^{-6}$ | $-2.95 \times 10^{-6}$ | $-2.34 \times 10^{-6}$ | $2.58 \times 10^{-7}$ |
| 0.2 $y_{MAX}$ | $2.07 \times 10^{-5}$ | $-2.39 \times 10^{-5}$ | $-1.89 \times 10^{-5}$ | $2.09 \times 10^{-6}$ |
| 0.3 $y_{MAX}$ | $7.13 \times 10^{-5}$ | $-8.23 \times 10^{-5}$ | $-6.51 \times 10^{-5}$ | $7.17 \times 10^{-6}$ |
| 0.4 $y_{MAX}$ | $1.73 \times 10^{-4}$ | $-2.00 \times 10^{-4}$ | $-1.59 \times 10^{-4}$ | $1.76 \times 10^{-5}$ |
| 0.5 $y_{MAX}$ | $3.48 \times 10^{-4}$ | $-4.02 \times 10^{-4}$ | $-3.25 \times 10^{-4}$ | $3.64 \times 10^{-5}$ |
| 0.6 $y_{MAX}$ | $6.18 \times 10^{-4}$ | $-7.21 \times 10^{-4}$ | $-5.97 \times 10^{-4}$ | $6.76 \times 10^{-5}$ |
| 0.7 $y_{MAX}$ | $1.01 \times 10^{-3}$ | $-1.19 \times 10^{-3}$ | $-1.02 \times 10^{-3}$ | $1.18 \times 10^{-4}$ |
| 0.8 $y_{MAX}$ | $1.53 \times 10^{-3}$ | $-1.87 \times 10^{-3}$ | $-1.68 \times 10^{-3}$ | $1.99 \times 10^{-4}$ |
| 0.9 $y_{MAX}$ | $2.20 \times 10^{-3}$ | $-2.81 \times 10^{-3}$ | $-2.69 \times 10^{-3}$ | $3.25 \times 10^{-4}$ |
| 1.0 $y_{MAX}$ | $3.01 \times 10^{-3}$ | $-4.08 \times 10^{-3}$ | $-4.20 \times 10^{-3}$ | $5.23 \times 10^{-4}$ |

TABLE 31

[Example 33]

| y | $A_{FR}$ $r_2$ | $A_{RE}$ $r_5$ |
|---|---|---|
| 0.1 $y_{MAX}$ | $-3.35 \times 10^{-6}$ | $-3.54 \times 10^{-6}$ |
| 0.2 $y_{MAX}$ | $-2.70 \times 10^{-5}$ | $-2.89 \times 10^{-5}$ |
| 0.3 $y_{MAX}$ | $-9.17 \times 10^{-5}$ | $-1.01 \times 10^{-4}$ |
| 0.4 $y_{MAX}$ | $-2.20 \times 10^{-4}$ | $-2.51 \times 10^{-4}$ |
| 0.5 $y_{MAX}$ | $-4.41 \times 10^{-4}$ | $-5.23 \times 10^{-4}$ |
| 0.6 $y_{MAX}$ | $-7.94 \times 10^{-4}$ | $-9.80 \times 10^{-4}$ |
| 0.7 $y_{MAX}$ | $-1.34 \times 10^{-3}$ | $-1.71 \times 10^{-3}$ |
| 0.8 $y_{MAX}$ | $-2.19 \times 10^{-3}$ | $-2.85 \times 10^{-3}$ |
| 0.9 $y_{MAX}$ | $-3.51 \times 10^{-3}$ | $-4.60 \times 10^{-3}$ |
| 1.0 $y_{MAX}$ | $-5.54 \times 10^{-3}$ | $-7.21 \times 10^{-3}$ |

TABLE 32

[Example 34]

| y | $A_{FR}$ $r_2$ | $A_{RE}$ $r_5$ |
|---|---|---|
| 0.1 $y_{MAX}$ | $-3.22 \times 10^{-6}$ | $-3.91 \times 10^{-6}$ |
| 0.2 $y_{MAX}$ | $-2.58 \times 10^{-5}$ | $-3.20 \times 10^{-5}$ |
| 0.3 $y_{MAX}$ | $-8.77 \times 10^{-5}$ | $-1.12 \times 10^{-4}$ |
| 0.4 $y_{MAX}$ | $-2.11 \times 10^{-4}$ | $-2.78 \times 10^{-4}$ |
| 0.5 $y_{MAX}$ | $-4.24 \times 10^{-4}$ | $-5.81 \times 10^{-4}$ |
| 0.6 $y_{MAX}$ | $-7.66 \times 10^{-4}$ | $-1.09 \times 10^{-3}$ |

TABLE 32-continued

[Example 34]

| y | $A_{FR}$ $r_2$ | $A_{RE}$ $r_5$ |
|---|---|---|
| 0.7 $y_{MAX}$ | $-1.30 \times 10^{-3}$ | $-1.91 \times 10^{-3}$ |
| 0.8 $y_{MAX}$ | $-2.12 \times 10^{-3}$ | $-3.19 \times 10^{-3}$ |
| 0.9 $y_{MAX}$ | $-3.38 \times 10^{-3}$ | $-5.15 \times 10^{-3}$ |
| 1.0 $y_{MAX}$ | $-5.32 \times 10^{-3}$ | $-8.10 \times 10^{-3}$ |

TABLE 33

[Example 35]

| y | $A_{FR}$ $r_1$ | $r_4$ | $A_{RE}$ $r_5$ |
|---|---|---|---|
| 0.1 $y_{MAX}$ | $-1.25 \times 10^{-6}$ | $-9.82 \times 10^{-8}$ | $-2.24 \times 10^{-6}$ |
| 0.2 $y_{MAX}$ | $-9.97 \times 10^{-6}$ | $-8.25 \times 10^{-7}$ | $-1.79 \times 10^{-5}$ |
| 0.3 $y_{MAX}$ | $-3.41 \times 10^{-5}$ | $-2.91 \times 10^{-6}$ | $-6.03 \times 10^{-5}$ |
| 0.4 $y_{MAX}$ | $-8.23 \times 10^{-5}$ | $-7.36 \times 10^{-6}$ | $-1.44 \times 10^{-4}$ |
| 0.5 $y_{MAX}$ | $-1.65 \times 10^{-4}$ | $-1.57 \times 10^{-5}$ | $-2.87 \times 10^{-4}$ |
| 0.6 $y_{MAX}$ | $-2.93 \times 10^{-4}$ | $-3.00 \times 10^{-5}$ | $-5.16 \times 10^{-4}$ |
| 0.7 $y_{MAX}$ | $-4.82 \times 10^{-4}$ | $-5.35 \times 10^{-5}$ | $-8.66 \times 10^{-4}$ |
| 0.8 $y_{MAX}$ | $-7.52 \times 10^{-4}$ | $-8.98 \times 10^{-5}$ | $-1.39 \times 10^{-3}$ |
| 0.9 $y_{MAX}$ | $-1.13 \times 10^{-3}$ | $-1.42 \times 10^{-4}$ | $-2.12 \times 10^{-3}$ |
| 1.0 $y_{MAX}$ | $-1.65 \times 10^{-3}$ | $-2.08 \times 10^{-4}$ | $-3.06 \times 10^{-3}$ |

TABLE 34

[Example 36]

| y | $A_{FR}$ $r_1$ | $r_2$ | $A_{RE}$ $r_5$ | $r_6$ |
|---|---|---|---|---|
| 0.1 $y_{MAX}$ | $-2.73 \times 10^{-6}$ | $1.71 \times 10^{-6}$ | $-3.65 \times 10^{-6}$ | $5.54 \times 10^{-7}$ |
| 0.2 $y_{MAX}$ | $-2.20 \times 10^{-5}$ | $1.37 \times 10^{-5}$ | $-2.95 \times 10^{-5}$ | $4.91 \times 10^{-6}$ |
| 0.3 $y_{MAX}$ | $-7.46 \times 10^{-5}$ | $4.65 \times 10^{-5}$ | $-1.01 \times 10^{-4}$ | $1.87 \times 10^{-5}$ |
| 0.4 $y_{MAX}$ | $-1.79 \times 10^{-4}$ | $1.10 \times 10^{-4}$ | $-2.49 \times 10^{-4}$ | $5.02 \times 10^{-5}$ |
| 0.5 $y_{MAX}$ | $-3.54 \times 10^{-4}$ | $2.16 \times 10^{-4}$ | $-5.10 \times 10^{-4}$ | $1.09 \times 10^{-4}$ |
| 0.6 $y_{MAX}$ | $-6.24 \times 10^{-4}$ | $3.75 \times 10^{-4}$ | $-9.33 \times 10^{-4}$ | $2.02 \times 10^{-4}$ |
| 0.7 $y_{MAX}$ | $-1.02 \times 10^{-3}$ | $5.98 \times 10^{-4}$ | $-1.57 \times 10^{-3}$ | $3.24 \times 10^{-4}$ |
| 0.8 $y_{MAX}$ | $-1.57 \times 10^{-3}$ | $8.98 \times 10^{-4}$ | $-2.48 \times 10^{-3}$ | $4.41 \times 10^{-4}$ |

TABLE 34-continued

[Example 36]

| y | $A_{FR}$ | | $A_{RE}$ | |
|---|---|---|---|---|
| | $r_1$ | $r_2$ | $r_5$ | $r_6$ |
| $0.9\ y_{MAX}$ | $-2.34 \times 10^{-3}$ | $1.29 \times 10^{-3}$ | $-3.71 \times 10^{-3}$ | $4.72 \times 10^{-4}$ |
| $1.0\ y_{MAX}$ | $-3.39 \times 10^{-3}$ | $1.81 \times 10^{-3}$ | $-5.50 \times 10^{-3}$ | $2.50 \times 10^{-4}$ |

TABLE 35

[Example 37]

| y | $A_{FR}$ | | $A_{RE}$ | |
|---|---|---|---|---|
| | $r_1$ | $r_4$ | $r_5$ | $r_6$ |
| $0.1\ y_{MAX}$ | $-1.58 \times 10^{-6}$ | $2.55 \times 10^{-7}$ | $-3.29 \times 10^{-6}$ | $1.16 \times 10^{-6}$ |
| $0.2\ y_{MAX}$ | $-1.27 \times 10^{-5}$ | $2.08 \times 10^{-6}$ | $-2.64 \times 10^{-5}$ | $9.43 \times 10^{-6}$ |
| $0.3\ y_{MAX}$ | $-4.34 \times 10^{-5}$ | $7.21 \times 10^{-6}$ | $-8.95 \times 10^{-5}$ | $3.24 \times 10^{-5}$ |
| $0.4\ y_{MAX}$ | $-1.05 \times 10^{-4}$ | $1.77 \times 10^{-5}$ | $<2.15 \times 10^{-4}$ | $7.88 \times 10^{-5}$ |
| $0.5\ y_{MAX}$ | $-2.12 \times 10^{-4}$ | $3.59 \times 10^{-5}$ | $-4.29 \times 10^{-4}$ | $1.59 \times 10^{-4}$ |
| $0.6\ y_{MAX}$ | $-3.82 \times 10^{-4}$ | $6.50 \times 10^{-5}$ | $-7.65 \times 10^{-4}$ | $2.83 \times 10^{-4}$ |
| $0.7\ y_{MAX}$ | $-6.37 \times 10^{-4}$ | $1.09 \times 10^{-4}$ | $-1.26 \times 10^{-3}$ | $4.60 \times 10^{-4}$ |
| $0.8\ y_{MAX}$ | $-1.01 \times 10^{-3}$ | $1.77 \times 10^{-4}$ | $-1.96 \times 10^{-3}$ | $6.85 \times 10^{-4}$ |
| $0.9\ y_{MAX}$ | $-1.55 \times 10^{-3}$ | $2.84 \times 10^{-4}$ | $-2.86 \times 10^{-3}$ | $9.15 \times 10^{-4}$ |
| $1.0\ y_{MAX}$ | $-2.32 \times 10^{-3}$ | $4.70 \times 10^{-4}$ | $-3.90 \times 10^{-3}$ | $1.00 \times 10^{-3}$ |

TABLE 36

[Example 38]

| y | $A_{FR}$ | $A_{RE}$ | |
|---|---|---|---|
| | $r_2$ | $r_5$ | $r_6$ |
| $0.1\ y_{MAX}$ | $-3.16 \times 10^{-6}$ | $-4.22 \times 10^{-6}$ | $1.41 \times 10^{-7}$ |
| $0.2\ y_{MAX}$ | $-2.55 \times 10^{-5}$ | $-3.41 \times 10^{-5}$ | $1.01 \times 10^{-6}$ |
| $0.3\ y_{MAX}$ | $-8.67 \times 10^{-5}$ | $-1.17 \times 10^{-4}$ | $2.62 \times 10^{-6}$ |
| $0.4\ y_{MAX}$ | $-2.09 \times 10^{-4}$ | $-2.87 \times 10^{-4}$ | $3.28 \times 10^{-6}$ |
| $0.5\ y_{MAX}$ | $-4.18 \times 10^{-4}$ | $-5.88 \times 10^{-4}$ | $-2.31 \times 10^{-6}$ |
| $0.6\ y_{MAX}$ | $-7.54 \times 10^{-4}$ | $-1.08 \times 10^{-3}$ | $-2.59 \times 10^{-5}$ |
| $0.7\ y_{MAX}$ | $-1.28 \times 10^{-3}$ | $-1.87 \times 10^{-3}$ | $-9.01 \times 10^{-5}$ |
| $0.8\ y_{MAX}$ | $-2.07 \times 10^{-3}$ | $-3.10 \times 10^{-3}$ | $-2.35 \times 10^{-4}$ |
| $0.9\ y_{MAX}$ | $-3.29 \times 10^{-3}$ | $-5.00 \times 10^{-3}$ | $-5.26 \times 10^{-4}$ |
| $1.0\ y_{MAX}$ | $-5.15 \times 10^{-3}$ | $-7.91 \times 10^{-3}$ | $-1.07 \times 10^{-3}$ |

TABLE 37

[Example 39]

| y | $A_{FR}$ | | $A_{RE}$ | |
|---|---|---|---|---|
| | $r_1$ | $r_2$ | $r_5$ | $r_7$ |
| $0.1\ y_{MAX}$ | $1.98 \times 10^{-6}$ | $-3.11 \times 10^{-6}$ | $-1.43 \times 10^{-6}$ | $-1.27 \times 10^{-6}$ |
| $0.2\ y_{MAX}$ | $1.61 \times 10^{-5}$ | $-2.52 \times 10^{-5}$ | $-1.17 \times 10^{-5}$ | $-9.98 \times 10^{-6}$ |
| $0.3\ y_{MAX}$ | $5.53 \times 10^{-5}$ | $-8.65 \times 10^{-5}$ | $-4.03 \times 10^{-5}$ | $-3.29 \times 10^{-5}$ |
| $0.4\ y_{MAX}$ | $1.34 \times 10^{-4}$ | $-2.10 \times 10^{-4}$ | $-9.87 \times 10^{-5}$ | $-7.73 \times 10^{-5}$ |
| $0.5\ y_{MAX}$ | $2.68 \times 10^{-4}$ | $-4.24 \times 10^{-4}$ | $-2.01 \times 10^{-4}$ | $-1.57 \times 10^{-4}$ |
| $0.6\ y_{MAX}$ | $4.75 \times 10^{-4}$ | $-7.61 \times 10^{-4}$ | $-3.68 \times 10^{-4}$ | $-3.08 \times 10^{-4}$ |
| $0.7\ y_{MAX}$ | $7.69 \times 10^{-4}$ | $-1.26 \times 10^{-3}$ | $-6.27 \times 10^{-4}$ | $-6.31 \times 10^{-4}$ |
| $0.8\ y_{MAX}$ | $1.16 \times 10^{-3}$ | $-1.99 \times 10^{-3}$ | $-1.02 \times 10^{-3}$ | $-1.41 \times 10^{-3}$ |
| $0.9\ y_{MAX}$ | $1.65 \times 10^{-3}$ | $-2.99 \times 10^{-3}$ | $-1.60 \times 10^{-3}$ | $-3.54 \times 10^{-3}$ |
| $1.0\ y_{MAX}$ | $2.22 \times 10^{-3}$ | $-4.37 \times 10^{-3}$ | $-2.44 \times 10^{-3}$ | $-1.10 \times 10^{-2}$ |

TABLE 38

[Example 40]

| y | $A_{FR}$ | | | $A_{RE}$ |
|---|---|---|---|---|
| | $r_1$ | $r_3$ | $r_5$ | $r_7$ |
| $0.1\ y_{MAX}$ | $-1.67 \times 10^{-6}$ | $5.30 \times 10^{-7}$ | $-2.18 \times 10^{-6}$ | $-5.72 \times 10^{-8}$ |
| $0.2\ y_{MAX}$ | $-1.34 \times 10^{-5}$ | $4.32 \times 10^{-6}$ | $-1.71 \times 10^{-5}$ | $-1.14 \times 10^{-7}$ |
| $0.3\ y_{MAX}$ | $-4.60 \times 10^{-5}$ | $1.50 \times 10^{-5}$ | $-5.64 \times 10^{-5}$ | $1.46 \times 10^{-6}$ |
| $0.4\ y_{MAX}$ | $-1.12 \times 10^{-4}$ | $3.69 \times 10^{-5}$ | $-1.30 \times 10^{-4}$ | $7.89 \times 10^{-6}$ |
| $0.5\ y_{MAX}$ | $-2.26 \times 10^{-4}$ | $7.57 \times 10^{-5}$ | $-2.48 \times 10^{-4}$ | $2.11 \times 10^{-5}$ |
| $0.6\ y_{MAX}$ | $-4.07 \times 10^{-4}$ | $1.39 \times 10^{-4}$ | $-4.20 \times 10^{-4}$ | $3.20 \times 10^{-5}$ |
| $0.7\ y_{MAX}$ | $-6.81 \times 10^{-4}$ | $2.36 \times 10^{-4}$ | $-6.56 \times 10^{-4}$ | $2.86 \times 10^{-7}$ |
| $0.8\ y_{MAX}$ | $-1.08 \times 10^{-3}$ | $3.79 \times 10^{-4}$ | $-9.58 \times 10^{-4}$ | $-1.93 \times 10^{-4}$ |
| $0.9\ y_{MAX}$ | $-1.66 \times 10^{-3}$ | $5.85 \times 10^{-4}$ | $-1.29 \times 10^{-3}$ | $-8.61 \times 10^{-4}$ |
| $1.0\ y_{MAX}$ | $-2.50 \times 10^{-3}$ | $8.75 \times 10^{-4}$ | $-1.53 \times 10^{-3}$ | $-2.87 \times 10^{-3}$ |

TABLE 39

[Example 41]

| y | $A_{FR}$ | | $A_{RE}$ |
|---|---|---|---|
| | $r_1$ | $r_2$ | $r_5$ |
| $0.1\ y_{MAX}$ | $-3.98 \times 10^{-8}$ | $-3.30 \times 10^{-6}$ | $-3.87 \times 10^{-6}$ |
| $0.2\ y_{MAX}$ | $-1.19 \times 10^{-7}$ | $-2.64 \times 10^{-5}$ | $-3.12 \times 10^{-5}$ |
| $0.3\ y_{MAX}$ | $7.95 \times 10^{-8}$ | $-8.92 \times 10^{-5}$ | $-1.06 \times 10^{-4}$ |
| $0.4\ y_{MAX}$ | $1.83 \times 10^{-6}$ | $-2.12 \times 10^{-4}$ | $-2.57 \times 10^{-4}$ |
| $0.5\ y_{MAX}$ | $7.72 \times 10^{-6}$ | $-4.21 \times 10^{-4}$ | $-5.16 \times 10^{-4}$ |
| $0.6\ y_{MAX}$ | $2.24 \times 10^{-5}$ | $-7.47 \times 10^{-4}$ | $-9.28 \times 10^{-4}$ |
| $0.7\ y_{MAX}$ | $5.34 \times 10^{-5}$ | $-1.24 \times 10^{-3}$ | $-1.56 \times 10^{-3}$ |
| $0.8\ y_{MAX}$ | $1.12 \times 10^{-4}$ | $-1.98 \times 10^{-3}$ | $-2.49 \times 10^{-3}$ |
| $0.9\ y_{MAX}$ | $2.15 \times 10^{-4}$ | $-3.09 \times 10^{-3}$ | $-3.86 \times 10^{-3}$ |
| $1.0\ y_{MAX}$ | $3.84 \times 10^{-4}$ | $-4.77 \times 10^{-3}$ | $-5.88 \times 10^{-3}$ |

TABLE 40

[Example 42]

| y | $A_{FR}$ $r_2$ | $A_{RE}$ $r_5$ |
|---|---|---|
| 0.1 $y_{MAX}$ | $-3.42 \times 10^{-6}$ | $-3.74 \times 10^{-6}$ |
| 0.2 $y_{MAX}$ | $-2.75 \times 10^{-5}$ | $-3.00 \times 10^{-5}$ |
| 0.3 $y_{MAX}$ | $-9.29 \times 10^{-5}$ | $-1.02 \times 10^{-4}$ |
| 0.4 $y_{MAX}$ | $-2.21 \times 10^{-4}$ | $-2.47 \times 10^{-4}$ |
| 0.5 $y_{MAX}$ | $-4.38 \times 10^{-4}$ | $-4.94 \times 10^{-4}$ |
| 0.6 $y_{MAX}$ | $-7.77 \times 10^{-4}$ | $-8.85 \times 10^{-4}$ |
| 0.7 $y_{MAX}$ | $-1.29 \times 10^{-3}$ | $-1.48 \times 10^{-3}$ |
| 0.8 $y_{MAX}$ | $-2.05 \times 10^{-3}$ | $-2.35 \times 10^{-3}$ |
| 0.9 $y_{MAX}$ | $-3.20 \times 10^{-3}$ | $-3.63 \times 10^{-3}$ |
| 1.0 $y_{MAX}$ | $-4.92 \times 10^{-3}$ | $-5.50 \times 10^{-3}$ |

TABLE 41

[Example 43]

| y | $A_{FR}$ $r_2$ | $A_{RE}$ $r_5$ |
|---|---|---|
| 0.1 $y_{MAX}$ | $-3.12 \times 10^{-6}$ | $-4.11 \times 10^{-6}$ |
| 0.2 $y_{MAX}$ | $-2.51 \times 10^{-5}$ | $-3.29 \times 10^{-5}$ |
| 0.3 $y_{MAX}$ | $-8.50 \times 10^{-5}$ | $-1.12 \times 10^{-4}$ |
| 0.4 $y_{MAX}$ | $-2.03 \times 10^{-4}$ | $-2.69 \times 10^{-4}$ |
| 0.5 $y_{MAX}$ | $-4.02 \times 10^{-4}$ | $-5.39 \times 10^{-4}$ |
| 0.6 $y_{MAX}$ | $-7.12 \times 10^{-4}$ | $-9.69 \times 10^{-4}$ |
| 0.7 $y_{MAX}$ | $-1.18 \times 10^{-3}$ | $-1.63 \times 10^{-3}$ |
| 0.8 $y_{MAX}$ | $-1.87 \times 10^{-3}$ | $-2.63 \times 10^{-3}$ |
| 0.9 $y_{MAX}$ | $-2.89 \times 10^{-3}$ | $-4.14 \times 10^{-3}$ |
| 1.0 $y_{MAX}$ | $-4.41 \times 10^{-3}$ | $-6.41 \times 10^{-3}$ |

TABLE 42

| | $\dfrac{\sqrt{\phi_w \cdot \phi_T}}{\beta \cdot \phi_1}$ | $\dfrac{\sqrt{\phi_w \cdot \phi_T}}{\beta \cdot \phi_2}$ | $\dfrac{\phi_1}{\phi_w}$ | $\dfrac{\phi_2}{\phi_w}$ |
|---|---|---|---|---|
| Example 27 | 0.314 | 0.343 | 1.28 | 1.17 |
| Example 28 | 0.314 | 0.348 | 1.28 | 1.15 |
| Example 29 | 0.301 | 0.305 | 1.33 | 1.31 |
| Example 30 | 0.226 | 0.214 | 1.41 | 1.49 |
| Example 31 | 0.226 | 0.236 | 1.41 | 1.35 |
| Example 32 | 0.314 | 0.344 | 1.28 | 1.16 |
| Example 33 | 0.341 | 0.340 | 1.34 | 1.34 |
| Example 34 | 0.301 | 0.292 | 1.33 | 1.37 |
| Example 35 | 0.241 | 0.225 | 1.50 | 1.60 |
| Example 36 | 0.204 | 0.180 | 1.50 | 1.70 |
| Example 37 | 0.241 | 0.240 | 1.50 | 1.51 |
| Example 38 | 0.299 | 0.288 | 1.34 | 1.39 |
| Example 39 | 0.314 | 0.343 | 1.28 | 0.17 |
| Example 40 | 0.241 | 0.238 | 1.50 | 1.52 |
| Example 41 | 0.334 | 0.343 | 1.36 | 1.33 |
| Example 42 | 0.334 | 0.334 | 1.36 | 1.31 |
| Example 43 | 0.336 | 0.356 | 1.35 | 1.28 |

What is claimed is:

1. A zoom lens system comprising, from the object side to the image side, a front lens group having a positive refractive power and a rear lens group having a negative refractive power, the zoom lens system being operated by changing the air distance between the front and rear lens group during a zooming operation, where the zoom lens system is characterized in that the zoom lens system comprises at least three aspherical surfaces for correcting aberrations, and that the most object side lens element includes at least one of the aspherical surfaces and the rear lens group includes the remaining two aspherical surfaces.

2. The zoom lens system according to claim 1, where the front lens group comprises at least two aspherical surfaces.

3. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the zoom lens system comprises at least one aspherical surface in the first lens group and at least one aspherical surface in the rear lens group, and the zoom lens system satisfies the following condition:

$$0.08 < |(\phi_w \cdot \phi_T)^{1/2}/(\beta \cdot \phi_2)| < 0.026,$$

where $\phi_w$: refractive power of the zoom lens system at the shortest focal length condition, $\phi_T$: refractive power of the zoom lens system at the longest focal length condition, $\phi_2$: refractive power of the rear lens group ($\phi_2 < 0$), and $\beta$: zoom ratio, which is give by $\beta = \phi_w/\phi_T$.

4. The zoom lens system according to claim 3, where the front lens group is composed of, from the object side to the image side, a lens element having a positive refractive power, a lens element having a negative refractive power and a lens element having a positive refractive power, and the zoom lens system satisfies the following condition:

$$0.10 < |(\phi_w \cdot \phi_T)^{\frac{1}{2}}/(\beta \cdot \phi_1)| < 0.27,$$

where $\phi_1$: refractive power of the front lens group ($\phi_1 > 0$).

5. The zoom lens system according to claim 3, where the rear lens group is composed of, from the object side to the image side, a lens element having a positive refractive power and a lens element having a negative refractive power.

6. The zoom lens system according to claim 3, where the rear lens group is composed of a lens element having a negative refractive power.

7. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group is composed of, from the object side to the image side, a lens element, with an aspherical surface, having a positive refractive power, a lens element, with an aspherical surface, having a negative refractive power, and a lens element having a positive refractive power, and the rear lens group is composed of two independent lens elements, and the zoom lens system satisfies the following conditions:

$$0.07 < (\phi_w \cdot \phi_T)^{\frac{1}{2}}/(\beta \cdot \phi_1) < 0.35, \text{ and}$$

$$0.07 < |(\phi_w \cdot \phi_T)^{\frac{1}{2}}/(\beta \cdot \phi_2)| < 0.35,$$

where $\phi_w$: refractive power of the zoom lens system at the shortest focal length condition, $\phi_T$: refractive power of the zoom lens system at the longest focal length condition, $\phi_1$: refractive power of the front lens group ($\phi_1 > 0$), $\phi_2$: refractive power of the rear lens group ($\phi_2 < 0$), and $\beta$: zoom ratio, which is given by $\beta = \phi_w/\phi_T$.

8. The zoom lens system according to claim 7, where the rear lens group is composed of, from the object side to the image side, a lens element having a positive refractive power and a lens element having a negative refractive power.

9. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group is composed of, from the object side to the image side, a lens element having a positive refractive power, a lens element having a negative refractive power and a lens element having a positive refractive power, and the rear lens group is composed of a lens element having a negative refractive power, and the zoom lens system satisfies the following conditions:

$$0.07 < (\phi_w \cdot \phi_T)^{\frac{1}{2}}/(\beta \quad \phi_1) < 0.40, \text{ and}$$

$$0.07 < |(\phi_w \cdot \phi_T)^{\frac{1}{2}}/(\beta \cdot \phi_2)| < 0.50,$$

where $\phi_w$: refractive power of the zoom lens system at the shortest focal length condition,
$\phi_T$: refractive power of the zoom lens system at the longest focal length condition,
$\phi_1$: refractive power of the front lens group ($\phi_1 > 0$);
$\phi_2$: refractive power of the rear lens group ($\phi_2 < 0$), and
$\beta$: zoom ratio, which is give by $\beta = \phi_w/\phi_T$.

10. A two group zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that each of the front and rear lens groups is composed of two lens elements, and the most object side lens element of the front lens group comprises at least one aspherical surface.

11. The zoom lens system according to claim 10, where one of the aspherical surfaces of the front lens group is placed at the most object side.

12. The zoom lens system according to claim 10, where the front lens group comprises a lens element whose surfaces are both aspherical.

13. The zoom lens system according to claim 10, where the front lens group satisfies the following conditions:

$$v_{d(G1)} < 40, \text{ and}$$

$$v_{d(G2)} > 50,$$

where $v_{d(Ga)}$: Abbe number of the object side lens of the front lens group, and
$v_{d(G2)}$: Abbe number of the image side lens of the front lens group.

14. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that each of the front and rear lens groups is composed of only two lens elements, and the rear lens group comprises a lens element whose surfaces are both aspherical.

15. The zoom lens system according to claim 14, where each of the front and rear lens groups comprises at least one aspherical surface.

16. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group is composed of a lens element with an aspherical surface on its object side having a positive refractive power and a lens element having a negative refractive power, and the rear lens group is composed of a lens element having a negative refractive power.

17. A zoom lens system comprising, from the object side tot he image side, a front lens unit having a positive refractive power and a rear lens unit having a negative refractive power, the zoom lens system being operated by changing the air distance between the front and rear lens units during a zooming operation, where the zoom lens system is characterized in that each of the front and rear lens units is composed of one lens element, and at least one surface of each of the lens elements is aspherical.

18. The zoom lens system according to claim 17, where the lens elements are, from the object side to the image side, a positive meniscus lens convex to the image side and a bi-concave lens.

19. The zoom lens system according to claim 17, where the lens elements are, from the object side to the image side, a positive meniscus lens convex to the image side and a negative meniscus lens concave to the object side.

20. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group comprises, from the object side to the image side, a first sub lens group having a negative refractive power and a second sub lens group having a positive refractive power, and the front and rear lens groups shift toward the object side with the air distance between the front lens group and the rear lens group decreasing and with the air distance between the first sub lens group and the second sub lens group of the front lens group increasing during a zooming operation from a shorter focal length to a longer focal length.

21. The zoom lens system according to claim 20, where the zoom lens system satisfies the following conditions:

$$0.01 < |(A_w - A_T)/(B_w - B_T)| < 0.8,$$

where $A_w$: the air distance between the first sub lens group and the second sub lens group of the front lens group at the shortest focal length condition,
$A_T$: the air distance between the first sub lens group and the second sub lens group of the front lens group at the longest focal length condition,
$B_w$: air distance between the front lens group and the rear lens group at the shortest focal length condition, and $B_T$: air distance between the front lens group and the rear lens group at the longest focal length condition.

22. The zoom lens system according to claim 21, where the zoom lens system further satisfies the following condition:

$A_w < A_T$, and $1.0 < \phi_{1T}/\phi_{1w} < 2.0$, where $\phi_{1w}$: refractive power of the front lens group at the shortest focal length condition, and $\phi_{1T}$: refractive power of the front lens group at the longest focal length condition.

23. The zoom lens system according to claim 22, where the front lens group comprises at least one aspherical surface.

24. The zoom lens system according to claim 23, where the rear lens group comprises at least one aspherical surface.

25. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group comprises, from the object side to the image side, a lens element having a negative refractive power and a sub lens group, and the air distance between the lens element and the sub lens group of the front lens group slightly varies for correcting aberrations according to a shift of the front lens group or the rear lens group along the optical axis of the zoom lens system for a focusing operation.

26. The zoom lens system according to claim 25, wherein the sub lens group has a positive refractive power comprising at least one lens element having a positive refractive power.

27. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that each of the front lens group and the rear lens group is composed of two lens elements, and each of the front lens group and the rear lens group comprises at least one lens element that is made of lens material satisfying either the following condition a) or the following condition b):

a) $N_d \leq 1.60$ and $\nu_d \leq 35.0$, or b) $N_d 1.50$, where $N_d$: refractive index of the lens material for the d-line, and $\nu_d$: Abbe number of the lens material for the d-line.

28. The zoom lens system according to claim 27, where the front lens group comprises at least one aspherical surface.

29. The zoom lens system according to claim 27, where the rear lens group comprises at least one aspherical surface.

30. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that each of the front lens group and the rear lens group is composed of two lens elements, and the rear lens group comprises at least one lens element that has an aspherical surface at the object side and is made of lens material satisfying either the following condition a) or the following condition b):

a) $N_d \leq 1.60$ and $\nu_d \leq 35.0$, or b) $N_d \leq 1.50$, where $N_d$: refractive index of the lens material for the d-line, and $\nu_d$: Abbe number of the lens material for the d-line.

31. The zoom lens system according to claim 30, where the front lens group comprises at least one lens element that is made of lens material satisfying either the following condition a) or the following condition b):

a) $N_d \leq 1.60$ and $\nu_d \leq 35.0$, or b) $N_d \leq 1.50$, where $N_d$: refractive index of the lens material for the d-line, and $\nu_d$: Abbe number of the lens material for the d-line.

32. The zoom lens system according to claim 30, where the front lens group comprises at least one aspherical surface.

33. A two group zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that each of the front lens group and the rear lens group is composed of two lens elements, and the two lens elements of the front lens group are made of plastic.

34. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the most object side lens element of the front lens group has two aspherical surfaces.

35. The zoom lens system according to claim 34, where the rear lens group comprises at least one aspherical surface.

36. The zoom lens system according to claim 34, where the front lens group comprises at least three aspherical surfaces.

37. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the most object side lens element of the front lens group has two aspherical surfaces, and the rear lens group comprises at least one aspherical surface, at least one of the aspherical surfaces of the rear lens group satisfying the following condition:

for a height y from the optical axis of the zoom lens system satisfying $0.8y_{MAX} < y < 1.0y_{MAX}$ where $y_{MAX}$ is the maximum effective radius of the aspherical surface, $$-0.10 < \phi_2 \cdot (N'-N) \cdot d\{x(y)-x_o(y)\}/dy < 0,$$

where $\phi_2$: refractive power of the rear lens group,
N: refractive index of the medium at the object side of the aspherical surface,
N': refractive index of the medium at the image side of the aspherical surface,
x(y): axial deviation of the aspherical surface from its vertex at the height y, which is given by $$x(y) = (r/\epsilon)[1-\{1-\epsilon(y^2/r^2)\}^{1/2}] + \Sigma A_i y^i$$

(summation $\Sigma$ made for $i \geq 2$)

$x_o(y)$: axial deviation of the reference spherical surface of the aspherical surface from its vertex at the height y, which is given by $$x_o(y) = \tilde{r}[1-\{1-(y^2/\tilde{r}^2)\}^{1/2}]$$

r: radius of curvature of the aspherical surface at the vertex,
$\epsilon$: quadric surface parameter,
$A_i$: aspherical coefficient of the i-th order, and
$\tilde{r}$: radius of curvature at the vertex, which is given by $(1/r) = (1/\tilde{r}) + 2A_2$.

38. A zoom lens system comprising, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group is composed of, from the object side to the image side, a lens element having a negative refractive power and a lens element having a positive refractive power, and the rear lens group is composed of, from the object side to the image side, a lens element having a negative or non-refractive power and a lens element having a negative refractive power.

39. The zoom lens system according to claim 38, where the front lens group comprises at least one aspherical surface.

40. The zoom lens system according to claim 38, where the rear lens group comprises at least one aspherical surfaces.

41. The zoom lens system according to claim 38, where the zoom lens system comprises at least one lens element whose surfaces are both aspherical.

42. A zoom lens system consisting of, from the object side to the image side, a front lens group having a positive refractive power and a rear lens group having a negative refractive power, the zoom lens system being operated by changing the air distance between the front and rear lens groups during a zooming operation, where the zoom lens system is characterized in that the front lens group comprises, from the object said to the image side, a first sub lens group and a second sub lens group, and the air distance between the first sub lens group and the second sub lens group of the front lens group slightly varies for correcting aberrations according to a shift of the front lens group or the rear lens group upon the optical axis of the zoom lens system for a focusing operation, wherein the first sub lens group has a positive refractive power comprising at least one lens element and the second sub lens group has a positive refractive power comprising at least one lens element.

* * * * *